United States Patent
Monroe

(10) Patent No.: US 7,859,396 B2
(45) Date of Patent: Dec. 28, 2010

(54) MULTIMEDIA NETWORK APPLIANCES FOR SECURITY AND SURVEILLANCE APPLICATIONS

(76) Inventor: David A. Monroe, 720 Lincoln Center 7800 IH-10 West, San Antonio, TX (US) 78230

( * ) Notice: Subject to any disclaimer, the term of this patent is extended or adjusted under 35 U.S.C. 154(b) by 989 days.

(21) Appl. No.: 11/603,649

(22) Filed: Nov. 22, 2006

(65) Prior Publication Data

US 2008/0016366 A1 Jan. 17, 2008

(51) Int. Cl.
G08B 29/00 (2006.01)
(52) U.S. Cl. .................. 340/506; 340/507; 340/521; 340/517; 340/539.1; 340/825.36; 340/825.49
(58) Field of Classification Search ............. 340/506, 340/507, 521, 517, 539.1, 825.36, 825.49
See application file for complete search history.

(56) References Cited

U.S. PATENT DOCUMENTS

| | | |
|---|---|---|
| 4,163,283 A | 7/1979 | Darby |
| 4,179,695 A | 12/1979 | Levine et al. |
| 4,197,536 A | 4/1980 | Levine |
| 4,516,125 A | 5/1985 | Schwab et al. |
| 4,831,438 A | 5/1989 | Bellman, Jr. et al. |
| 4,845,629 A | 7/1989 | Murge |
| 4,857,912 A | 8/1989 | Everett, Jr. et al. |
| 4,891,650 A | 1/1990 | Sheffer |
| 4,910,692 A | 3/1990 | Outram |
| 5,027,104 A | 6/1991 | Reid |

(Continued)

FOREIGN PATENT DOCUMENTS

EP 220752 5/1987

(Continued)

OTHER PUBLICATIONS

Apr. 1966, Apollo Unified S-Band System, NASA-Goddard Space Flight Center, Greenbelt, Maryland.

(Continued)

Primary Examiner—Daryl Pope

(57) ABSTRACT

Network appliances for use in combination with a network based full service, multi-media surveillance system provide a wide range of monitoring techniques utilizing digital network architecture. The appliances may be connected to the surveillance system for transmitting event data, video and/or image monitoring information, audio signals and other data over significant distances using digital data transmission over networks such as a local area network (LAN), a wireless LAN (WLAN), a wide area network such as the Internet for other networks, permitting remote manual and/or automatic assessment and response. The wireless LAN connectivity permits local distribution of audio, video and image data with relatively high bandwidth without requirement of a license and without relying on a common carrier and the fees associated therewith. The surveillance system may be interfaced with a WAN (wide area network) such as frame relay or the Internet for providing a worldwide, low cost surveillance system with virtually unlimited geographic application. Multiple sensors and appliances may be accommodated, as required. The topology of the network will be established by the geographic situation of the specific installation. Appropriate firewalls may be set up as desired to protect unauthorized access to the system or collected data. The server based system permits a security provider to have access to the appliance, related sensor and surveillance data or to configure or reconfigure the system from any station on the Intranet or Internet.

69 Claims, 131 Drawing Sheets

U.S. PATENT DOCUMENTS

| | | | |
|---|---|---|---|
| 5,027,114 A | 6/1991 | Kawashime et al. | |
| 5,091,780 A | 2/1992 | Pomerleau | |
| 5,109,278 A | 4/1992 | Erickson | |
| 5,111,291 A | 5/1992 | Erickson | |
| 5,166,746 A | 11/1992 | Sato et al. | |
| 5,218,367 A | 6/1993 | Sheffer et al. | |
| 5,243,340 A | 9/1993 | Norman et al. | |
| 5,243,530 A | 9/1993 | Stanifer et al. | |
| 5,268,698 A | 12/1993 | Smith, Sr. et al. | |
| 5,283,643 A | 2/1994 | Fujimoto | |
| 5,321,615 A | 6/1994 | Frisbie et al. | |
| 5,334,982 A | 8/1994 | Owen | |
| 5,351,194 A | 9/1994 | Ross | |
| 5,400,031 A | 3/1995 | Fltts | |
| 5,400,246 A * | 3/1995 | Wilson et al. | 700/17 |
| 5,408,330 A | 4/1995 | Squicciarini et al. | |
| 5,432,838 A | 7/1995 | Purchase | |
| 5,440,337 A | 8/1995 | Henderson et al. | |
| 5,440,343 A | 8/1995 | Parulski | |
| 5,448,243 A | 9/1995 | Bethke et al. | |
| 5,463,595 A | 10/1995 | Rochall et al. | |
| 5,469,371 A | 11/1995 | Bess | |
| 5,497,149 A | 3/1996 | Fast | |
| 5,508,736 A | 4/1996 | Cooper | |
| 5,509,009 A | 4/1996 | Laycock | |
| 5,530,440 A | 6/1996 | Denzer et al. | |
| 5,553,609 A | 9/1996 | Chen et al. | |
| 5,557,254 A | 9/1996 | Johnson et al. | |
| 5,557,278 A | 9/1996 | Piccirillo et al. | |
| 5,598,167 A | 1/1997 | Zjderhand | |
| 5,612,668 A | 3/1997 | Scott | |
| 5,627,753 A | 5/1997 | Brankin et al. | |
| 5,629,691 A | 5/1997 | Jain | |
| 5,636,122 A | 6/1997 | Shah et al. | |
| 5,642,285 A | 6/1997 | Woo | |
| 5,666,157 A | 9/1997 | Avid | |
| 5,670,961 A | 9/1997 | Tomote et al. | |
| 5,677,979 A | 10/1997 | Squicciarini | |
| 5,689,442 A | 11/1997 | Swanson | |
| 5,712,679 A | 1/1998 | Coles | |
| 5,712,899 A | 1/1998 | Pace, II | |
| 5,714,948 A | 2/1998 | Farmakis et al. | |
| 5,742,336 A | 4/1998 | Lee | |
| 5,751,346 A | 5/1998 | Dozler | |
| 5,777,551 A | 7/1998 | Hess | |
| 5,777,580 A | 7/1998 | Janky et al. | |
| 5,793,416 A | 8/1998 | Rostoker et al. | |
| 5,825,283 A | 10/1998 | Camhi | |
| 5,835,059 A | 11/1998 | Nadel et al. | |
| 5,850,180 A | 12/1998 | Hess | |
| 5,867,804 A | 2/1999 | Pilley et al. | |
| 5,917,405 A | 6/1999 | Joso | |
| 5,926,210 A | 7/1999 | Hackett et al. | |
| 5,933,098 A | 8/1999 | Haxton | |
| 5,938,706 A | 8/1999 | Feldman | |
| 5,959,529 A * | 9/1999 | Kail, IV | 340/539.12 |
| 5,974,158 A | 10/1999 | Auty et al. | |
| 5,983,161 A | 11/1999 | Lemelson et al. | |
| 5,999,116 A | 12/1999 | Evers | |
| 6,002,427 A | 12/1999 | Kipust | |
| 6,009,356 A | 12/1999 | Monroe | |
| 6,067,571 A | 5/2000 | Igarashi et al. | |
| 6,069,655 A | 5/2000 | Seeley | |
| 6,078,850 A | 6/2000 | Kane et al. | |
| 6,084,510 A | 7/2000 | Lemelson et al. | |
| 6,092,008 A | 7/2000 | Bateman | |
| 6,100,964 A | 8/2000 | De Cremiers | |
| 6,133,941 A | 10/2000 | Ono | |
| 6,154,658 A | 11/2000 | Caci | |
| 6,157,317 A | 12/2000 | Walker | |
| 6,181,373 B1 | 1/2001 | Coles | |
| 6,195,609 B1 | 2/2001 | Pilley et al. | |
| 6,226,031 B1 | 5/2001 | Barraciough et al. | |
| 6,246,320 B1 | 6/2001 | Monroe | |
| 6,259,475 B1 | 7/2001 | Ramachandran et al. | |
| 6,275,231 B1 | 8/2001 | Obradovich | |
| 6,278,965 B1 | 8/2001 | Glass et al. | |
| 6,282,488 B1 | 8/2001 | Castor et al. | |
| 6,292,098 B1 | 9/2001 | Ebata | |
| 6,356,625 B1 | 3/2002 | Casteiani | |
| 6,385,772 B1 | 5/2002 | Courtney | |
| 6,424,370 B1 | 7/2002 | Courtney | |
| 6,462,697 B1 | 10/2002 | Klamer et al. | |
| 6,476,858 B1 | 11/2002 | Ramirez Diaz et al. | |
| 6,504,479 B1 | 1/2003 | Lemons | |
| 6,522,352 B1 | 2/2003 | Strandwitz et al. | |
| 6,525,761 B2 | 2/2003 | Sato et al. | |
| 6,549,130 B1 | 4/2003 | Joso | |
| 6,556,241 B1 | 4/2003 | Yoshimura et al. | |
| 6,570,610 B1 | 5/2003 | Kipulst | |
| 6,628,835 B1 | 9/2003 | Brill | |
| 6,646,676 B1 | 11/2003 | DaGrace | |
| 6,662,649 B1 | 12/2003 | Knight et al. | |
| 6,675,386 B1 | 1/2004 | Hendricks et al. | |
| 6,698,021 B1 | 2/2004 | Amini | |
| 6,720,990 B1 | 4/2004 | Walker et al. | |
| 7,113,971 B1 | 9/2006 | Ohi et al. | |
| 2003/0071899 A1 | 4/2003 | Joso | |
| 2005/0055727 A1 | 3/2005 | Creamer et al. | |
| 2005/0130803 A1 | 6/2005 | Rastegar | |

FOREIGN PATENT DOCUMENTS

| | | |
|---|---|---|
| EP | 232031 | 8/1987 |
| EP | 532110 | 3/1993 |
| EP | 209397 | 7/1993 |
| EP | 613109 | 8/1994 |
| EP | 613110 | 8/1994 |
| EP | 613111 | 8/1994 |
| EP | 744630 | 11/1996 |
| EP | 785536 | 7/1997 |
| JP | 6-301898 | 10/1994 |
| JP | 9-282600 | 10/1997 |
| JP | HEI-10-66058 | 3/1998 |
| JP | A-10-155040 | 6/1998 |
| JP | 9-251599 | 4/1999 |
| JP | 11-160424 | 6/1999 |
| WO | WO90/04242 | 4/1990 |
| WO | WO95/27910 | 10/1995 |
| WO | WO96/12265 | 4/1996 |
| WO | WO9737336 | 10/1997 |
| WO | WO98/52174 | 11/1998 |

OTHER PUBLICATIONS

Nov. 24, 1976, TELEXIS ViaNet General Information Booklet Version 1.3.
2000, ViaNet 3000 Administrator's Manual Version 1.1-NetXpress Video by TELEXIS, Kanata, Ontario, Canada.
1999, ViaNet 3000 Operator Manual Version 1.0 by TELEXIS-NetXpress Video, Kanata, Ontario, Canada.
1999, ViaNet 3000 Administrator Manual Version 1.0-NetXpress Video by TELEXIS, Kanata, Ontario, Canada.
1999, ViaNet 3000 Instruction Manual Operator's Revision 1-NetXpress Video by TELEXIS, Kanata, Ontario, Canada.

* cited by examiner

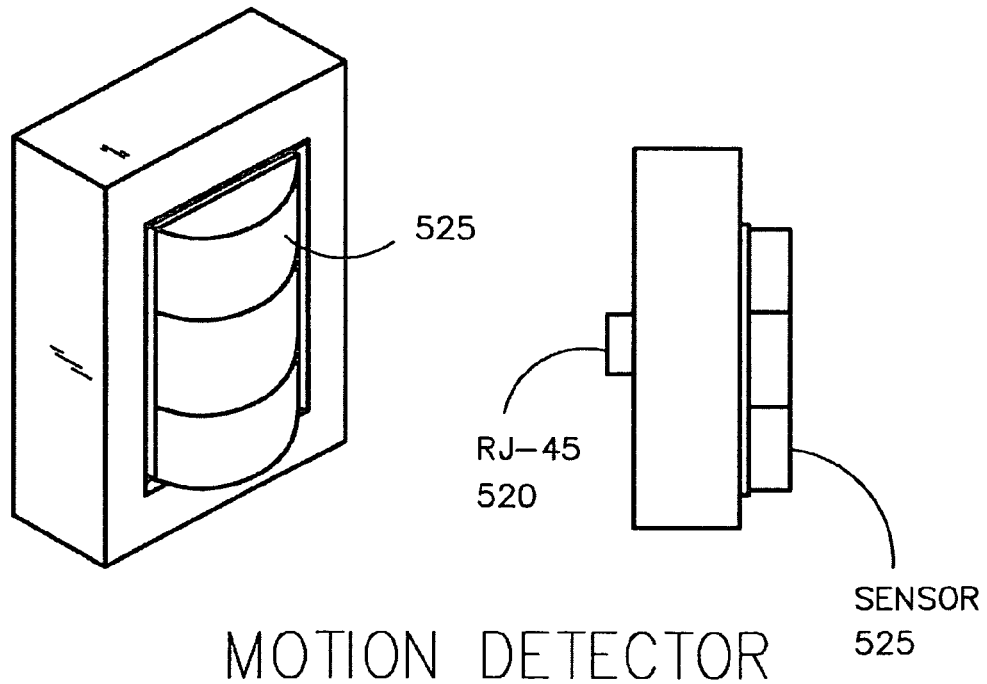
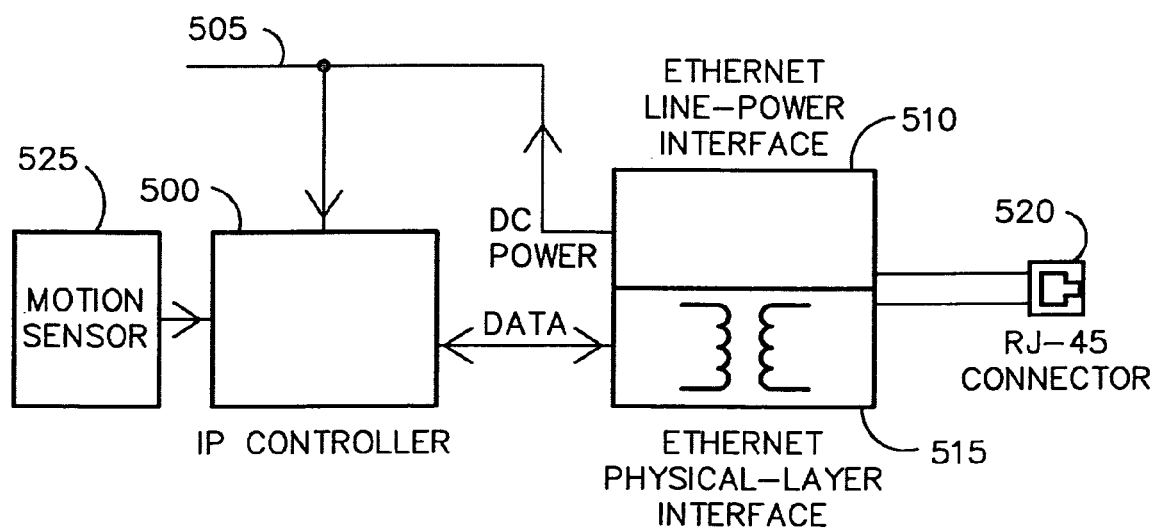
FIG. 12

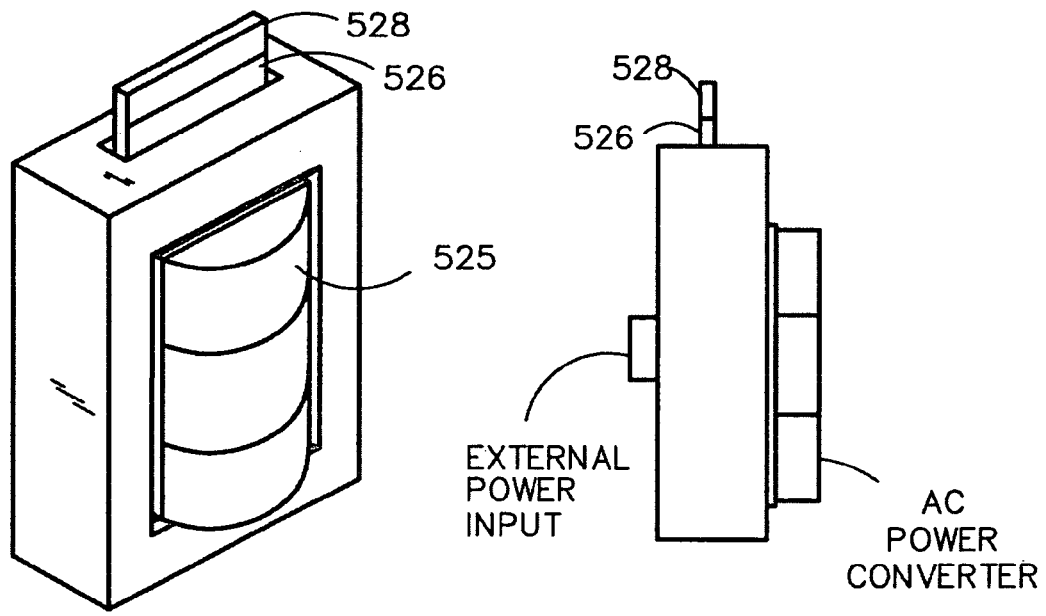
MOTION DETECTOR
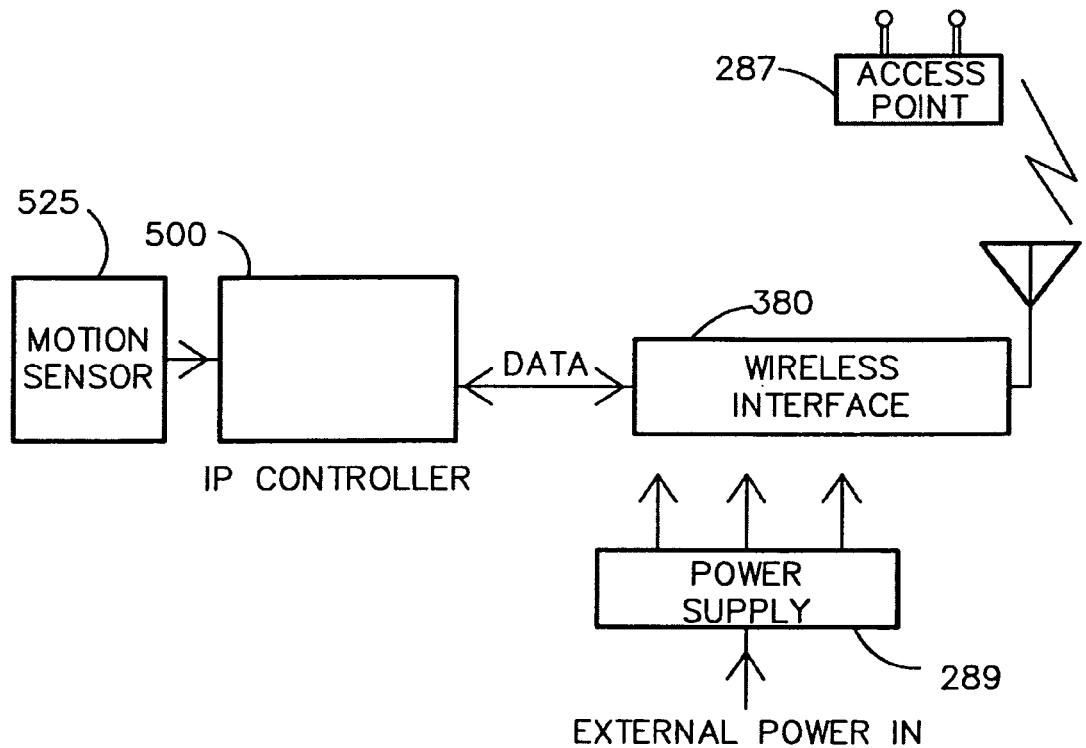
FIG. 12A

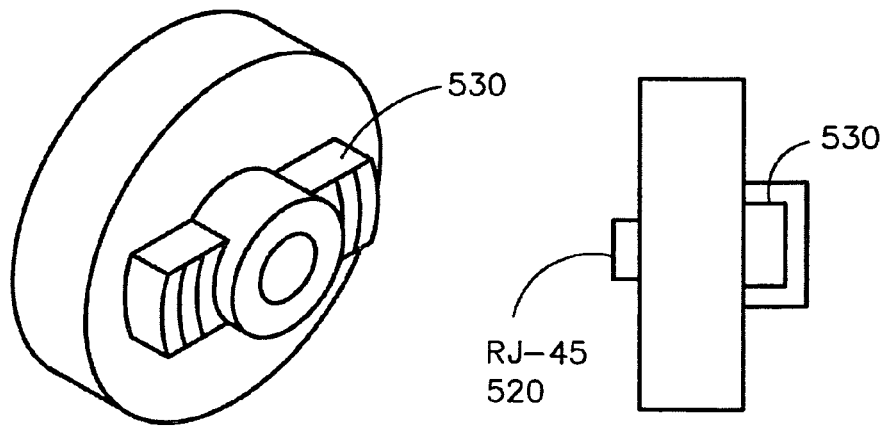
SMOKE DETECTOR OR
SMOKE & TEMP DETECTOR
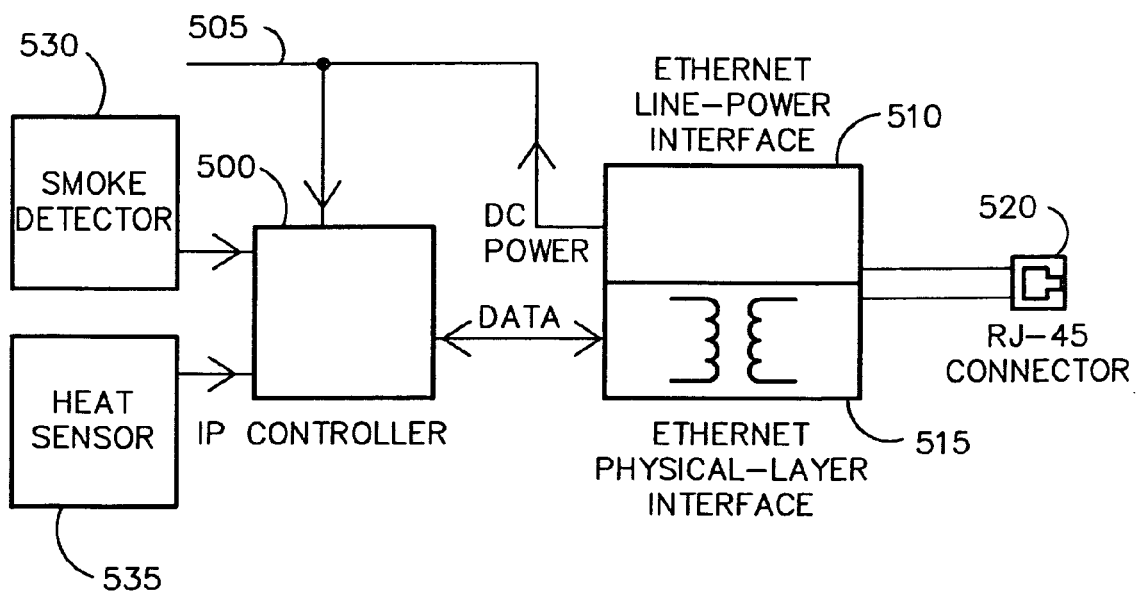
FIG. 13

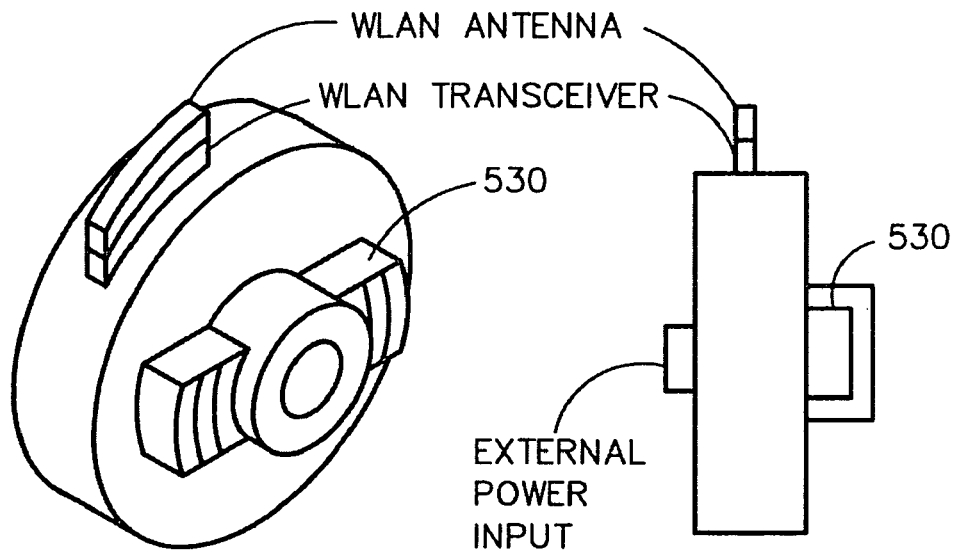
SMOKE DETECTOR OR
SMOKE & TEMP DETECTOR
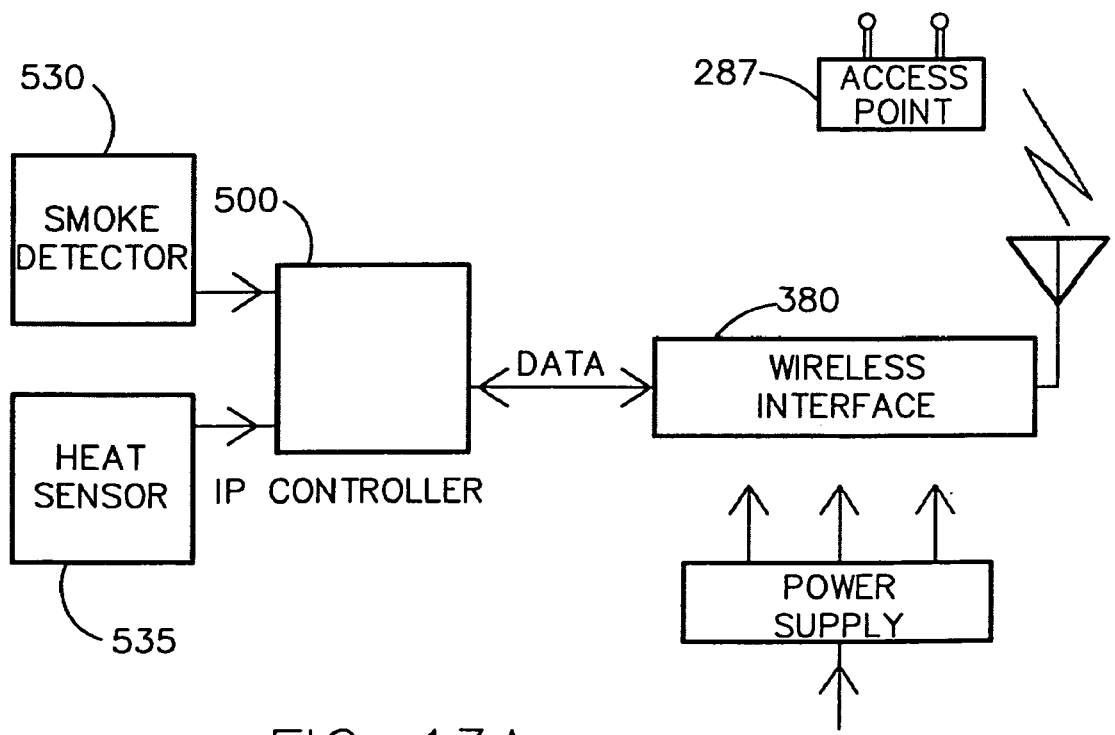
FIG. 13A

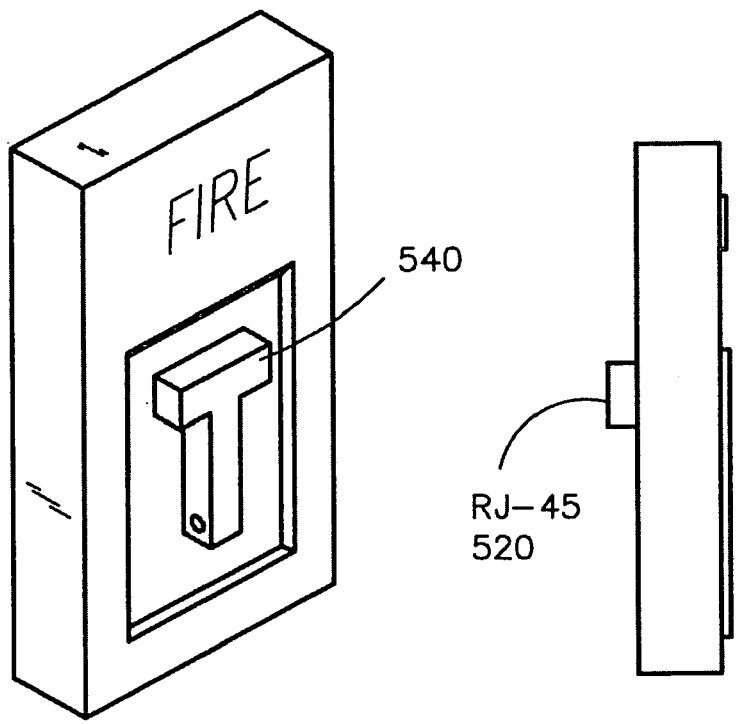
PULL HANDLE
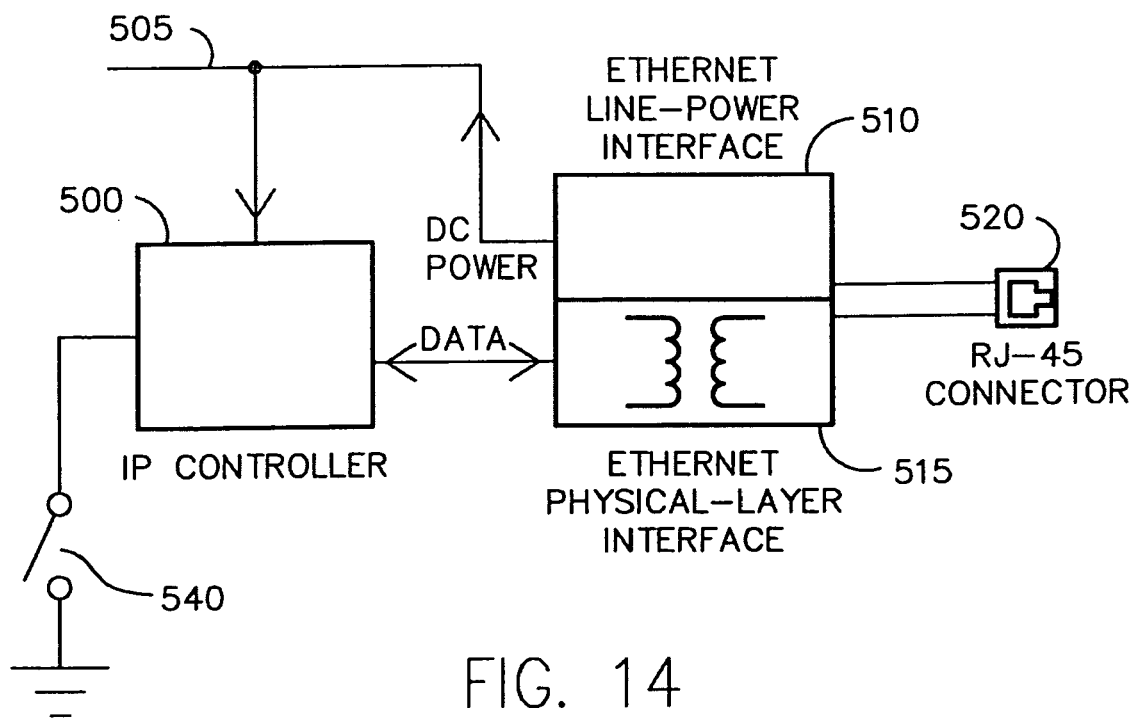
FIG. 14

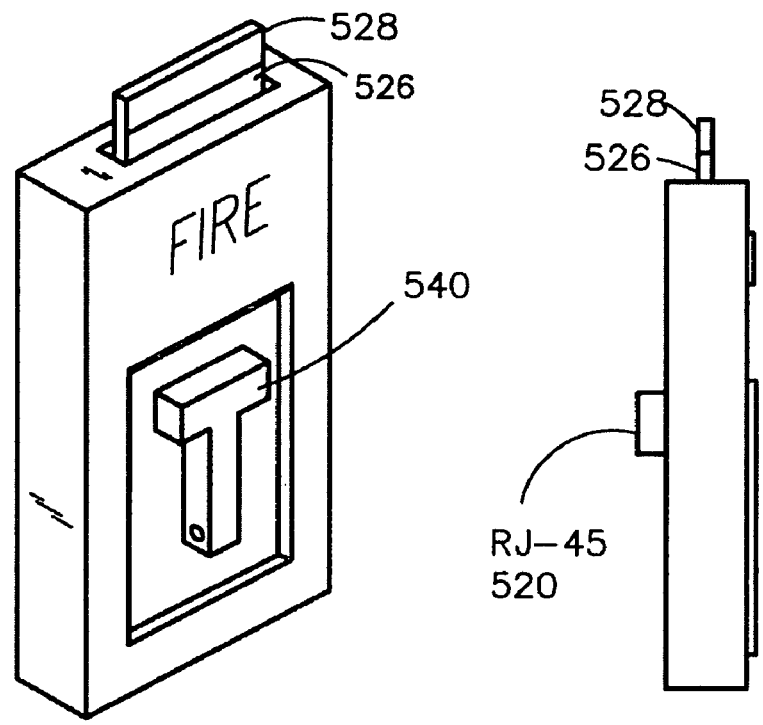
PULL HANDLE
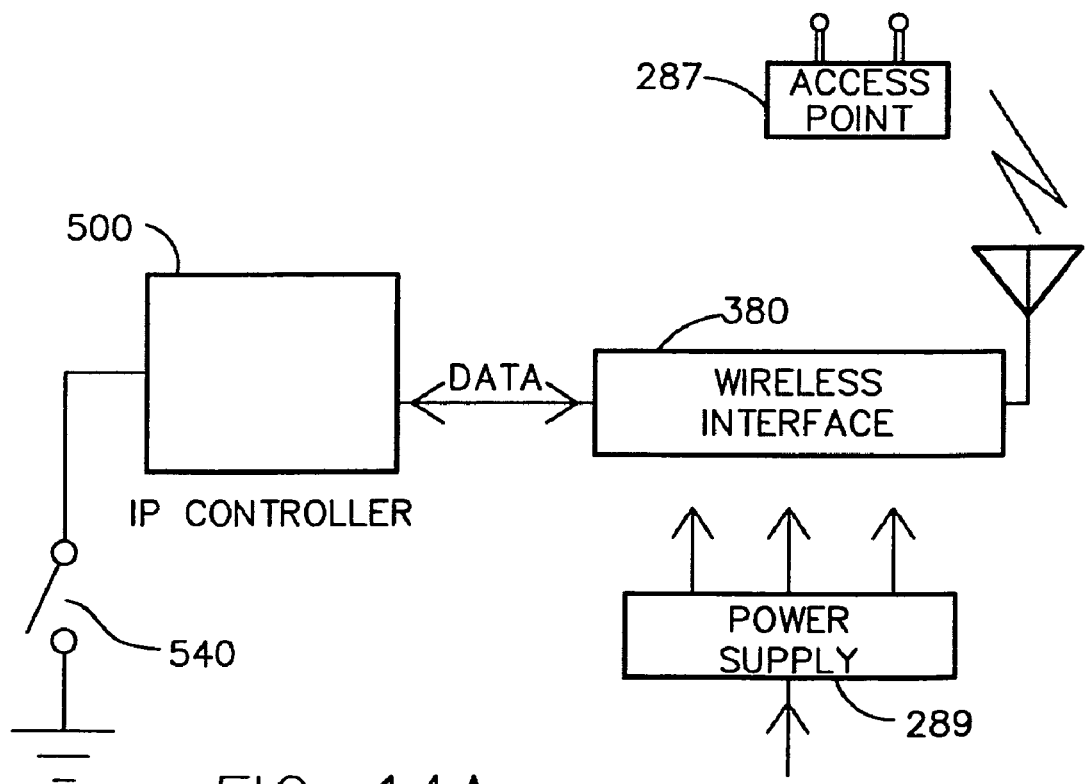
FIG. 14A

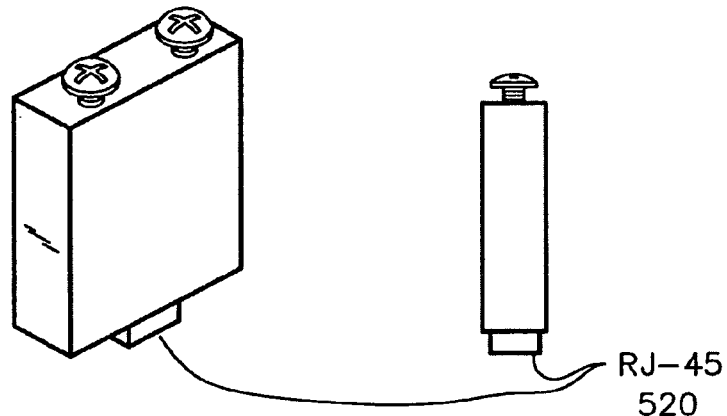
EXTERNAL CONTACT INTERFACE
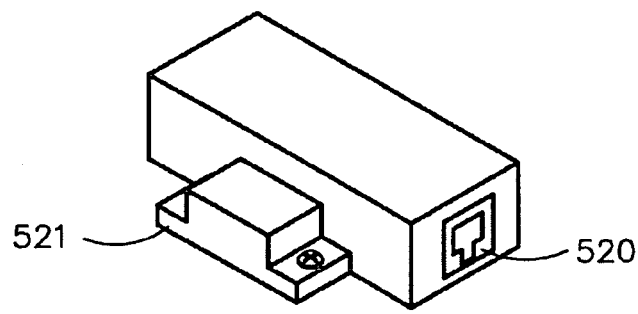
INTERNAL CONTACT INTERFACE
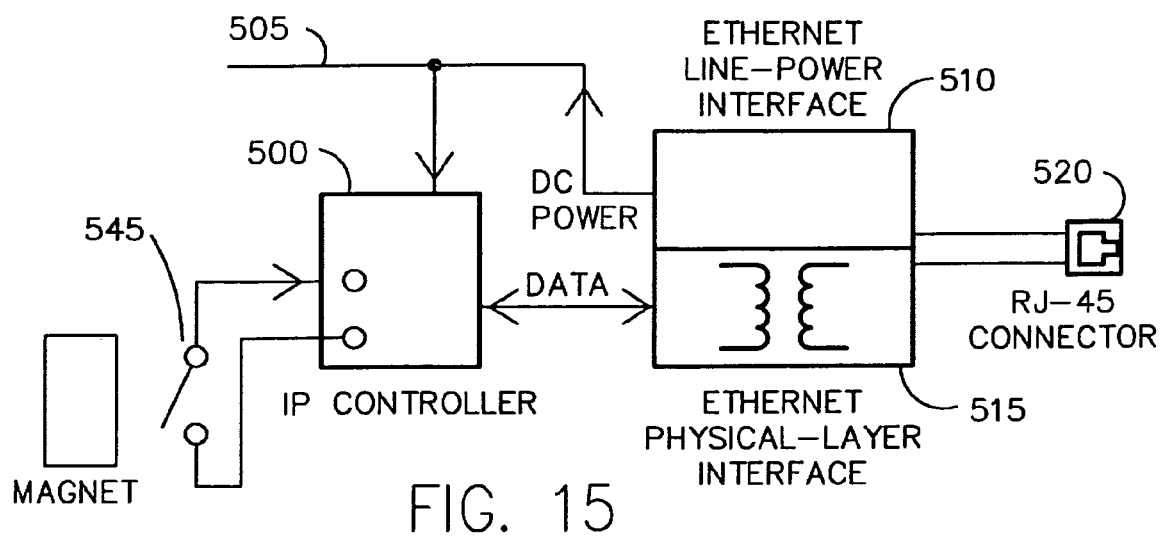
FIG. 15

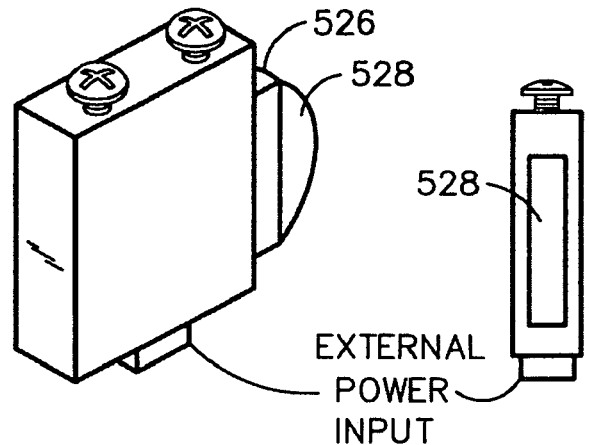
EXTERNAL CONTACT INTERFACE
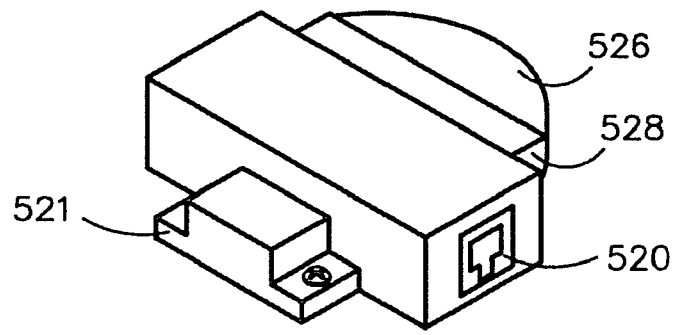
INTERNAL CONTACT INTERFACE
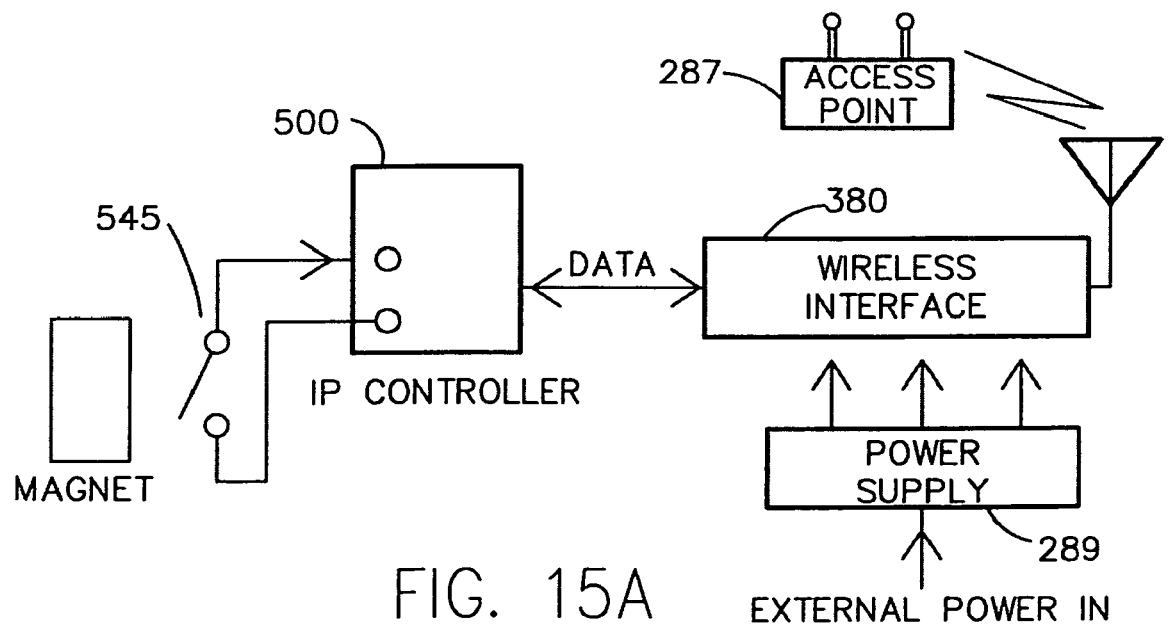
FIG. 15A

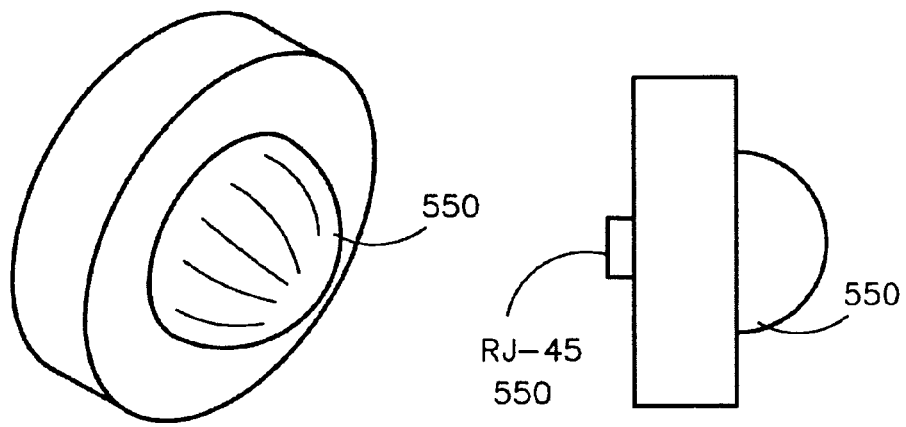
HEAT SENSOR
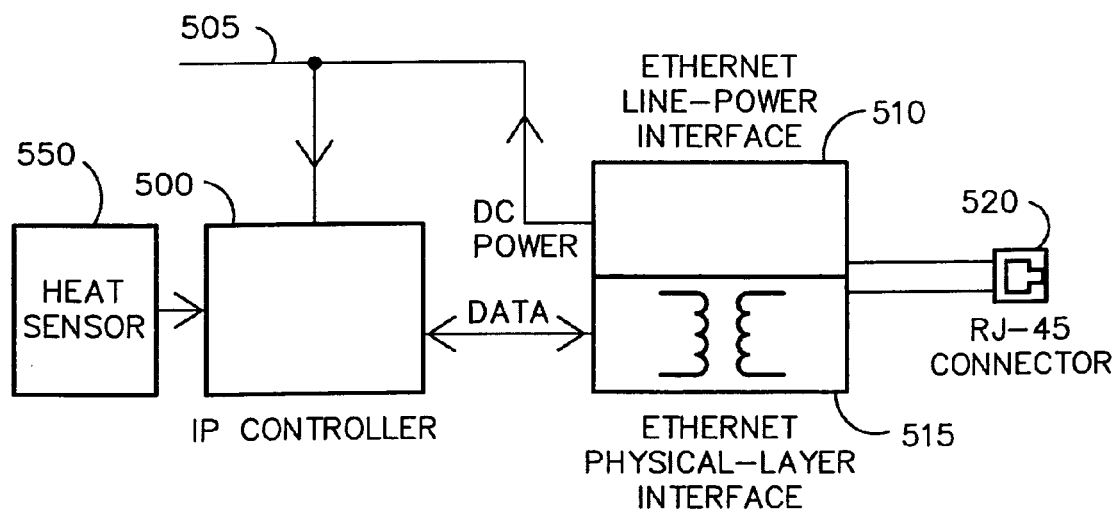
FIG. 16

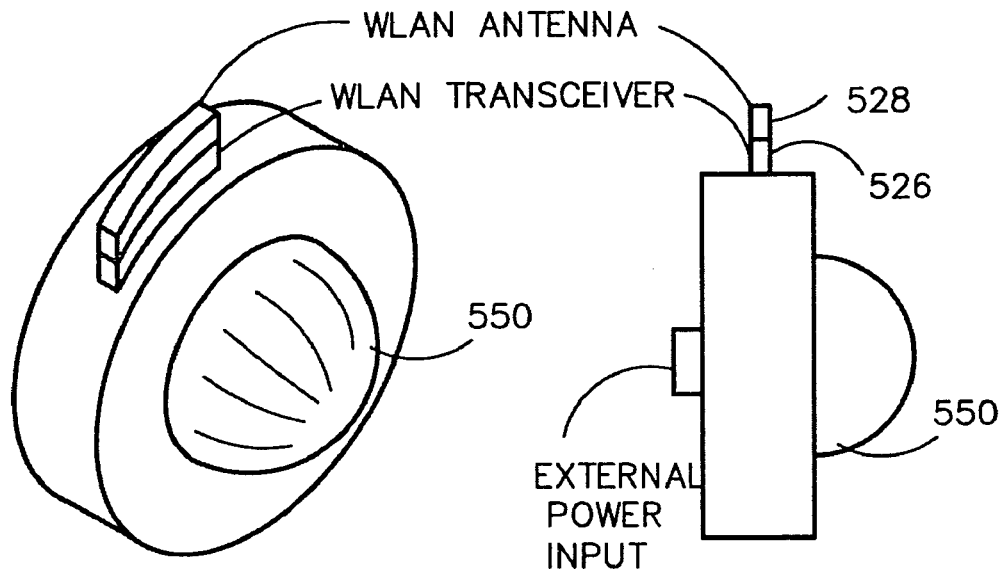
HEAT SENSOR
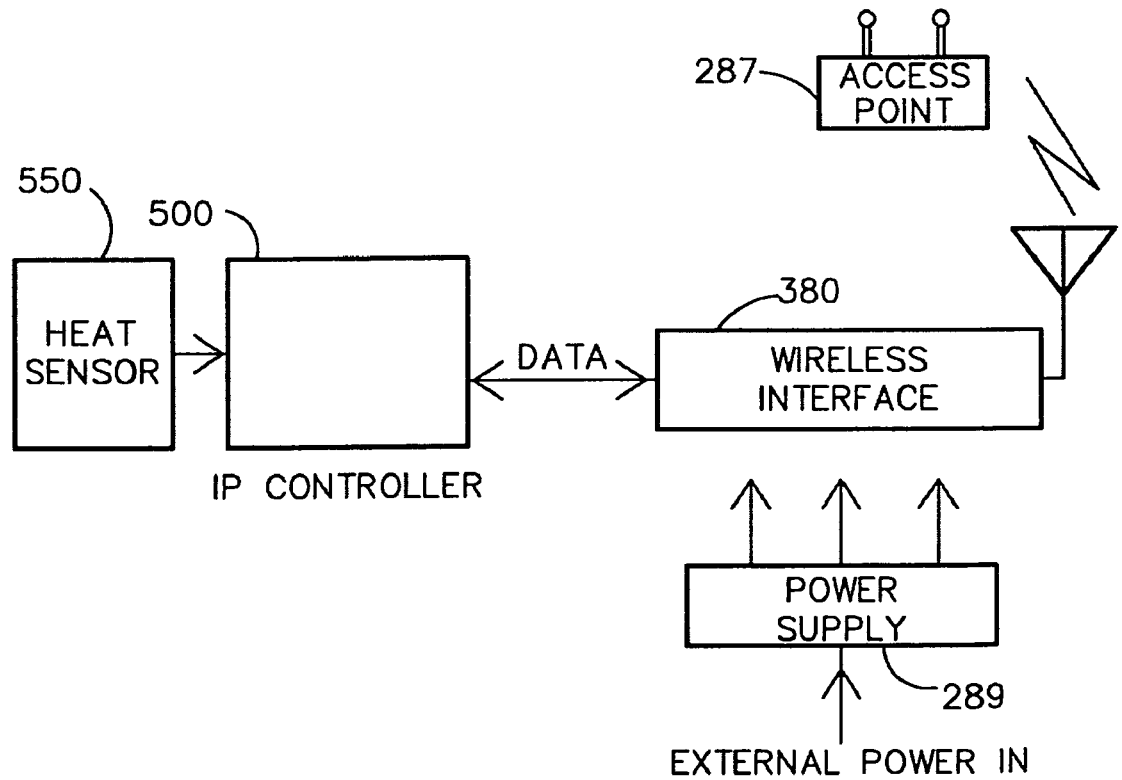
FIG. 16A

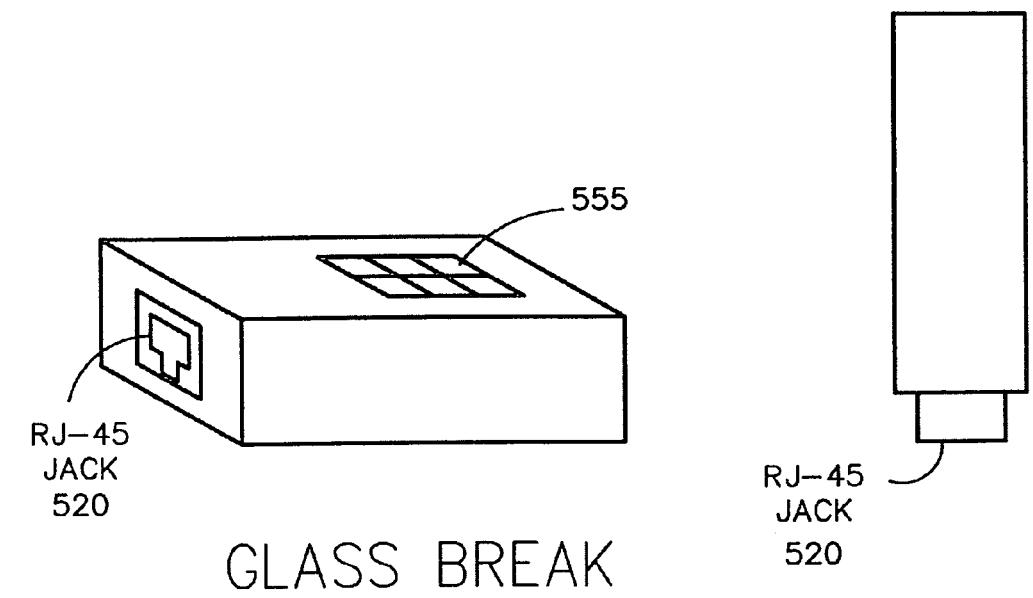
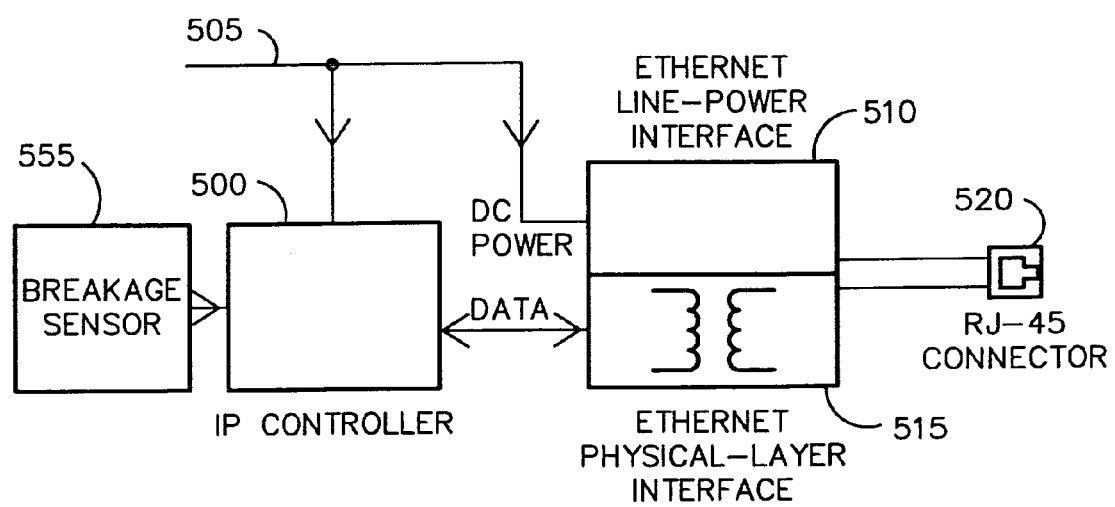
FIG. 17

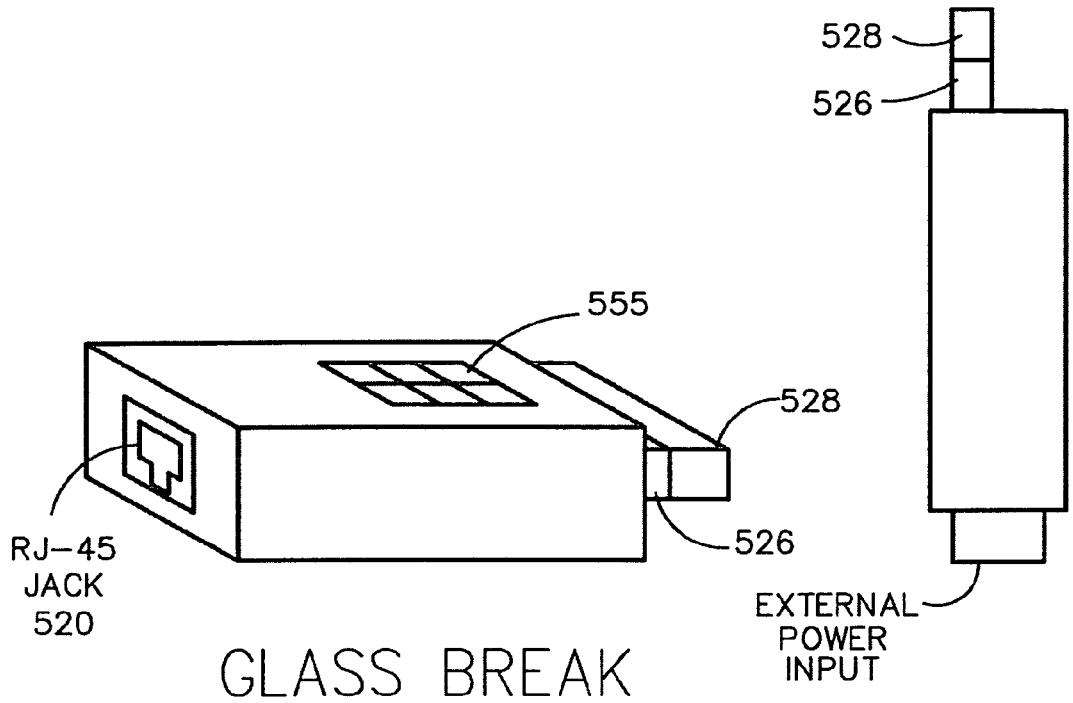
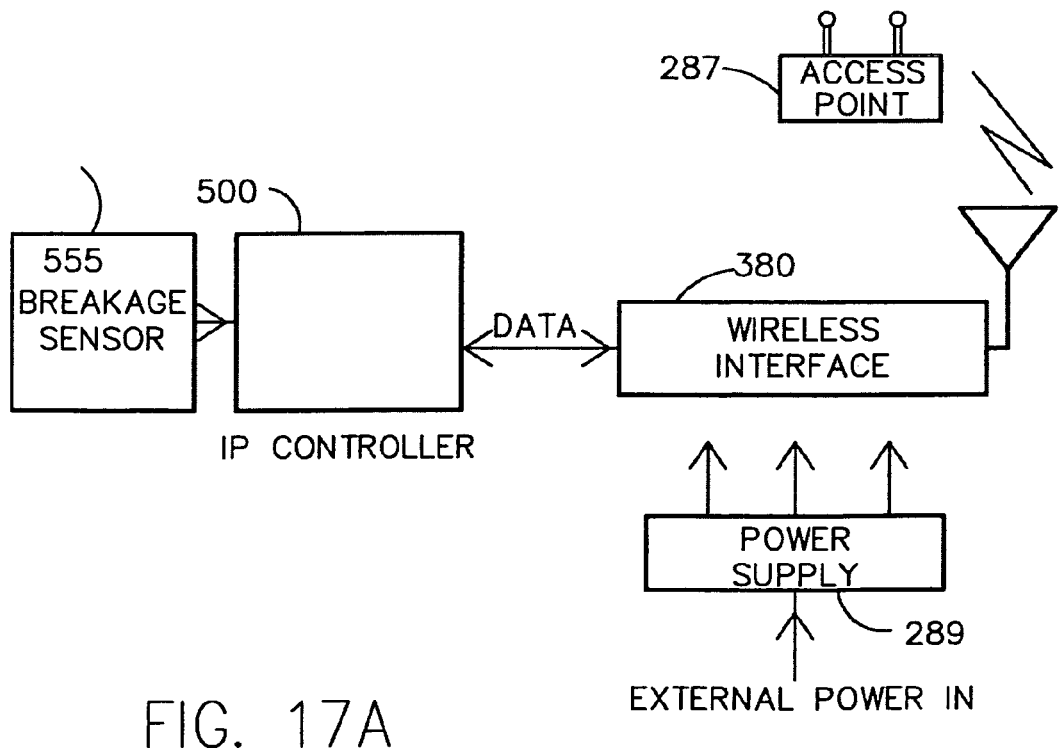
FIG. 17A

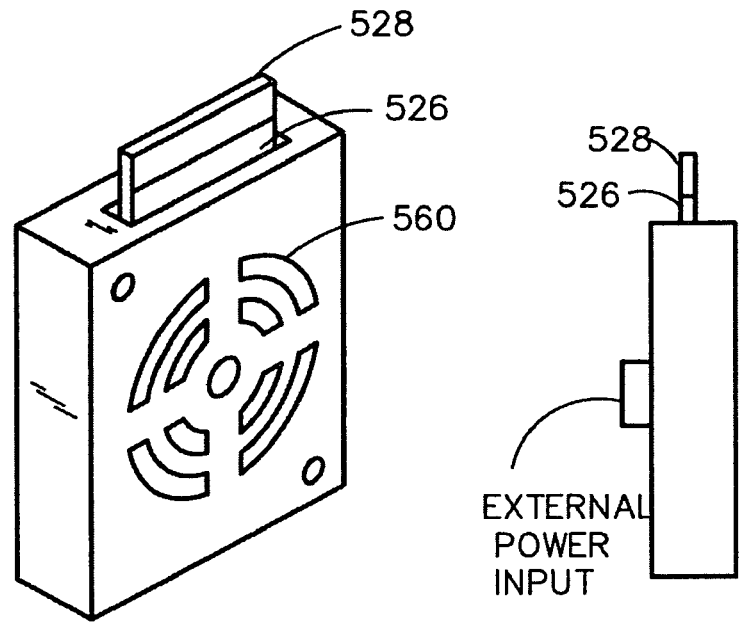
SIREN
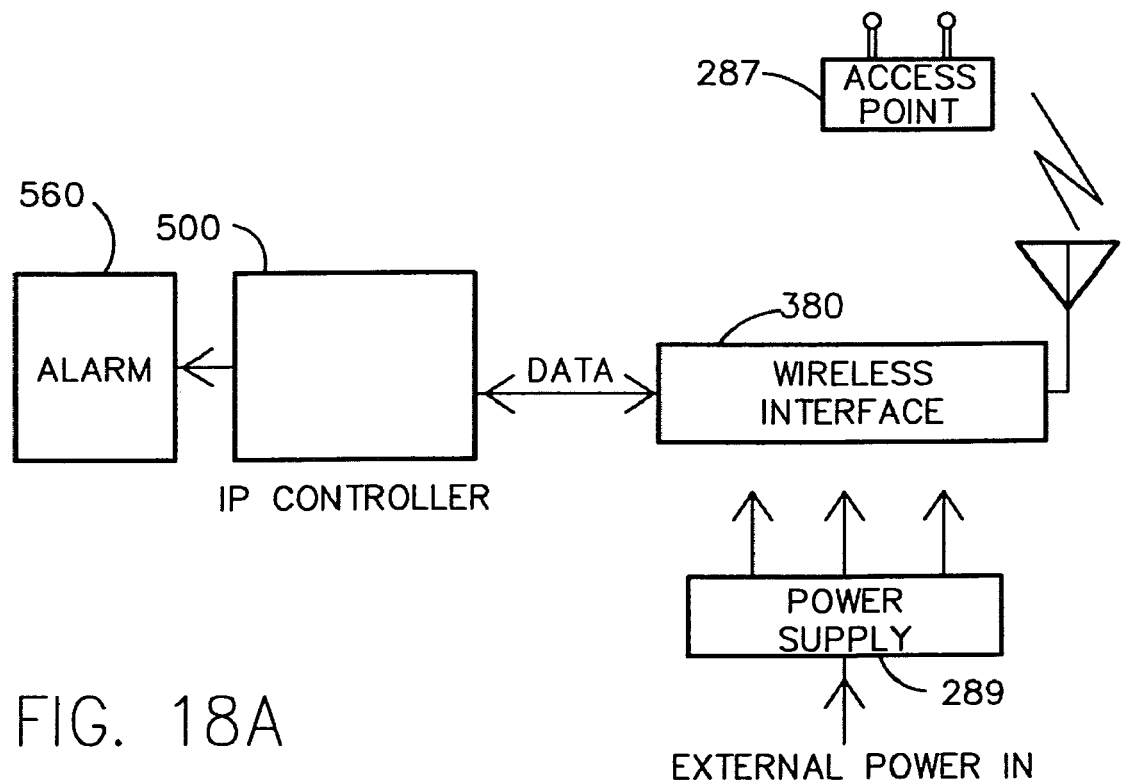
FIG. 18A

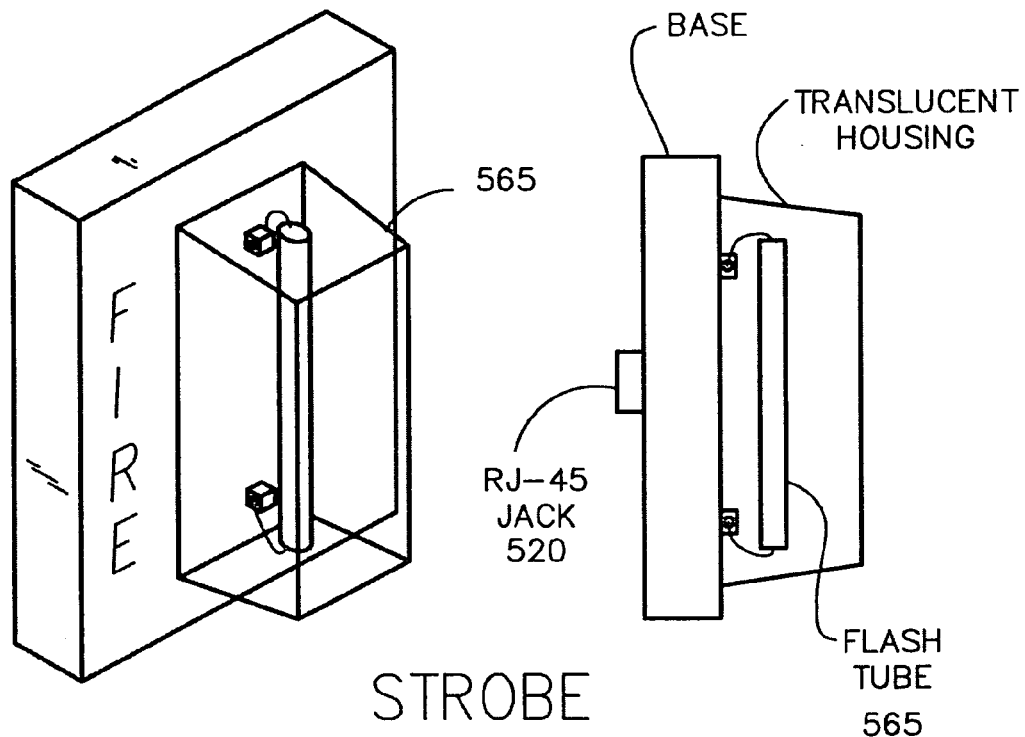
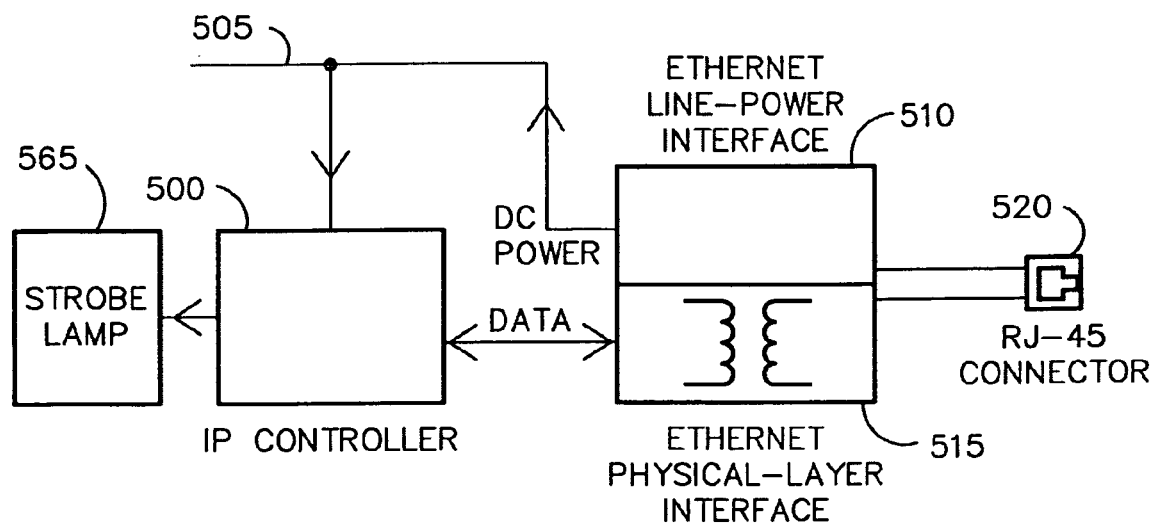
FIG. 19

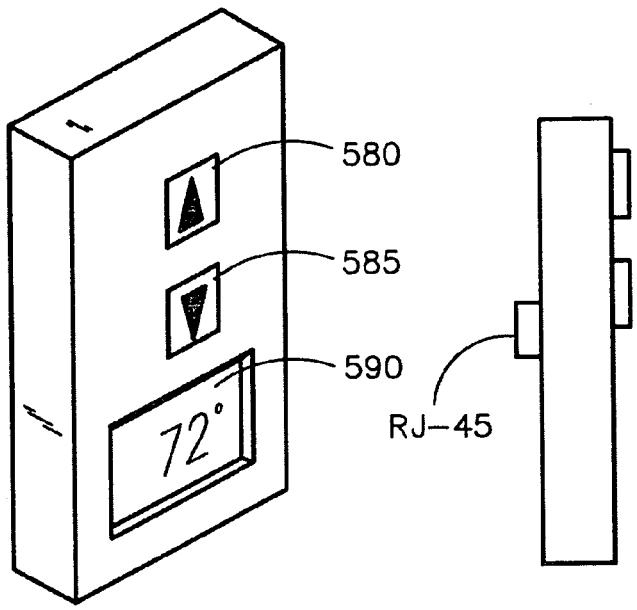
THERMOSTAT AND/OR HUMIDISTAT
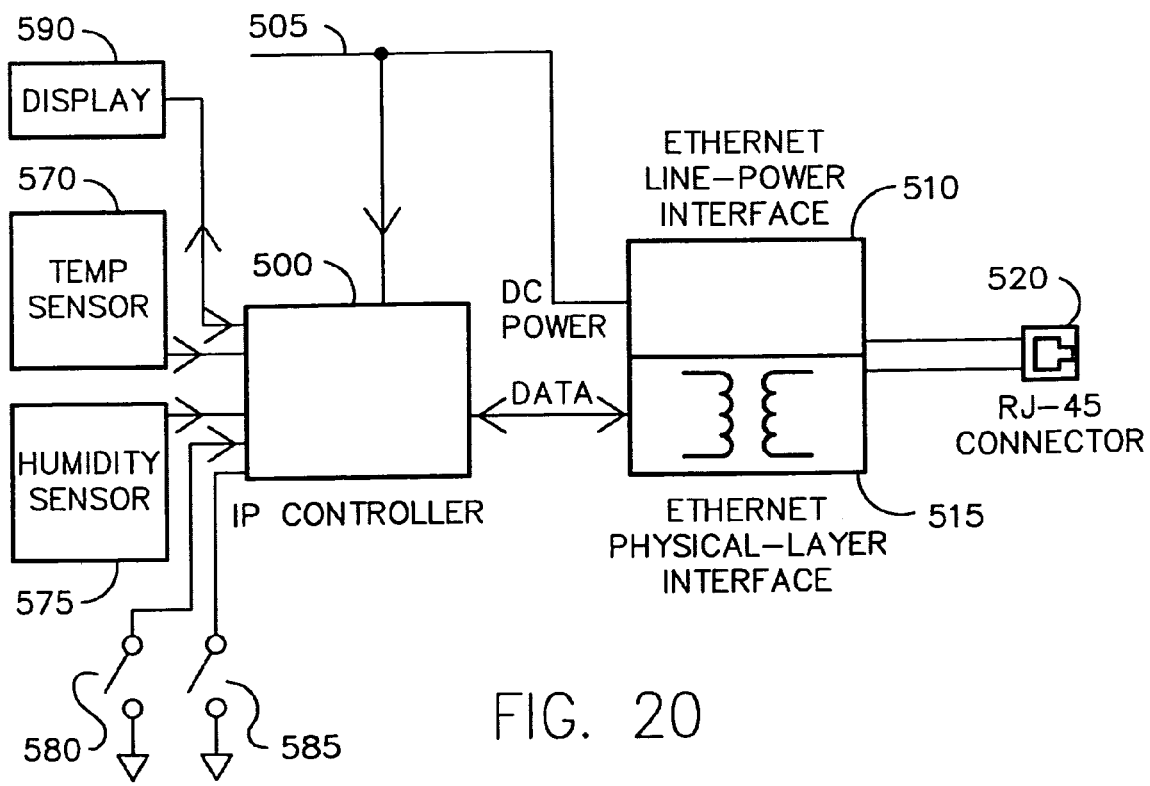
FIG. 20

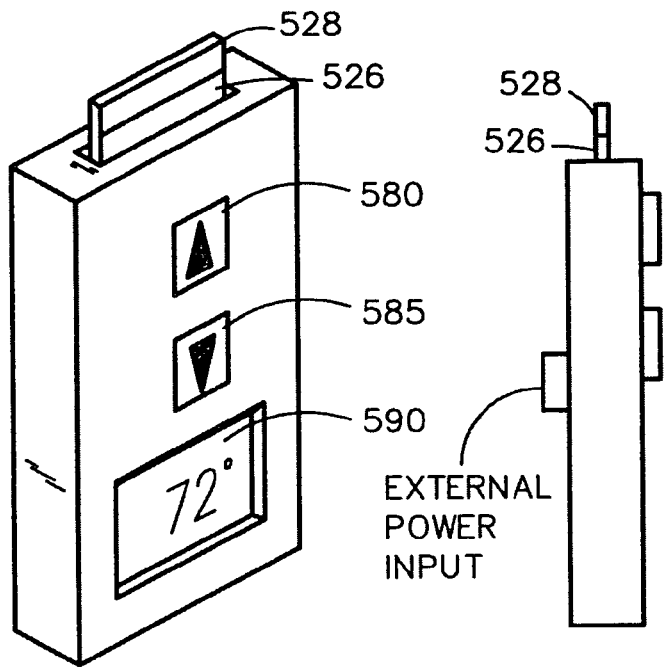
THERMOSTAT AND/OR HUMIDISTAT
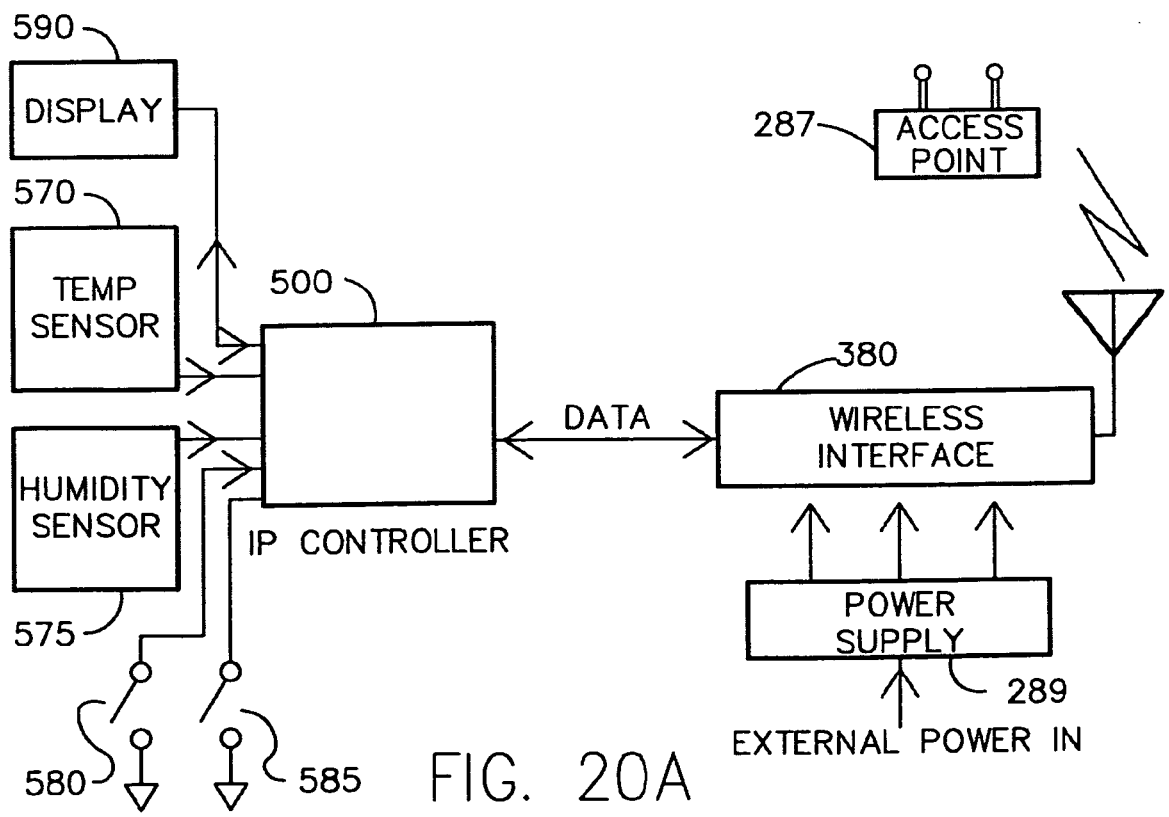
FIG. 20A

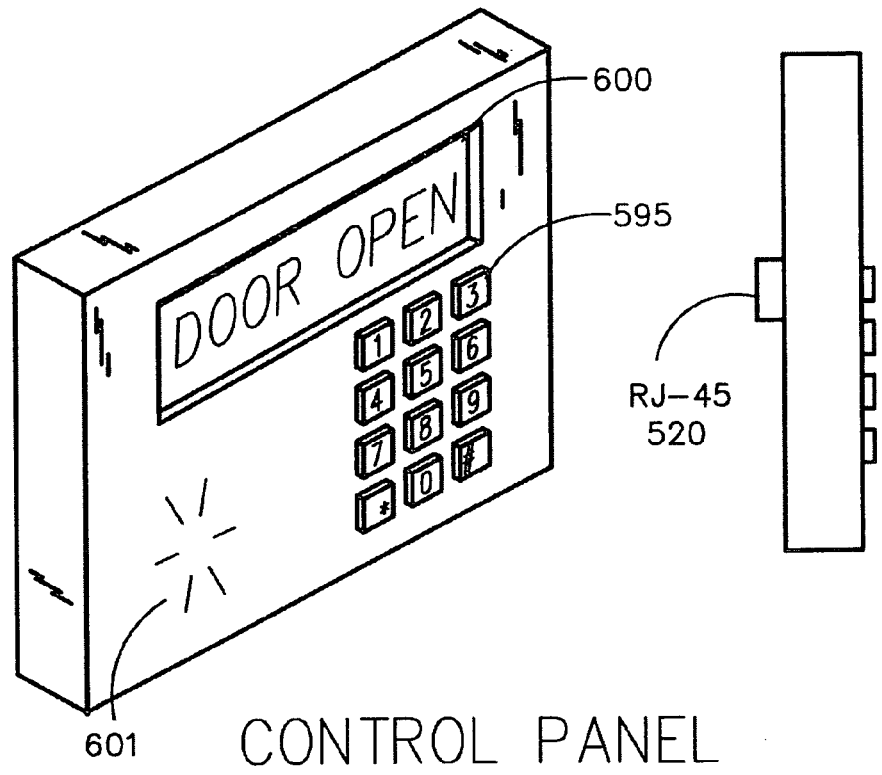
CONTROL PANEL
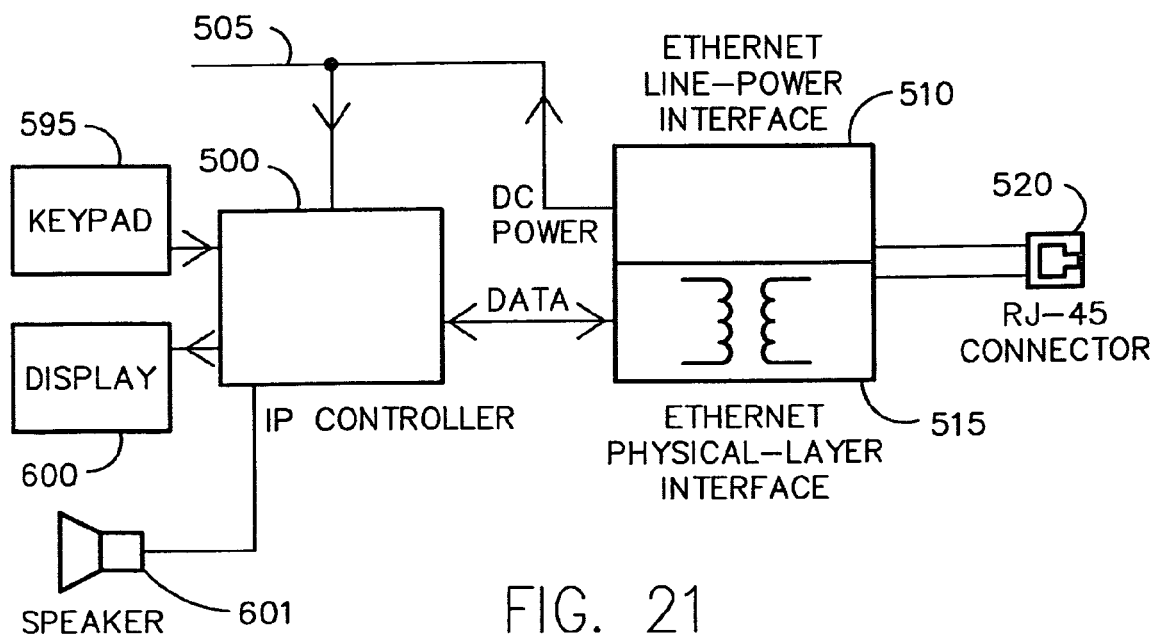
FIG. 21

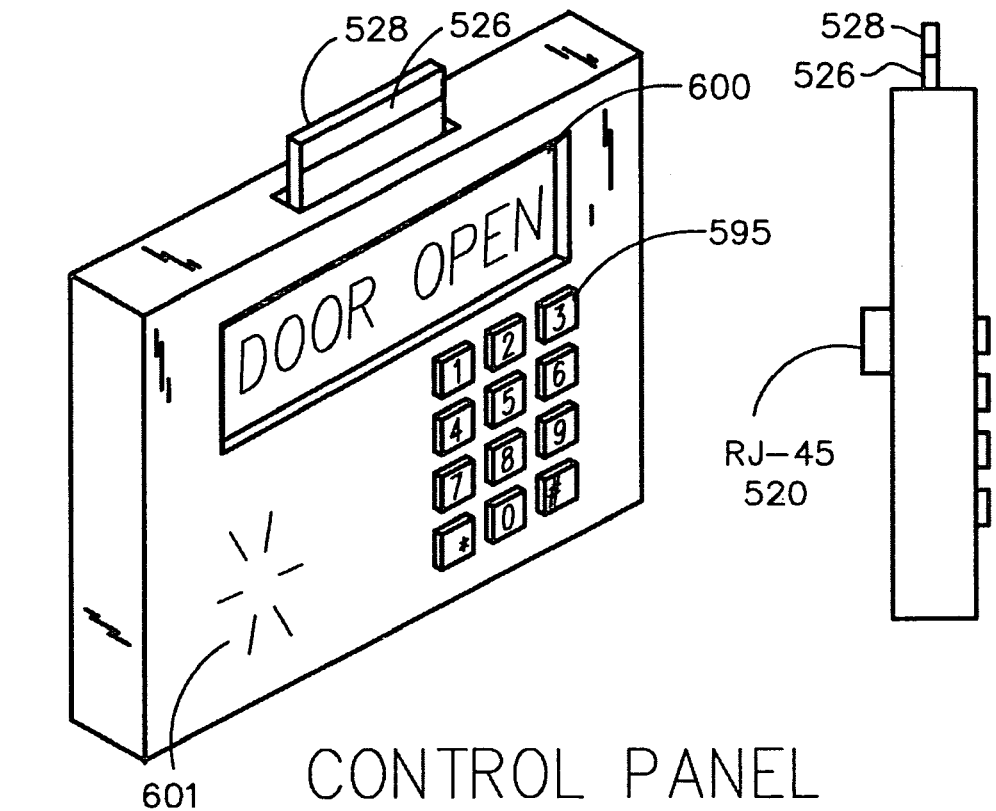
CONTROL PANEL
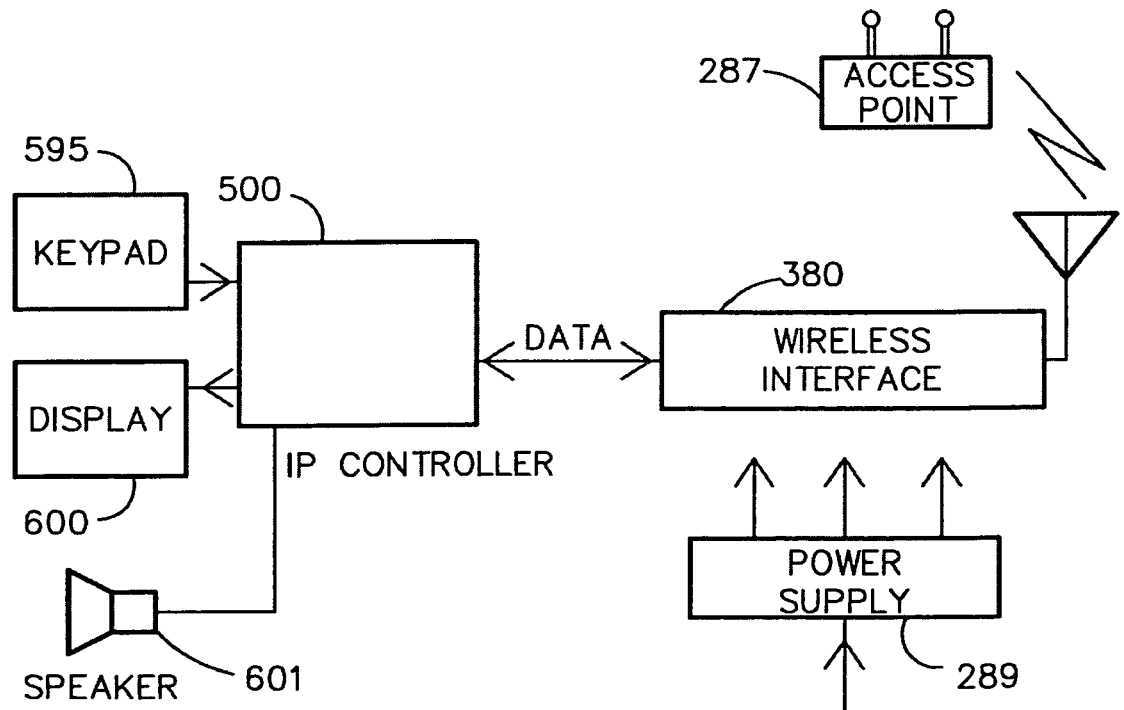
FIG. 21A

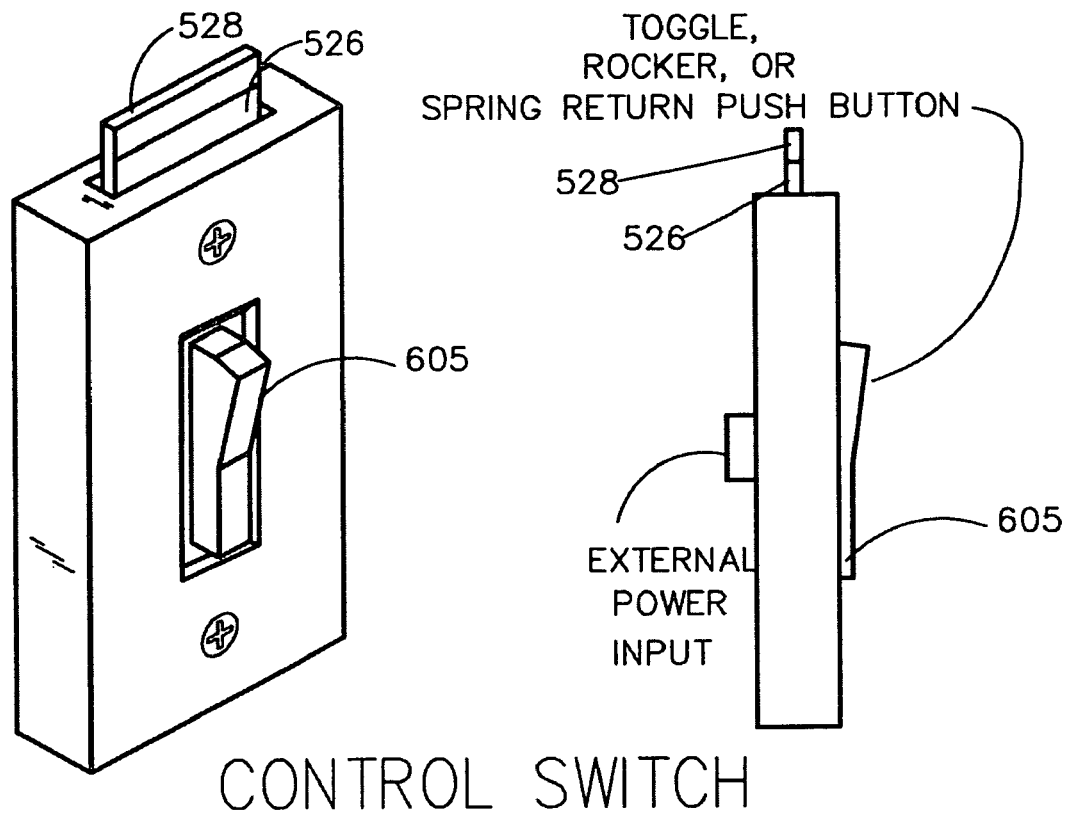
CONTROL SWITCH
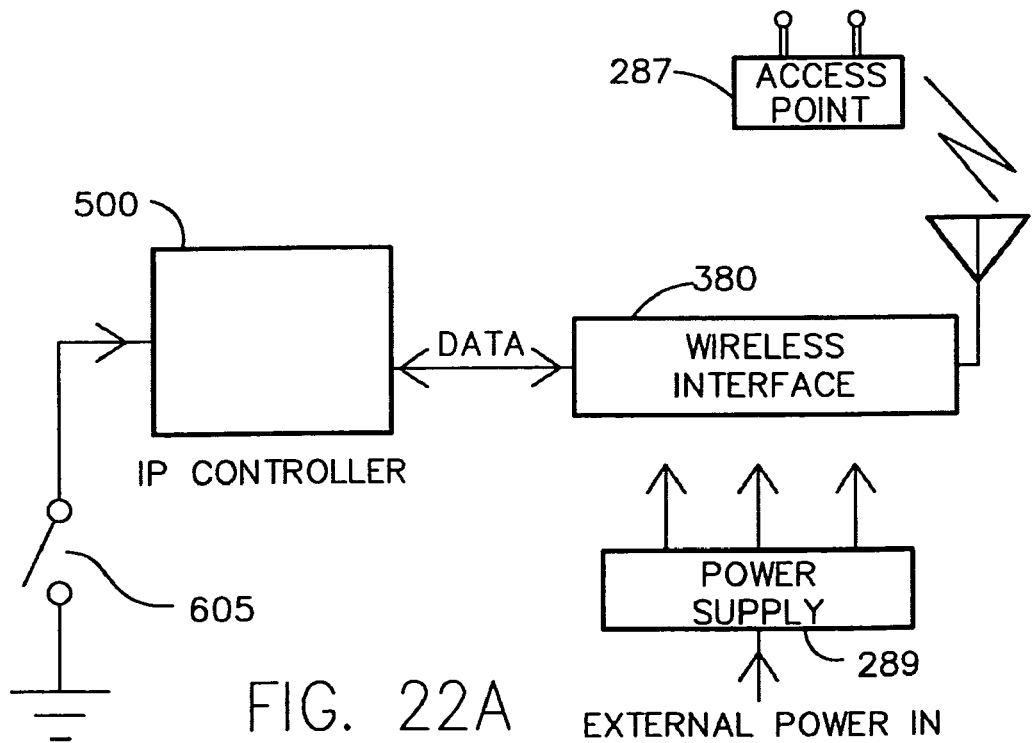
FIG. 22A

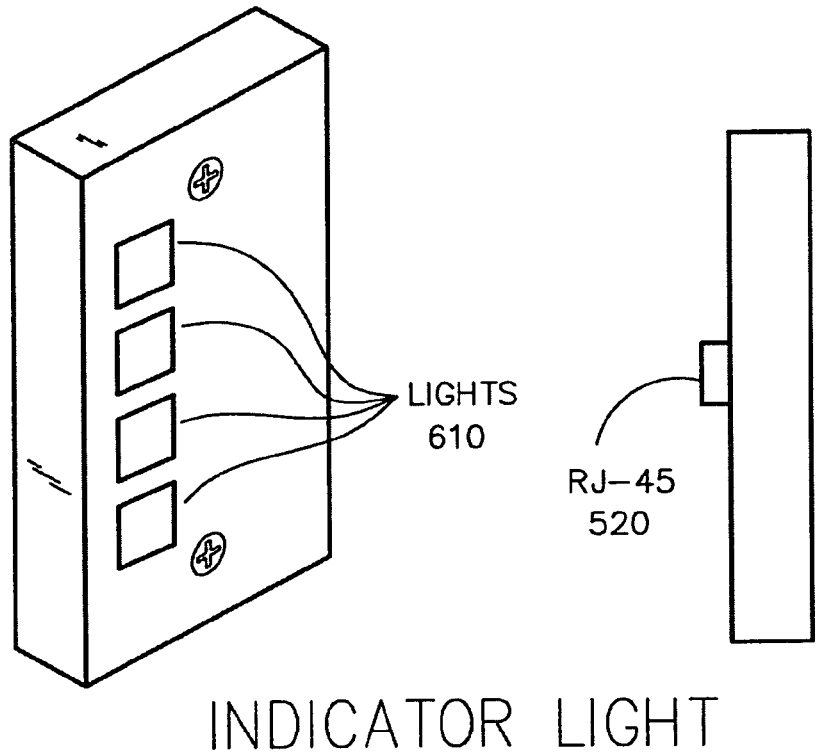
INDICATOR LIGHT
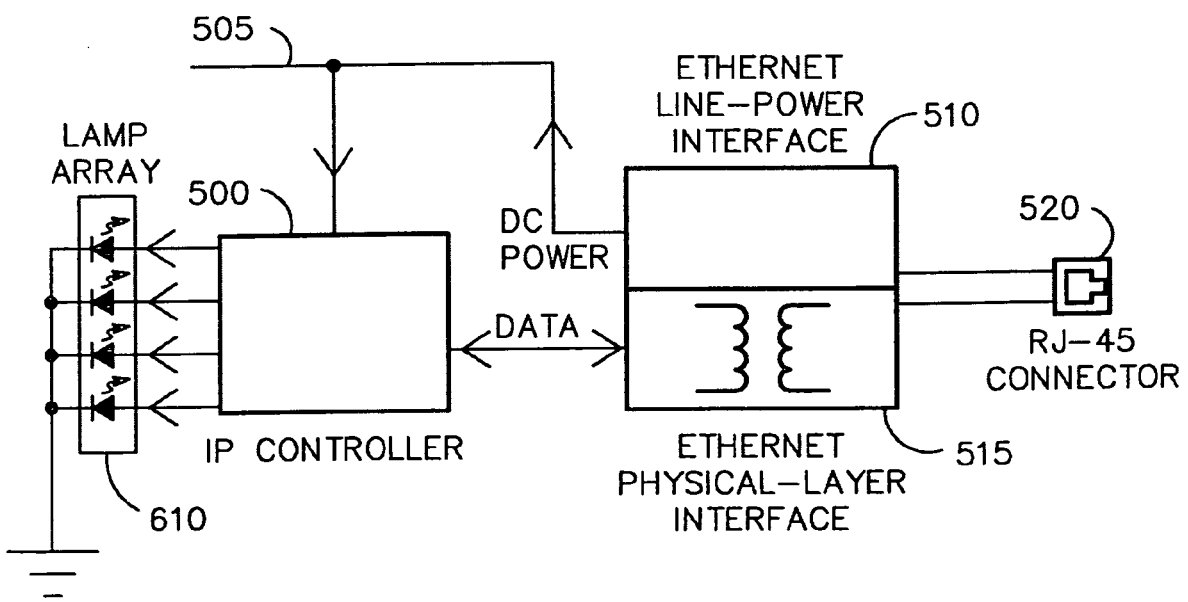
FIG. 23

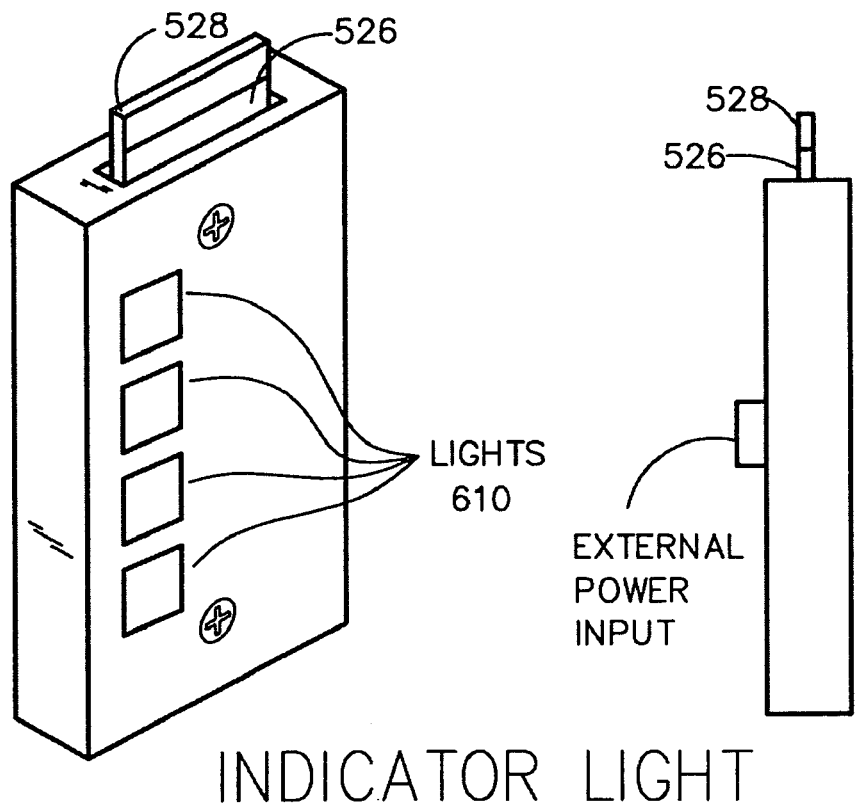
INDICATOR LIGHT
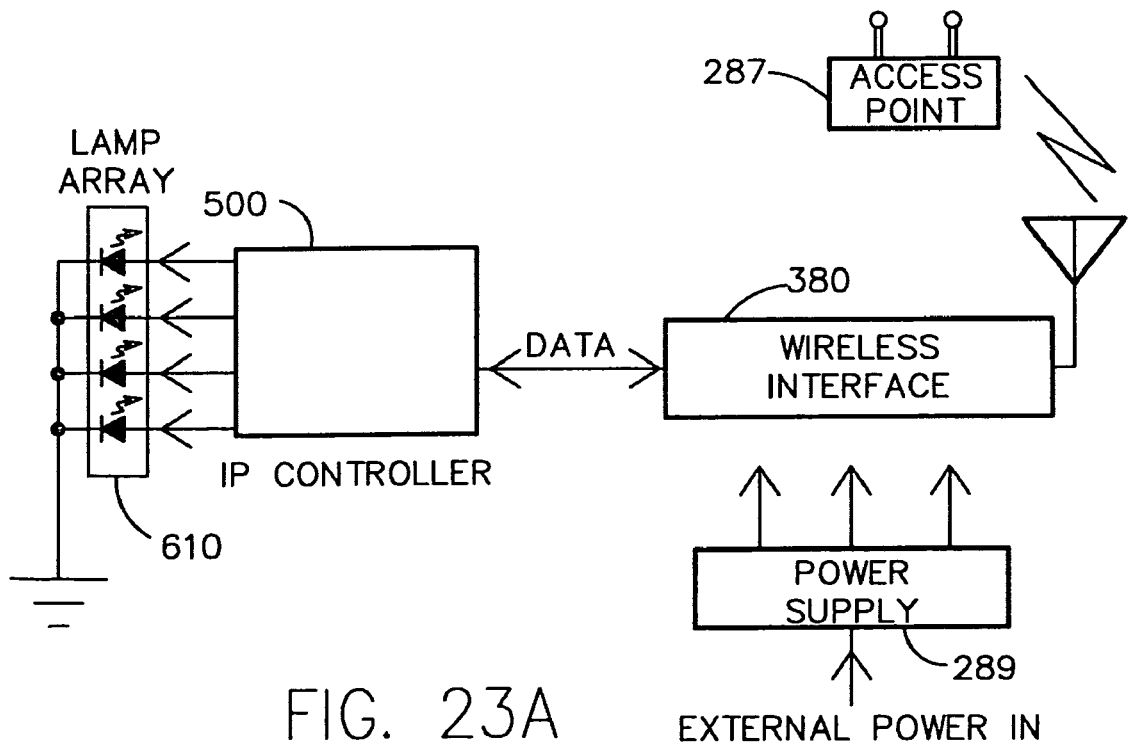
FIG. 23A

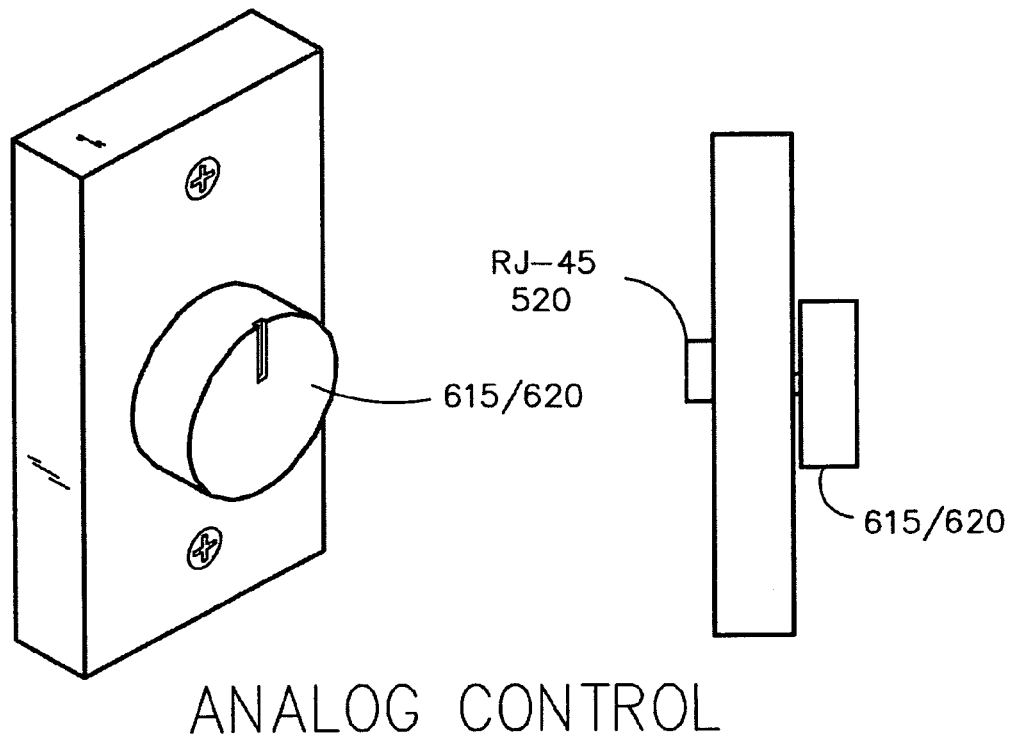
ANALOG CONTROL
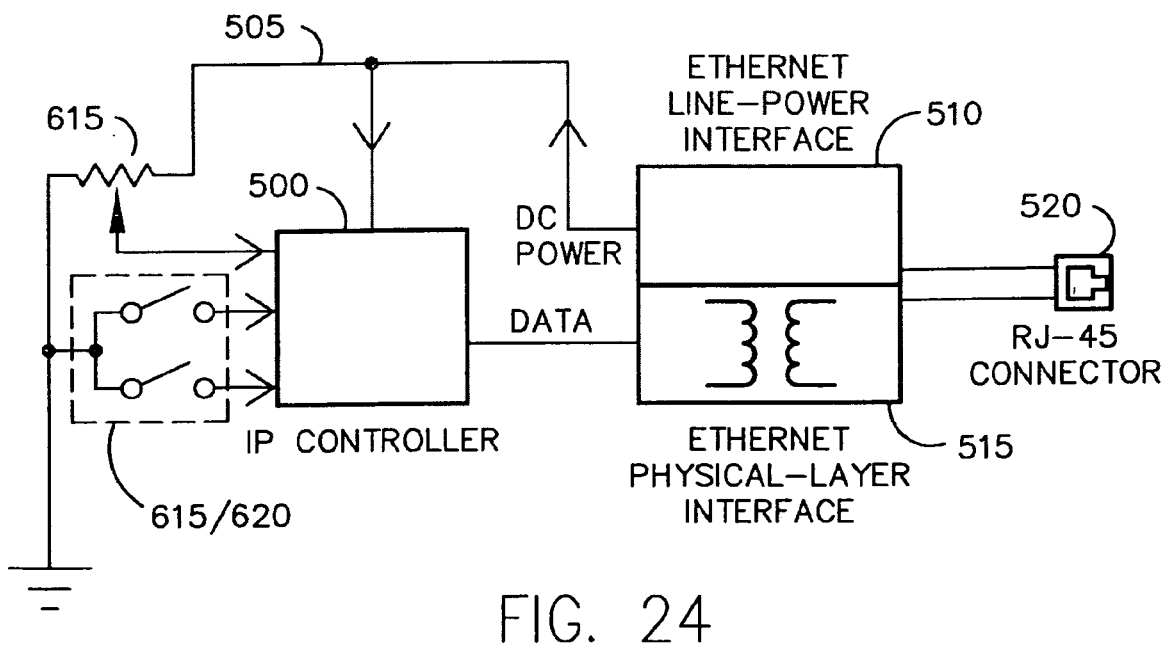
FIG. 24

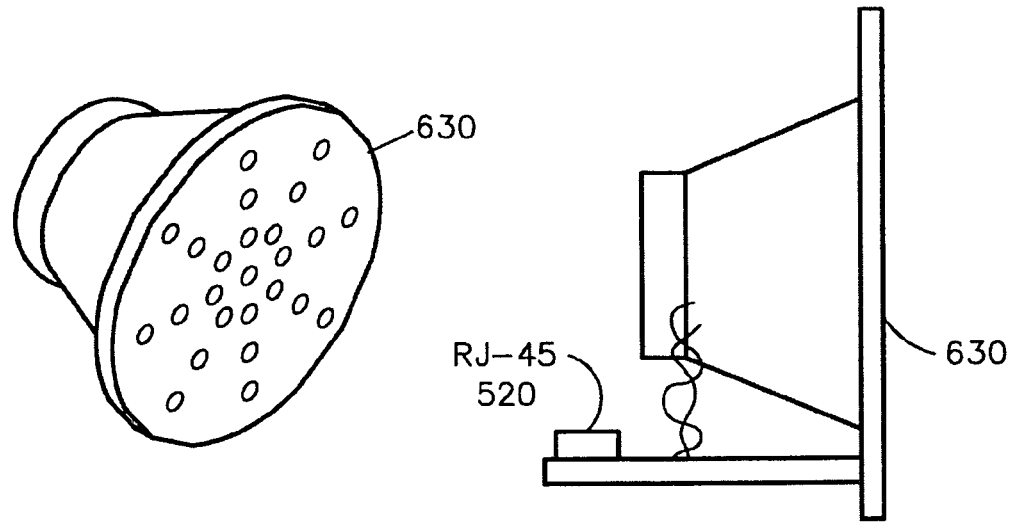
LOUDSPEAKER
WITH AMPLIFIER
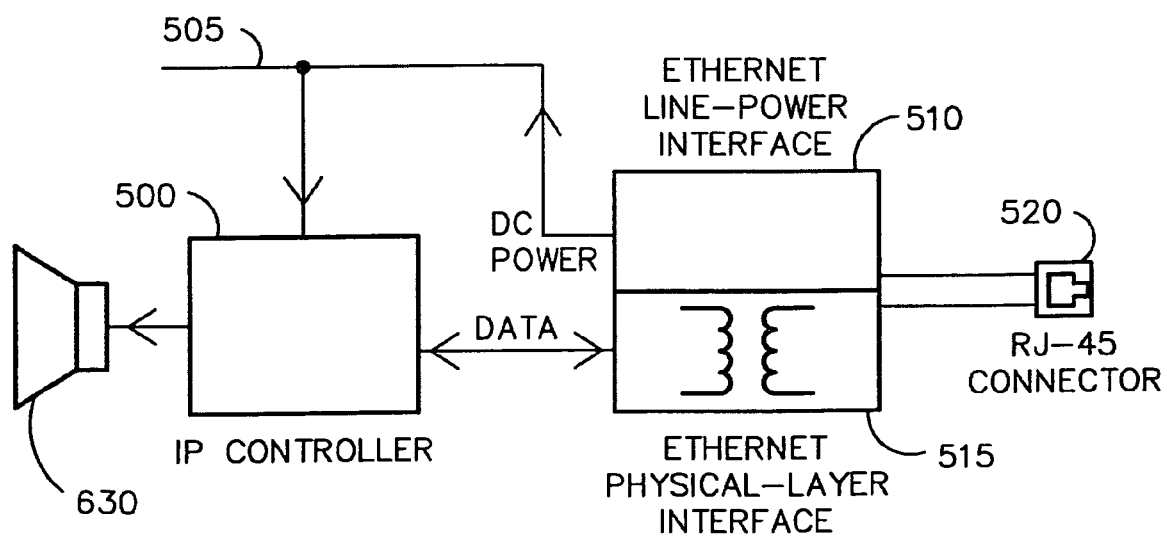
FIG. 25

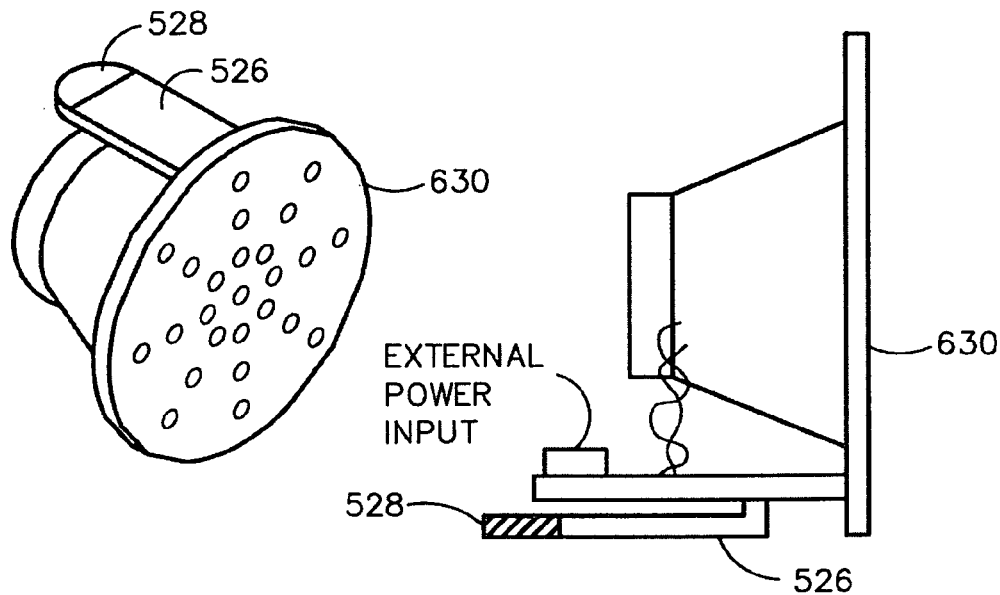
LOUDSPEAKER
WITH AMPLIFIER
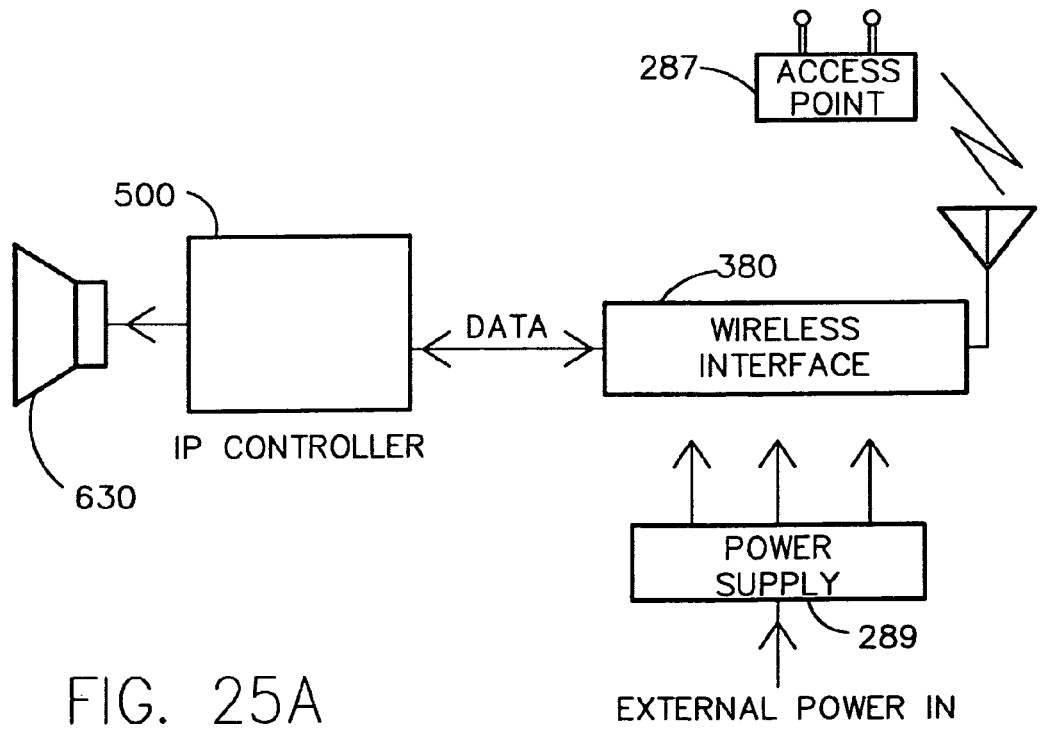
FIG. 25A

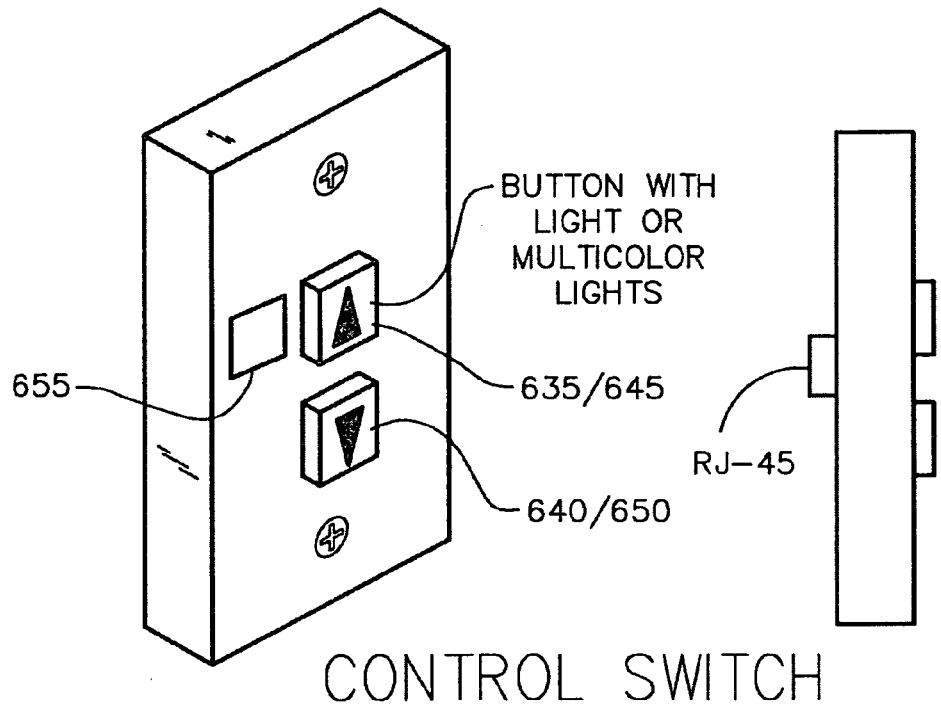
CONTROL SWITCH
INDICATOR LIGHT
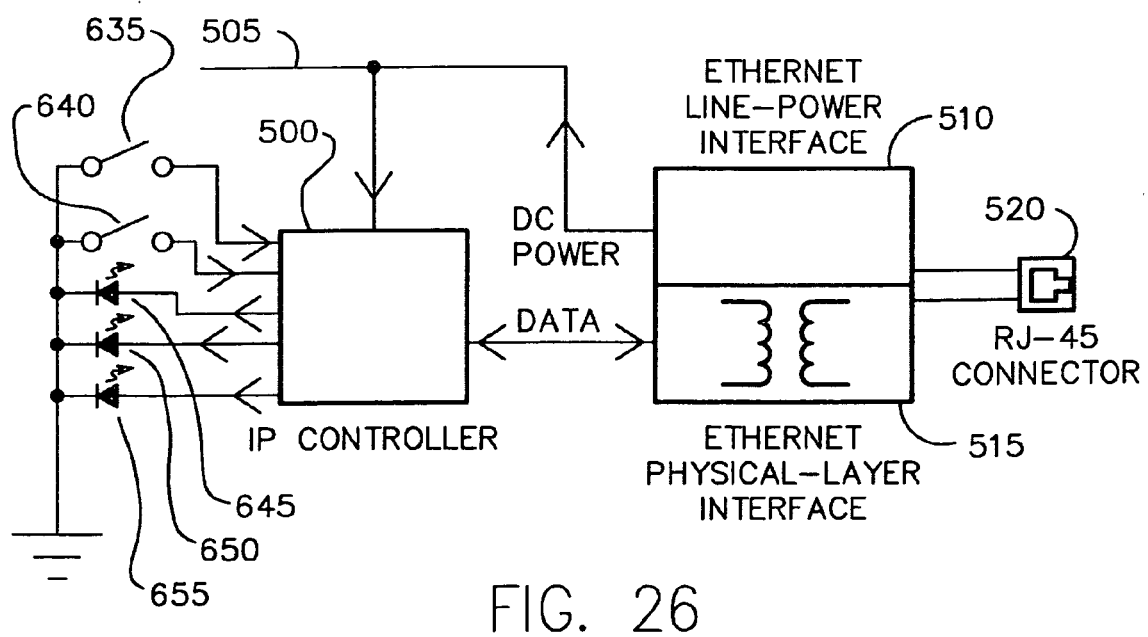
FIG. 26

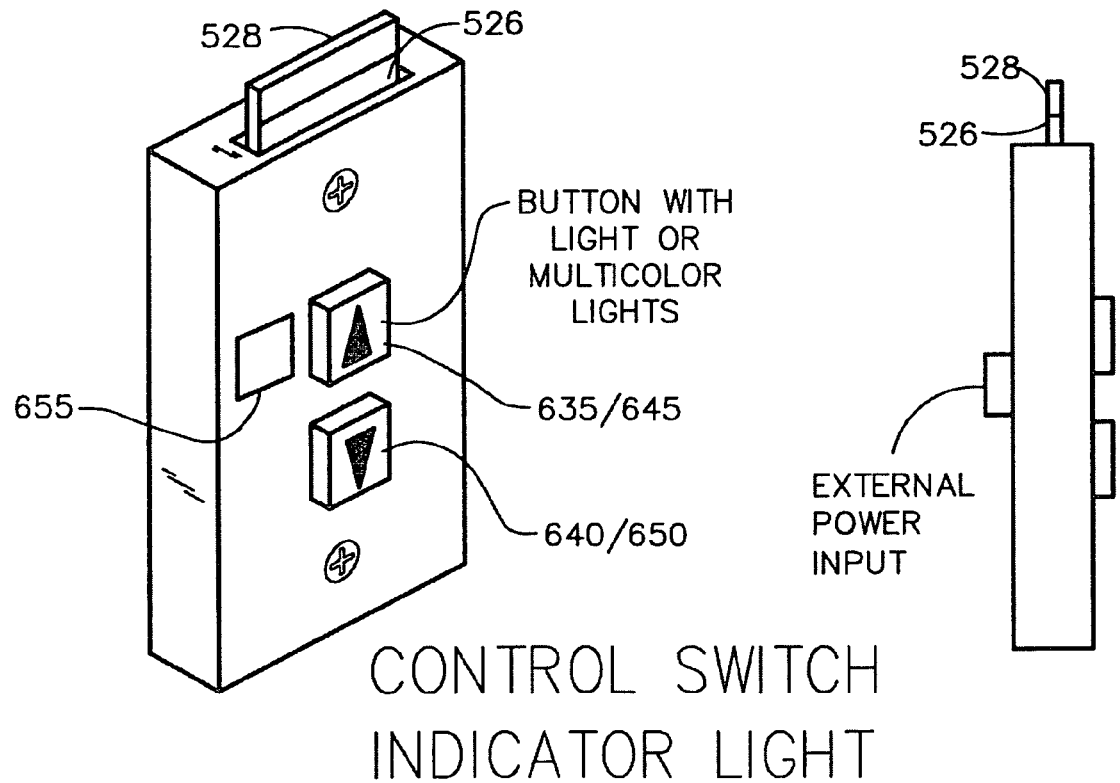
CONTROL SWITCH
INDICATOR LIGHT
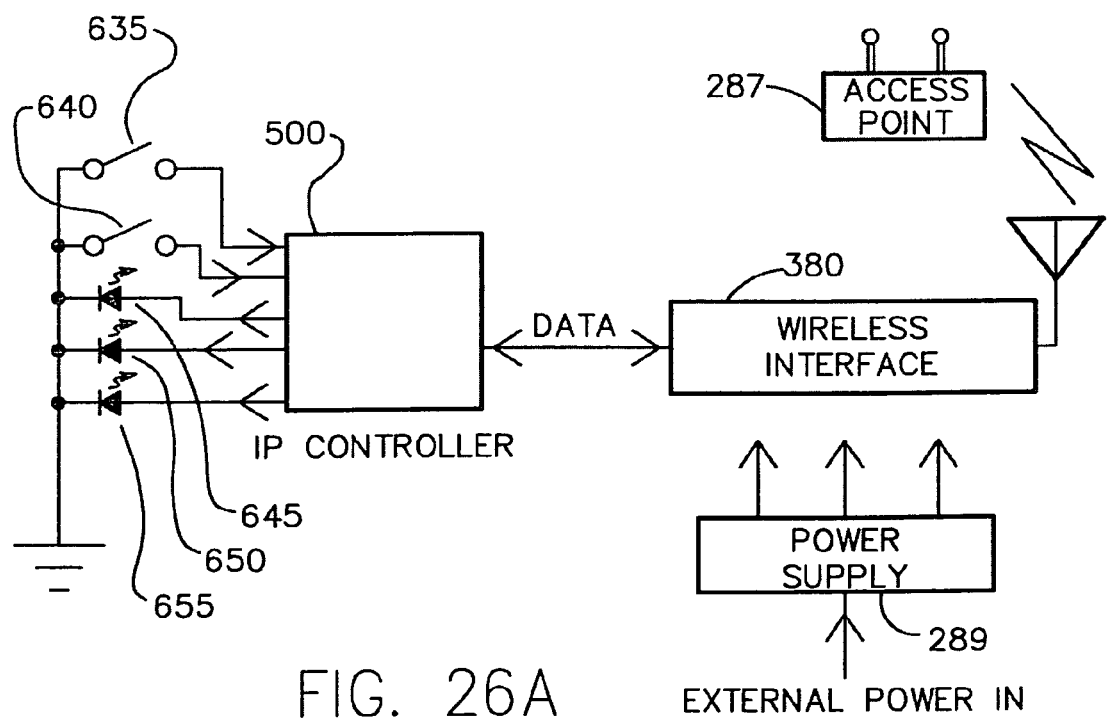
FIG. 26A

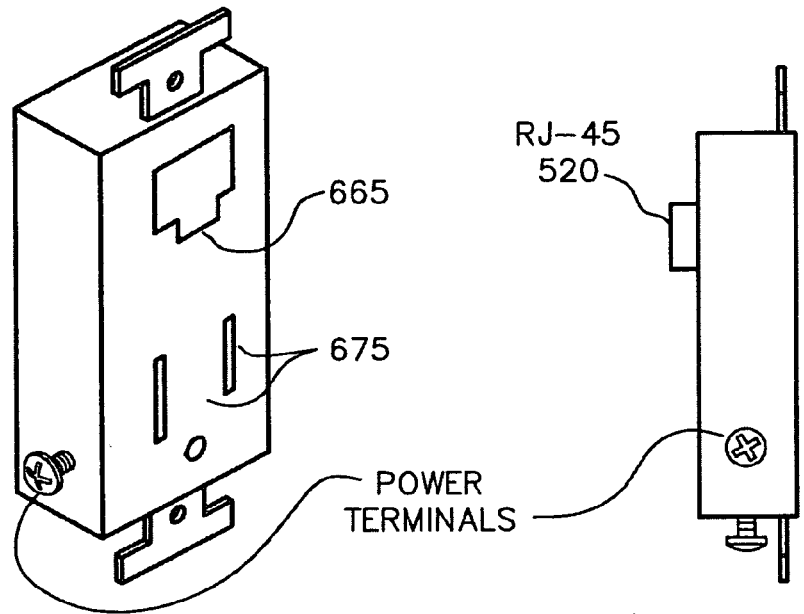
POWER CONTROL
(SWITCH OR DIMMER)
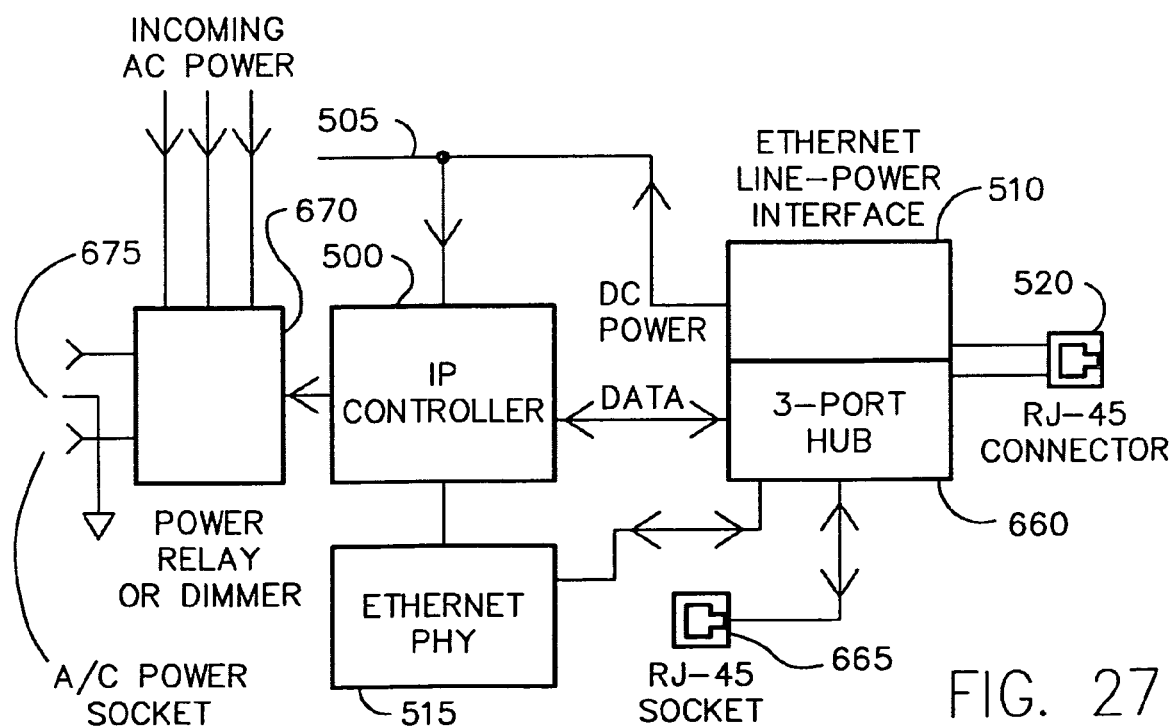
FIG. 27

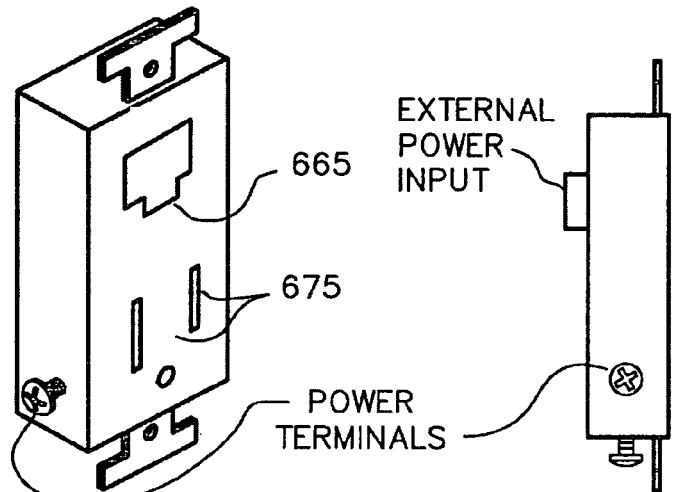
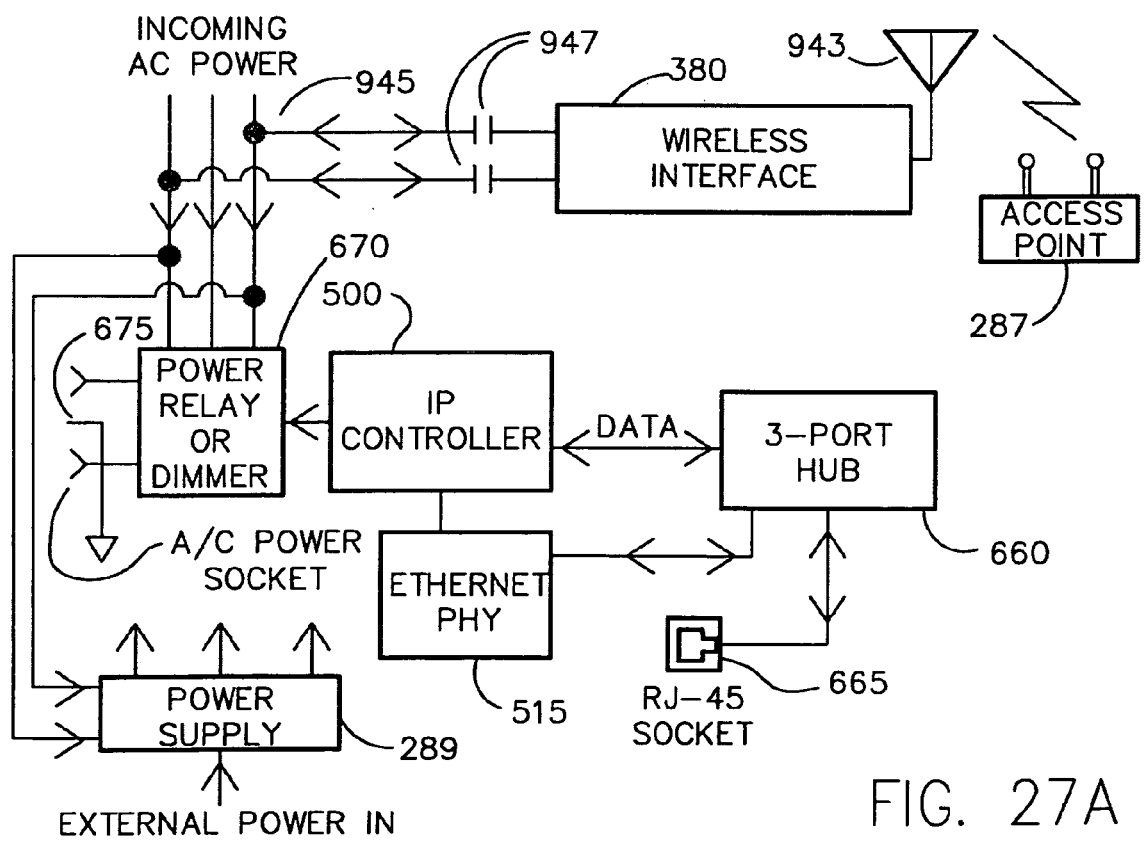
FIG. 27A

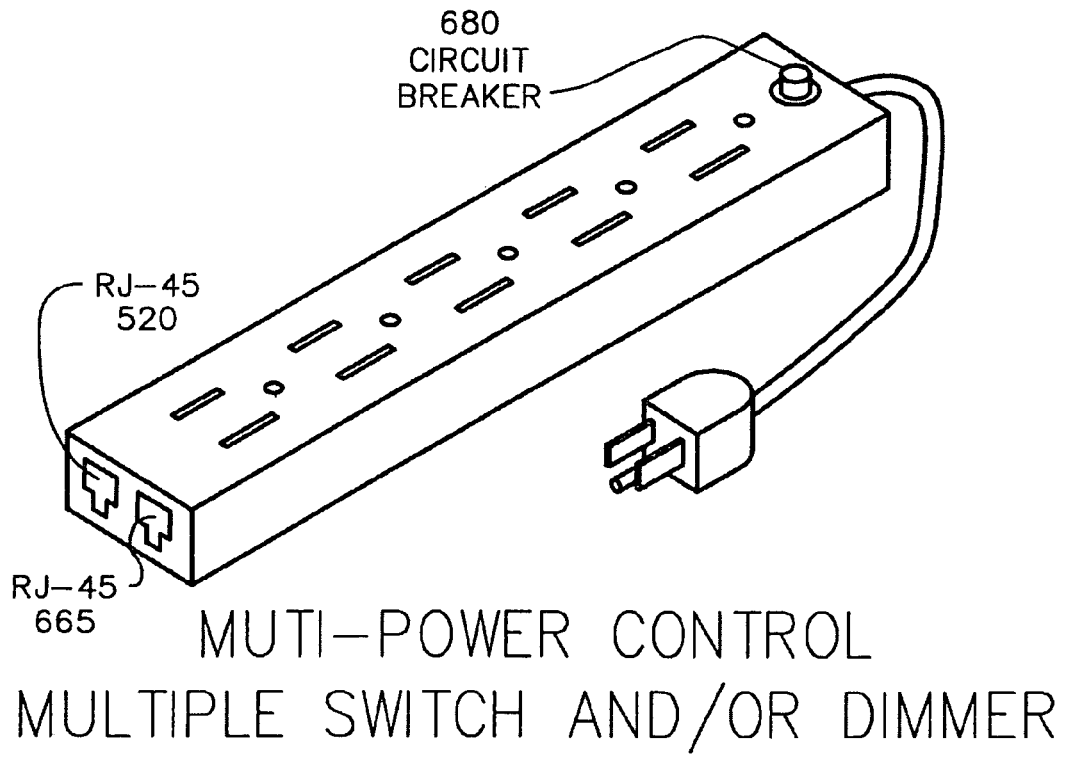
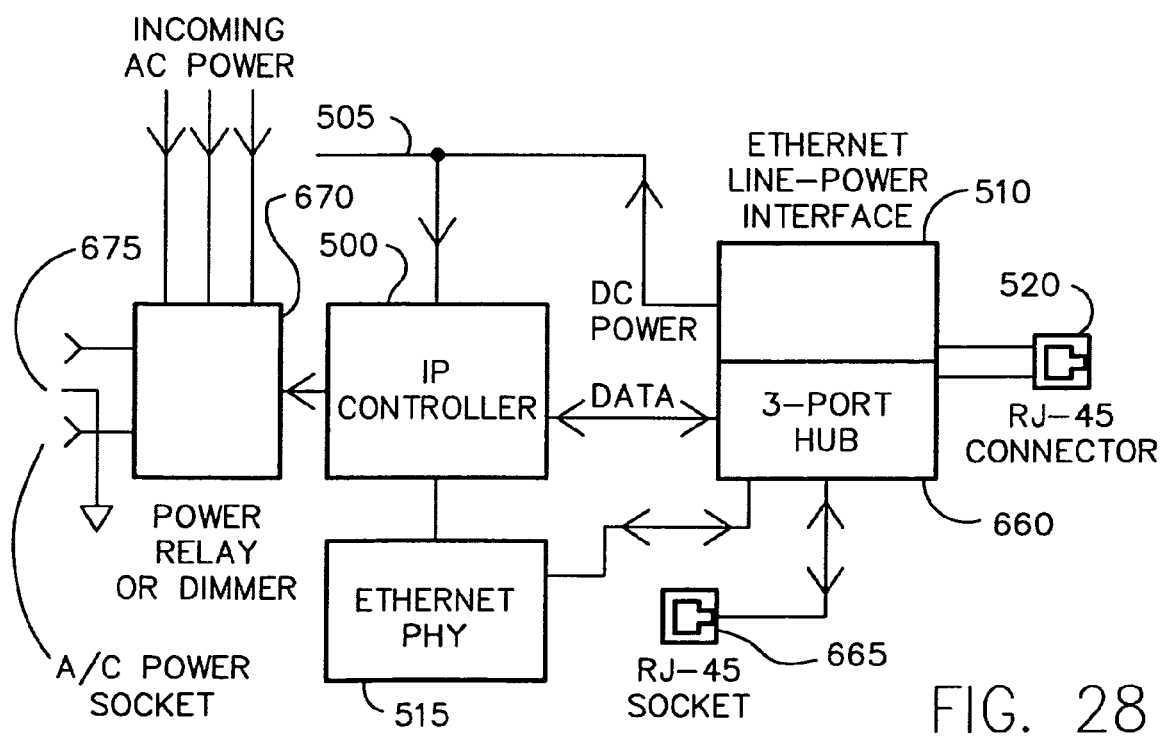
FIG. 28

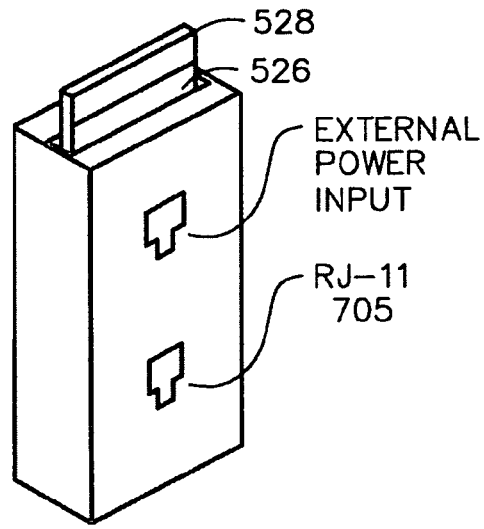
TELEPHONE DIALER/INTERFACE
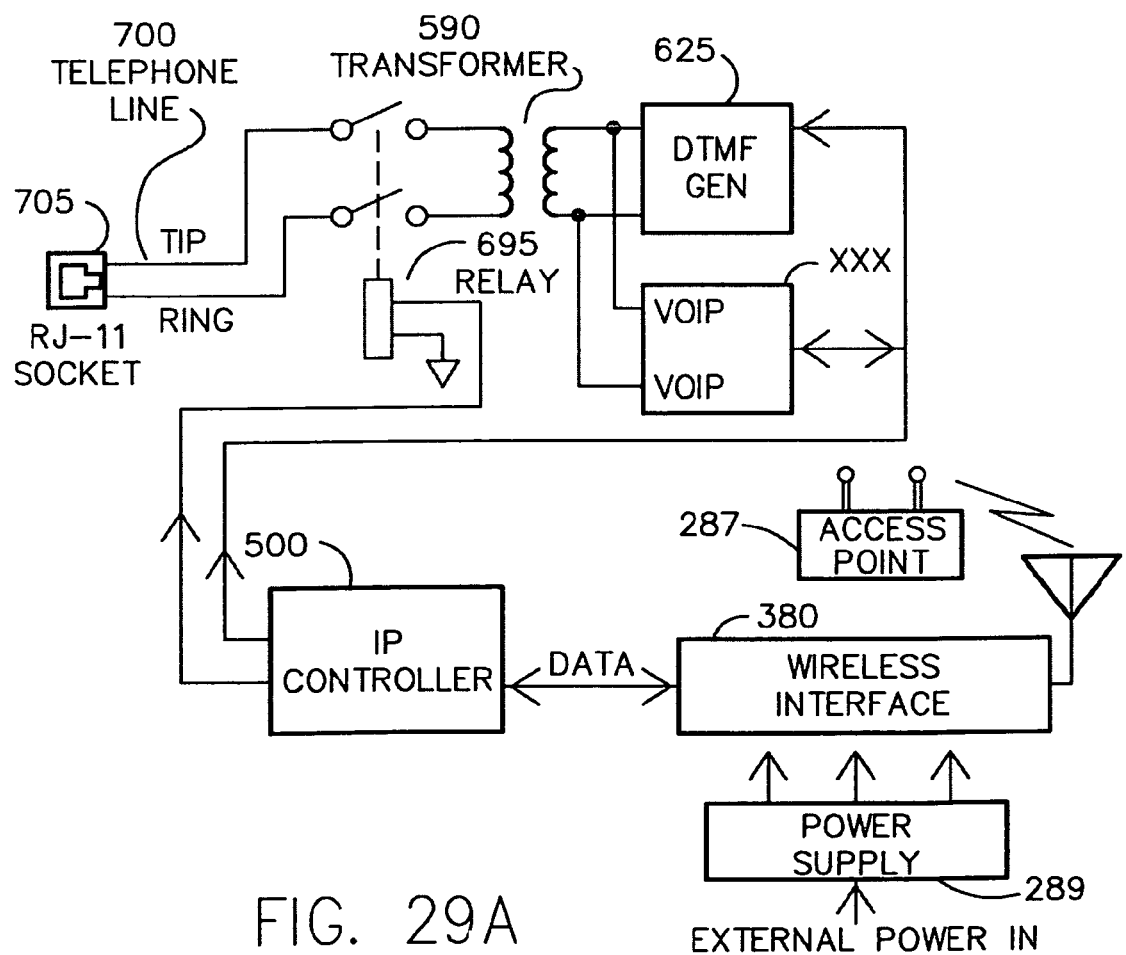
FIG. 29A

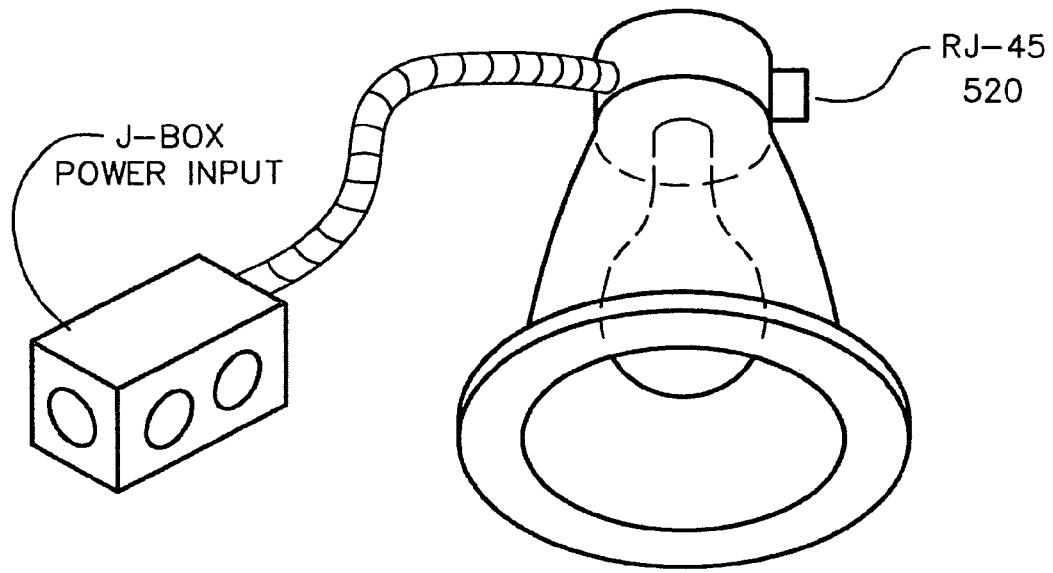
LIGHT FIXTURE
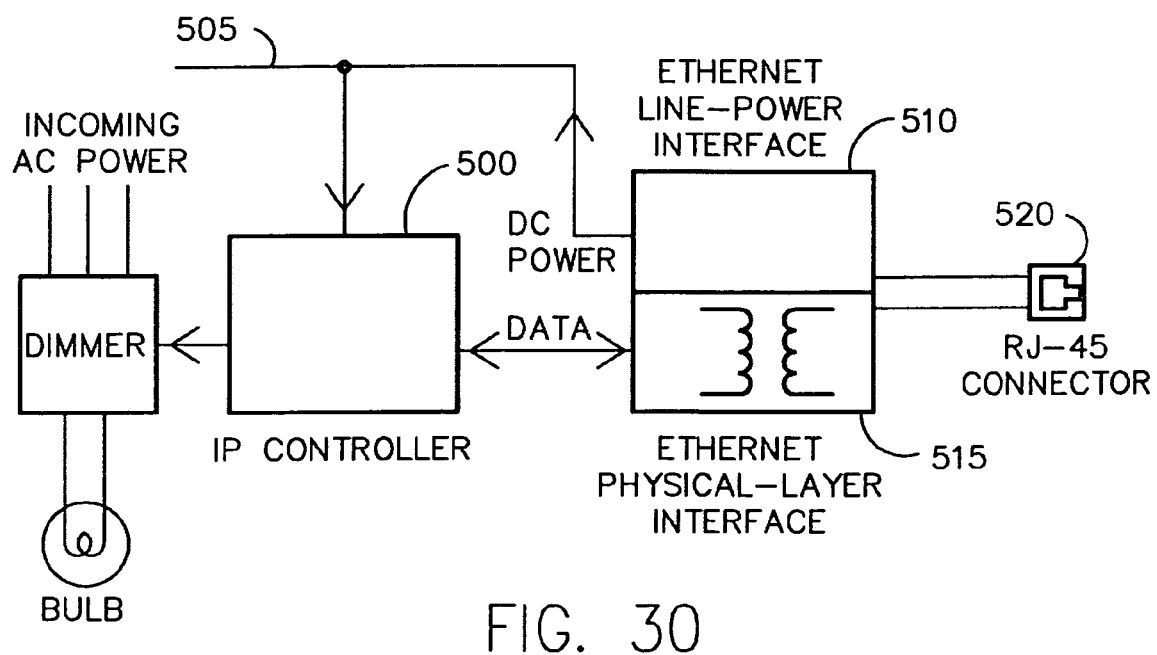
FIG. 30

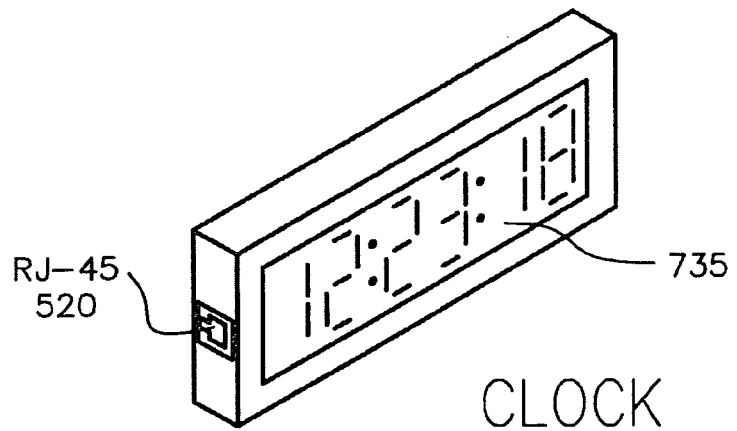
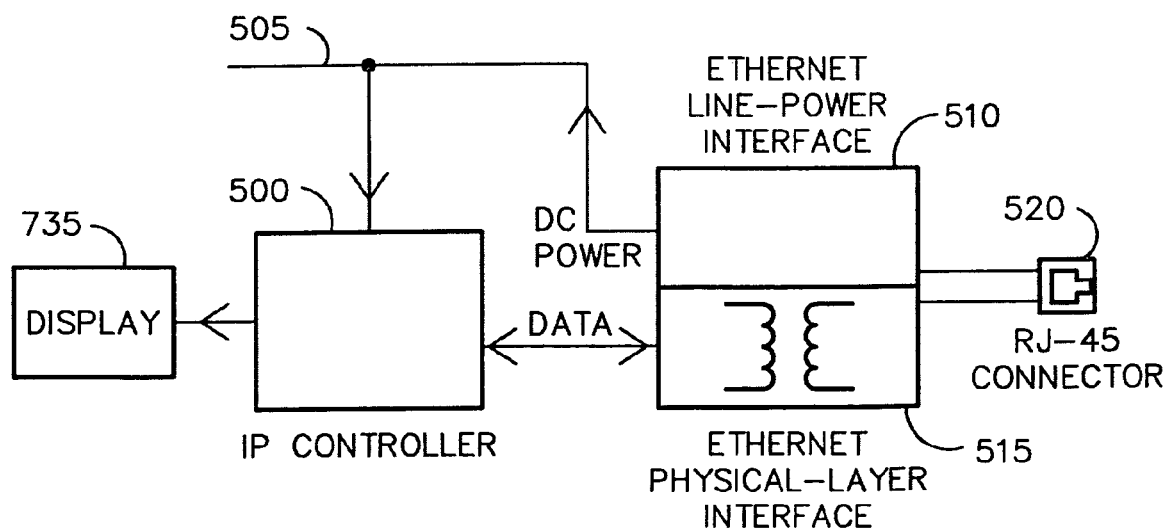
FIG. 32

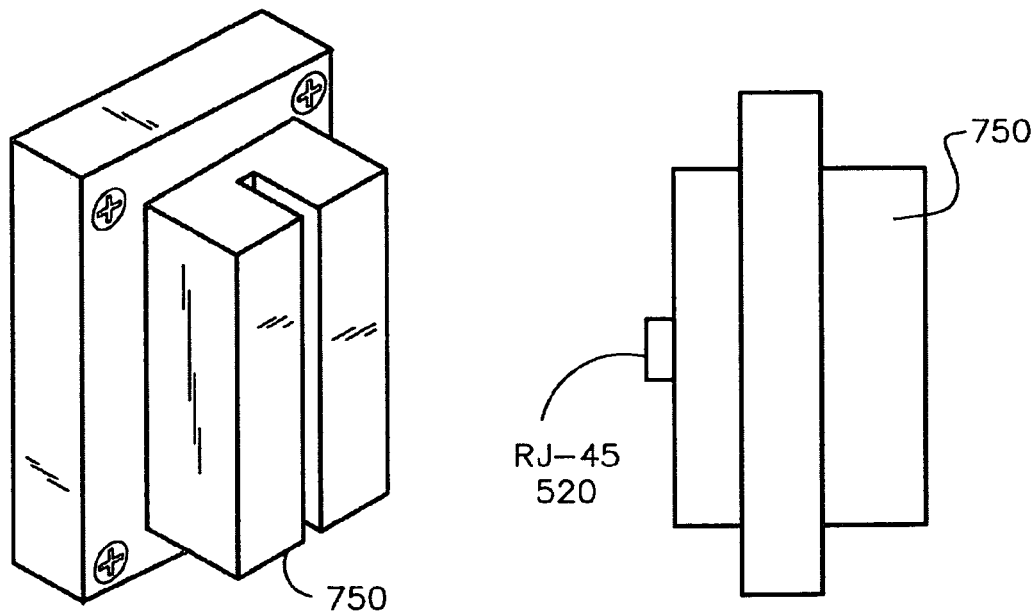
MAG STRIP READER
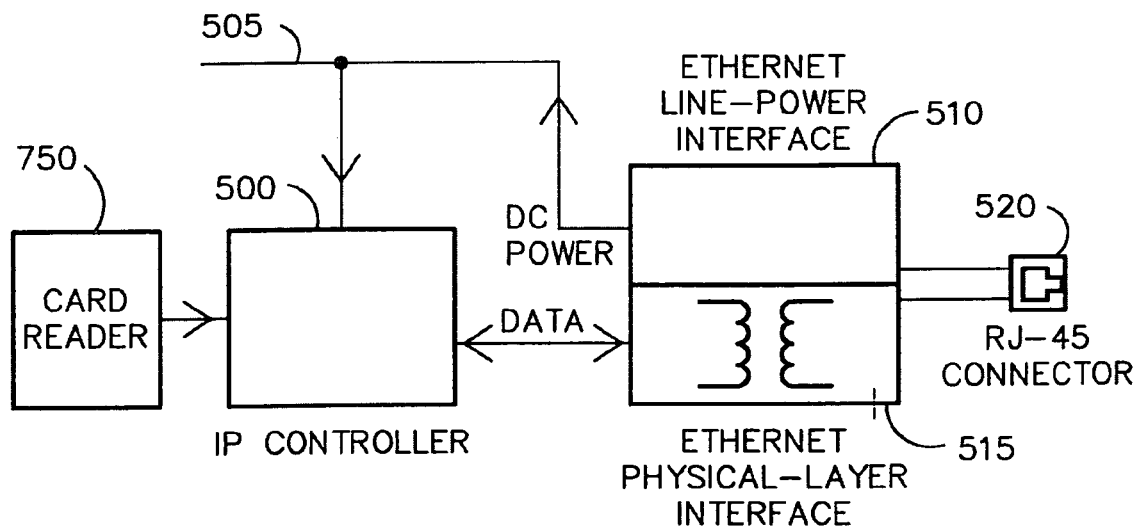
FIG. 33

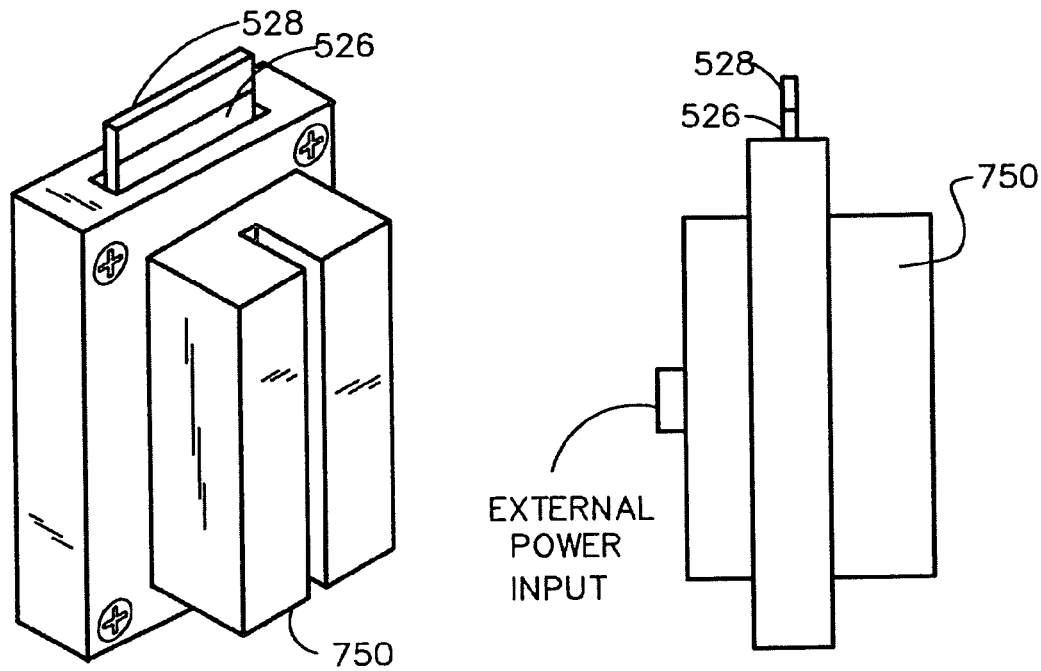
MAG STRIP READER
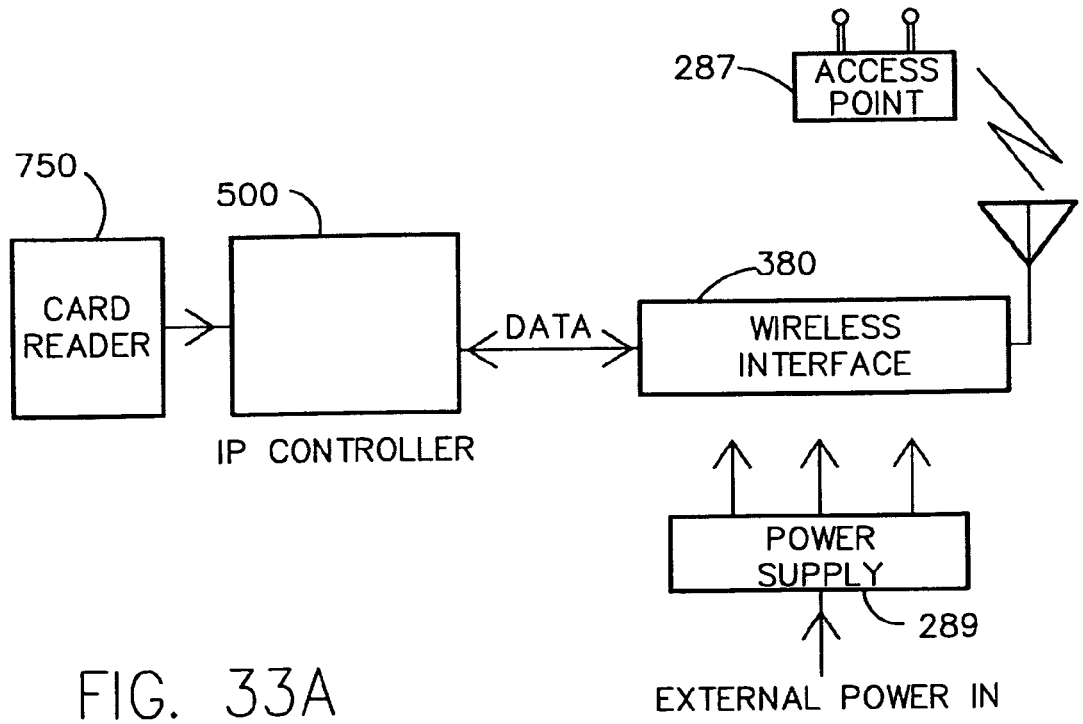
FIG. 33A

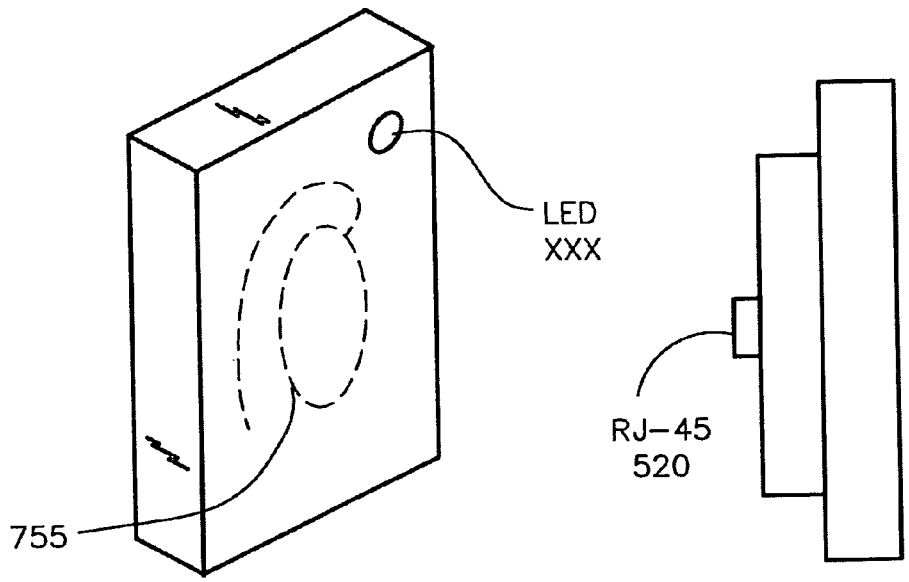
PROXIMITY CARD READER
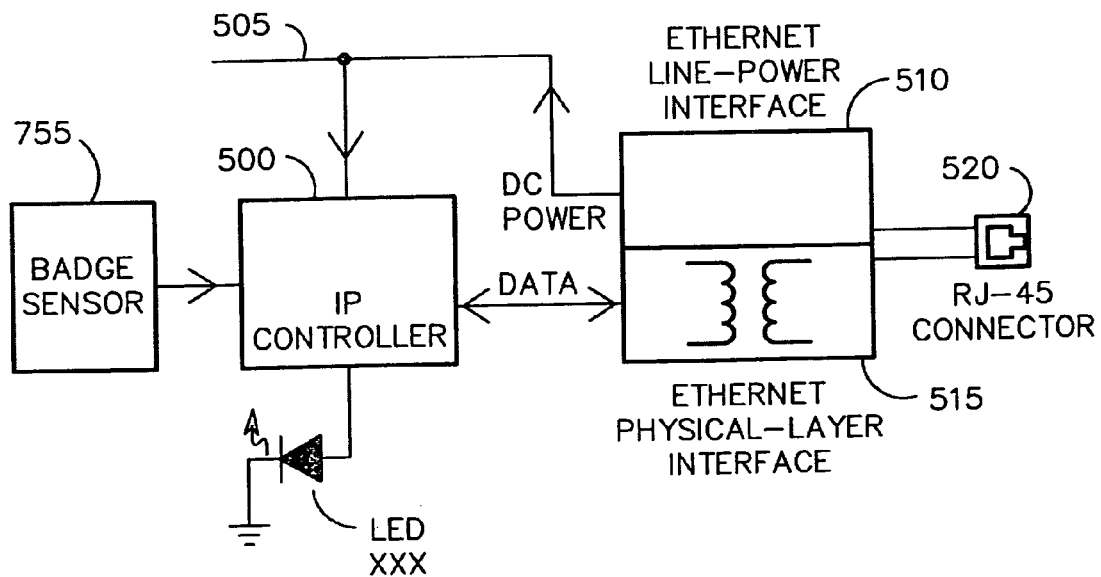
FIG. 34

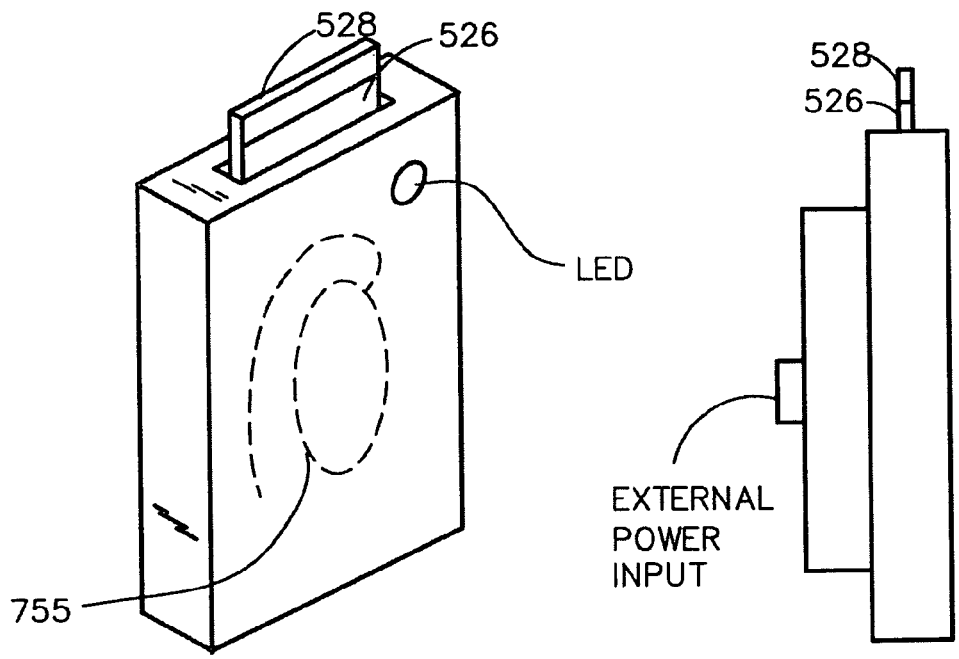
PROXIMITY CARD READER
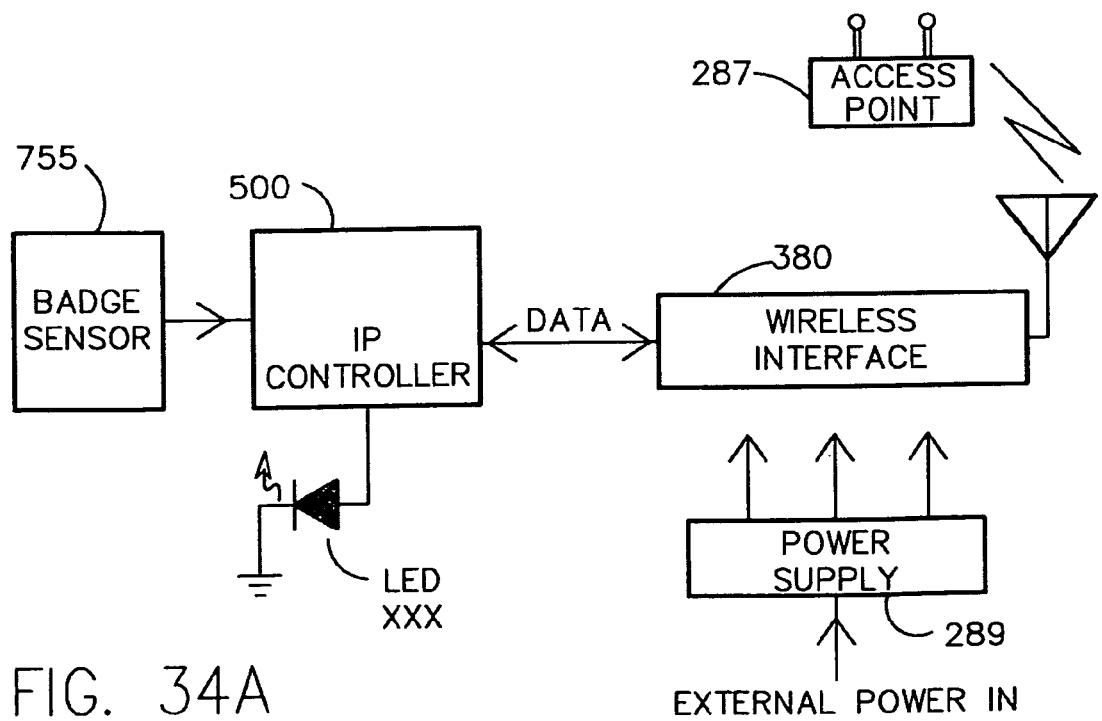
FIG. 34A

OPTIONAL DOOR CONTACTS

ELECTRIC STRIKE

WIRELESS EXIT SENSOR

WIRED UNIVERSAL INTERFACE—
PULL HANDLE/STROBE APPLICATION

WIRELESS UNIVERSAL INTERFACE-
PULL HANDLE/STROBE APPLICATION

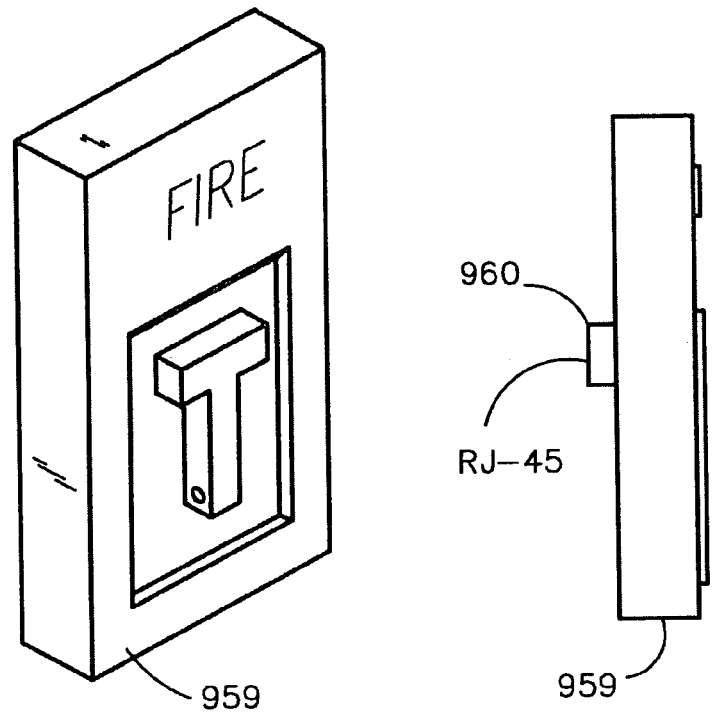
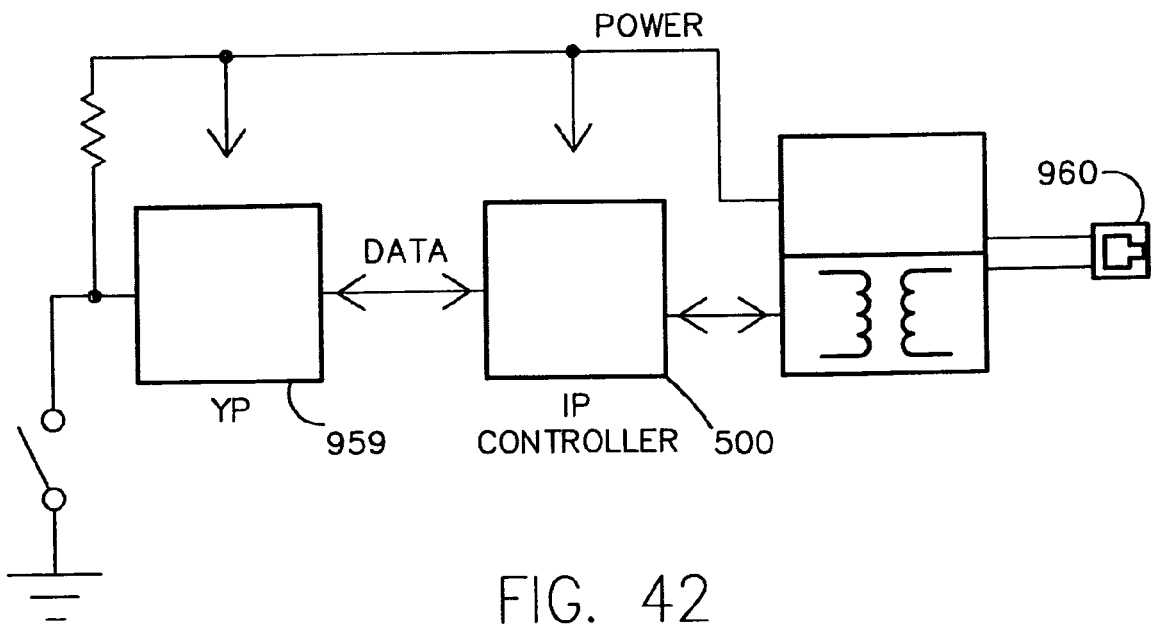
FIG. 42
WIRED PULL HANDLE

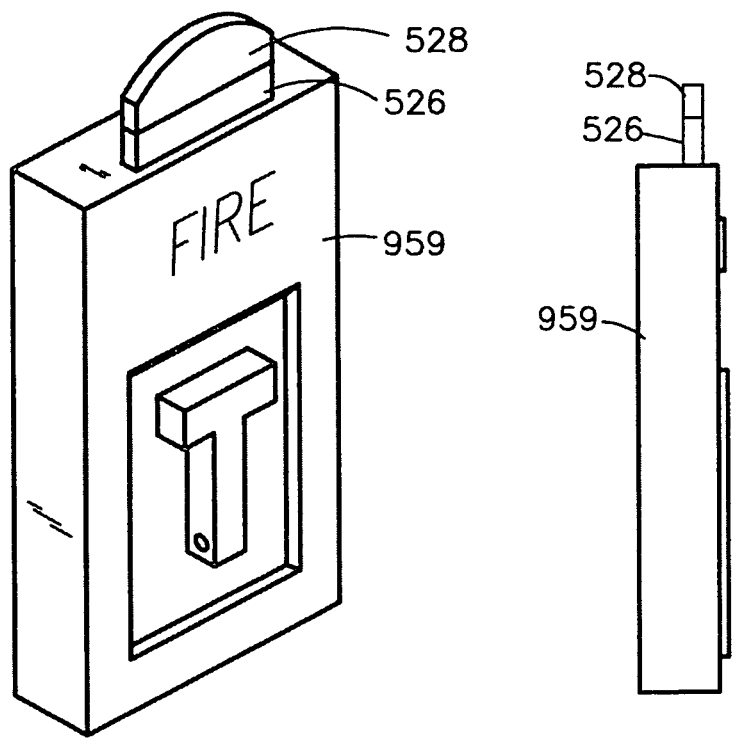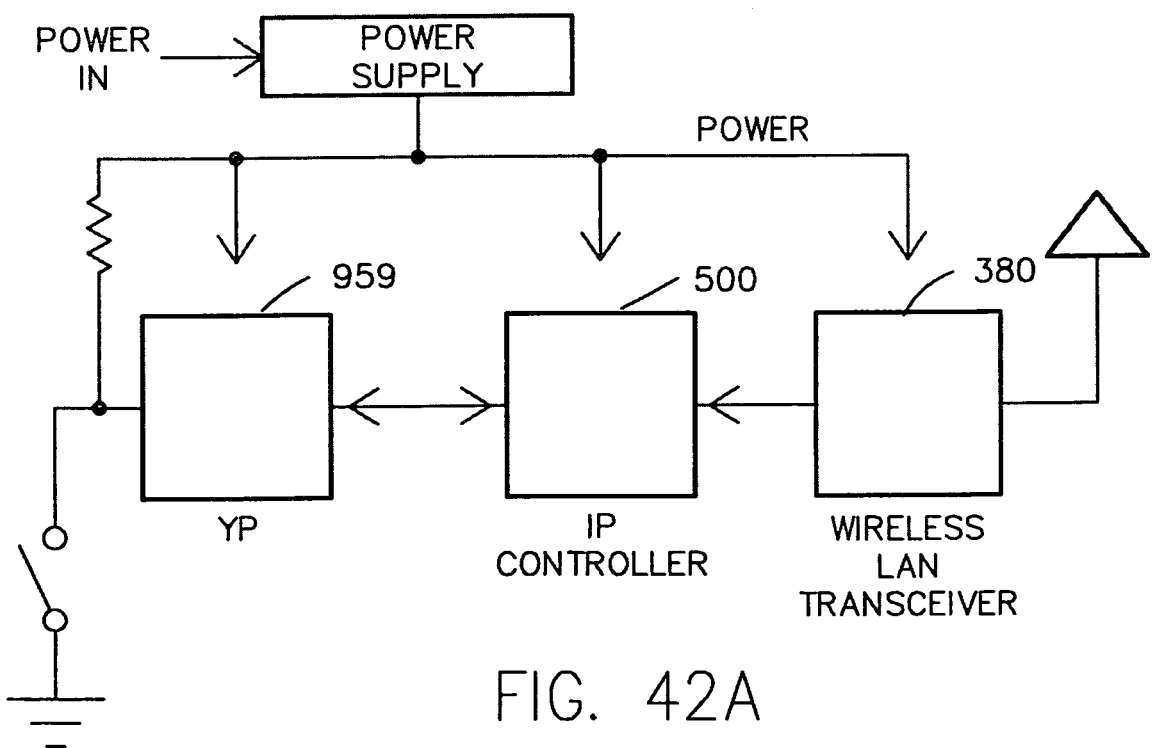
FIG. 42A
WIRELESS PULL HANDLE

WIRED EXIT DEVICE

WIRELESS EXIT DEVICE

WIRED KEYPAD MORTISE LOCK

WIRELESS KEYPAD MORTISE LOCK

WIRED SWIPE CARD READER MORTISE

WIRELESS SWIPE CARD MORTISE LOCK

WIRED PROXIMITY CARD READER MORTISE LOCK

WIRELESS PROXIMITY CARD READER MORTISE LOCK

UNIVERSAL INTERFACE
APPLICATIONS

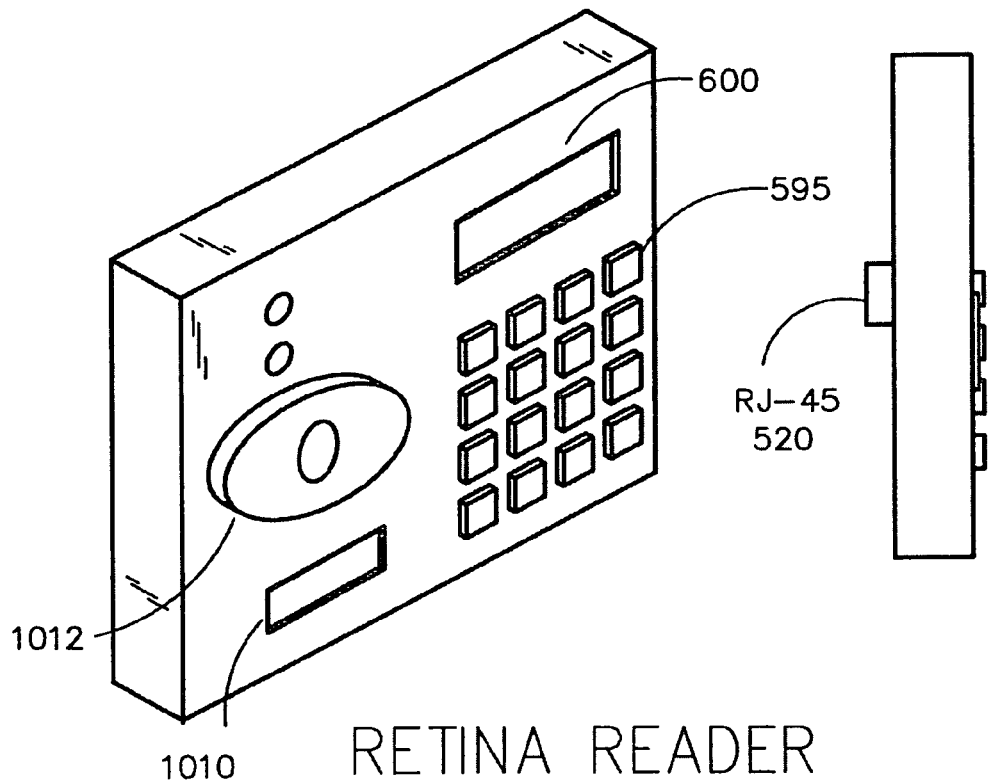
RETINA READER
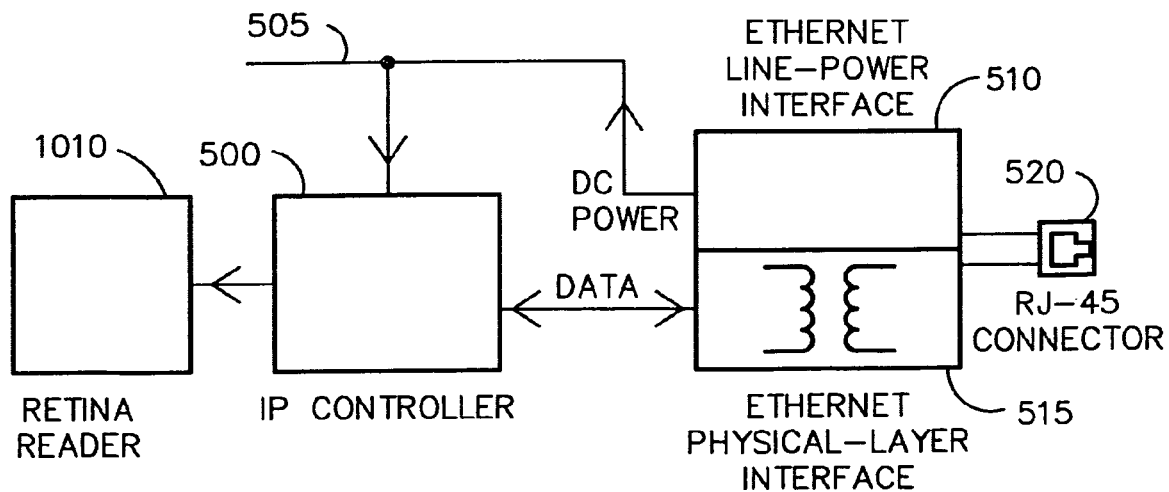
FIG. 49A

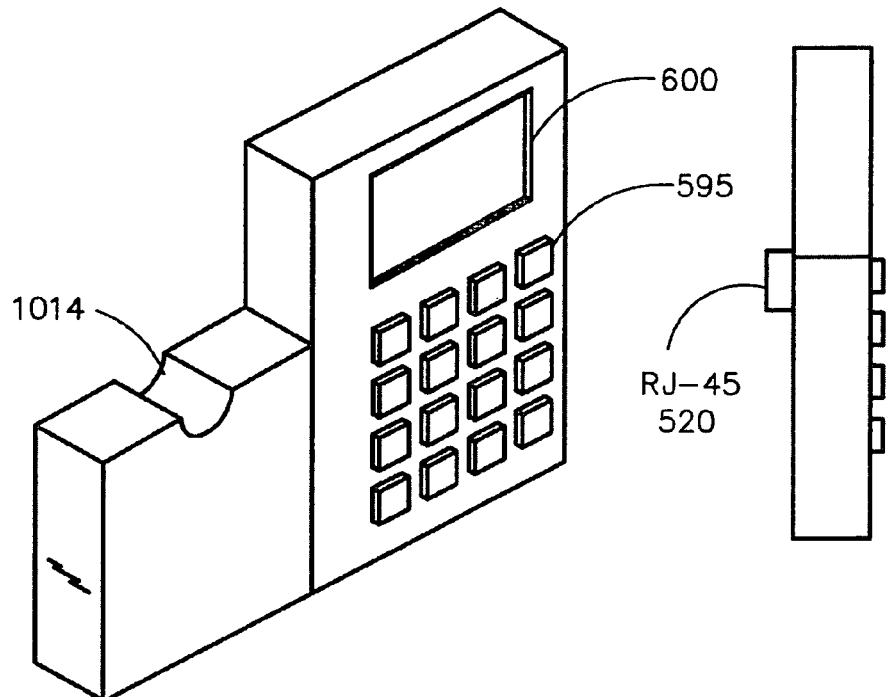
FINGERPRINT READER
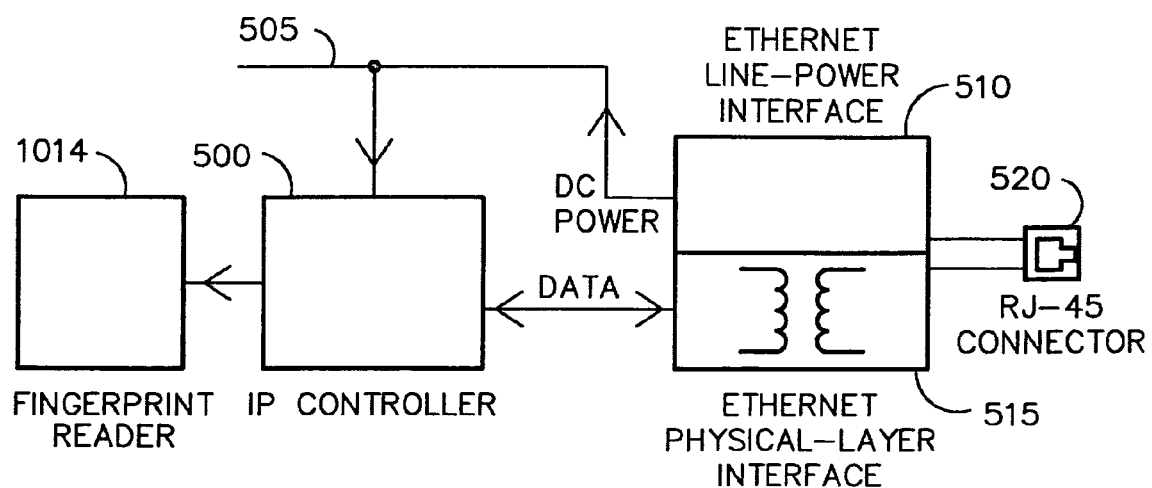
FIG. 49C

MULTIMEDIA NETWORK APPLIANCES FOR SECURITY AND SURVEILLANCE APPLICATIONS

BACKGROUND OF THE INVENTION

1. Field of the Invention

The subject invention is generally related to sensor, monitor and control appliance devices generally utilized in monitoring and surveillance systems and is specifically directed to a network adaptation of such appliances.

2. Discussion of the Prior Art

Security of public facilities such as schools, banks, airports, arenas and the like is a topic of increasing concern in recent years. Over the past few years, a number of violent incidents including bombings, shootings, arson, and hostage situations have occurred. In addition, agencies responsible for public security in these facilities must cope with more commonplace crimes, such as drug dealing, vandalism, theft and the like.

Such facilities frequently employ monitoring and surveillance systems and access control systems to enhance security. This has been common practice for a number of years. Such systems generally have a centralized monitoring console, usually attended by a guard or dispatcher. A variety of sensors are located throughout the facility, such as smoke detectors, fire detectors, motion sensors, glass breakage detectors, badge readers at various access points, and sometimes, video cameras and/or microphones. Other sensors and transducers are utilized to lock and unlock doors.

There are numerous devices utilized to collect information at remote locations and initiate a local alarm, store the information for later retrieval or forward the information to a remote location for storage and/or near real time review. Examples include fire alarms, security cameras, motion sensors, proximity switches, heat sensors, smoke and fire sensors, and the like. Almost all of these appliances can be used in some form of configuration where one or more sensors may be used in combination to provide a surveillance scheme over an area to be monitored. In prior art systems, the signal generated by each type of device was used locally, or if part of a network, was sent over a dedicated connection to a remote collection point for that type of device.

These prior-art devices often use technologies that not 'intelligent' in the modern sense; they merely provide an 'ON/OFF' indication to the centralized monitoring system. The appliances also are not 'networked' in the modern sense; they are generally hard-wired to the centralized monitoring system via a 'current loop' or similar arrangement, and do not provide situational data other than their ON/OFF status.

SUMMARY OF THE INVENTION

The subject invention is directed to support function systems that may be used separately or in combination as building support devices by adapting them to network appliances and configuring them to communicate over network topologies to each other, to building databases, and to the users. This allows either stand alone functional systems, or a fully integrating them into a single "seamless" system. By way of example, school classrooms may have several communications and monitoring systems to support a classroom such as an intercom, clock system, thermostat, motion detector, door access control, computer network connections and the like. The subject invention permits the combination of all of these functions into a single appliance device that may communicate over a single network connection providing various combinations to provide for building support functions. The appliance devices may also communicate to other buildings and control nodes in other facilities by use of Wide Area Networks (WANs) such as Intranets and the Internet. The invention is particularly well adapted for use in connection with my co-pending patent applications, entitled: Multimedia Surveillance and Monitoring System Including Network Configuration, Ser. No. 09/594,041, filed on Jun. 14, 2000; Method and Apparatus for Distributing Digitized Streaming Video Over a Network, Ser. No. 09/716,141, filed on Nov. 17, 2000; and Method and Apparatus for Collecting, Sending, Archiving and Retrieving Motion Video and Still Images and Notification of Detected Events, Ser. No. 09/853,274, filed May 11, 2001, and incorporated by reference herein.

The subject invention includes specific network appliances designed to participate in a comprehensive multimedia security and building support system that may be deployed singularly or in combination to achieve the degree of monitoring and protection desired.

The subject invention also permits all of the support functions to be combined in one appliance, achieving both improved functionality and support at a lower costs because of use of shared components, shared wiring and shared network connectivity. In the preferred embodiment, the appliance is connected to a single Category5 (CAT5) wire, fiber or the like to the system network. The single appliance provides all of the functions previously supplied by a plurality of dedicated purpose discrete appliances.

Functional superiority over the discrete appliances is also achieved because of the opportunity to integrate the various subsystems common in the appliances. For example, a universal wall appliance in accordance with the subject invention can use a common display panel for a clock/bell system and a visual alarm. A single microphone can be shared for the intercom, for noise detection and for alarm oral response or activation. A single speaker can be utilized for the intercom, a telephone call bell, an alarm emitter and a clock/bell sound emitter. A single temperature sensor can be shared between a fire alarm system, the HVAC system and be utilized to check for appliances proper ambient operating temperature environment. A wireless LAN access point can be shared for remote or mobile alarm/sensor/display modules and for classroom computer access. A single video camera can be shared for security monitoring, video conferencing and distance learning. A single streaming audio/video decoder can present Video On Demand (VOD) classroom video presentations, broadcast television and video conferencing.

The subject invention permits network components and appliances to be used in combination with a network based full service, multi-media surveillance system capable of a wide range of monitoring techniques utilizing digital network architecture.

Schools, banks, retail operations and other security conscious businesses and institutions have a need for advanced hardware and software solutions that provide total, user friendly control over their surveillance and monitoring equipment. A system desirably provides:

1. Multimedia data collection;
2. Automated control;
3. Archive storage;
4. Enhanced search and recall of archived event recordings;
5. Preset responses to triggers and triggering events;
6. Remote viewing and management from a wide area network including, preferably, the World Wide Web (or Internet) accessibility.
7. Automatic system pre-failure prediction and post failure analysis.

8. Common infrastructure and workstations shared with other co-located systems.
9. Wireless infrastructure for sensors, monitors and shared applications/systems.

In accordance with the teachings of the subject invention, any or a plurality of distinctive appliances may be connected to the comprehensive, wired/wireless multimedia surveillance and monitoring system for transmitting event data, video and/or image monitoring information, audio signals and other network appliance sensor and detector data over significant distances using digital data transmission over networks such as a local area network (LAN), a wireless LAN (WLAN), a wide area network (WAN) such as the Internet for other network automatic event recording, assessment and response, including dispatch of response personnel. Wired, wireless and optical appliances and sensor systems may be employed. The wireless LAN connectivity permits local distribution of sensor, audio, video and image data with relatively high bandwidth without expensive local wiring/fiber and without the requirement of a license and without relying on a common carrier and the fees associated therewith. The surveillance system may be interfaced with a WAN (wide area network) such as optical fiber, frame relay or the Internet for providing a worldwide, low cost surveillance system with virtually unlimited geographic application. Centralized and distributed remote monitoring stations have access to all of the surveillance data from various remote locations via the network or the WAN. A server provides a centralized location for data collection, alarm detection and processing, access control, auto response generation, paging, automatic e-mail generation, telephone dialing and message transmission, dispatch processing, logging functions, configuration management, and/or other specialized functions. The server may be inserted virtually anywhere in the Intranet/Internet network, and may be segmented and installed in a distributed manner to further add to system security, reduce bandwidth requirements, or allow redundancy.

Multiple sensors and appliances may be accommodated, as required. The topology of the network will be established by the geographic situation of the specific installation. Appropriate firewalls, encryption and access codes may be set up as desired to protect unauthorized access to the system or collected data. The server based system permits a security provider to have access to the appliance, related sensor and surveillance data or to configure or reconfigure the system from any station on the Intranet or Internet.

The system of the subject invention permits comprehensive monitoring of locations over great distances with sufficient performance to provide widespread use as a security surveillance device.

The subject invention is specifically directed to networked appliances such as video and/or image appliances, access control devices, detectors and sensors as well as audio, condition and/or event monitoring systems. In its preferred form, the comprehensive multi-media safety and surveillance system of the subject invention provides both visual and audio information as well as critical data such as temperature fire and smoke detection. Manually operated transducers, such as panic buttons, door contacts, floor sensors, and the like may also be included to activate the system in the presence of an event at the sensor location, such as a fire alarm or security alarm panic bar or the like. Controlled transducers, such as electric door strikes, magnetic door strikes, electric door openers, strobe lights, sirens, room lights, fire control equipment and the like can be controlled by the appliances. Numerous appliances, including but not limited to detection and sensor systems, are utilized to provide monitoring stations or personnel, such as security personnel, and/or a base station monitoring critical information from the sensor system and to record the information and permit reconstruction of events after the fact.

In its preferred form, a plurality of sensor units, which may include at least one video image appliance sensor and/or at least one audio appliance sensor and/or at least one motion appliance sensor and/or other sensors, are placed strategically about the facility to be monitored. In addition, strategically placed motion detectors, fire sensors, panic switches, smoke sensors and other monitoring equipment is incorporated in the system. Cameras may be placed throughout the facility and in other desired spaces including on the grounds outside the facility. The audio sensors/transducers and other sensors and detectors are also strategically located both internal and external of the facility.

While the appliances of the subject system may be hard-wired, in its preferred form the system of the present invention is adapted for use in connection with wireless transmission and receiving systems. The wireless system is particularly useful for adapting the system as a retrofit in existing facilities and also provides assurances against disruption of data transmission such as during a fire, as well as permitting roving interactive monitors that can be carried or worn. In the preferred embodiment, the wireless system is fully self-contained with each appliance and/or sensor unit having an independent power supply and, where required for image sensors, a sensor light source. The security system may include either motion sensitive, audio sensitive and/or image processing based activation systems so that the equipment is not activated until some event is detected, i.e., the system is action triggered.

In the preferred embodiment, each appliance will transmit any detected information to a monitor system located at a base monitoring station, located on site and/or at a remote or roving location, and/or a server for logging, forwarding, archiving same. The base station has instant live access to all of the image and audio signals as they are captured by the sensors, and where desired is adapted to record and make an historic record of the images for archive purposes. Where random access recording techniques are used, such as, by way of example, digital random access memory storage devices or high speed disk storage arrays, the archive may be readily searched for stored information.

One significant advantage to the appliance configuration of the subject invention is that it permits multimedia surveillance in applications and locations where physical wiring cannot be used, and over distances not possible or not cost effective with other systems. The system of the present invention provides surveillance capability utilizing techniques ranging from closed-circuit, hard wired systems to the Internet based techniques and is not limited by the data capacity; or cost associated with systems currently on the market.

It is, therefore, an object and feature of the subject invention to provide both wired and wireless communication links between appliances, sensors, monitors and/or sensors.

It is an additional object and feature of the subject invention to provide an appliance configuration for a multimedia surveillance system adapted for any of a plurality of monitoring and surveillance appliances which may be incorporated in the system via network connections through a server to provide a versatile, wide-ranging multi-media system which may be configured to meet specific application needs.

It is an additional object and feature of the subject invention to provide an appliance and monitoring station configuration for a multimedia surveillance system adapted for a plurality simultaneously operating geographically distributed monitoring stations.

It is another object and feature of the subject invention to provide appliances adapted for use in connection with a surveillance system for transmitting data over significant distances using typical bandwidth carriers such as the public telephone system, and wireless carriers such as cellular telephones, including AMPS, PCS, GSM, CDMA, wide band CDMA and the like, CDPD data links, two-way pagers, satellite networks such as Iridium and the like.

It is another object and feature of the subject invention to provide appliances adapted for use in connection with a surveillance system for transmitting data over significant distances using typical broadband carriers such as cable TV networks, dedicated fiber optics networks, DSL and ADSL carriers, and forthcoming broadband wireless networks.

It is also an object and feature of the subject invention to provide appliances for a surveillance system adapted for utilizing wired video and/or image data collection and/or transmission using the Internet and/or IP protocols.

It is also an object and feature of the subject invention to provide appliances for a surveillance system adapted for utilizing wireless video and/or image data collection and/or transmission using the Internet and/or IP protocols.

It is also an object and feature of the subject invention to utilize network communication systems to distribute both appliance surveillance data and control data.

It is another object and feature of the subject invention to provide network appliances for a security surveillance system adapted for use in connection with a wireless LAN (WLAN) communications system, such as the IEEE 802.11 standards and follow-on standards.

It is another object and feature of the subject invention to provide time display to a network appliance communicating over the IP network.

It is another object and feature of the subject invention to provide emergency event annunciation to a network appliance communicating over the IP network.

It is another object and feature of the subject invention to provide room paging through a network appliance communicating over the IP network.

It is another object and feature of the subject invention to provide room audio monitoring utilizing a network appliance communicating over the IP network.

It is another object and feature of the subject invention to provide room intercom utilizing a network appliance communicating over the IP network.

It is another object and feature of the subject invention to provide room temperature sensing using a network appliance communicating over the IP network.

It is another object and feature of the subject invention to provide device temperature sensing using a network appliance communicating over the IP network.

It is another object and feature of the subject invention to provide room gunshot detection utilizing a network appliance communicating over the IP network.

It is another object and feature of the subject invention to provide room access control utilizing a network appliance communicating over the IP network.

It is another object and feature of the subject invention to provide an audio monitor or intercom between one or more network appliances and one or more monitor system using voice-over-IP (VOIP).

It is another object and feature of the subject invention to provide an audio monitor or intercom between two or more network appliances utilizing VOIP.

It is another object and feature of the subject invention to provide archival storage of VOIP audio information for later playback.

It is another object and feature of the subject invention to provide a network appliance with video and/or audio capability with muted camera video and/or muted microphone audio capability in a room for privacy.

It is another object and feature of the subject invention to provide a network appliance device that has an open camera and/or microphone when panic button is pushed.

It is another object and feature of the subject invention to provide "intercom" and "emergency" buttons on a panic button.

It is another object and feature of the subject invention to provide panic button initiated actions, such as:
  Intercom functions to and from room over IP.
  Logging of all intercom calls.
  Emergency notification to wired guard stations over IP.
  Emergency notification to wireless guard stations over IP.
  Push-To-Talk (or voice activation) response from guard or administrator.
  Display on room display stating identity of the responding party.
  Flashing location icon on map for intercom or emergency.
  Pop-up name of person pushing panic button.
  Pop-up location of person pushing panic button.
  Pop-up name of room where emergency is taking place.
  Logging of all panic button pushes, by whom, time, location, and the like.
  Logging of all responses, by whom, time, and the like.
  Recording of all emergency audio/video on server or appliance.
  For emergency calls, automatic call list: i.e., if first guard does not respond, go to next, go to administration.
  For emergency calls, have a party line: i.e., call all stations, all can respond asynchronously.
  On party line, all stations display the name of any speaker doing a push-to-talk (or voice activation) operation, with workstations having a pop-up display and wall appliance display shows instead of time.
  A software priority is established for the responding push to talk (or voice activation). Automatic notification priority based upon location, nearest, first, and so on.

It is another object and feature of the subject invention to provide a workstation-to-workstation intercom utilizing VOIP.

It is another object and feature of the subject invention to provide push-to-talk or voice activated control of audio from two or more stations on a group session at one time.

It is another object and feature of the subject invention to provide an audio/video intercom from workstation-to-workstation utilizing VOIP.

It is another object and feature of the subject invention to provide map-based dialing to workstations or network appliances.

It is another object and feature of the subject invention to provide menu-based dialing to workstations or network appliances.

It is another object and feature of the subject invention to provide IP video to and from network appliances.

It is another object and feature of the subject invention to provide logging of all calls.

It is another object and feature of the subject invention to provide logging of all calls with caller and/or called station ID's.

It is another object and feature of the subject invention to provide logging of all calls with time stamps for time of calling and answering.

It is another object and feature of the subject invention to provide logging of all calls by recording actual audio on the server.

It is another object and feature of the subject invention to provide calls to guard stations and standard PC workstations.

It is another object and feature of the subject invention to provide calls to administrative stations.

It is another object and feature of the subject invention to provide calls from any workstation to any other workstation.

It is another object and feature of the subject invention to provide other voice interfaces, such as:

Calls patched into POTS telephone calls from the "outside" through a gateway network appliance device.

Calls on internal PBX through a gateway network appliance device.

Multimedia network appliances can be patched into VOIP telephone calls such as from the Internet, VOIP phone systems and the like. Incoming calls are automatically distributed.

Outgoing calls by automatic priority, such as guard station first, if no answer, the police department over POTS.

Outgoing calls by speed dialing. It is another object and feature of the subject invention to provide access control, such as:

Access granted or denied flashing on map.
Automatic camera switching based on any access attempt.
Automatic camera switching on access denied only.
Mode for manual guard confirmation for all accesses.
Access network appliance powered over Cat-5 wiring.
Access network appliance controlled over IP wiring.
Access control of a network appliance decided by server, or by internal tables.
Access network appliance has internal access allowance tables set over IP wiring.
Access network appliance uses internal tables if server is down.
Access network appliance always uses internal tables (to save bandwidth).
Access network appliance is has encryption.
Access network appliance has contact outputs.
Access network appliance has optional wireless badge reader.
Access network appliance has optional swipe badge reader.
Access network appliance has optional fingerprint reader.
Access network appliance has optional retina scanner.
Access network appliance has link to personal geo-locator such that if authorized person is in close proximity door opens.
Access network appliance opens under local control.
Access network appliance opens under server control.
Access network appliance has tamper detectors reporting over IP.
Access network appliance sends all activity to server for logging.
Access network appliance has local memory for logging all activity.
Access network appliance can send local memory content to server for logging.
Server can request access network appliance data for logging.
Access network appliance is configured over IP.
Access network appliance has HTML server for setup and monitoring.
Access network appliance supports friendly names, such as "East Outside Door".
Access network appliance has password protection.
Access network appliance has encrypted communications to and/or from.
Access network appliance can communicate over wired LAN (example, cat-5).
Access network appliance can communicate over wireless LAN (example IEEE 802.11B).

Other objects and features will be readily apparent from the accompanying drawings and detailed description.

BRIEF DESCRIPTION OF THE DRAWINGS

FIG. 12 depicts a motion detector sensor network appliance with an IP network interface and power receiver.

FIG. 12A is a wireless version of the network appliance shown in FIG. 12.

FIG. 13 depicts a networked smoke detector network appliance using the network interface of FIG. 12.

FIG. 13A is a wireless version of the network appliance shown in FIG. 13.

FIG. 14 depicts a conventional 'Pull Handle' commonly used in institutional fire alarm systems as adapted for incorporation in the networked appliance of the subject invention.

FIG. 14A is a wireless version of the network appliance shown in FIG. 14.

FIG. 15 depicts a contact-closure interface, as is commonly used for door or window sensors in alarm systems as adapted as a networked appliance of the subject invention.

FIG. 15A is a wireless version of the network appliance shown in FIG. 15.

FIG. 16 depicts a heat sensor network appliance.

FIG. 16A is a wireless version of the network appliance shown in FIG. 16.

FIG. 17 depicts a glass breakage sensor network appliance.

FIG. 17A is a wireless version of the network appliance shown in FIG. 17.

FIG. 18A is a wireless version of the network appliance shown in FIG. 18.

FIG. 19 depicts a strobe light network appliance.

FIG. 20 depicts a thermostat/humidistat network appliance.

FIG. 20A is a wireless version of the network appliance shown in FIG. 20A.

FIG. 21 depicts a general-purpose control panel network appliance.

FIG. 21A is a wireless version of the network appliance shown in FIG. 21.

FIG. 22A is a wireless version of the network appliance shown in FIG. 22.

FIG. 23 depicts an indicator light panel network appliance.

FIG. 23A is a wireless version of the network appliance shown in FIG. 23.

FIG. 24 depicts a networked analog user interface control network appliance, such as may be used to control room lights, temperature, fan speed, louver blind position, loudspeaker volume, and the like.

FIG. 25 depicts a loudspeaker network appliance.

FIG. 25A is a wireless version of the network appliance shown in FIG. 25.

FIG. 26 depicts a control panel network appliance with indicator lights.

FIG. 26A is a wireless version of the network appliance shown in FIG. 26.

FIG. 27 depicts a power outlet network appliance.

FIG. 27A is a wireless version of the network appliance shown in FIG. 27.

FIG. 28 illustrates an AC socket as expanded into a network-controlled AC power strip network appliance.

FIG. 29A is a wireless version of the network appliance shown in FIG. 29.

FIG. 30 depicts a lighting fixture network appliance controlled over a network.

FIG. 32 depicts an alternative embodiment of the network appliance of FIG. 31, wherein a digital display replaces the stepper motor, gearbox, hands and shaft encoder.

FIG. 33 depicts a self-contained magnetic strip reader network appliance, containing a reader as is commonly used in ATM machines, gas pumps, and point-of-sale cash registers.

FIG. 33A is a wireless version of the network shown in FIG. 33.

FIG. 34 depicts a proximity card reader network appliance.

FIG. 34A is a wireless version of the network appliance shown in FIG. 34.

FIG. 36 depicts a combination security controller network appliance showing as it is utilized to control an electronic door strike, a door contact switch, a keypad entry system, and a secondary identification component such as a magnetic stripe reader, a proximity sensor or retina reader, or the like.

FIG. 42 depicts a wired pull handle system.

FIG. 42A is a wireless version of the system shown in FIG. 42.

FIG. 49A depicts a retina reader for use in the networked system of the subject invention.

FIG. 49C depicts a fingerprint reader for use in the networked system of the subject invention.

DETAILED DESCRIPTION OF THE PREFERRED EMBODIMENTS

Figure 1:
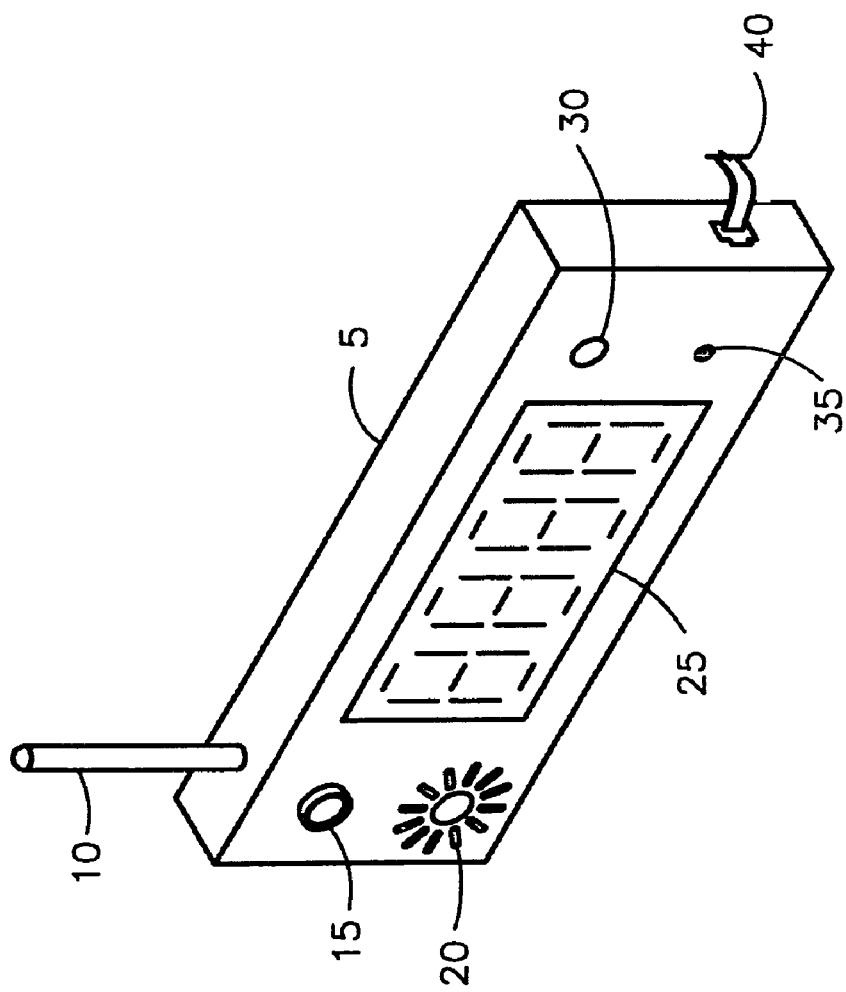
FIG. 1 is a perspective view of a room network appliance module in accordance with the subject invention.

FIG. 1 depicts an overall view of the appliance 5 of the subject invention. The appliance contains a variety of devices that are commonplace or useful in educational, institutional, or office environments, including:

A conventional clock display 25, operable to display other information as needed such as temperature, humidity, alert messages, etc.

A microphone 35, to detect local ambient sounds in the room and send them to a remote location and, optionally, to support acoustic event detection of gunshots and the like, A loudspeaker 20, to allow remote supervisory personnel to communicate with room occupants, A beacon transmitter 30, which emits coded infrared, RF, or ultrasonic energy into the room for the purpose of activating personnel locator devices therein, A beacon receiver also 30, which detects coded infrared, RF, or ultrasonic energy emitted by locator devices within the room, A camera 15, to view live or still scenes in the room and send them to a remote location, A standard RJ-45 or equivalent connector 40 for connecting to a facility Network.

An antenna 10 may be provided for supporting a wireless connection, as will be explained therein.

Figure 2:
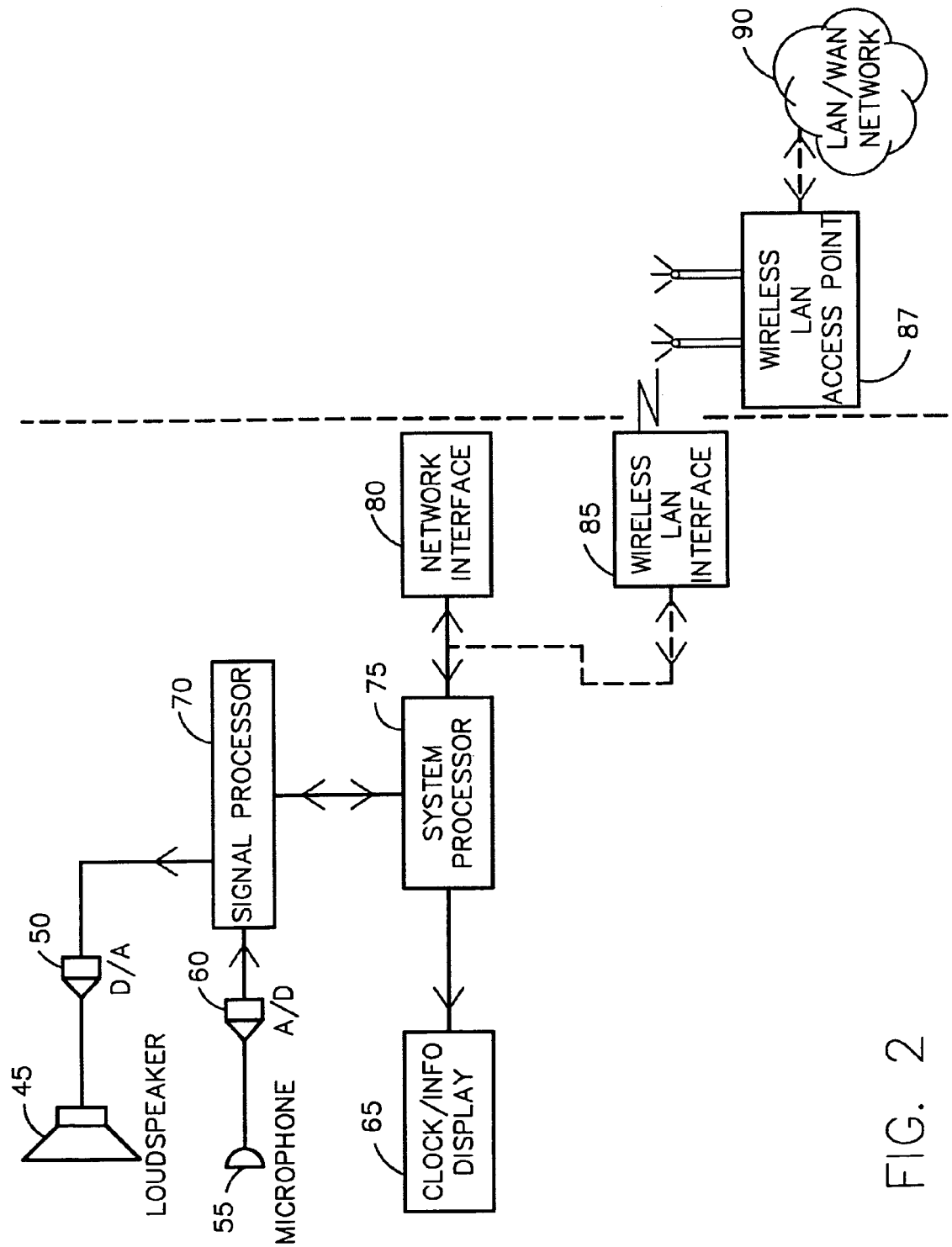
FIG. 2 depicts an overall block-diagram view of a simple implementation of a wall network appliance of the typed shown in FIG. 1.

FIG. 2 depicts an overall block-diagram view of a simple implementation, such as may be used in an educational setting. In this implementation, the appliance only supports a clock display 65, a loudspeaker 45, and a microphone 55, to support the ordinary clock and intercom commonly found in schoolrooms. As shown, a digital-to-analog converter 50 and an analog-to-digital converter 60 are used as required for conditioning signals input to and output from the signal processor 70. The system processor is connected to a network interface 80, and/or as desired a wireless interface 85. The wireless interface 85 is in wireless communication with a wireless access point 87 for providing a gateway to the network 90.

The device is connected to a local-area-network, such as the commonplace 10Base-T, via the network interface. 10Base-T networks commonly employ twisted-pair wiring between hubs and connected devices; an alternative implementation may use IEEE 802.11 or equivalent wireless connections. In either case, the network interface passes information to and from the appliance's processor. The processor controls the clock display. Ambient sounds picked up by the microphone are digitized, compressed, and transmitted to the network via the A/D converter, signal processor, system processor, and network interface. A variety of compression methods and communication protocols may be employed; in the preferred embodiment the audio is compressed using MP3 and sent to the network using the RTP and TCP/IP protocols. Similarly, compressed audio from the network may be received, de-multiplexed, decoded, and played back via the network interface, system processor, signal processor, and D/A converter.

Figure 3:
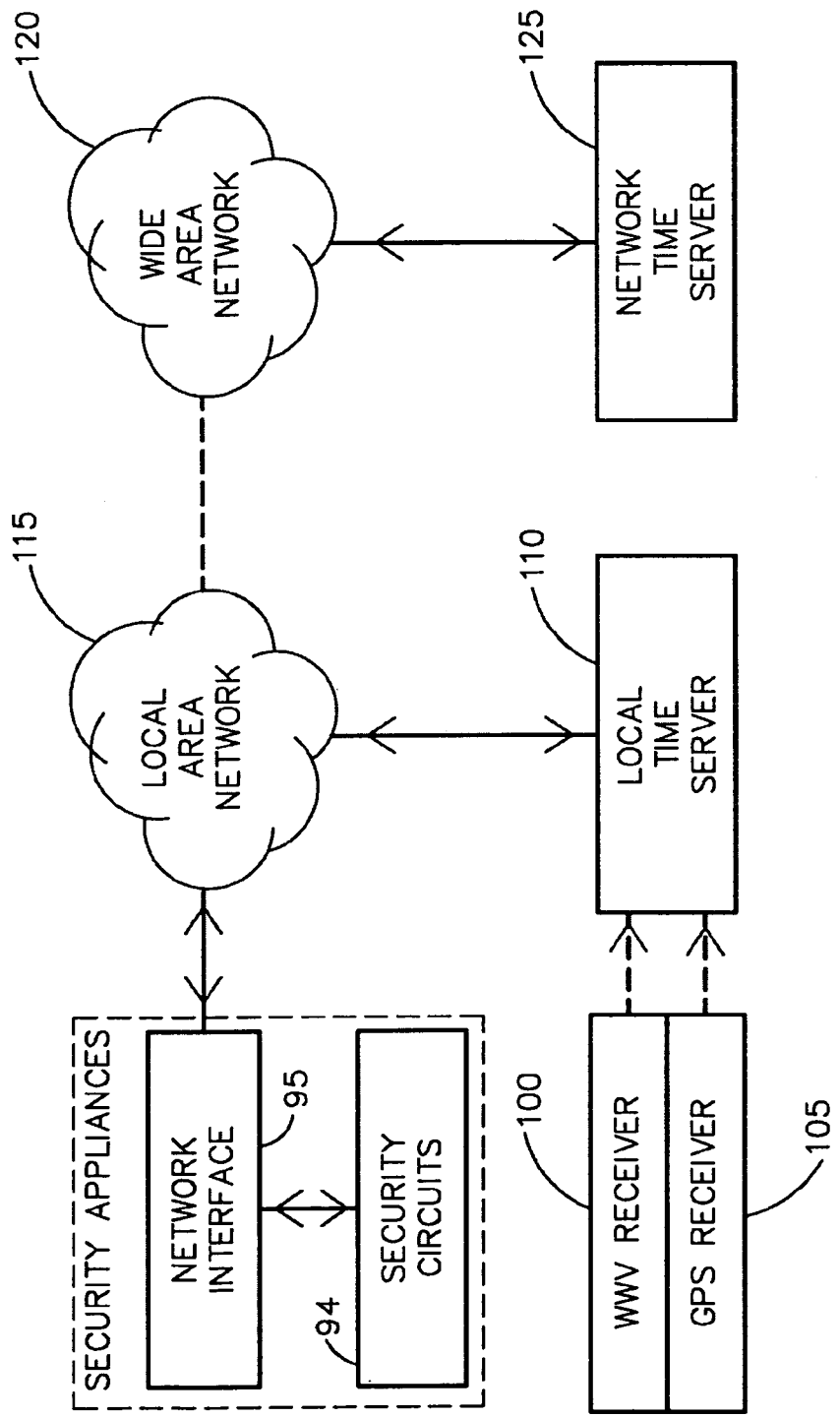
FIG. 3 illustrates a network-supported circuit for communicating a time standard to a network appliance for use in event logging or event execution by a network appliance via a local network.

As depicted in FIG. 3, the clock may be set from a time server 110 connected to the local network 115. A variety of network-based time-transfer methods exist, the most popular and convenient is Network Time Protocol (NTP), a protocol used in conjunction with local-area networks or the Internet. Using NTP, the time server and the client (in this case, the appliance) exchange time messages, and determine a statistical value for network delay, which is then factored out. Accuracies on the order of 1 millisecond are possible on a local network. The timeserver may be set manually, or may optionally be set using a commercially available WWV time receiver 100 or GPS time receiver 105. As an alternative, the local time server may set itself to an internet-based master timeserver, such as provided by NIST or the U.S. Naval Observatory (USNO) as indicated by the network timeserver 125, via the network 120. Various security appliances including the security circuits 94 may be incorporated in the circuit via the network interface 95.

Figure 4:
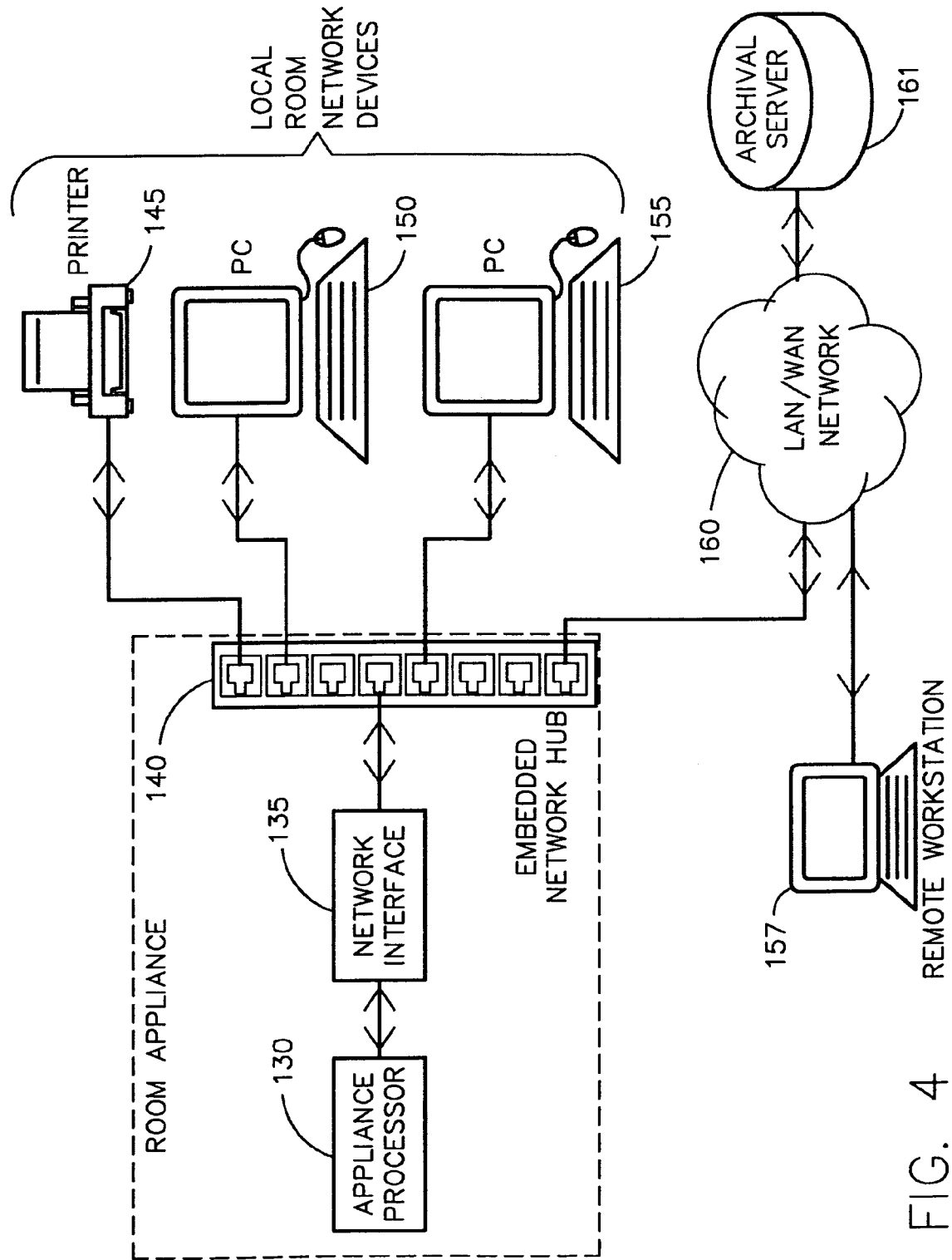
FIG. 4 shows a configuration including a network hub embedded into the security network appliance.

A useful refinement of the system is depicted in FIG. 4. As there shown, the appliance processor 130 is connected to an embedded network hub 140 via a network interface 135. Typically, a 10Base-T hub, or equivalent, is embedded into the appliance. This allows other computers 150, 155, printers 145, or other networked devices (via network 160) to share the existing connection from the room to the facility's local area network. By way of an example, remote workstation 157 may be supported in this manner. An archival server 161 is accessible over the network 160.

Figure 5:
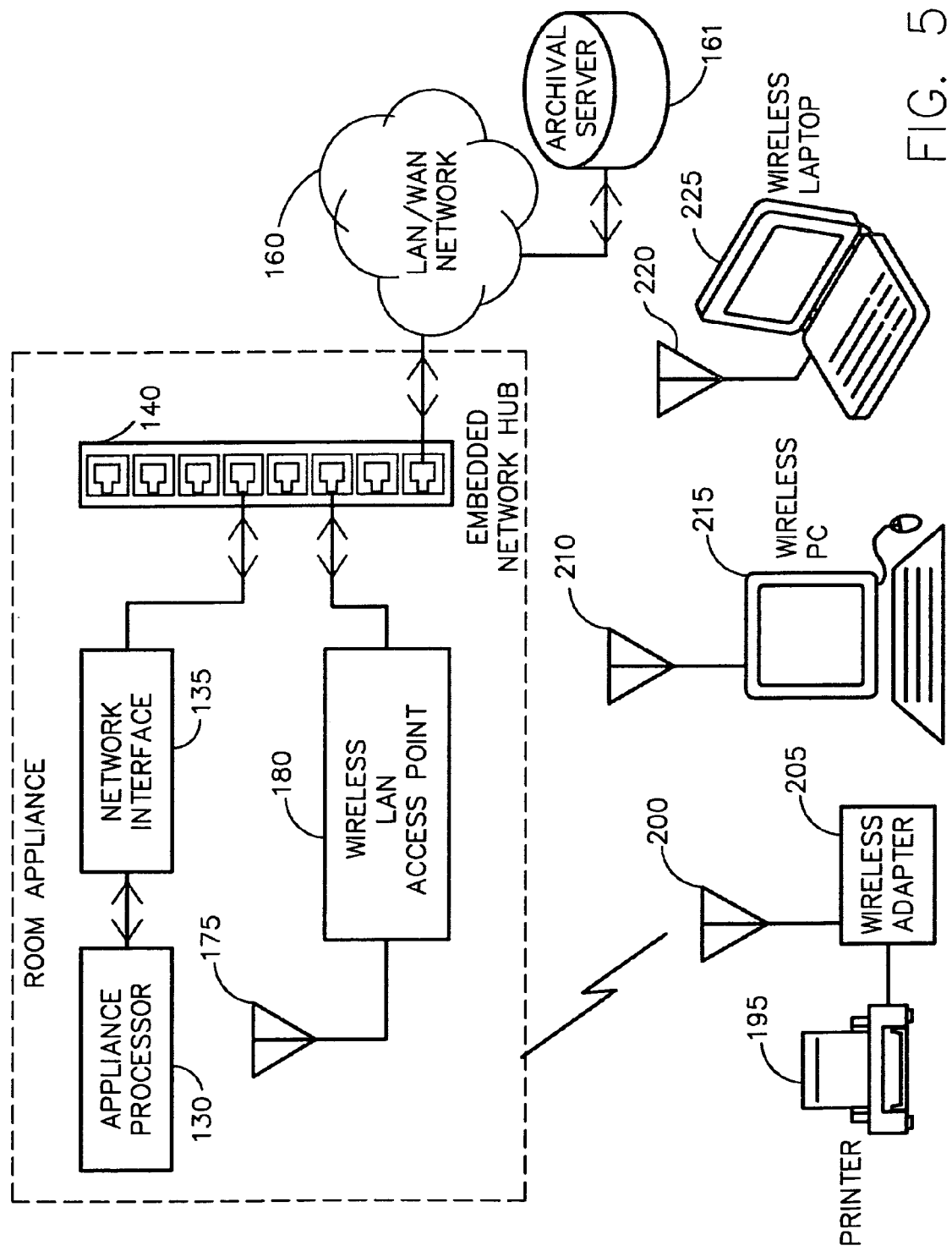
FIG. 5 shows a configuration wherein a room network appliance includes wireless networking technologies.

The local area network hub may also include wireless networking technologies, such as the IEEE 802.11, as depicted in FIG. 5. In this enhancement a wireless LAN access point 180 and an antenna 175 is provided at the appliance, permitting communication with various wireless remote components or systems such as the printer 195 supported by the wireless adapter 205 and antenna 200, the wireless desktop PC 215 and antenna 210, the wireless laptop 225 or other portable device and antenna 220.

Figure 6:
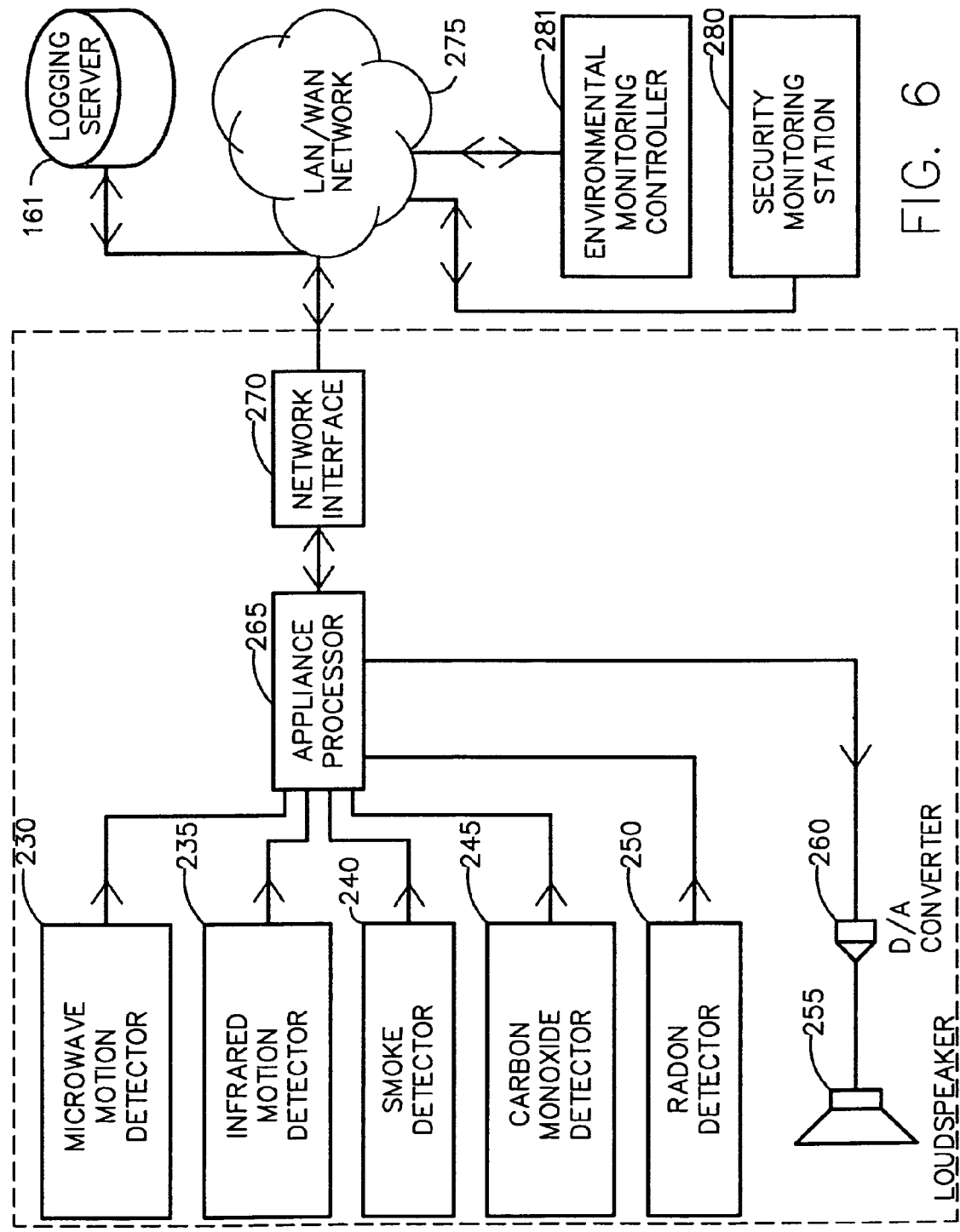
FIG. 6 illustrates the utility of the room network appliance as configures as an integrated multimedia sensor for a plurality safety-related sensors commonly employed in such a facility.

FIG. 6 illustrates the utility of the room appliance as a collection point for safety-related sensors such as, by way of example, the microwave motion detector 230, the infrared motion detector 235, the smoke detector 240, and the carbon monoxide detector 250, commonly employed in such a facility. The processor 265 collects data from the various sensors in the room. Such inputs are often simple contact closure inputs. When activated, the appliance alerts a security monitoring station via the local network or via a wide-area network 275 through the network interface 270. The security station may then summon the appropriate help, such as police, fire, ambulance, or other services as needed. Also, the system processor when so activated may generate an appropriate local warning sound using the D/A converter 260 and the loudspeaker 255. Appropriate sounds might be a fire horn, alarm bell, klaxon, or the like. The warning sounds may be generated from stored sounds in the processor's memory, or may be generated by the facility security system and transmitted to the room appliance via the intervening network. As shown, various remote stations such as a logging server or archive server 161, a security monitoring station 280 and other systems such as by way of example the environmental monitoring controller 281.

Figure 6A:
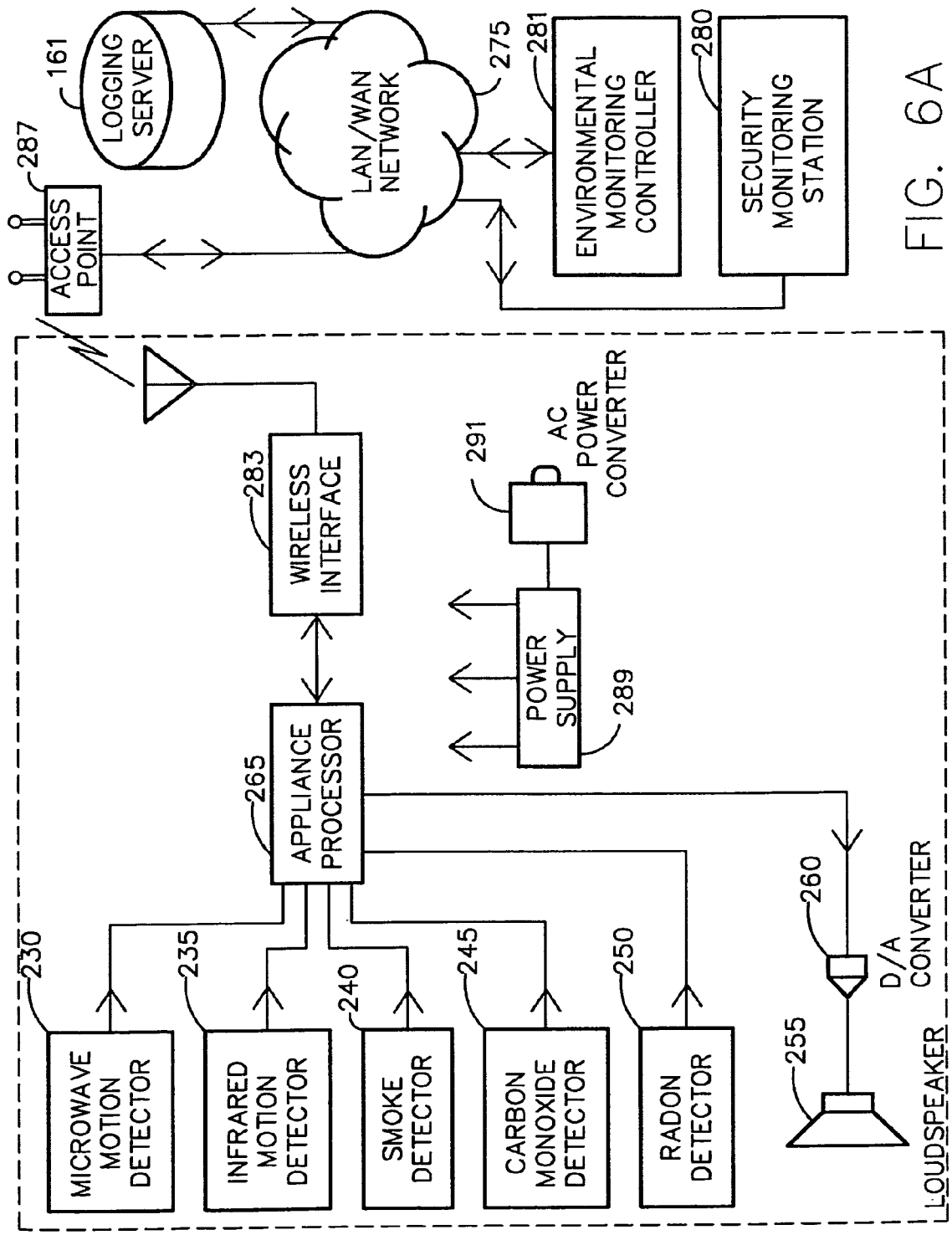
FIG. 6A is a wireless version of network appliance shown in FIG. 6.

FIG. 6A is a wireless version of the system of FIG. 6. In this enhancement a wireless interface 283 is provided for communicating with a wireless access point 287 to provide a link to the network 275. Also in this embodiment a power supply 289 and a converter 291 is provided to power the appliance system. In the wired version the network cabling is used to provide power.

Figure 7:
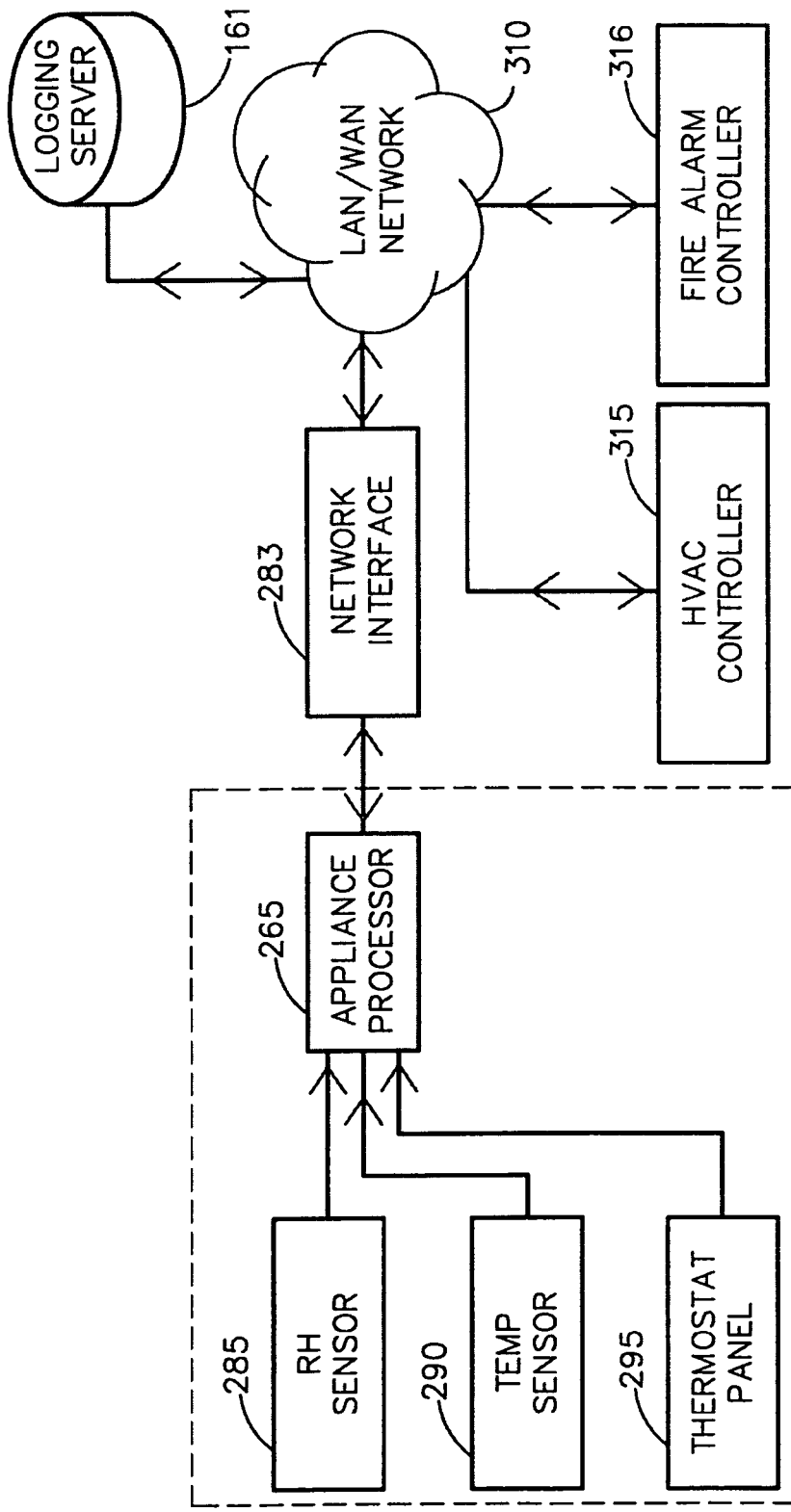
FIG. 7 depicts a room network appliance as a gathering point for room environmental data.
Figure 7A:
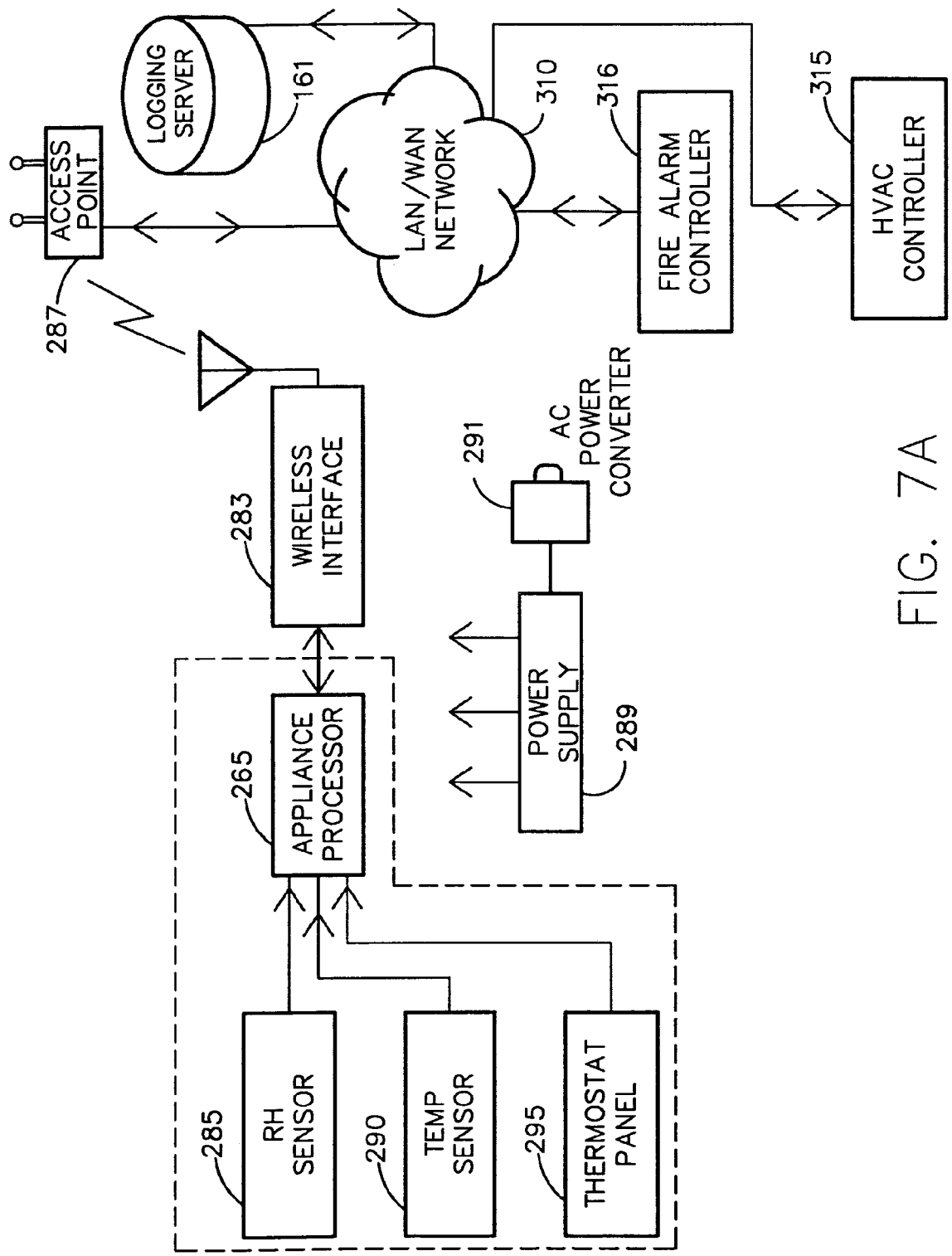
FIG. 7A is a wireless version of the network appliance shown in FIG. 7.

FIG. 7 depicts the room appliance as a gathering point for room environmental data, as may be used in controlling an HVAC system. Various environmental control sensors, such as a relative humidity sensor 285, temperature sensor 290, or thermostat panel 295, may connect to the facility HVAC controller 315 via the room appliance processor 265 and network 310. Other critical monitoring systems such as, by way of example, the fire alarm controller 316, may be interconnected to this subsystem via the network. The wireless version is shown in FIG. 7A.

Figure 8:
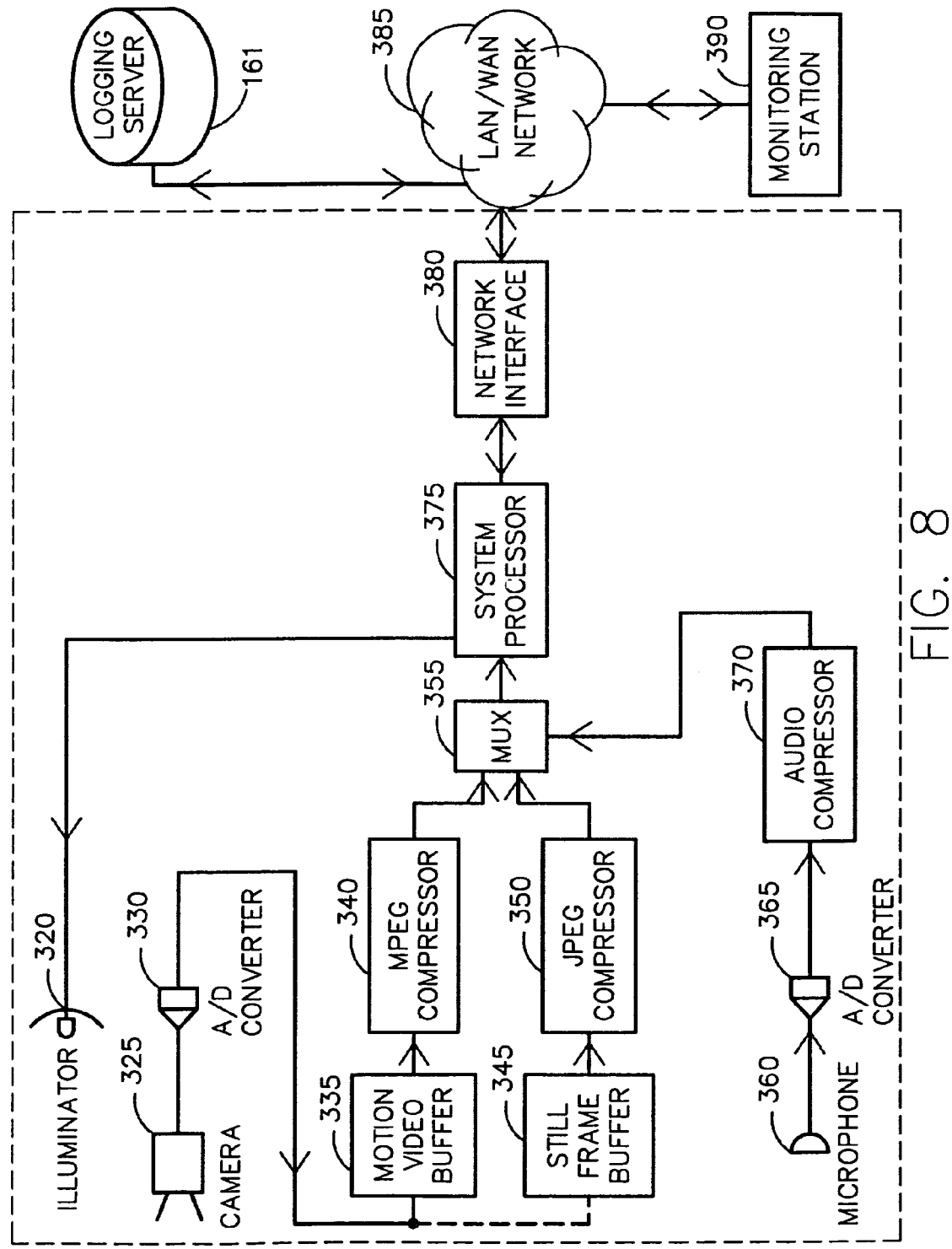
FIG. 8 illustrates a network appliance enhancement including a video camera, digitizer, motion video compressor, still-frame video compressor, infrared illuminator for dark operation, audio sensor, digitizer, and audio compressor.
Figure 8A:
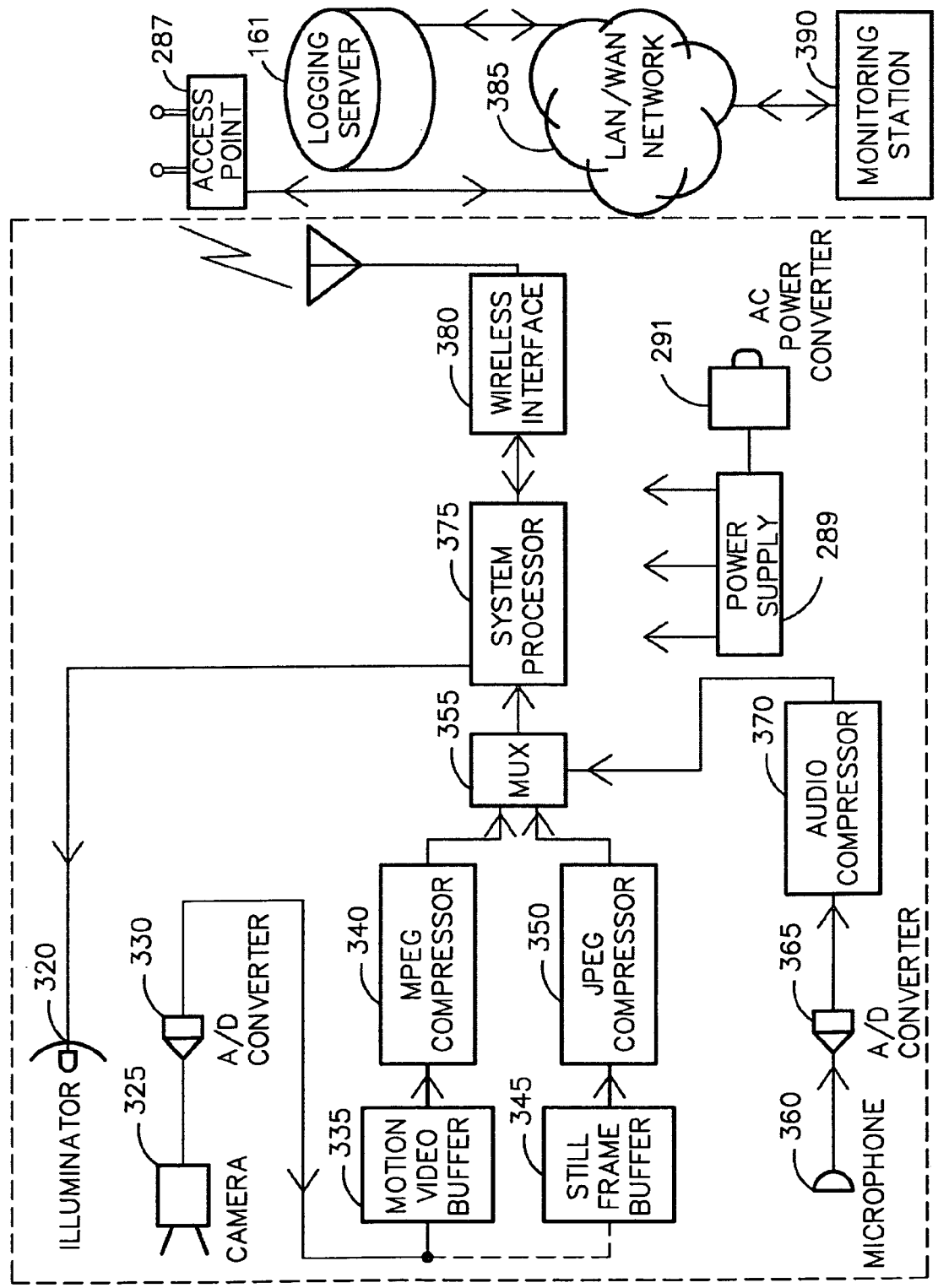
FIG. 8A is a wireless version of the network appliance shown in FIG. 8.

FIG. 8 illustrates an enhancement to the basic appliance system, wherein a video camera 325, digitizer 330, motion video buffer 335 and compressor 340 and, optionally, a still-frame video buffer 345 and compressor 350 is added. An illuminator 320 for low light conditions may also be supplied. When activated, the camera captures local scenes, and transmits them to a monitoring station(s) 390 on the local network or wide-area network using suitable compression methods such as MPEG or JPEG, via the network comprising the multiplexer 355, the system or appliance processor 375 and a network interface 380 whereby communication via the network 385 is supported. Simultaneously, the microphone 360 may be included to receive local sounds, digitize them at converter 365, compress them at compressor 370, and send them to the same destinations. Activation of the camera and microphone may be accomplished locally via one or more of the attached sensors, or remotely via the network from a monitoring station. If the ambient illumination is insufficient for viewing via the camera, an illuminator may be enabled by command from the appliance's processor or by command from the remote station. The illuminator may be visible light or infrared, as desired. A wireless version is shown in FIG. 8A with an independent power supply 289, converter 291 and wireless access point 287 is provided as previously described.

Figure 9:
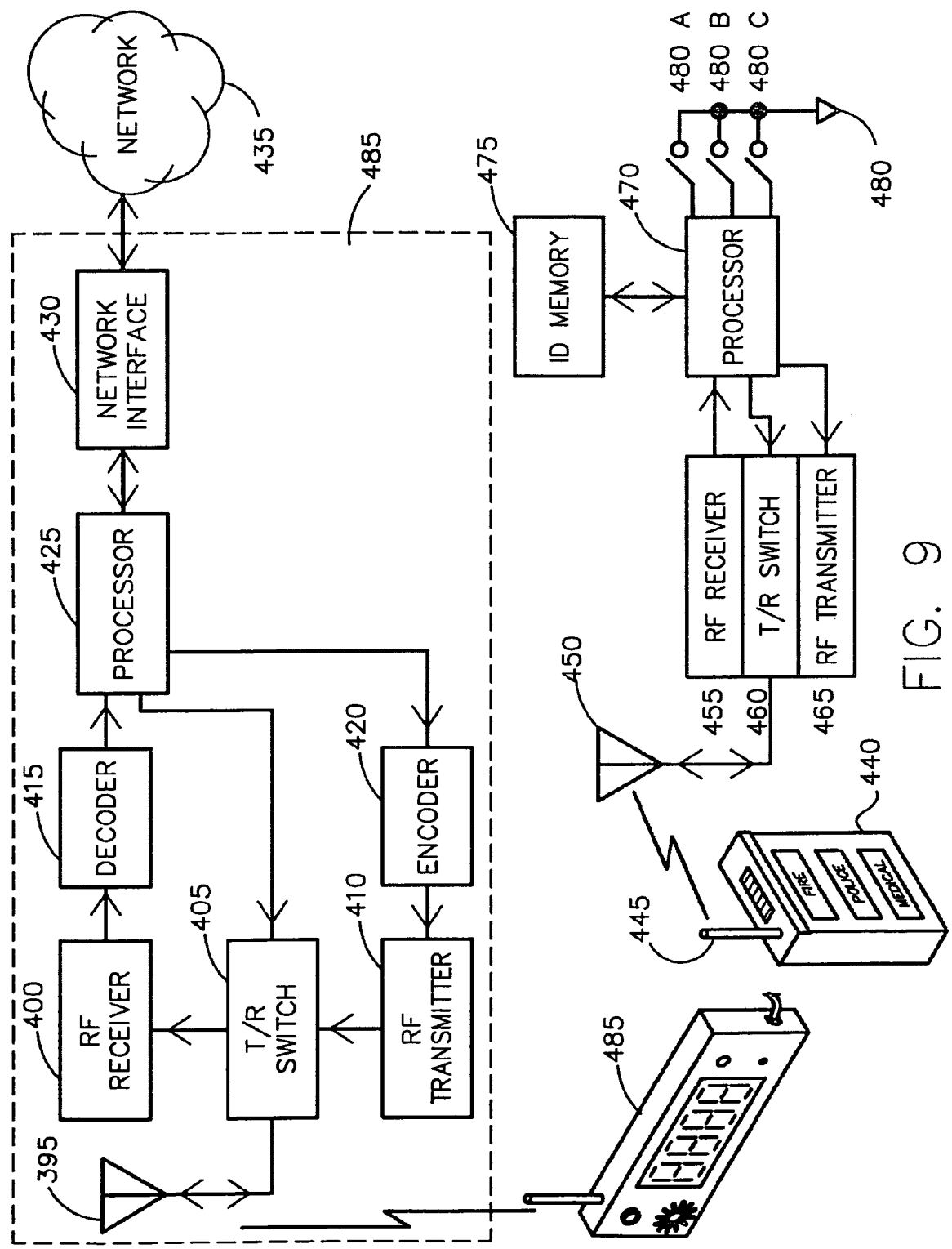
FIG. 9 illustrates a room network appliance with an alternative alarm source wherein a wireless "panic button" alarm device may activate the system.
Figure 9A:
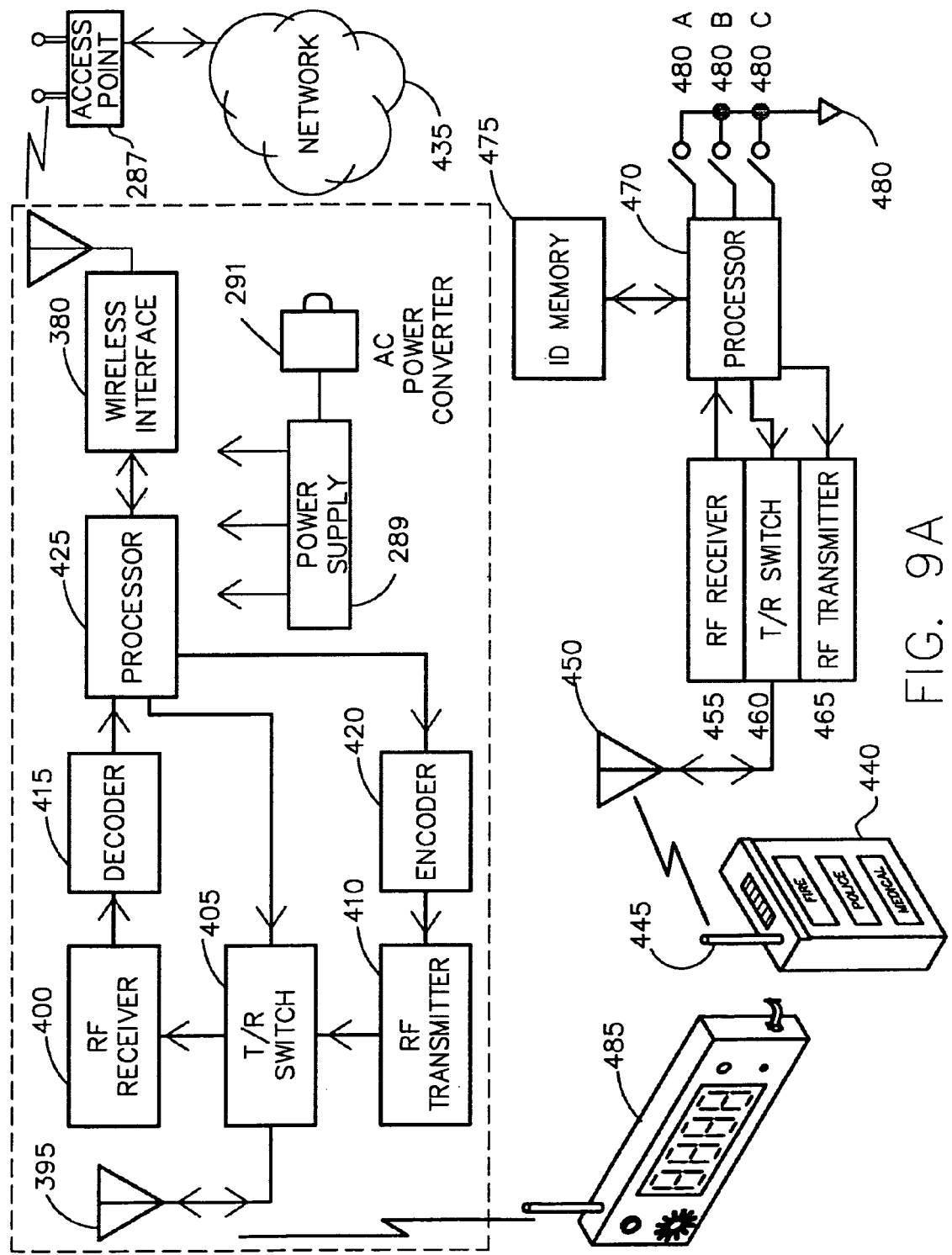
FIG. 9A is a wireless version of the room network appliance shown in FIG. 9.

An alternative alarm source is depicted in FIG. 9, wherein a wireless "panic button" alarm device 440 may activate the system using the wireless transmitter 445 and receiver 450, 455. As shown, the wireless alarm has an RF receiver 455 and transmitter 465, controlled by the T/R switch 460, a device ID memory 475, and a pushbutton switch 480. A process controller 470 is also provided. During normal usage, the room appliance 485 periodically transmits a code representing its location. The personal alarm 440 receives and stores this location code. When the alarm is activated by pressing the switch 480, the alarm transmits its device ID and the room ID information to the appliance 440. This then activates the appliance, enabling the camera and microphone, and alerts the central monitoring station via the intervening network. As shown, the appliance 440 in this configuration includes a compatible RF receiver 400, T/R switch 405, RF transmitter 410 with antenna 395. The appliance processor 425 and network interface 430 communicate with the network 435 as previously described. An encoder 420 may be provided as necessary. FIG. 9A shows the same system with wireless network interfacing as previously described.

Figure 10:
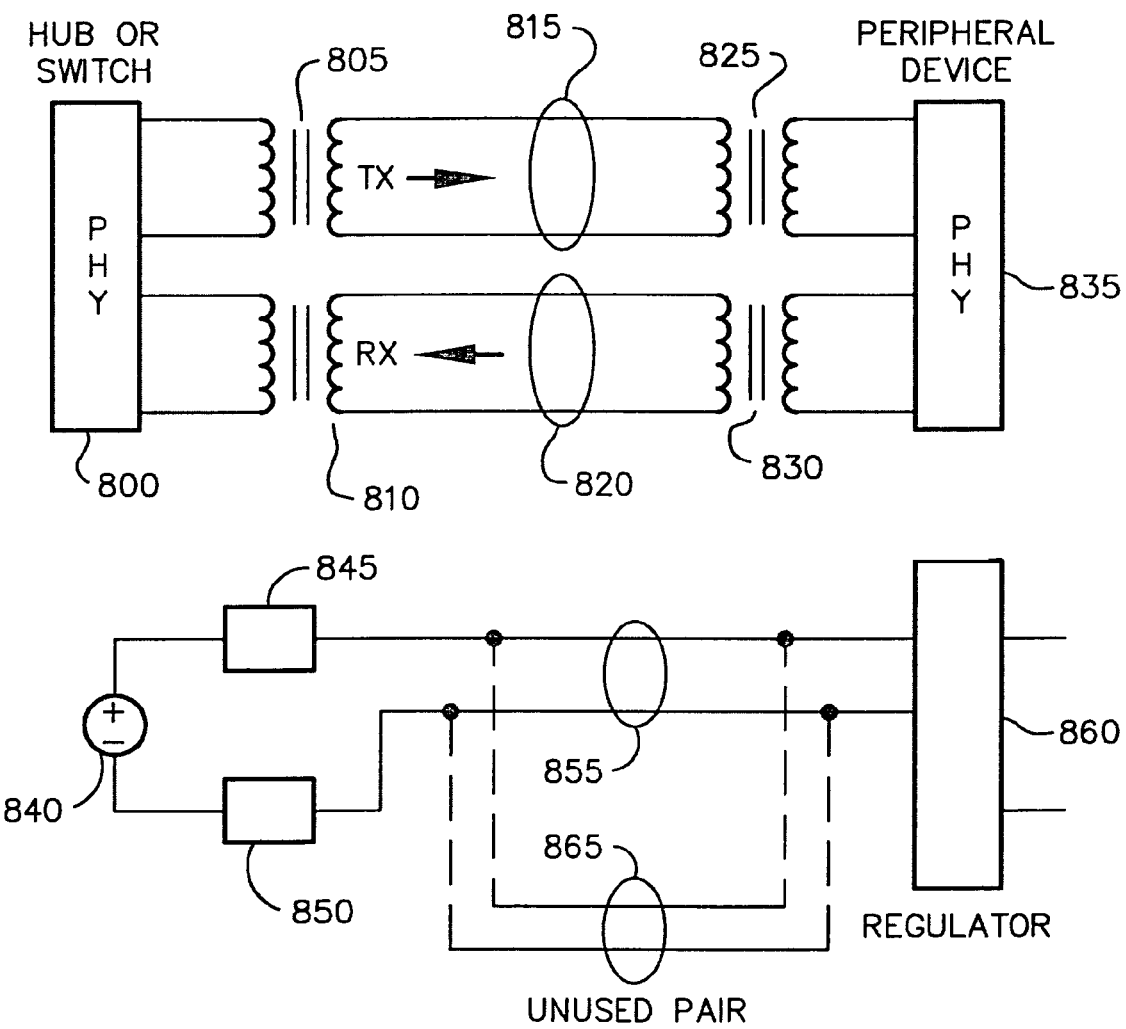
FIG. 10 illustrates one method power insertion technique utilizing the LAN data link incorporated in the system of the invention to power a wired network appliance.
Figure 11:
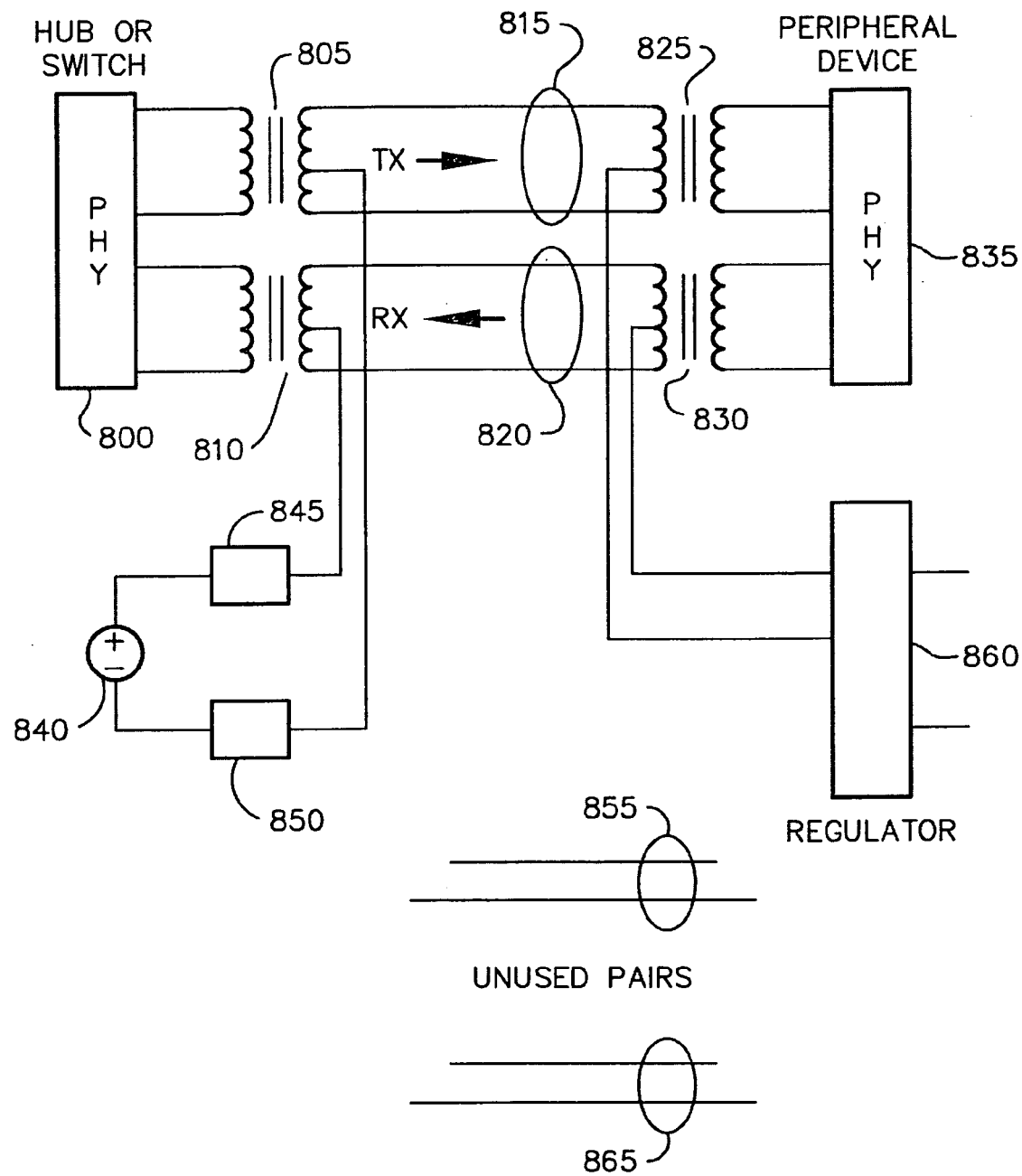
FIG. 11 depicts an alternative embodiment including an alternate power insertion technique whereby DC power conveyed along signal pairs of the cable, in common-mode, in order to power a wired network appliance.

FIGS. 10 and 11 depict a standardized method and apparatus for monitoring, controlling, and powering a variety of network-based appliances, which are subsequently described. This is advantageous when the network-based may be located in an area where conventional AC-operated power is not easily accessible. Referring to FIG. 10, a conventional LAN data link is depicted. The hub's physical-layer interface 800 connects to twisted-pairs 815 and 820 via transformers 805 and 810. The remote network device's physical-layer interface 830 connects to the same twisted pairs 815 and 820 via transformers 825 and 830, thus effectuating a conventional LAN connection. Twisted-pair cable typically used in LAN's generally contains 4 pairs, who of which are unused in this example. Accordingly, one or both of the unused twisted-pairs 855 and 865 are employed to convey operating power to the remote device. A power source 840 is disposed at the centralized hub or switch. The power source is preferably a voltage source, and preferably a DC source of moderately high voltage. Typical voltage levels may run in the 30 to 60 Volt range. Current sensor 845 senses the DC current consumed by the remote device, and may cause current limiter 850 to reduce or eliminate any current supplied to the remote device, in the case of a fault in the wiring or in the remote device. At the remote device, power is extracted and regulated by regulator 860, preferably a switched-mode down-converter of high efficiency.

FIG. 11 depicts a variation of the same method, wherein the DC power is conveyed along the signal pairs of the cable 855, 865, in common-mode. In this example, transformers 805, 810, 825, and 830 are center-tapped, and the power is applied to the center taps of transformers 805 and 810. Said power is extracted from the center taps of transformers 825 and 830 at the remote device. As before, power is supplied by source 840, and is monitored and protected by current sensor 845 and limiter 850. At the remote end, power extracted from the center taps of transformers 825 and 830 is appropriately regulated by regulator 860.

The network interface, common to all subsequent network devices, here represented as the motion sensor 525, is depicted in FIG. 12. The device attaches to the network using RJ-45 connector 520. An Ethernet interface 515 handles the physical-layer connection to the Ethernet network. The required DC operating power, as supplied over the network wiring, passed through RJ-45 connector 520 to the Ethernet Line-Power Interface 510. This interface extracts the DC power provided by the network, and provides filtering and regulation as necessary to provide the DC operating voltages required by the device via line 505. The power provided by the network will typically be at a relatively high DC voltage for the sake of transmission efficiency. The Line-Power interface will therefore typically contain one or more regulators to reduce the line-supplied DC voltage to an appropriate value such as the standard 3.3 VDC or 5 VDC. An IP controller 500 is provided.

An additional benefit of the described configuration is that all sensors or appliances are intelligent due to the presence of the preprogrammed IP controller. This allows a centralized system monitoring station to automatically detect and configure the individual sensors or appliances. For example, a device may 'announce' itself immediately upon installation, thus becoming automatically recognized and monitored by the centralized monitoring station. Also, relevant operating parameters of the device may be measured or controlled remotely. An example might be a glass breakage detector with a history of false alarms; the sensor's sensitivity may be reduced from the centralized monitoring station via the network. FIG. 12A shows a wireless version of the system depicted in FIG. 12. In this enhancement a wireless interface card 526 and receiver/transmitter 528 is provided at the device, for defining the wireless interface 380 that operates as previously described.

FIGS. 13 through 34A depict a variety of additional sensors and appliances that may be attached to the described network. All these described devices share a common network interface, allowing any such device to be added to the network as desired. Moreover, all such devices are configured to derive their operating DC power from the network, rather than from locally supplied power.

FIG. 13 depicts a networked smoke detector, using the same standardized network interface of FIG. 12. The device may also contain a heat sensor, to increase the accuracy of detecting a fire. The smoke and heat sensors 530 and 535 pass their data to the IP controller 500, which generates and transmits a predefined message to the network. Note that the heat sensor may pass an actual numerical value for temperature to the network if desired, rather than a simple 1-bit indication that a temperature threshold has been exceeded. FIG. 13A is the wireless version and corresponds to the circuit shown in FIG. 12A.

FIG. 14 depicts a conventional 'Pull Handle' commonly used in institutional fire alarm systems. In this case, the input to the IP controller 500 is a simple 1-bit input from the pull handle switch 540. Again, the device sends a predefined IP message to the network and system monitoring station upon activation. FIG. 14 is the wireless version.

FIG. 15 depicts a simple contact-closure interface, as is commonly used for door or window sensors in alarm systems. The sensors often contain a magnet in one module, and a magnetic reed switch in the other module. In this implementation, the contact closure thus effectuated by the reed switch 545 becomes input bit into the IP controller 500. In response to a change in switch status, the controller 500 generates and transmits a predefined IP message via the Ethernet interface to the network and associated monitoring apparatus. FIG. 15A is the wireless version.

FIG. 16 depicts a networked heat sensor. The sensor 550 may produce a simple one-bit 'threshold crossed' indication to the controller 500, or may pass a variable representing actual sensed temperature. In either case, the IP controller 500 generates and transmits a predefined IP message to the network and associated monitoring apparatus. As an additional refinement, the device may be programmed to accept configuration commands from the networked monitoring apparatus. Such commands may, for example, change the sensor's trip point or temporarily suspend the transmission of messages. FIG. 16A is the wireless version.

A networked glass breakage sensor is depicted in FIG. 17. Sensor 555 produces an output indicative of breaking glass to the IP controller 500, which generates a predefined IP message and transmits said message to the network. The sensor's output may, if necessary be processed or analyzed by controller 500 in the case of a simple microphone or vibration sensor. The device may additionally be configured to respond to incoming control and configuration messages from the network, such as commands to change the sensor's sensitivity or to temporarily disable the device. FIG. 17 is the wireless version.

Figure 18:
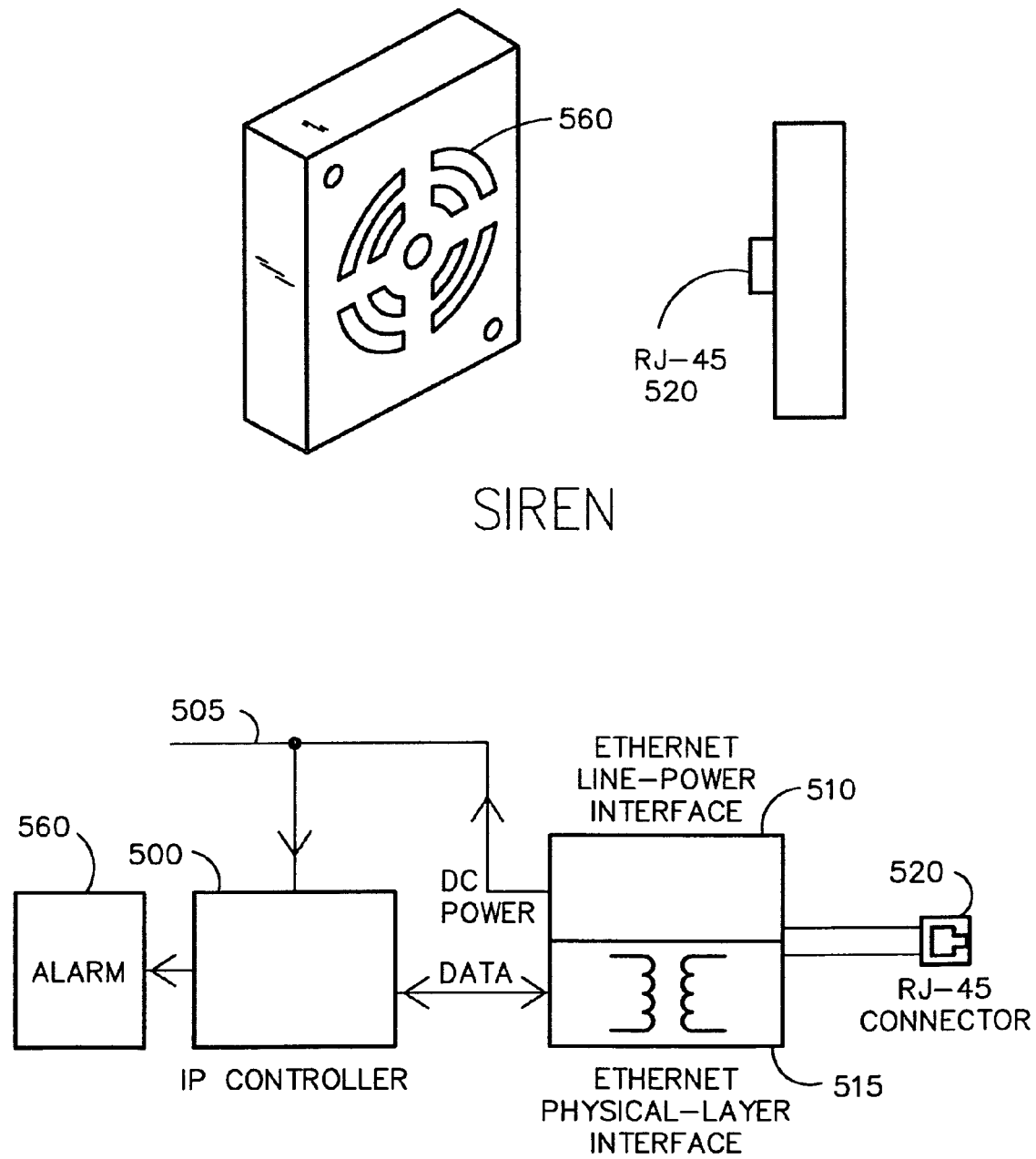
FIG. 18 depicts an alarm siren network appliance.
Figure 19A:
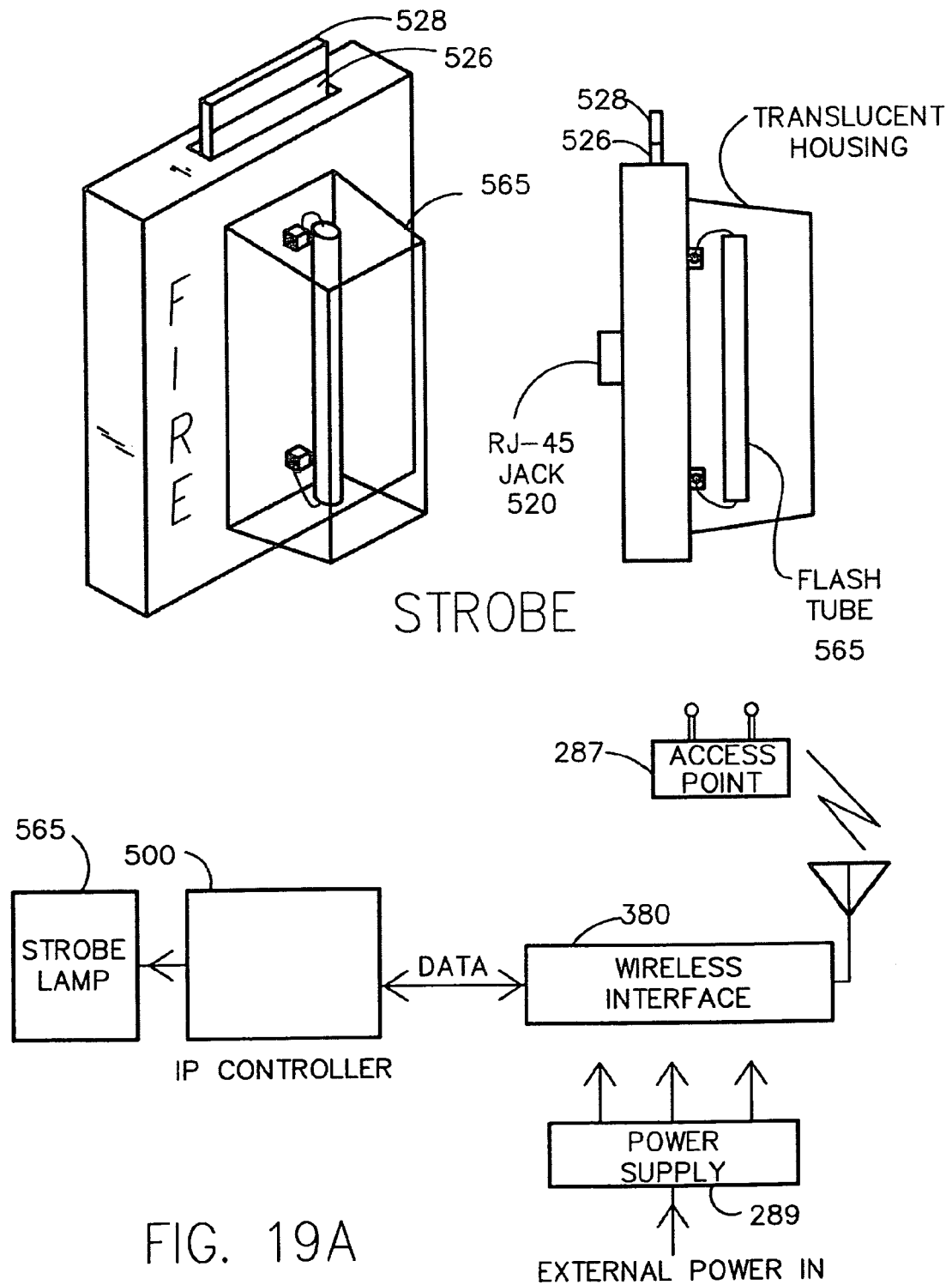
FIG. 19A is a wireless version of the network appliance shown in FIG. 19.

FIGS. 18 and 19 depict a networked alarm siren and strobe light respectively. The IP controller 500 receives IP messages from the network and controls the alarm 560 or strobe light 565 respectively. Network messages may be used to turn the alarm or strobe on or off, or may control other characteristics of the device such as volume, flash rate, etc. The IP controller may also send status messages to the network, either in response to inquiries from control devices or at regular intervals. FIGS. 18A and 19A are the wireless versions, respectively.

FIG. 20 depicts a networked thermostat or humidistat, or both combined. The temperature sensor 570 and/or humidity sensor 575 produce signals indicative of local temperature and/or humidity. As before, IP controller 500 generates and transmits predefined messages to the network representing the current values of temperature and/or humidity. In addition, switches 580 and 585 allow a user to increase or decrease the desired temperature setting. Contact closures produced by switches 580 or 585 are detected by IP controller 500 and transmitted via IP messages to a monitoring and/or control device disposed on the network. In addition, display 590 displays the current value of the local temperature and/or temperature setting. The temperature displayed may be generated locally by the controller 500 or may be commanded by a networked monitoring and control device via IP messaging. FIG. 20A is the wireless version.

A general-purpose control panel is depicted in FIG. 21. A keypad 595 and display 600 are connected to the IP controller 500. The controller 500 detects and interprets keystrokes on keypad 595, and generates appropriate IP messages for transmission over the intervening network to a networked monitoring and control station. Similarly, a networked monitoring and control station may generate messages to be displayed on the control panel's display 600. Said messages are transmitted from the monitoring and control station via the IP network to the controller 500, which causes the appropriate message to be displayed. FIG. 21A is the wireless version.

Figure 22:
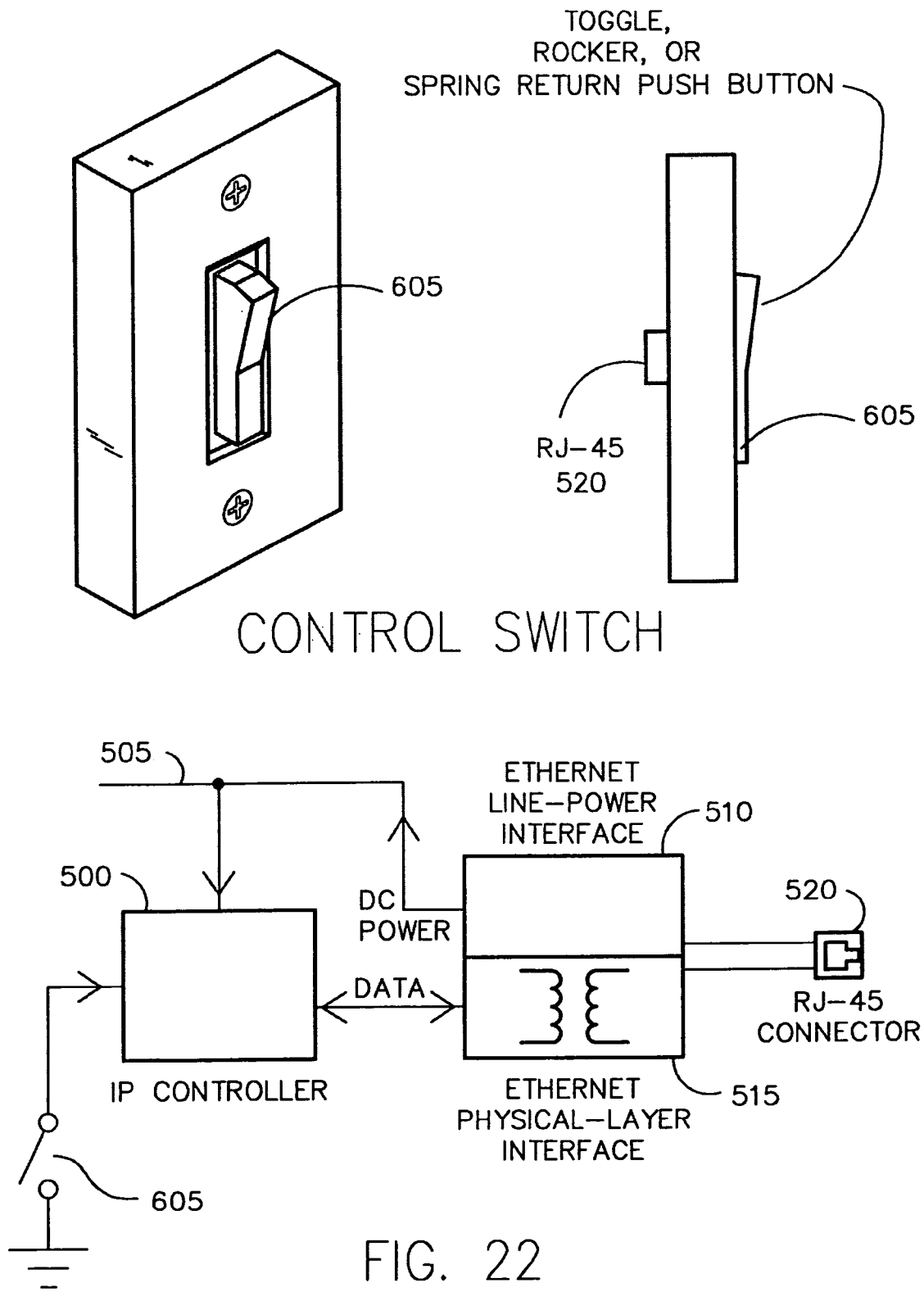
FIG. 22 depicts a simple control switch network appliance.

FIG. 22 depicts a simple control switch. The switch 605 may be a toggle, rocker, or push-button switch as appropriate. The status of switch 605 is detected by IP controller 500, which generates and transmits an appropriate message over the IP network to a networked monitoring and control station. FIG. 22A is the wireless version.

A networked indicator light panel is depicted in FIG. 23. IP controller 500 receives messages from a networked monitoring and control station, and thereupon causes the appropriate lamp or lamps in light array 610 to be illuminated or extinguished. FIG. 23A is the wireless version.

Figure 24A:
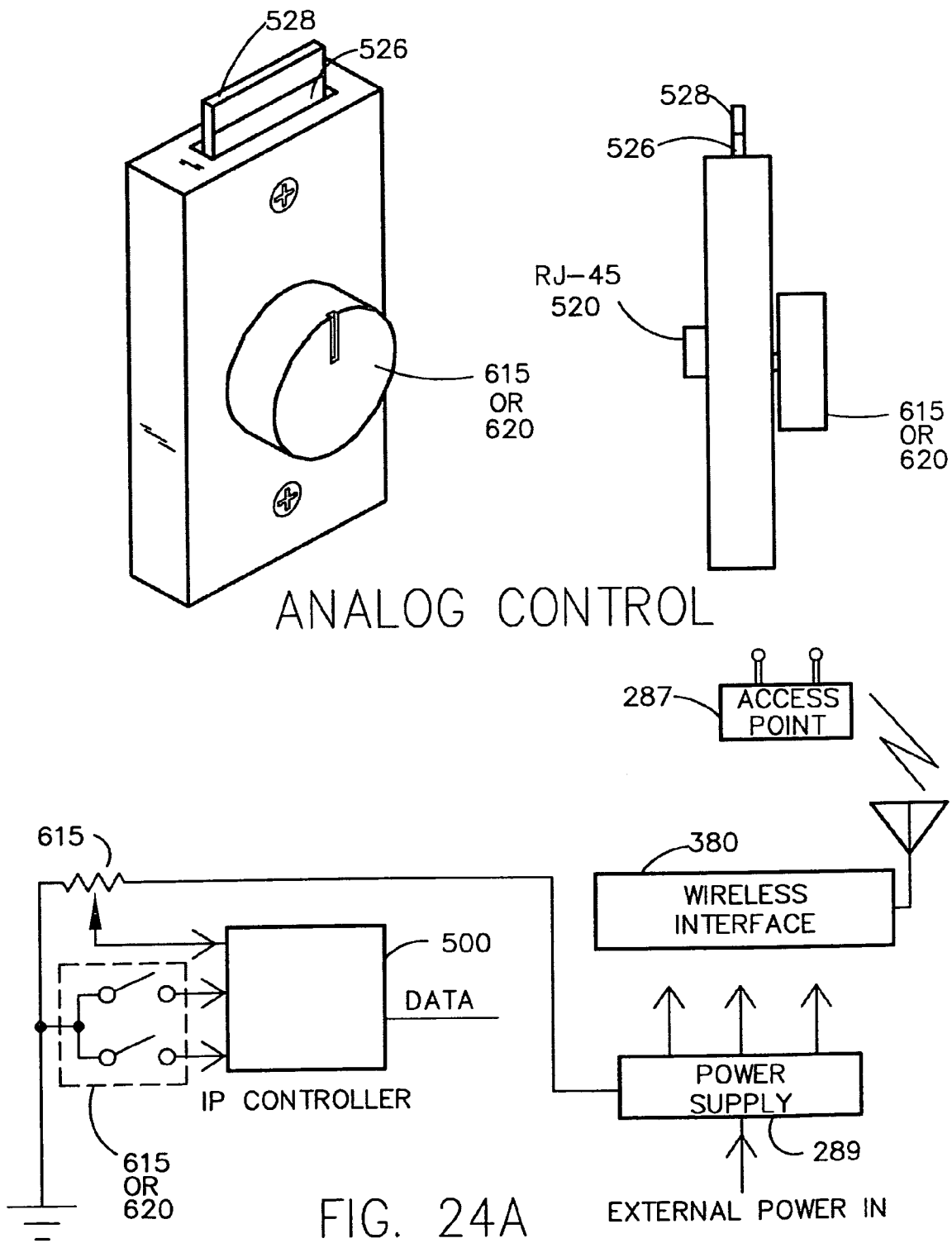
FIG. 24A is a wireless version of the network appliance shown in FIG. 24.

FIG. 24 depicts a networked analog control device, such as may be used to control room lights, temperature, loudspeaker volume, and the like. IP controller 500 receives input from potentiometer 615 or shaft encoder 620, and thereupon generates appropriate IP messages and transmits them via the intervening IP network to a networked monitoring and control station. FIG. 24A is the wireless version.

A networked loudspeaker is depicted in FIG. 25. In the preferred embodiment, the device receives a stream of data representing audio from the IP network. IP controller 500 passes this data to processor 625, which decodes the data stream and generates an appropriate analog signal for reproduction via loudspeaker 630. FIG. 25A is the wireless version.

A networked control panel, with indicator lights is depicted in FIG. 26. Switches 635 and 640 cause the IP controller 500 to generate and transmit IP messages to a networked monitoring and control station. Additionally, a networked monitoring and control station may generate appropriate IP messages to control the status of lamps 645, 650, and 655 via the intervening network and IP controller 500. FIG. 26A is the wireless version.

A networked power outlet is depicted in FIG. 27. In this device, the IP controller 500 controls the status of an AC power switch 670 in response to received IP messages from a networked monitoring and control station. The networked monitoring and control station may thereby turn an AC-powered appliance ON or OFF via networked IP messages. Alternatively, power switch 670 may be replaced with a dimmer module, to allow dimming of a lamp from the networked monitoring and control station. Additionally, an RJ-45 socket 665 may be installed on the device, to provide a local user with an Ethernet connection into the network. Since the Ethernet connection to the network is already in use by the system controller 500, it is necessary to insert a simple three-port Ethernet hub 660 between the Ethernet physical-layer interface 515 and the RJ-45 connector to the network 520. FIG. 27A is the wireless version.

Figure 28A:
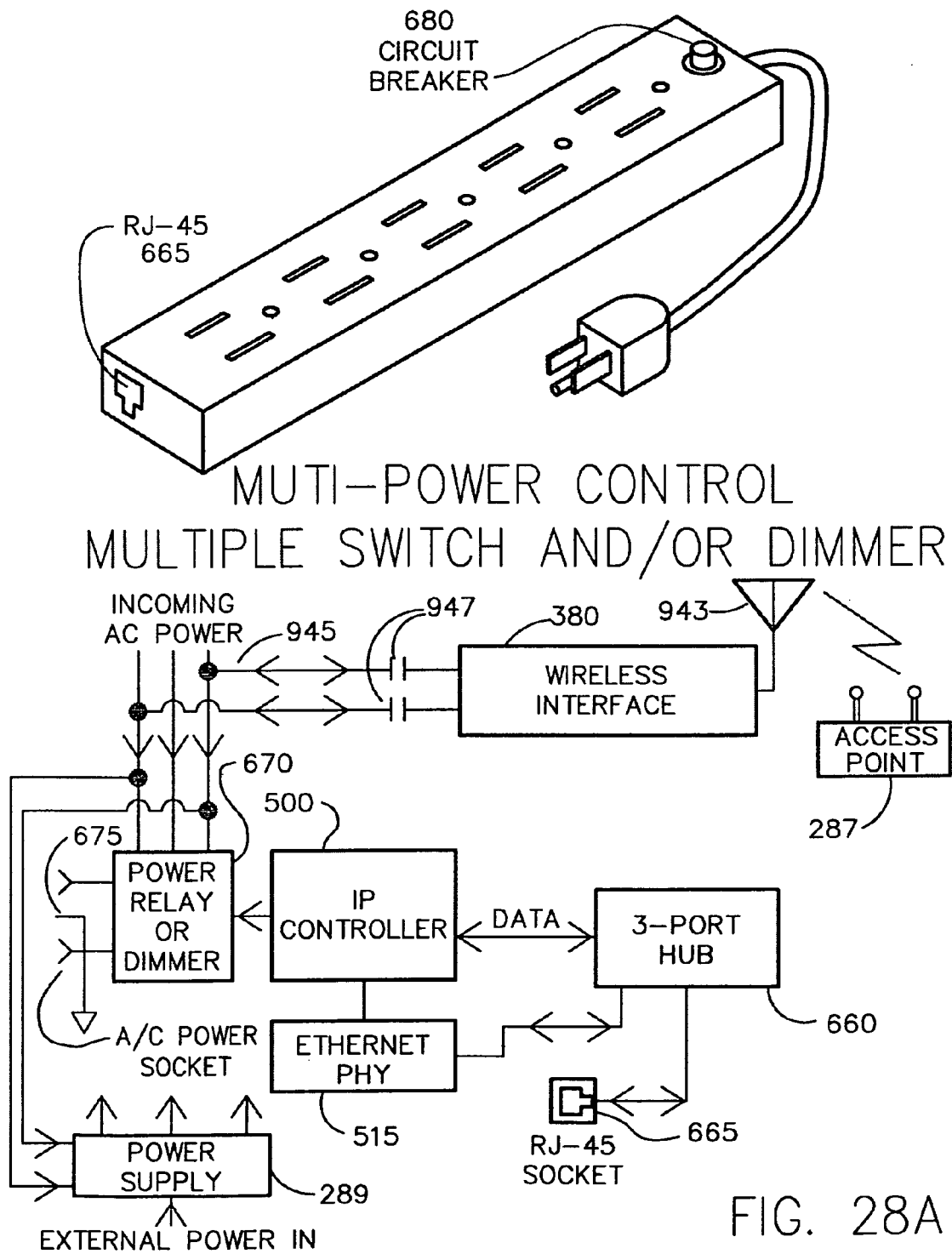
FIG. 28A is a wireless version of the network appliance shown in FIG. 28.

In FIG. 28, the network-controlled AC socket is expanded into a network-controlled AC power strip. As previously described in FIG. 27, the IP controller 500 controls a switch or dimmer 670 in response to IP messages received via the network from a monitoring and control station. In this embodiment, multiple AC sockets 675 are provided. In addition, a circuit breaker 680 protects the device from overload. FIG. 28A is the wireless version.

Figure 29:
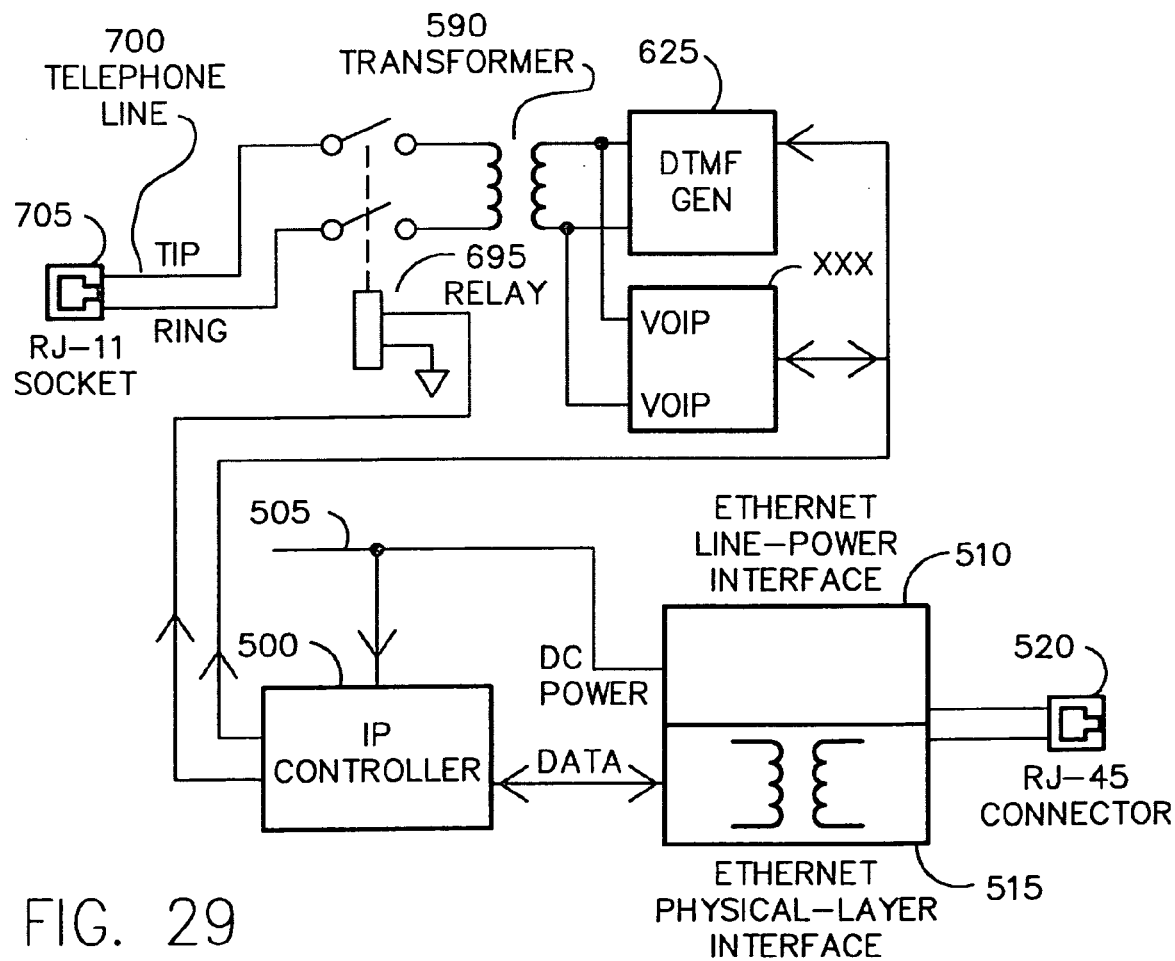
FIG. 29 depicts a telephone interface/dialer network appliance.

FIG. 29 depicts a network-controlled telephone dialer, preferably housed in a standard telephone wall socket. A standard POTS telephone is plugged into the telephone line 700 via RJ-11 socket 705. The IP controller 500, in response to commands received from the IP network, energizes relay 695, thus seizing telephone line 700. The IP controller 500 thereupon, in response to IP commands received via the IP network, causes DTMF generator 685 to produce the desired DTMF tones on telephone line 700 via line transformer 690. FIG. 29A is the wireless version.

Figure 30A:
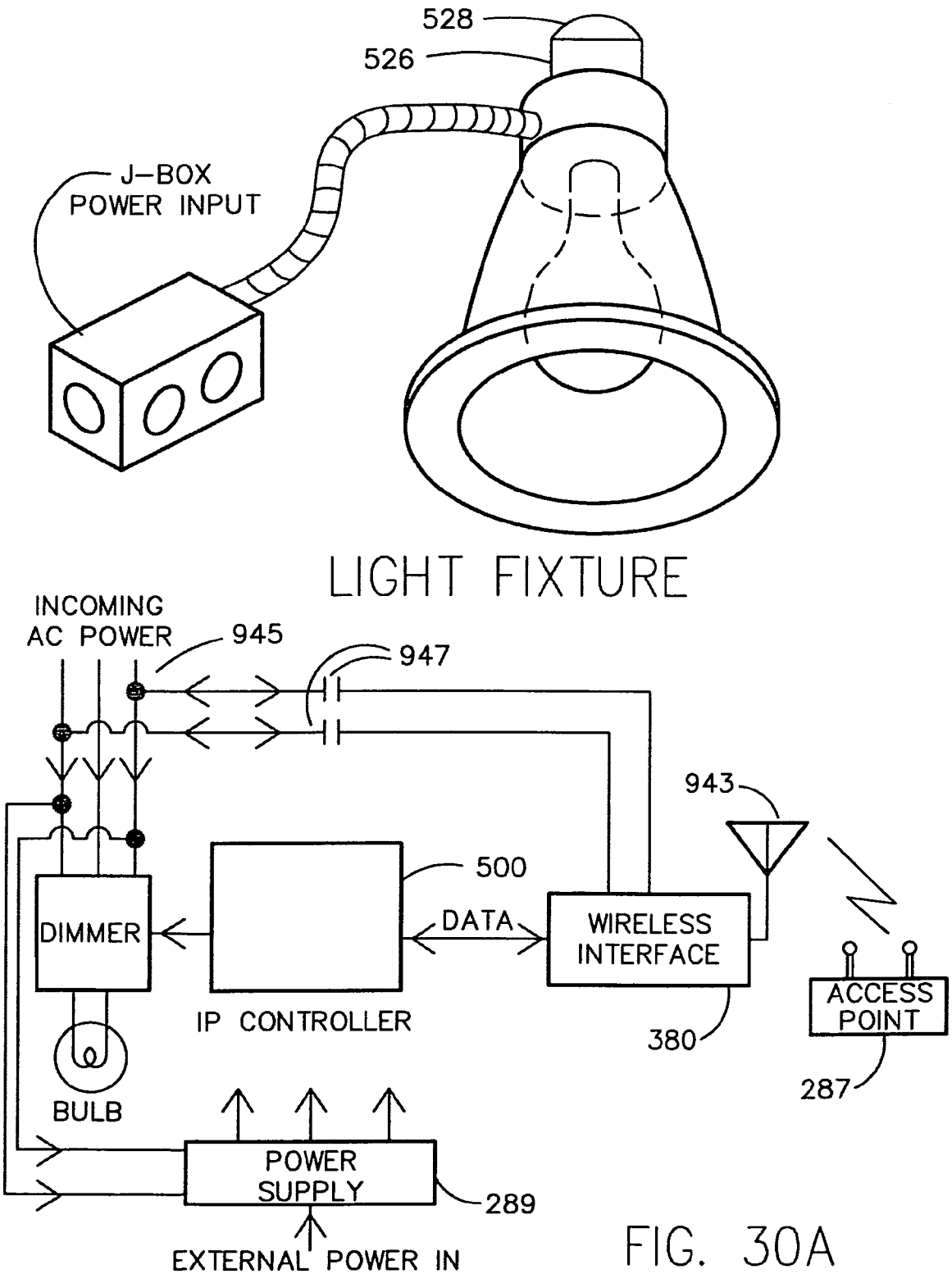
FIG. 30A is a wireless version of the network appliance shown in FIG. 30.

FIG. 30 depicts a lighting fixture controlled by the network. As in FIG. 27, IP controller 500 turns the light ON or OFF, or may dim the light, in response to IP messages received from a monitoring and control station via the network. FIG. 30A is the wireless version.

Figure 31:
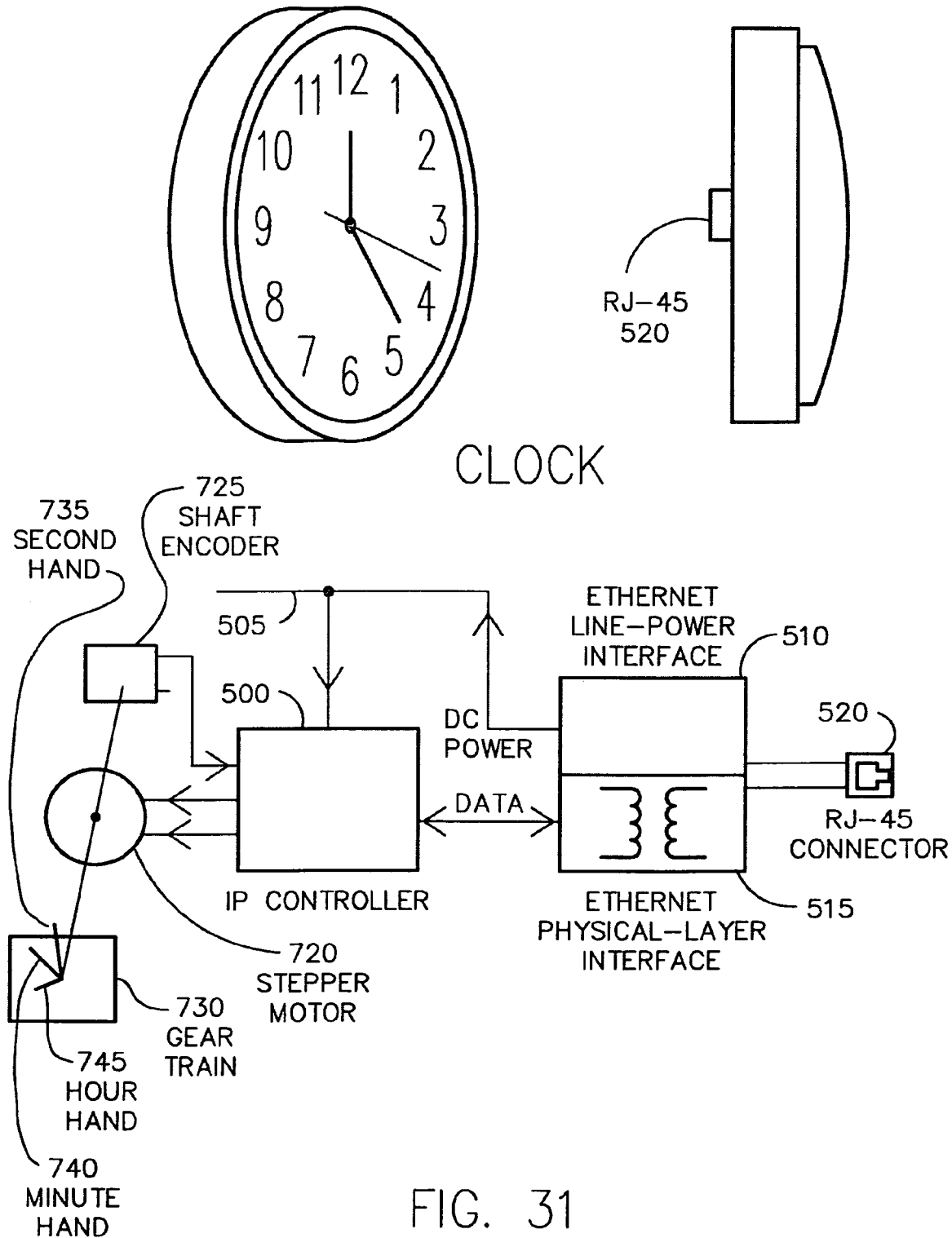
FIG. 31 depicts an analog wall clock network appliance controlled over the IP network.
Figure 31A:
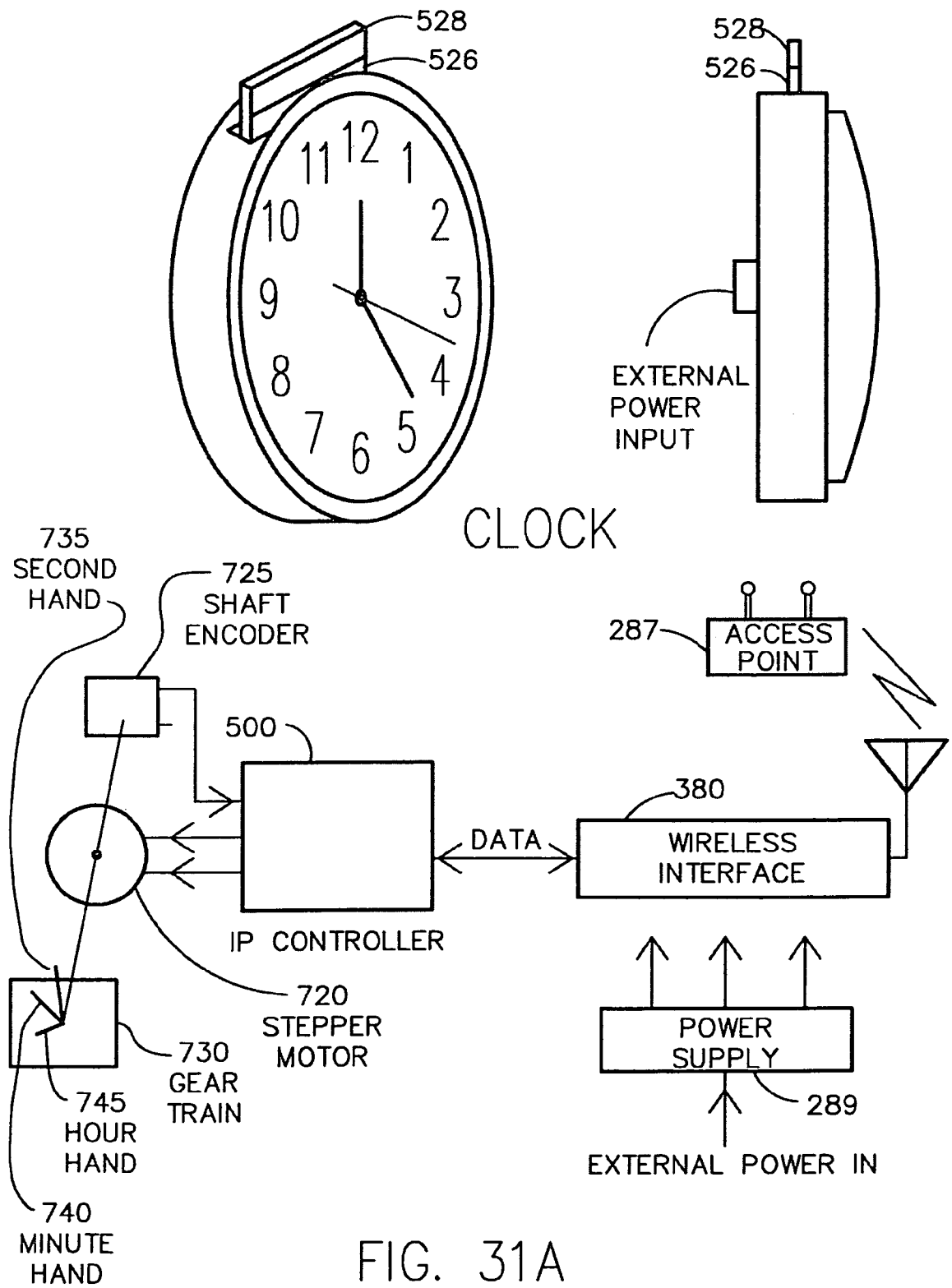
FIG. 31A is a wireless version of the network appliance shown in FIG. 31.

FIG. 31 depicts an analog wall clock controlled by the IP network. IP controller 500 maintains an accurate knowledge of local time through periodic synchronization with a network time standard via SNTP or other appropriate network-time protocols. IP controller 500 drives a stepper motor 720, which drives hands 735, 740, and 745 via gear train 730. Shaft encoder 725 provides shaft position feedback information to IP controller 500, to allow the clock to be set after a power failure. The shaft encoder may be as simple as a one-bit indication that the hands are all in the 12:00 position. FIG. 31A is the wireless version.

Figure 32A:
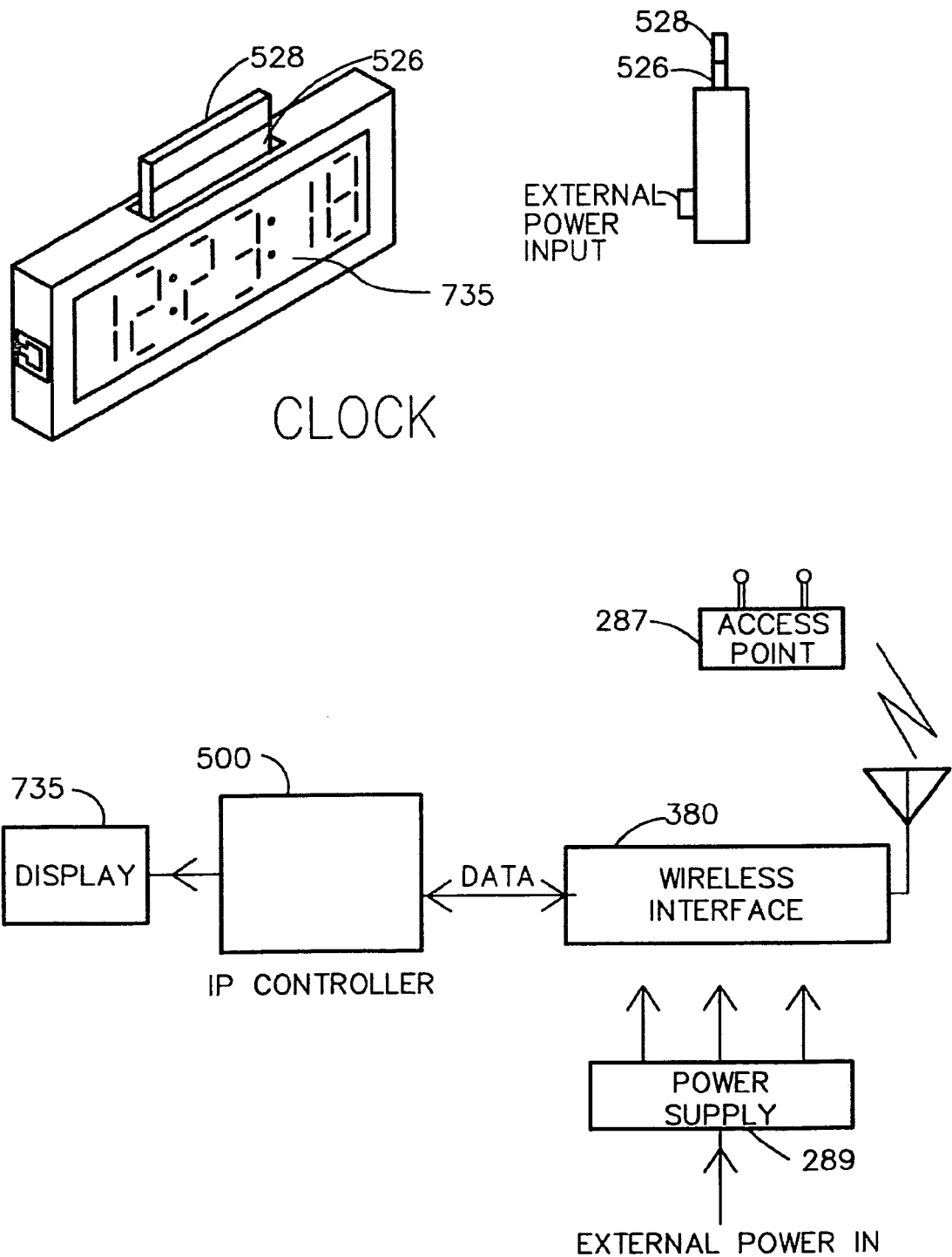
FIG. 32A is a wireless version of the network appliance shown in FIG. 32.

FIG. 32 depicts an alternative embodiment, wherein a digital display 735 replaces the stepper motor 720, gearbox 730, hands 735, 740, and 745, and shaft encoder 725. As before, IP controller 500 maintains accurate time via periodic synchronization over the IP network. FIG. 32A is the wireless version.

FIG. 33 depicts a magnetic strip reader, as commonly used in ATM machines, gas pumps, and point-of-sale cash registers. Card reader 750 passes data extracted from the card to IP controller 500, which thereupon transmits the card data to a device on the IP network for appropriate processing. The card data is preferentially encrypted by IP controller before transmission, to provide security. FIG. 33A is the wireless version.

FIG. 34 depicts a proximity card reader, as commonly used at door entrances. IP controller 500 receives data detected by badge sensor 755, and passes an appropriate predefined IP message to a networked monitoring and control station. FIG. 34A is the wireless version.

Figure 35:
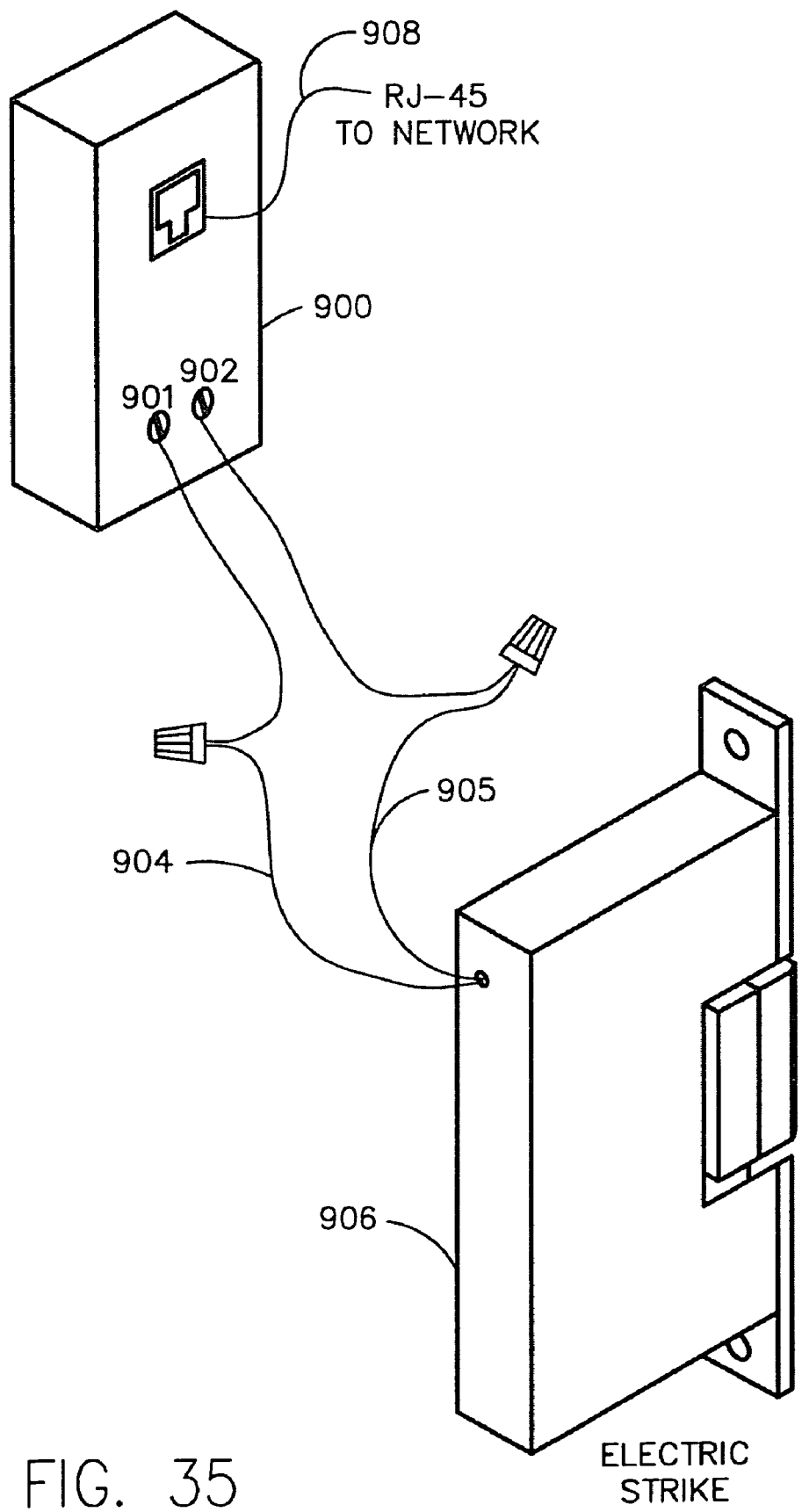
FIG. 35 depicts an electronic door strike controller network appliance shown controlling a standard elector-mechanical door strike.
Figure 35A:
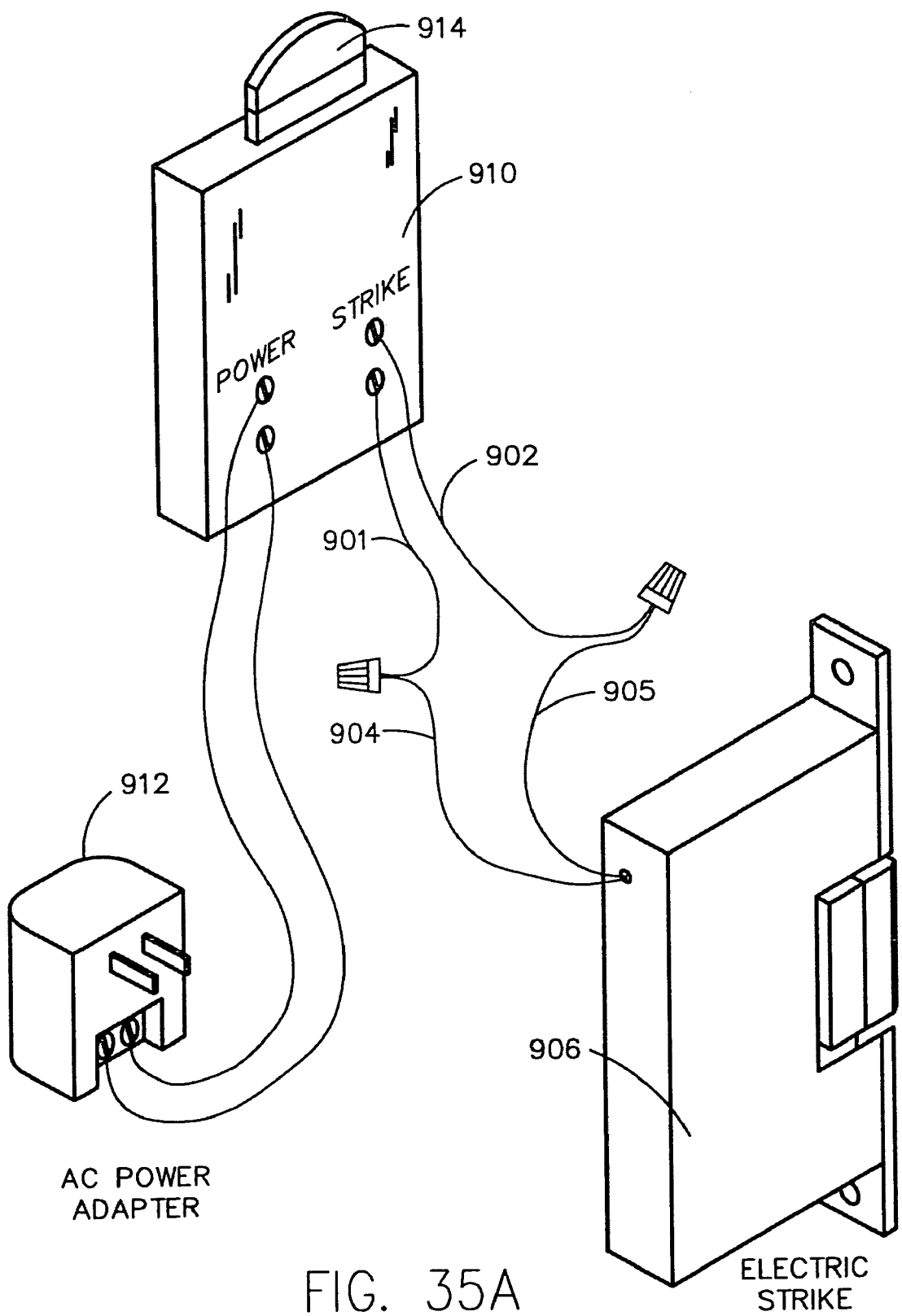
FIG. 35A is a wireless version of the network appliance shown in FIG. 35.
Figure 35B:
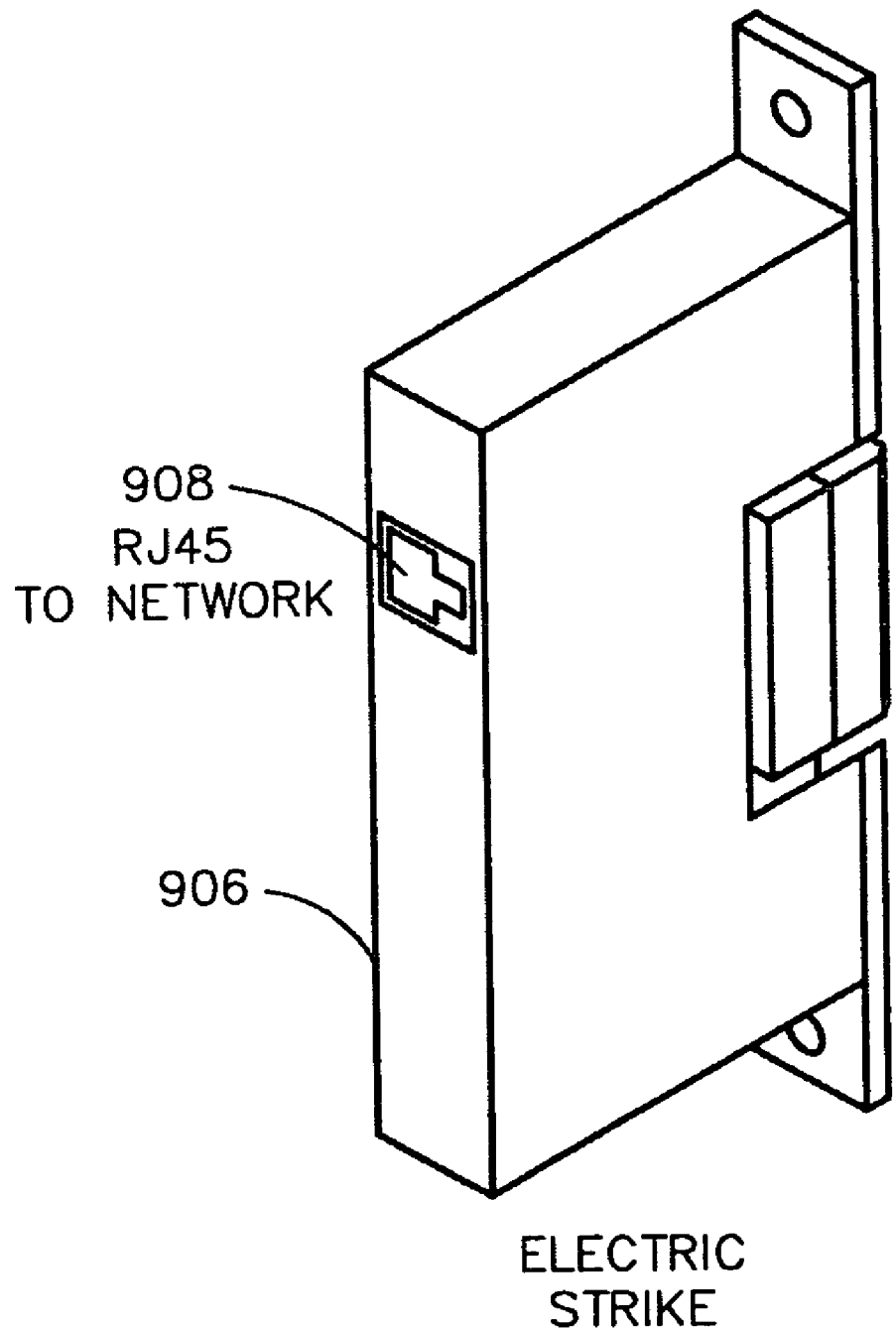
FIG. 35B is a self-contained electronic door strike network appliance with an integrated IP network interface and electromechanical door strike.
Figure 35C:
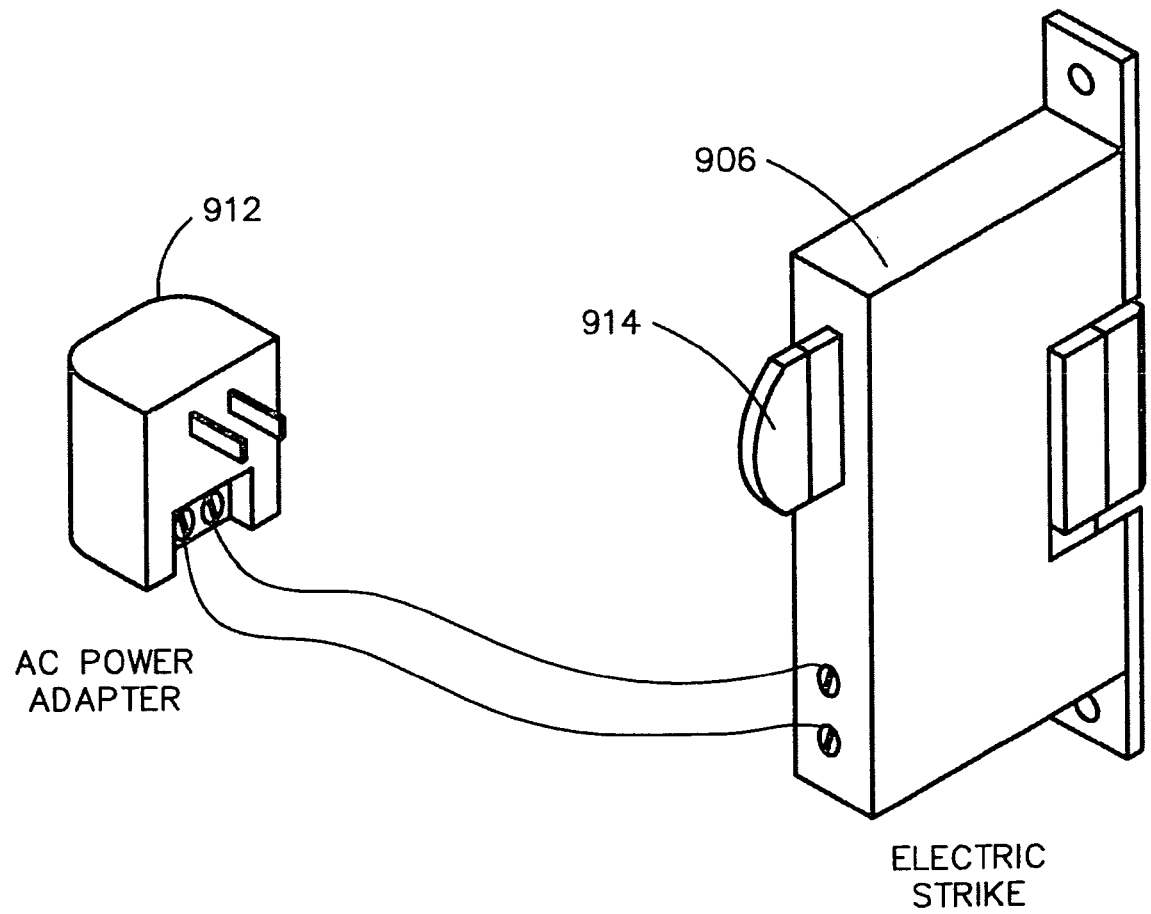
FIG. 35C is a wireless version of the network appliance shown in FIG. 35B.

It is an important feature of the subject invention that legacy sensors, alarms and devices may be connected to the system without modification of the legacy device, permitting signals generated by the legacy devices to be communicated via and managed by the system of the subject invention. FIGS. 35-38 are examples of such enhancements. An important component of this feature is a common interface permitting the communication of the signals generated by the legacy device to the network supporting the system of the subject invention. One common interface device 900 is shown in FIG. 35 and includes two terminals or connectors 901,902 for connecting the output wires 904, 905 of a legacy device, here an electric door strike 906, to the network. The network connection is made via a wire connected at the RJ-45 jack 908. As shown in FIG. 35A, the legacy device can also be connected via wireless interface 910. In this version, a power adapter 912 is provided for driving the interface 910. A wireless transmitter/receiver card 914 is added to provide the wireless network connection. In the wired version, the connector wire connected to the RJ-45 jack 908 is ideally used to provide power. However, a separate power supply can be provided where desired.

Figure 36:
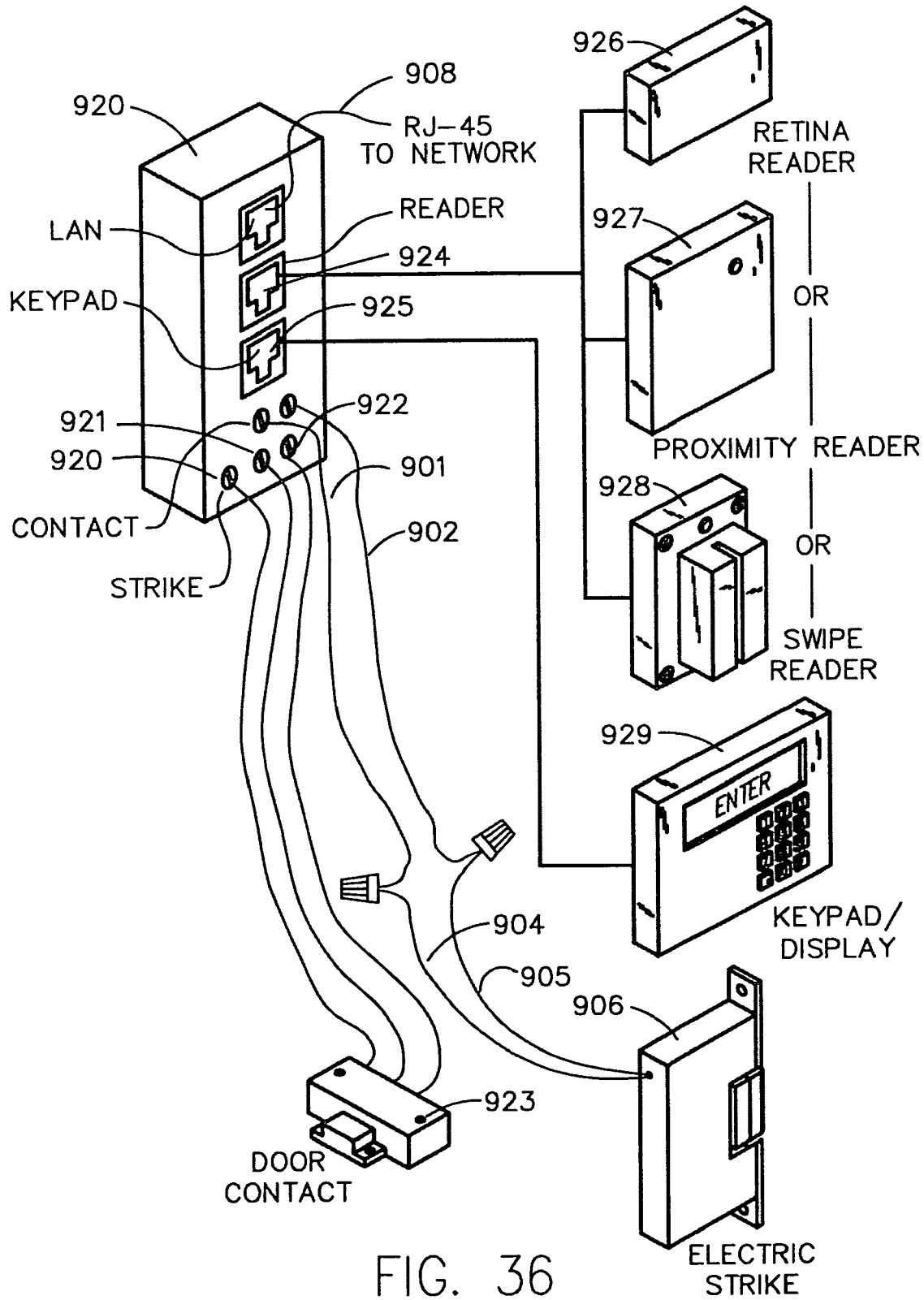
Figure 36A:
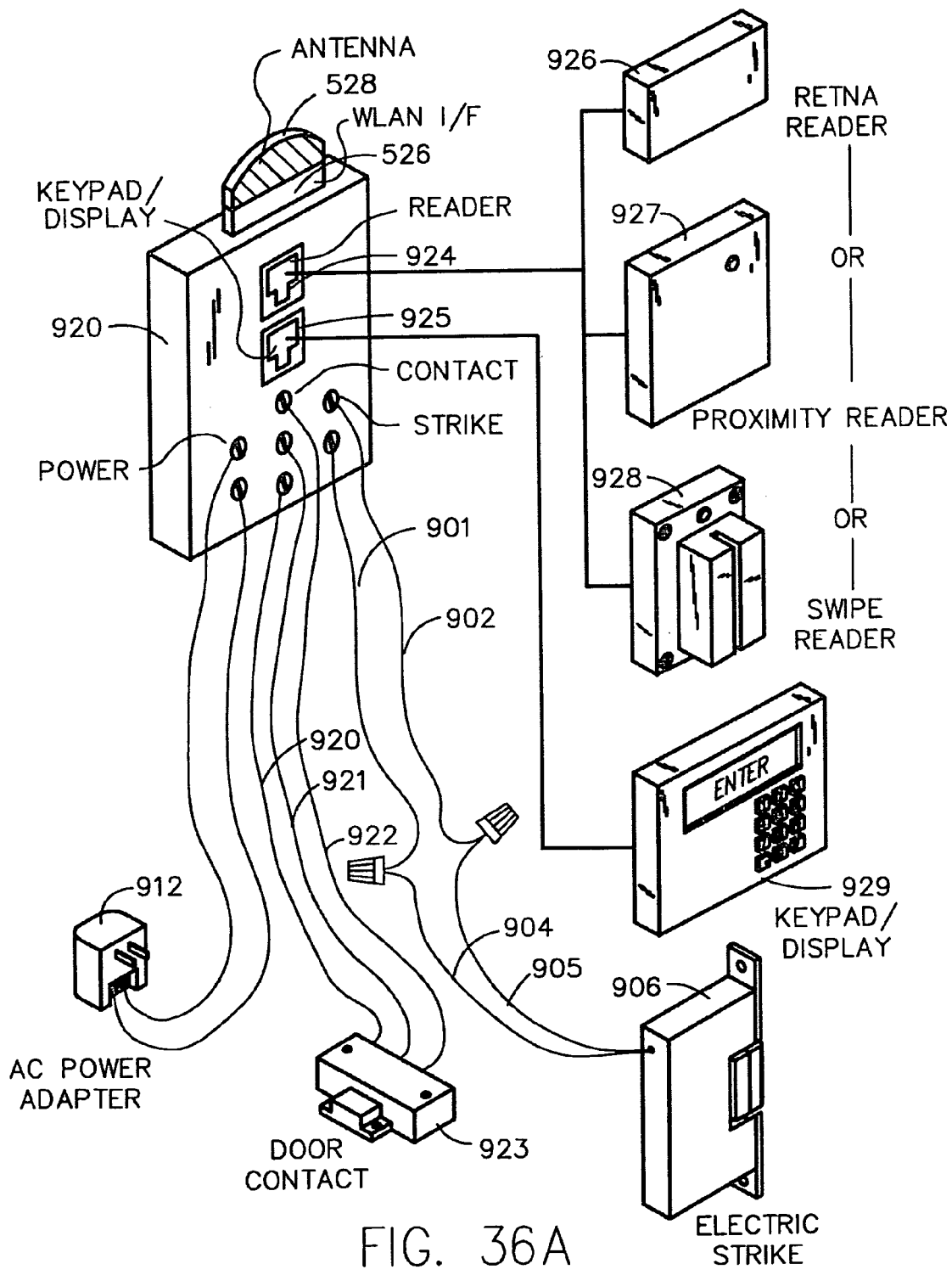
FIG. 36A is a wireless version of the network appliance shown in a FIG. 36.

Multiple legacy appliances may be connected to a common interface system as shown in FIG. 36 (wired version) and FIG. 36A (wireless version). As there shown, the interface 920 has multiple terminal 901, 902, 920, 921 and 922 and/or appliance jacks 924, 925 for connecting numerous legacy appliances such as the retina reader 926, proximity reader 927, swipe reader 928 and keypad display 929. All of these are connected to the network via a connector such as a wire via RJ-45 jack 908 (FIG. 36) or via a wireless connection card 914 (FIG. 36A). As before, the power supply 912 may be used in either version.

Figure 37:
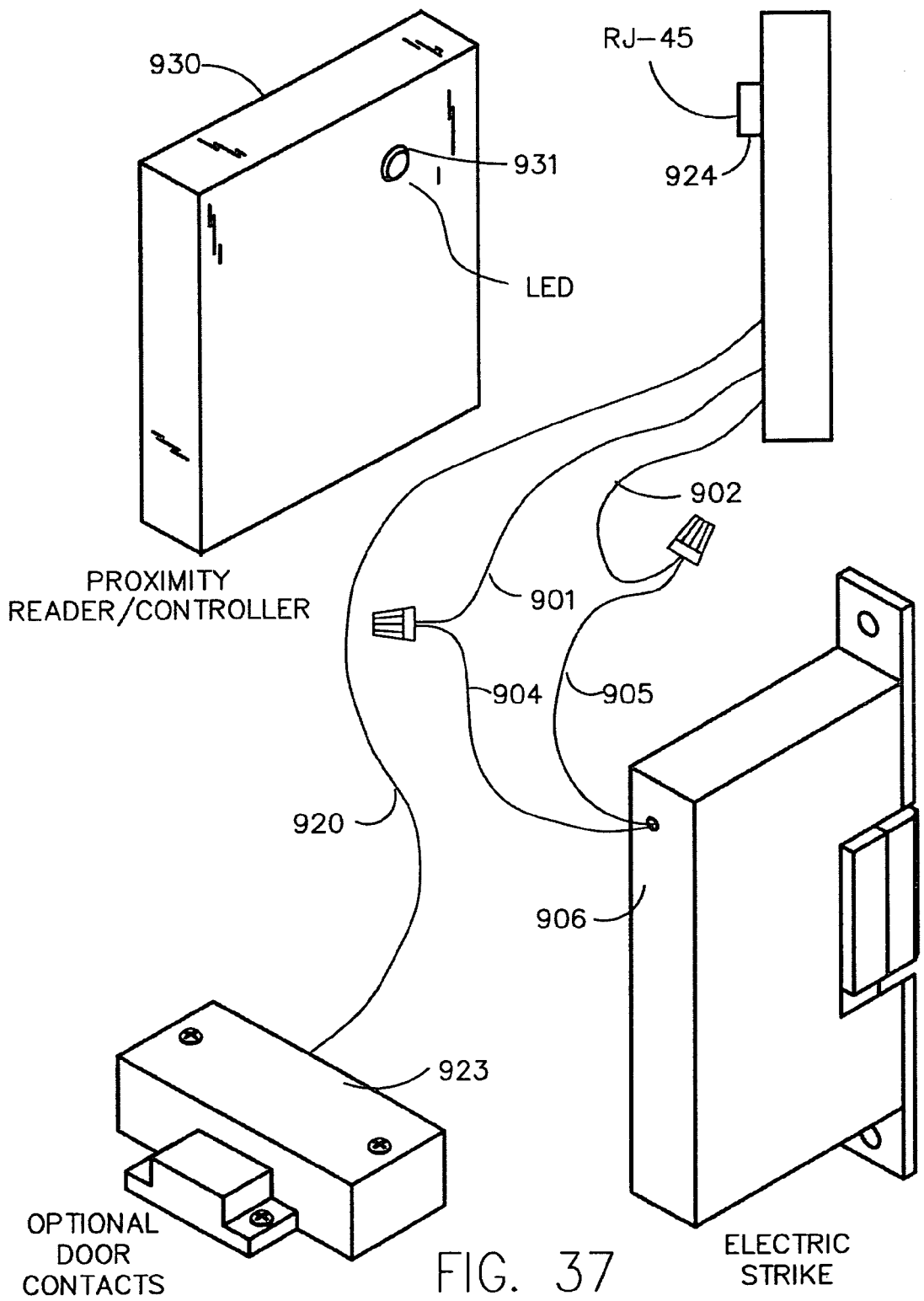
FIG. 37 depicts a combination security controller network appliance controlling an electric door strike, and sensing door contacts and a proximity sensor
Figure 37A:
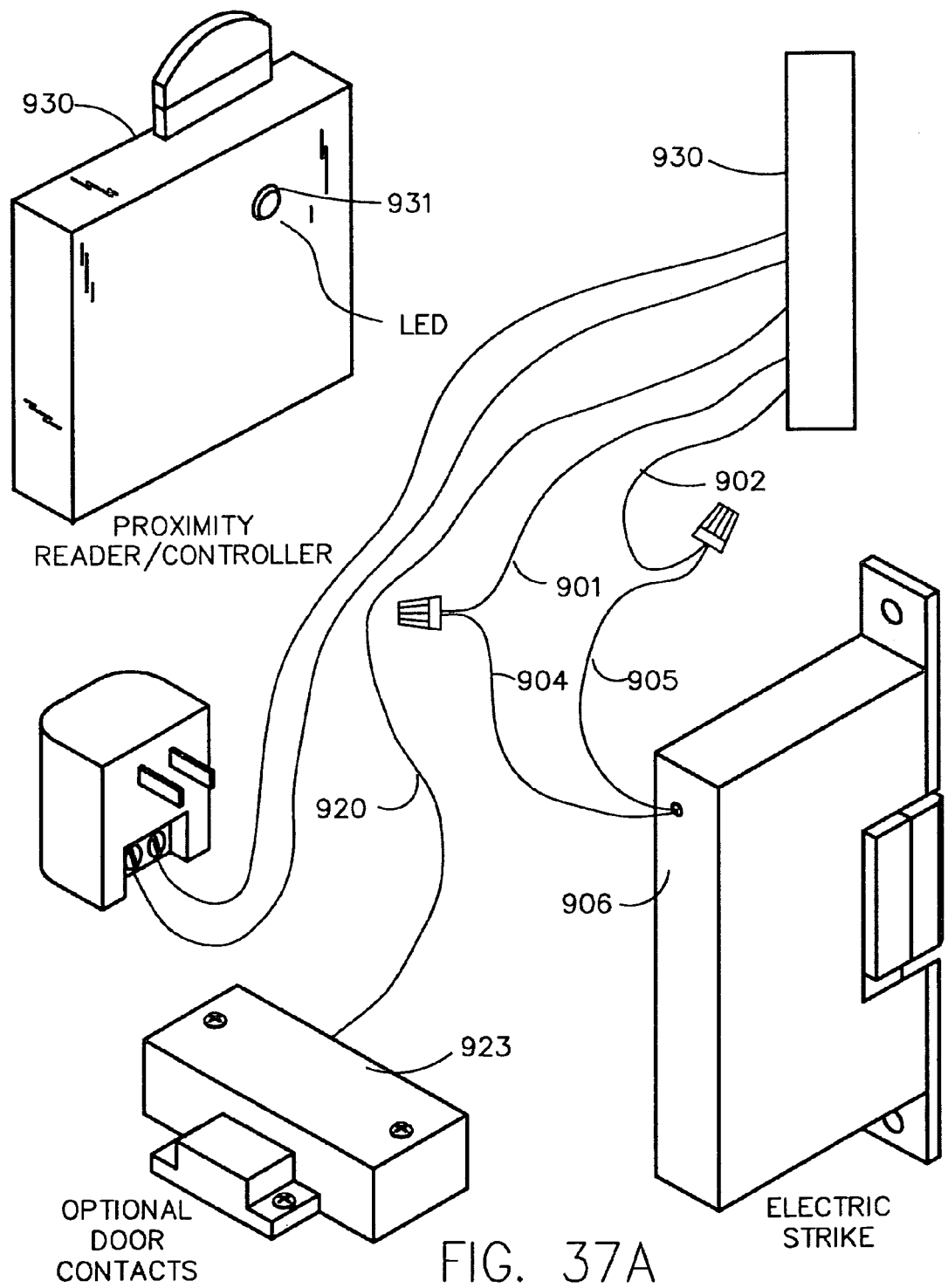
FIG. 37A is a wireless version of the network appliance shown in FIG. 37.
Figure 37B:
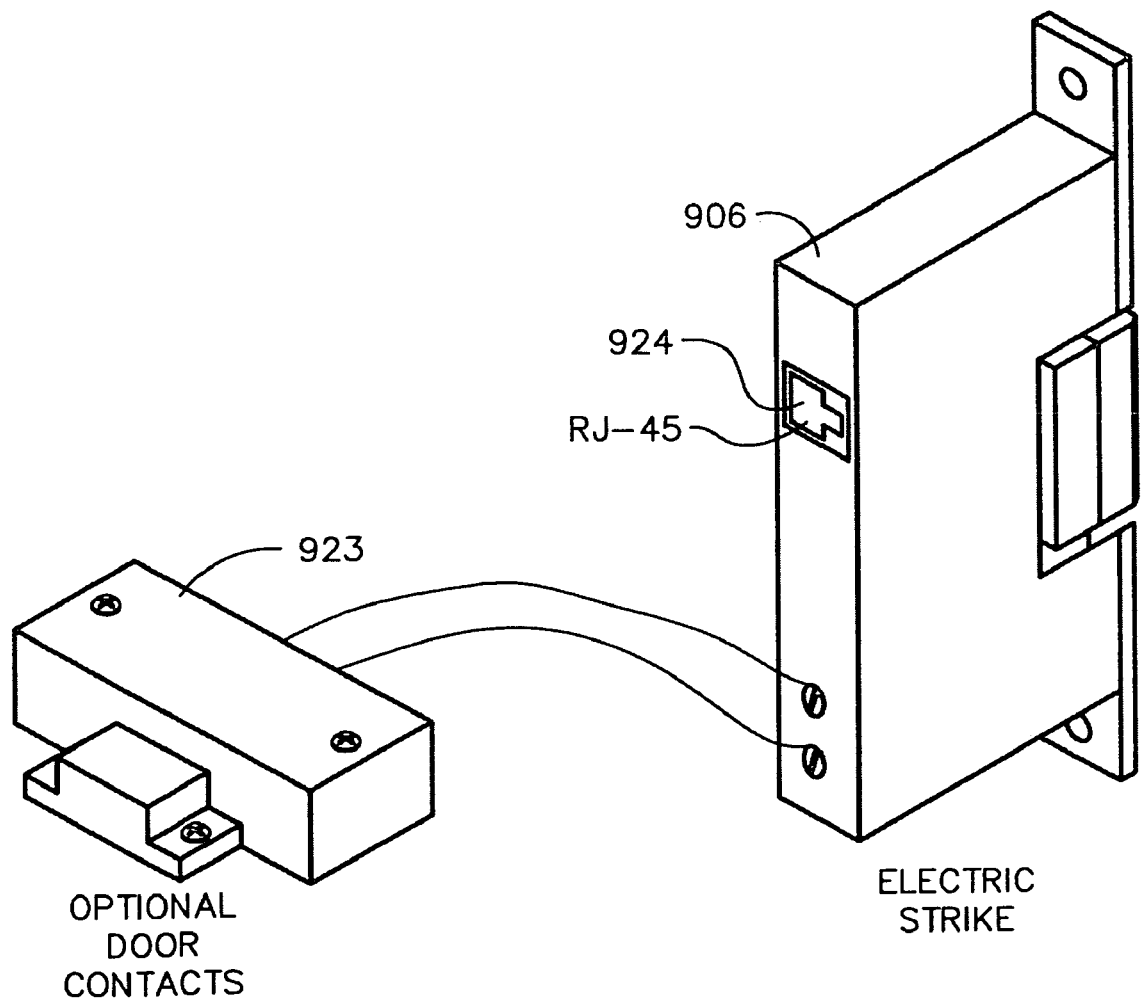
FIG. 37B is an electronic strike network appliance with external contact inputs.
Figure 37C:
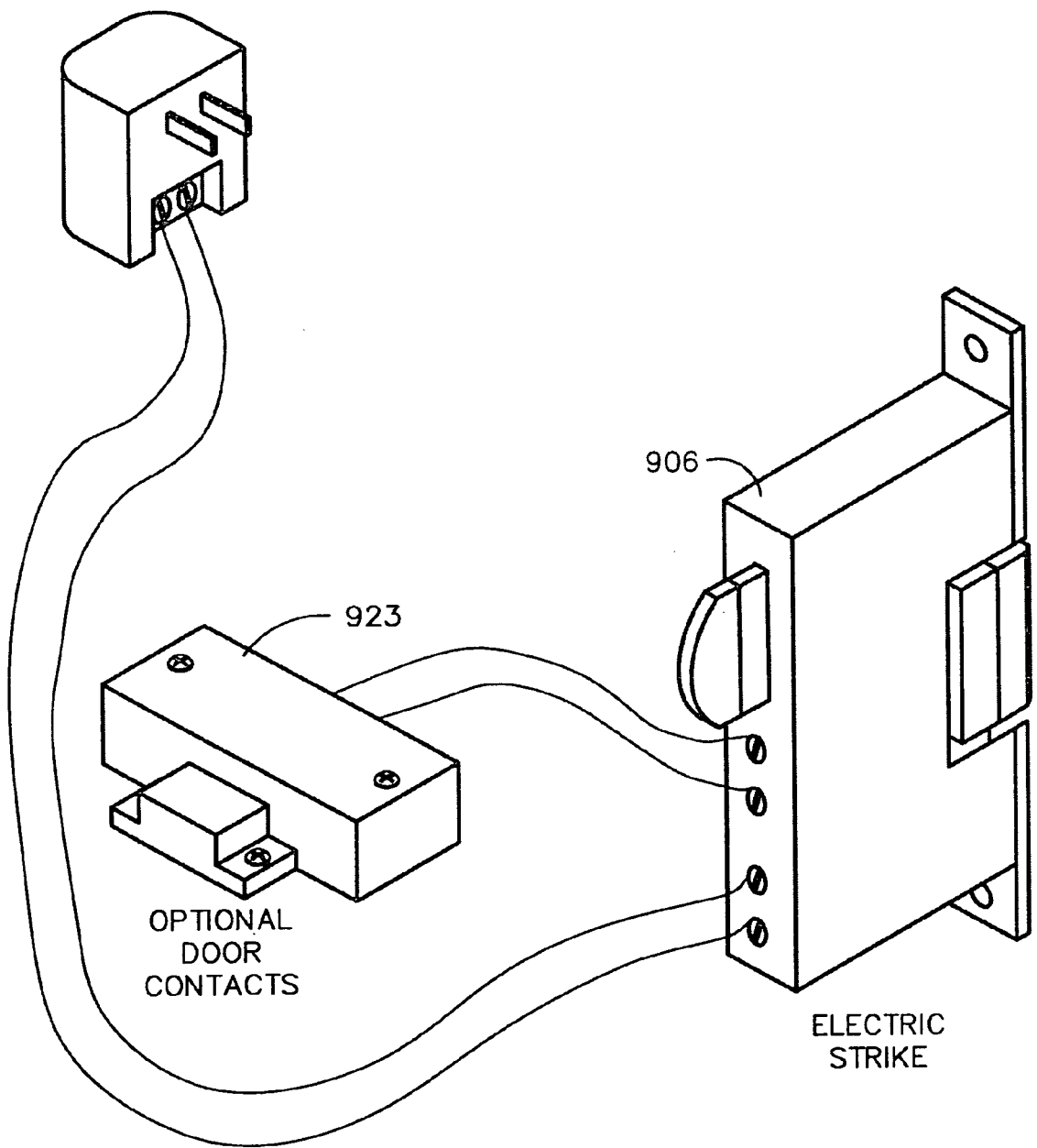
FIG. 37C is a wireless version of the network appliance shown in FIG. 37B.
Figure 38:
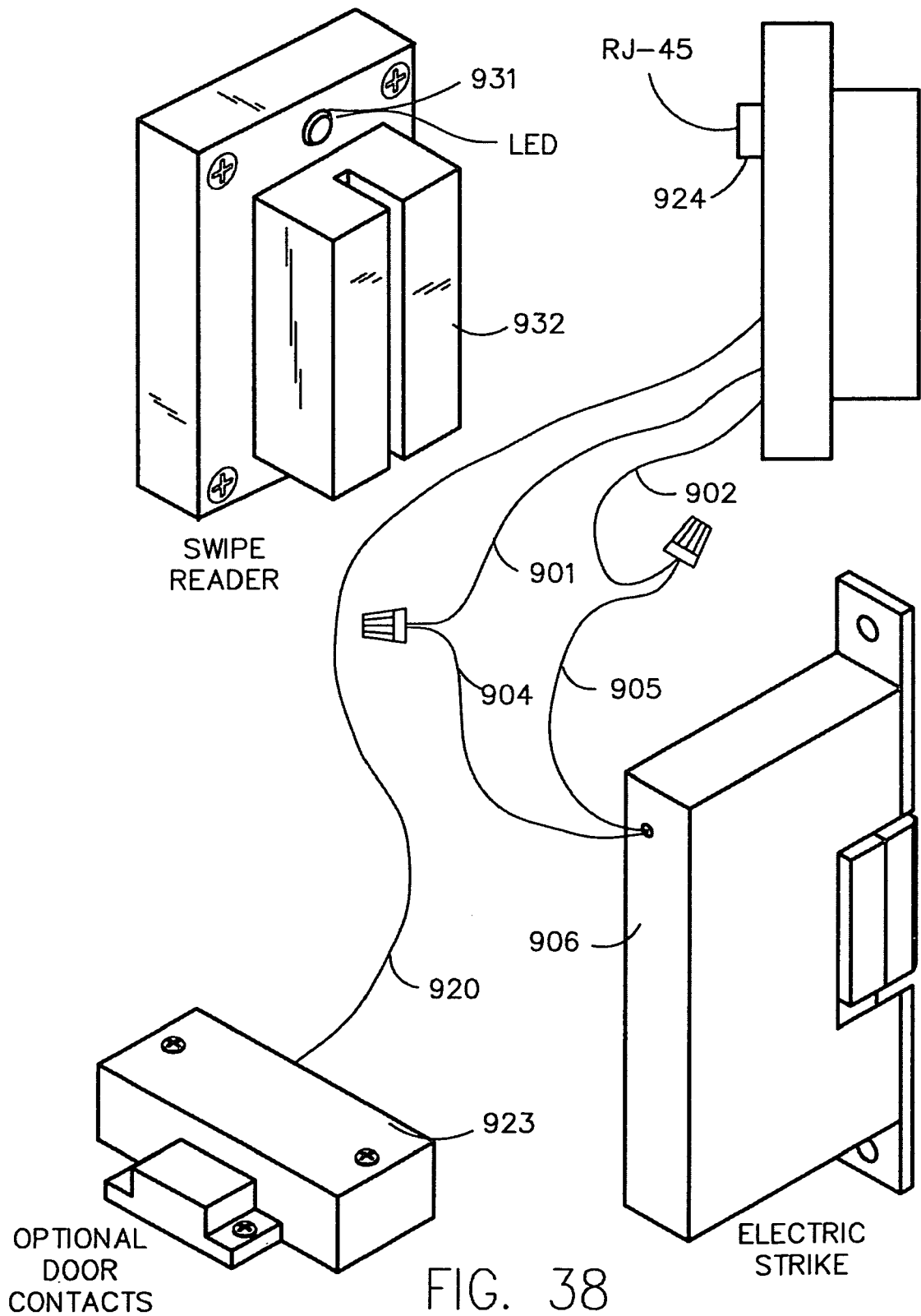
FIG. 38 depicts a combination network appliance that is controlling an electric door strike and sensing door contacts and a magnetic stripe reader.
Figure 38A:
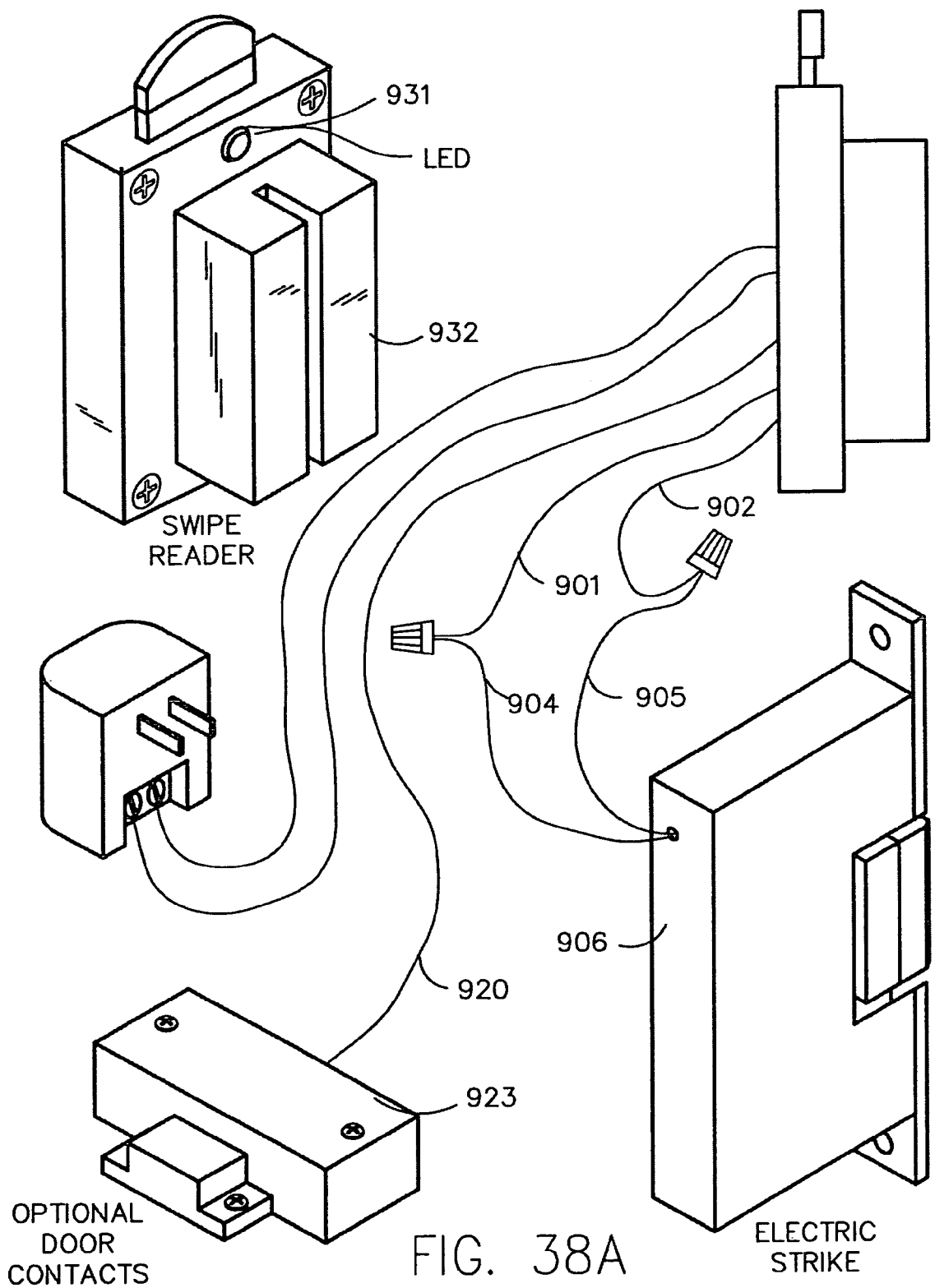
FIG. 38A is a wireless version of the network appliance show in FIG. 38.

FIG. 37 is an enhancement wherein a network sensor in accordance with the subject invention includes an integrated interface for connecting a legacy appliance to the network via the network sensor system. In this enhancement the proximity reader/controller 930 has an LED sensor 931 as is well known in the art and includes an RJ-45 jack for connecting the sensor to the network. As previously described, a wireless version is also supported. The sensor includes terminals or connectors 901, 902 and 920 for connecting various legacy appliances such as, by way of example the electric door strike 906 or the door contacts 923. Other sensors/devices may be similarly enhanced, as shown with the swipe reader 932 of FIG. 38. A keypad entry appliance 934 is similarly enhanced as shown in FIG. 38A.

Figure 39:
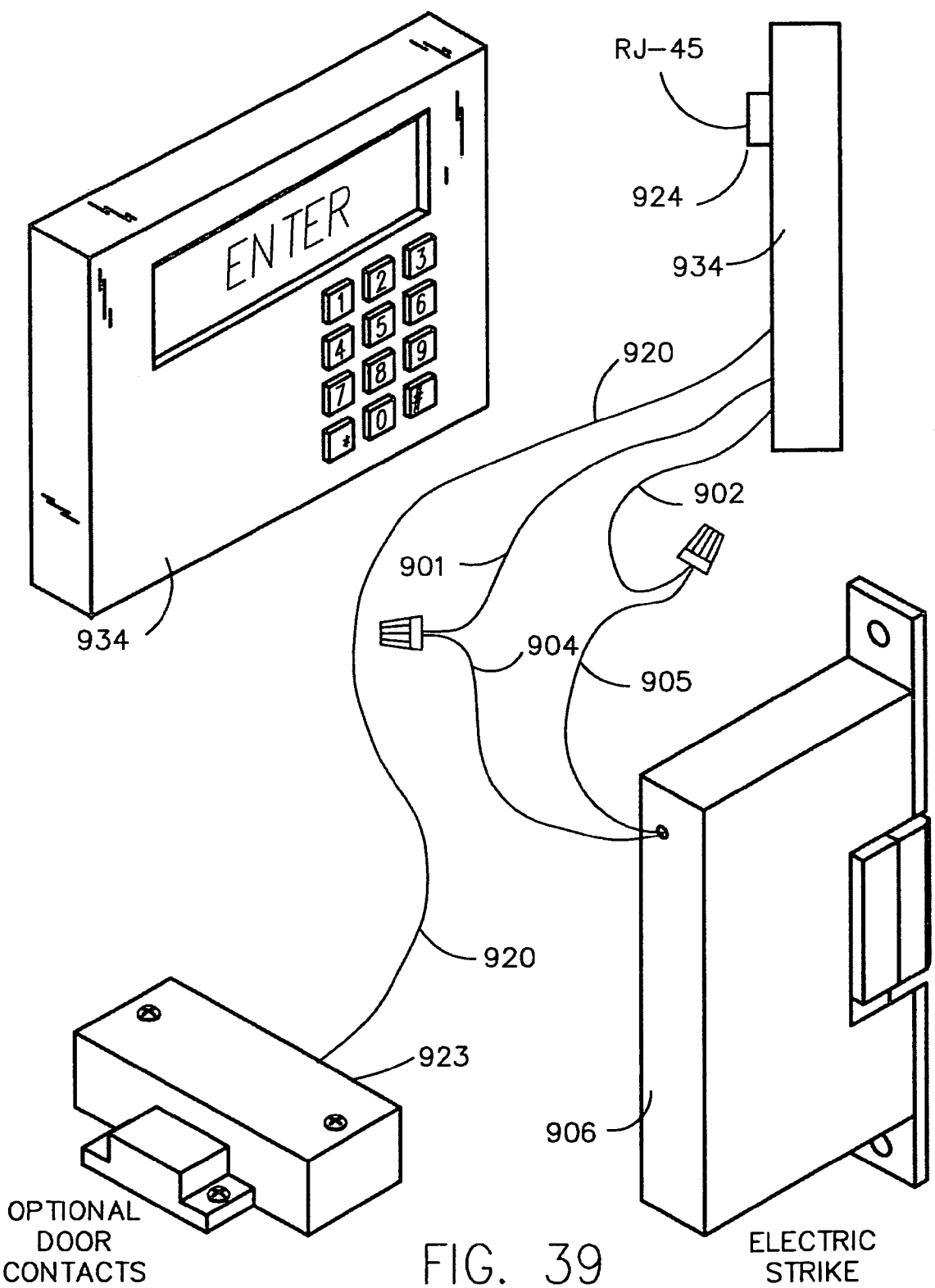
FIG. 39 depicts a keypad entry network appliance with auxiliary electric strike and door contacts.
Figure 39A:
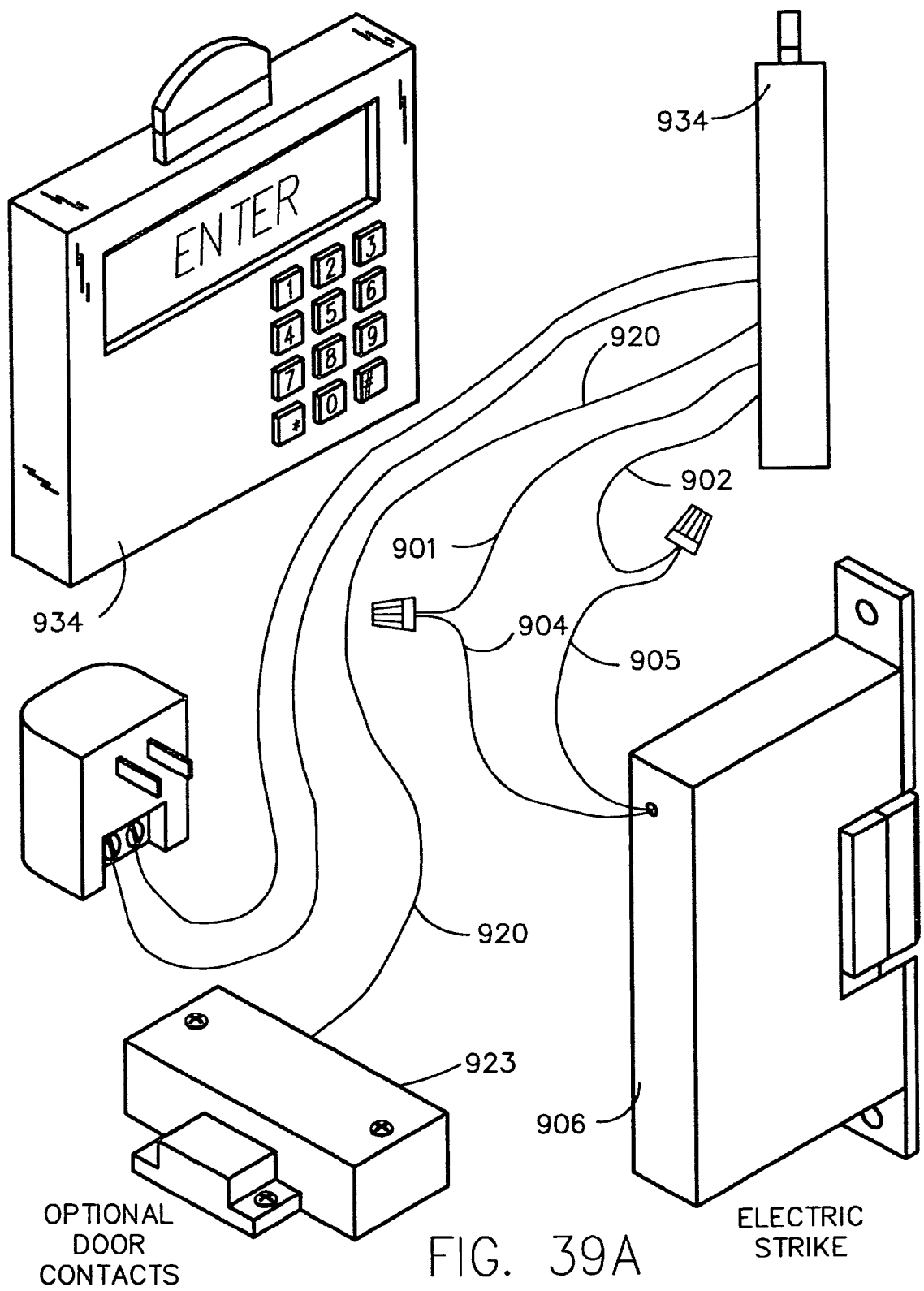
FIG. 39A is a wireless version of the network appliance shown in FIG. 39.

A further enhancement is shown in FIGS. 39-39C. In this enhancement a wireless proximity sensor 934 for monitoring movement within the marked zones, see zone 936, around monitored door 938 is connected to the network via the wireless transmitter/receiver card 526,528 to a wireless interface 287. As is better shown in FIG. 39A, the circuitry for supporting this sensor 934 is identical to the circuitry shown and described in FIG. 33. The wireless version is shown in FIG. 39B and is consistent with the circuitry shown in FIG. 33A.

Figure 40:
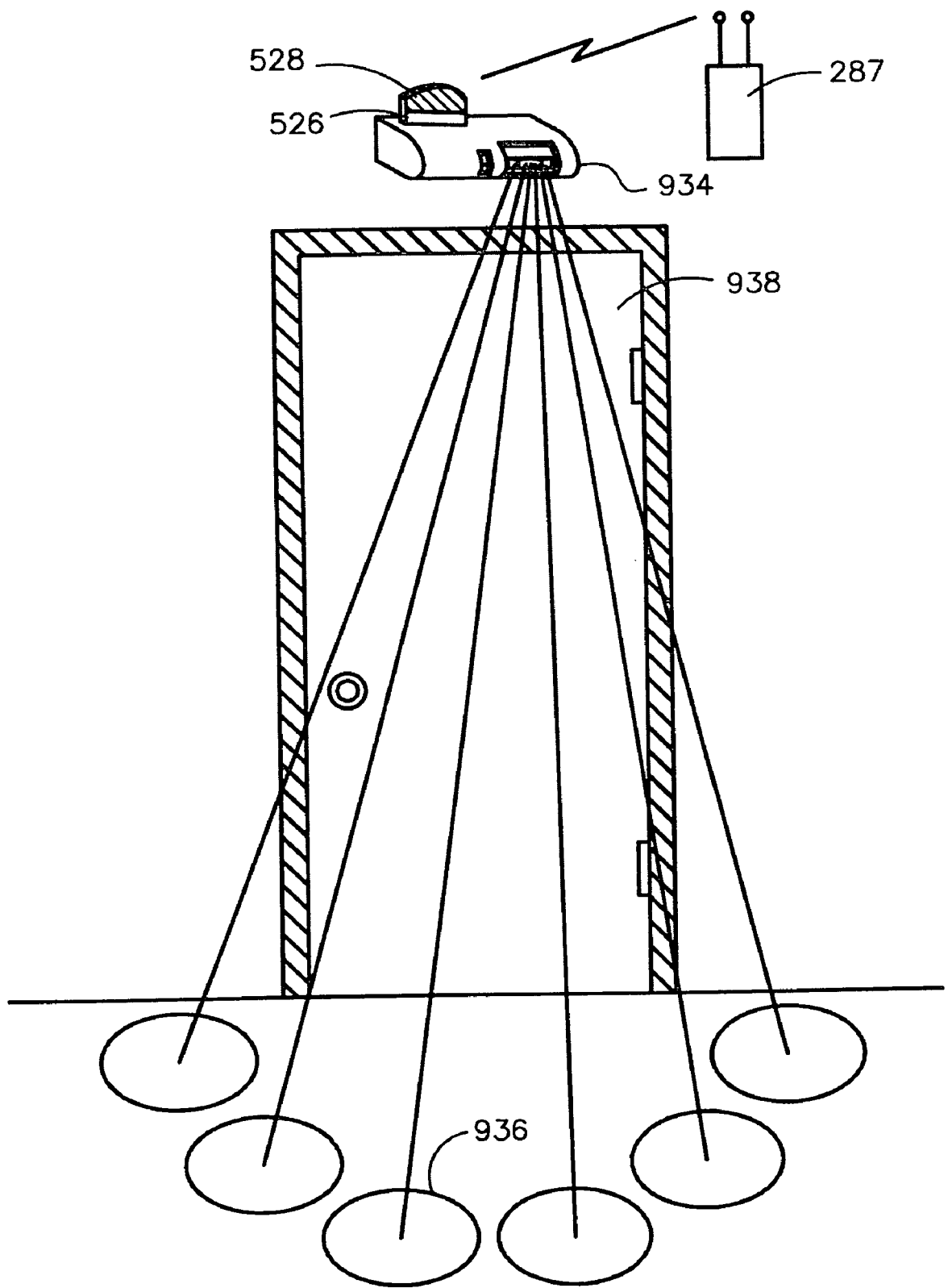
FIG. 40 shows a wireless proximity sensor network appliance.
Figure 40A:
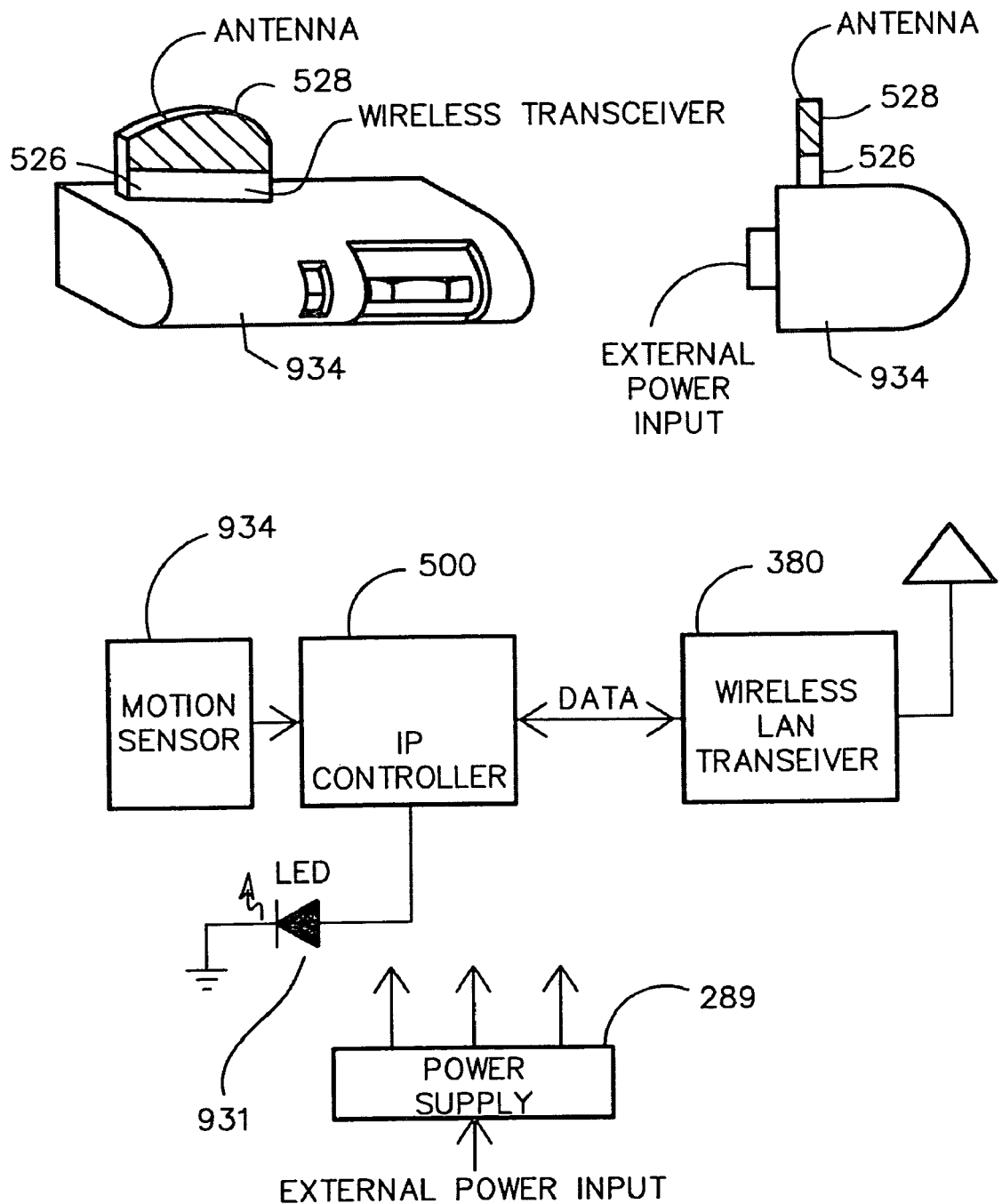
FIG. 40A depicts the circuit diagram for the system of FIG. 39
Figure 40B:
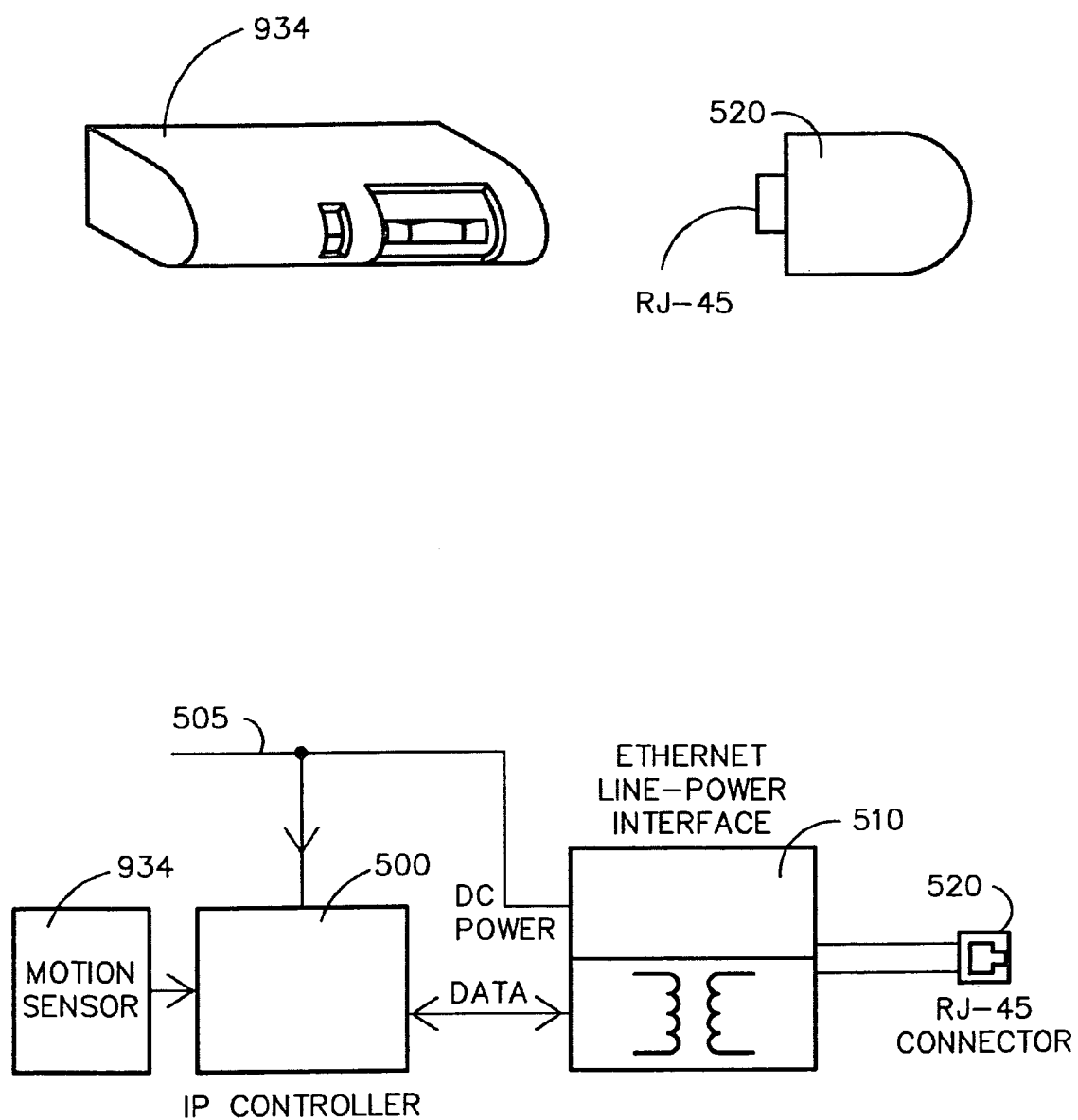
FIG. 40B depicts the circuit diagram for a wireless version of the system of FIG. 39.
Figure 40C:
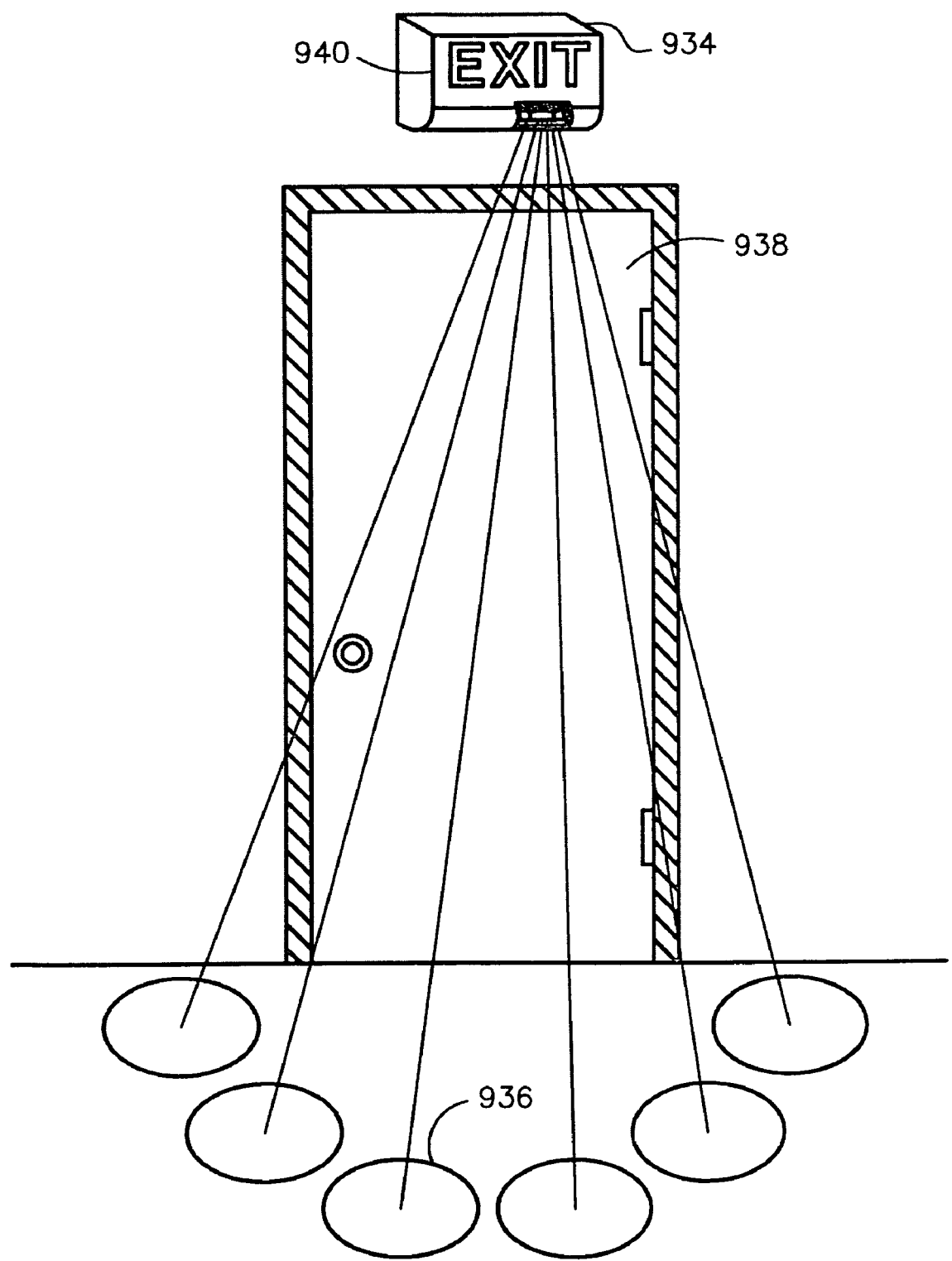
FIG. 40C shows a system similar to the system shown in FIG. 39 with the addition of an exit sign.
Figure 40D:
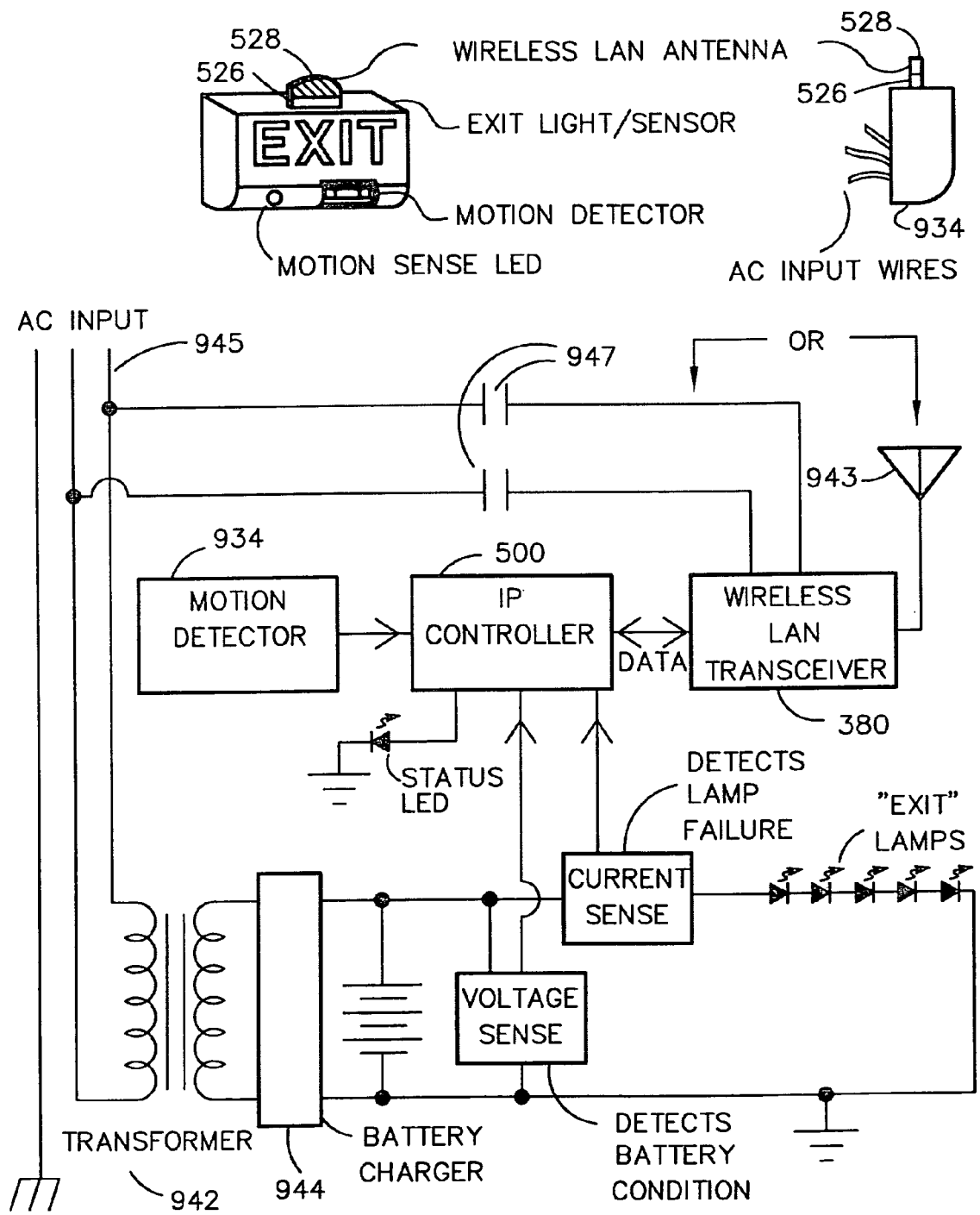
FIG. 40D depicts the circuit diagram for the system of FIG. 40.

FIGS. 40 and 40A show an enhancement of the door proximity sensor shown in FIG. 39 with a message display such as, by way of example, the EXIT display 940. In this configuration a power supply comprising the AC input, a transformer 942 and a battery charger 944 provides power to the display. This provides power to the lamp display 940 in the normal manner, and can also be used to power the IP controller 500. The wireless version is shown in FIG. 40A and is consistent with the changes made in the previously discussed embodiments.

Figure 41:
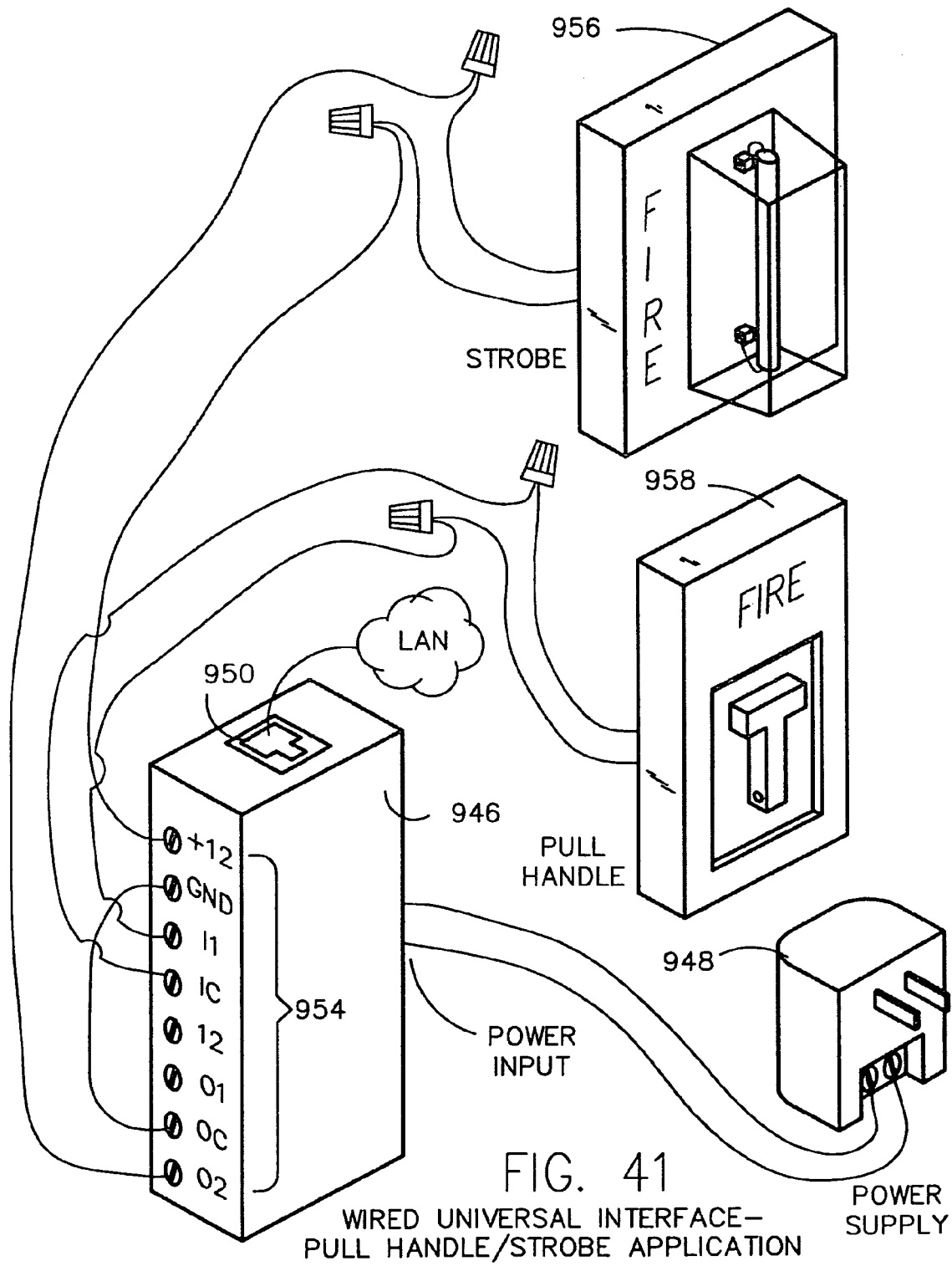
FIG. 41 depicts a wired universal interface-pull handle/strobe system.
Figure 41A:
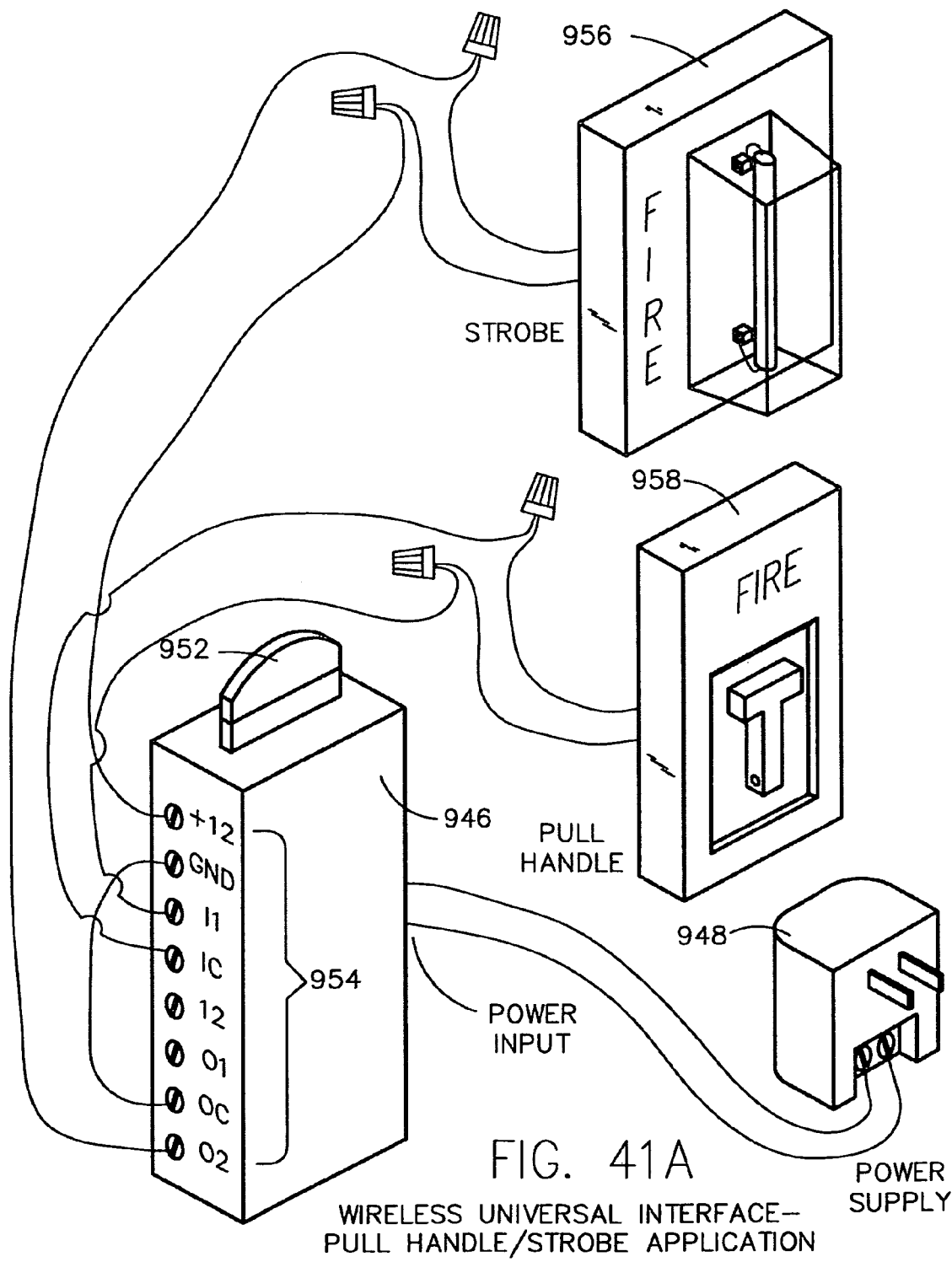
FIG. 41A is a wireless version of the system shown in FIG. 41.

FIGS. 41 and 41A show a wired universal interface and wireless universal interface, respectively. This configuration of the interface 946 includes an independent connection to a power supply as indicated at 948, a LAN connection such as the RJ-45 jack 950 in the configuration of FIG. 41 or the wireless connector 952 of FIG. 41A. A plurality of terminal connectors 954 are provided for connecting the legacy appliances such as the fire strobe display alarm 956 and the pull-handle alarm 958.

FIG. 42 shows a pull-handle alarm 959 modified for direct network hook-up using a wired RJ-45 jack 960. FIG. 42A is a wireless version with the wireless modifications previously described.

Figure 43:
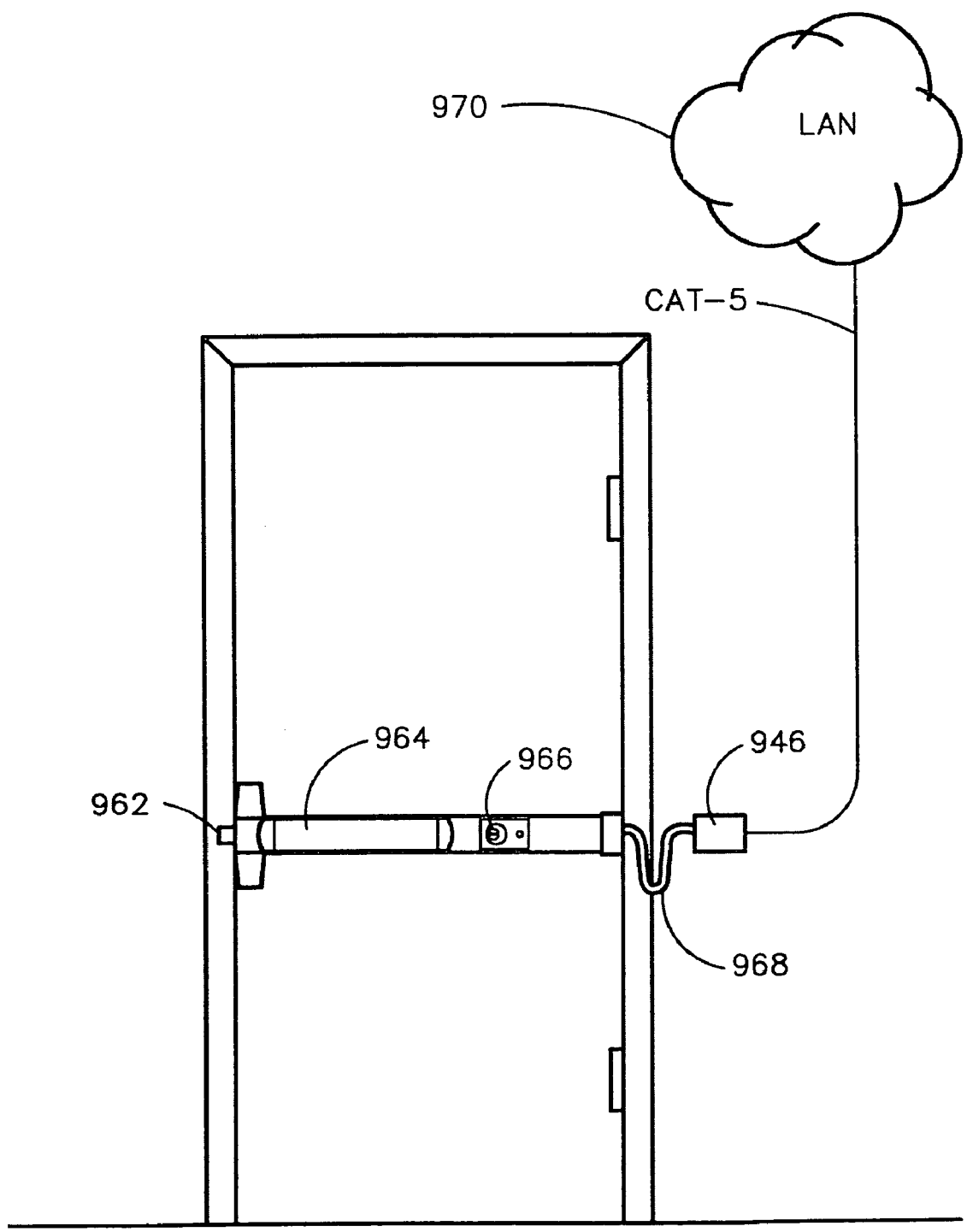
FIG. 43 depicts a wired exit device.
Figure 43A:
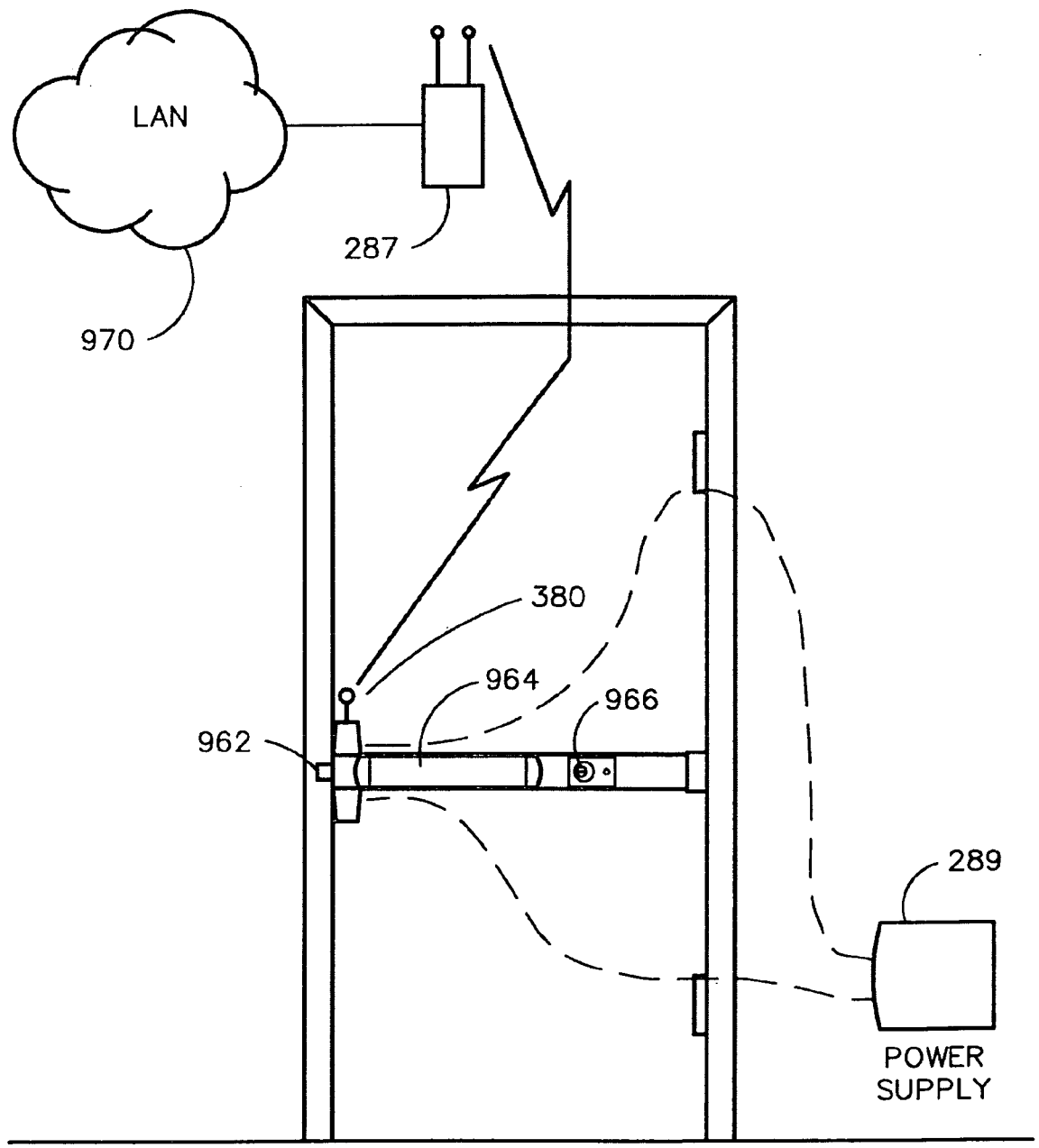
FIG. 43A is a wireless version of the system shown in FIG. 43.

A wired exit device is shown in FIG. 43. The wireless version of the exit device is shown in FIG. 43A. In this enhancement the exit device includes a latch 962, a push bar 964 and a key lock 966. Action on any of these elements will transmit a signal via wire 968 to show activity at the door. The wire is connected to terminals on the universal interface 946, which is in turn connected to the network 970 via a CAT-5 wire or other cabling to the universal interface. A wireless version is shown in FIG. 43A and includes the external power supply 289, the wireless access component 380, and the wireless access point 287, as with previously described enhancements.

Figure 44:
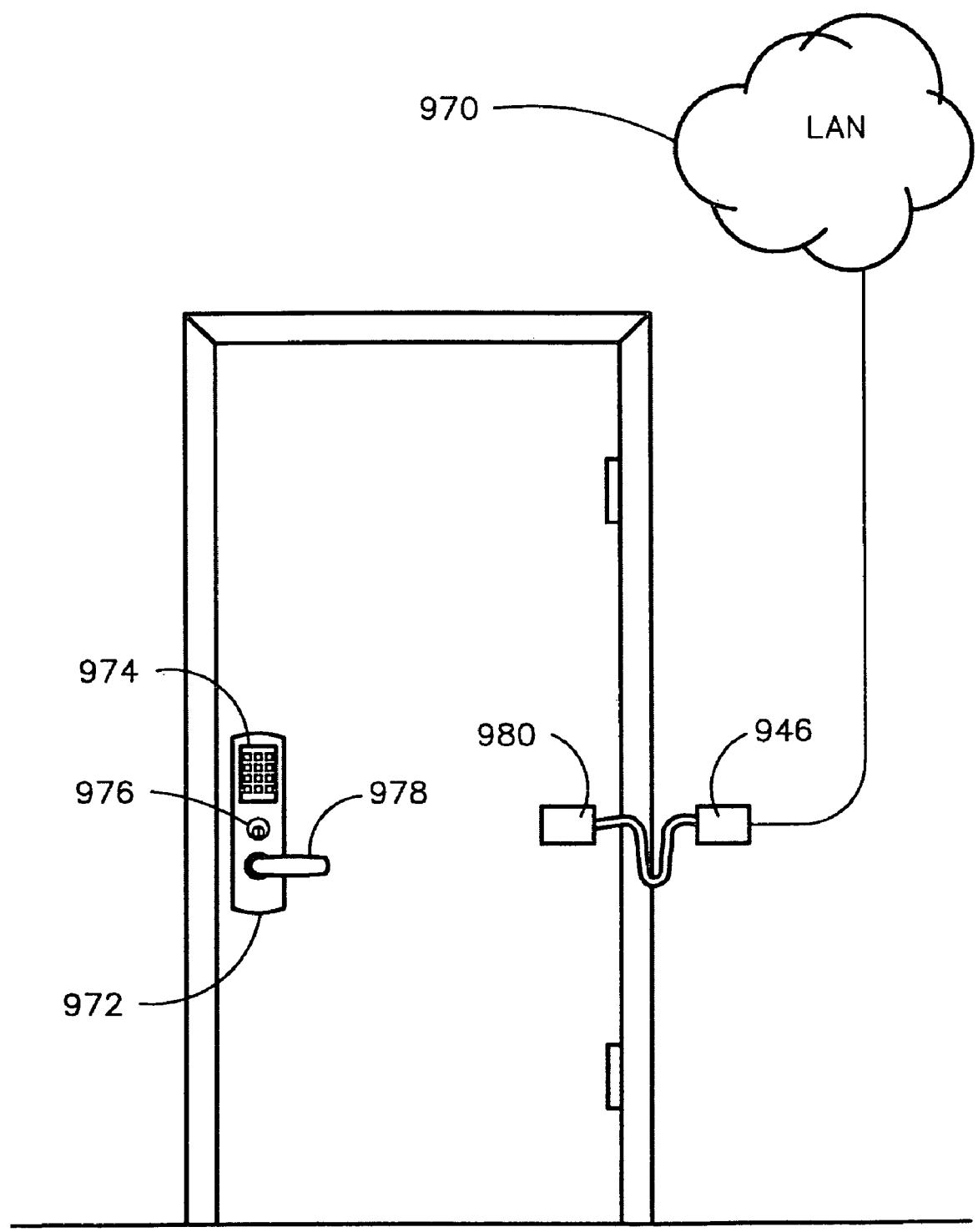
FIG. 44 depicts a wired keypad mortise lock.
Figure 44A:
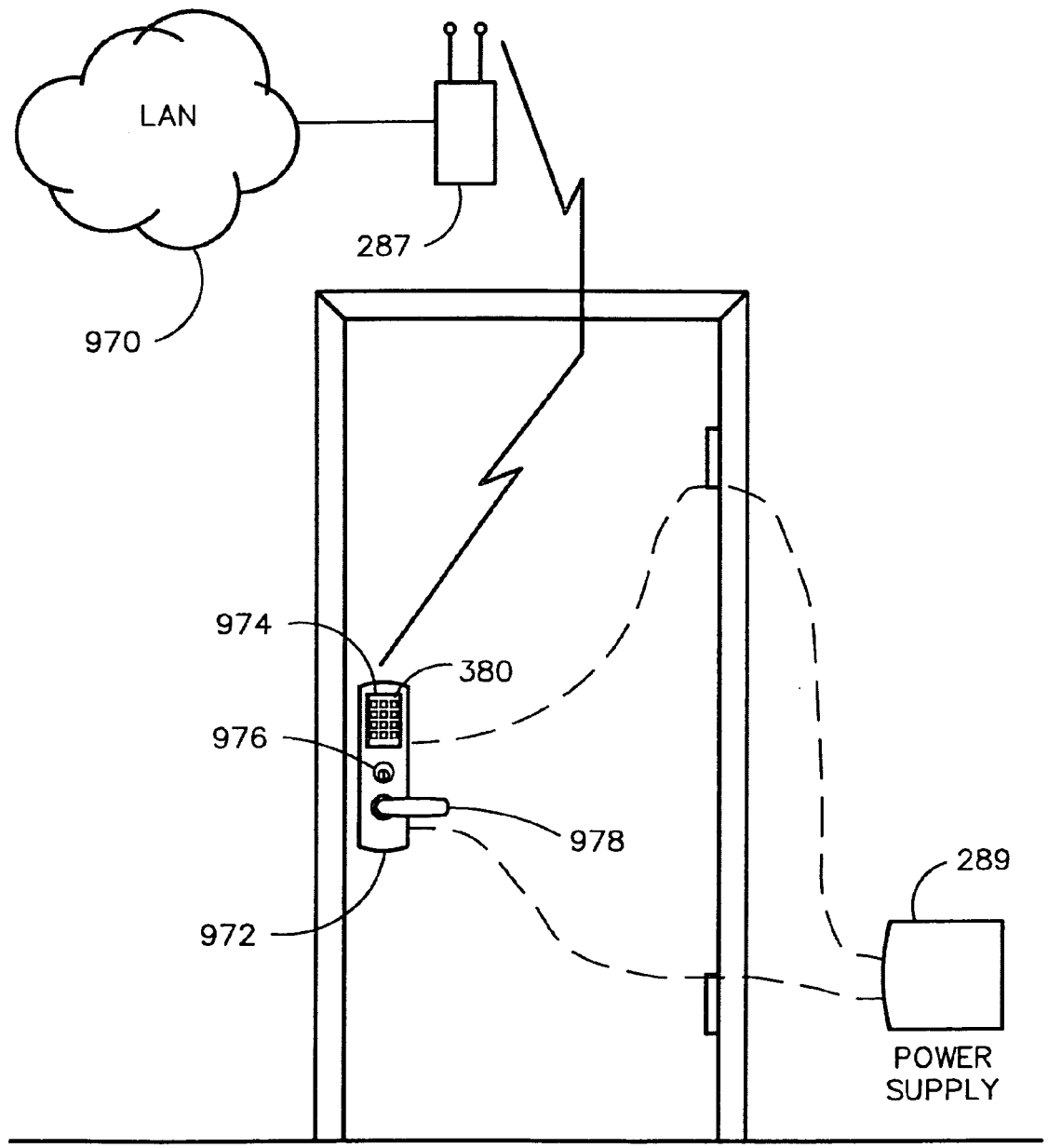
FIG. 44A is a wireless version of the system shown in FIG. 44.
Figure 45:
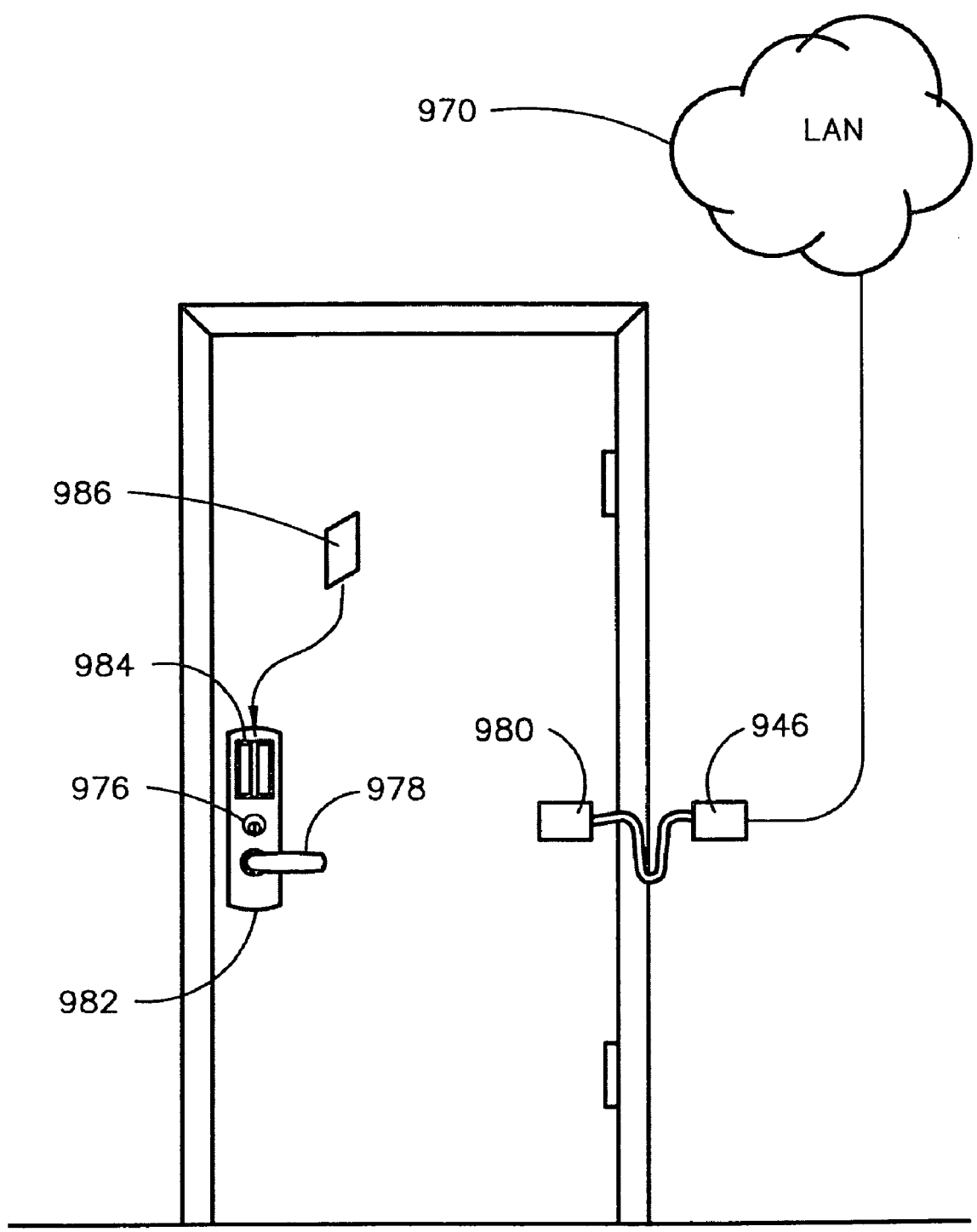
FIG. 45 depicts a wired magnetic card stripe swipe reader mortise lock.
Figure 45A:
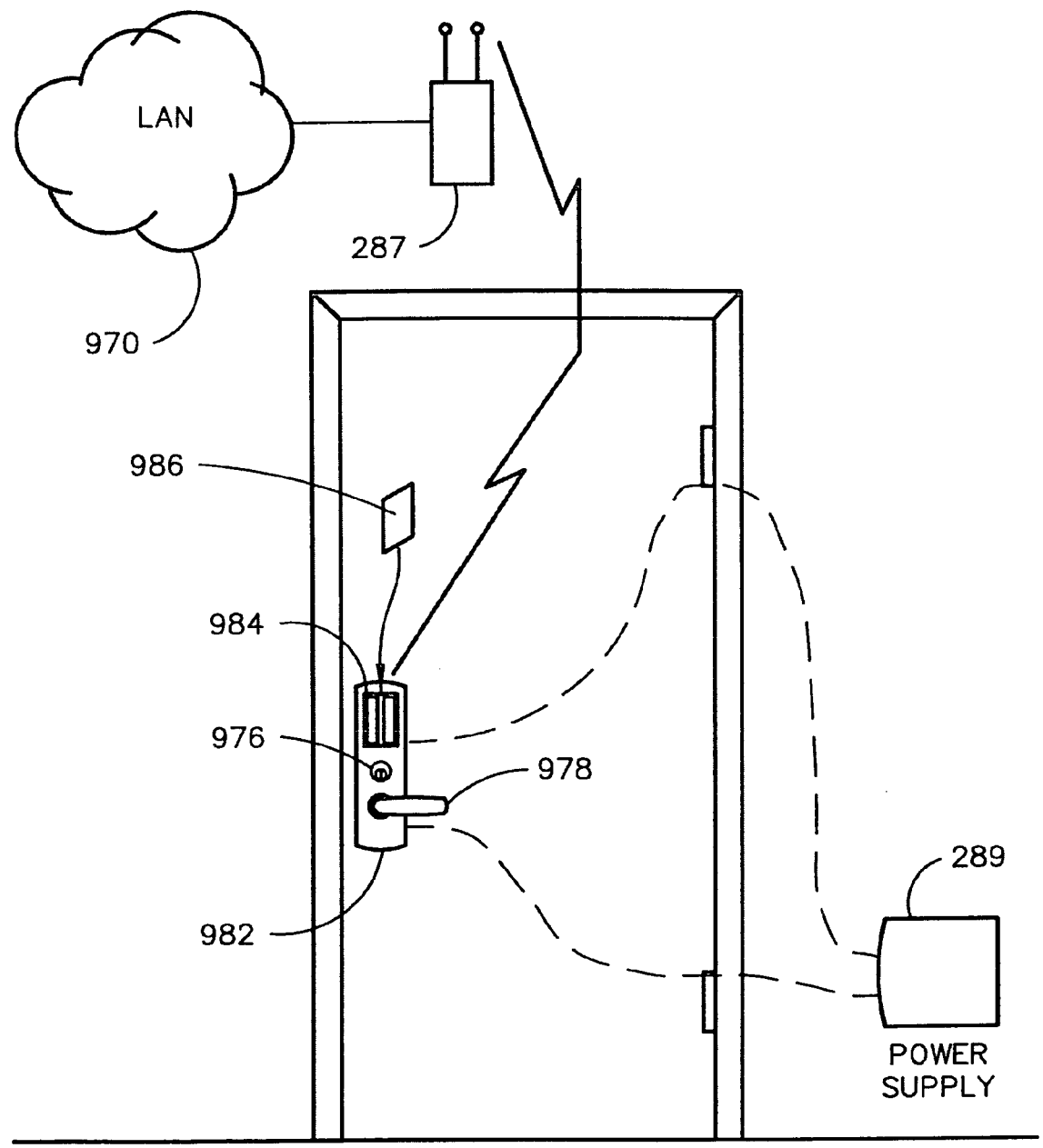
FIG. 45A is a wireless version of the system of FIG. 45.
Figure 46:
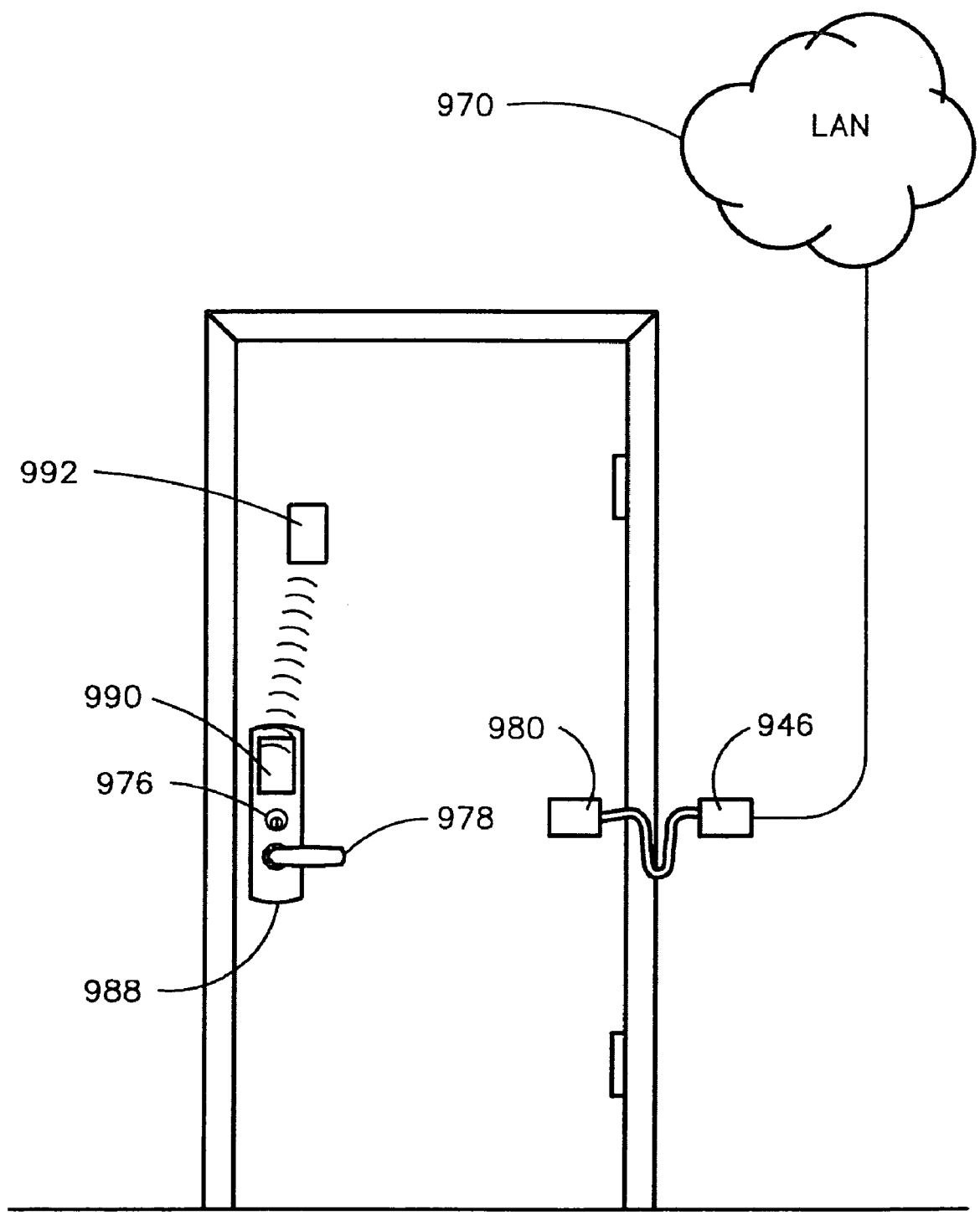
FIG. 46 depicts a wired proximity card reader mortise lock.
Figure 46A:
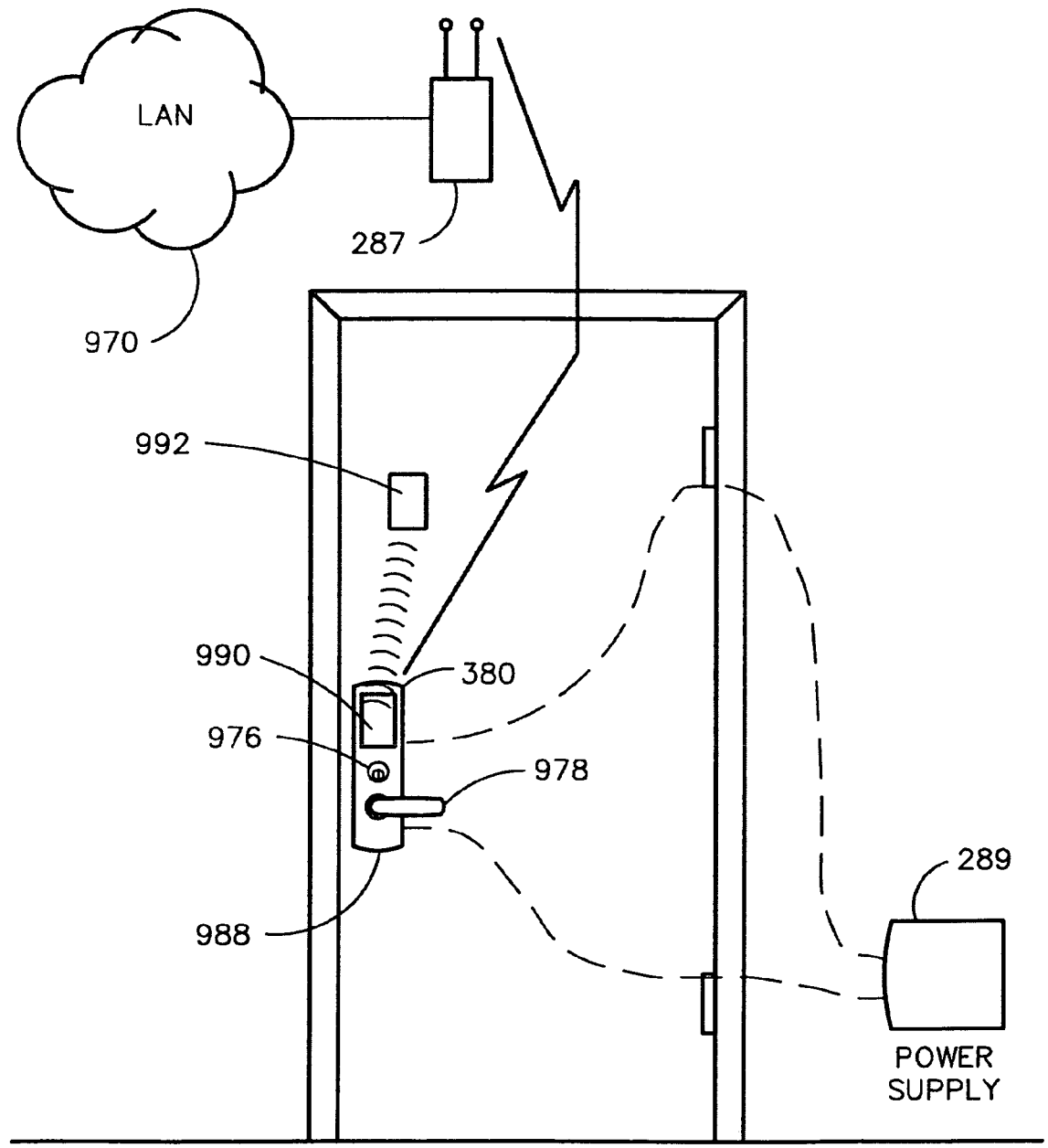
FIG. 46A is a wireless version of the system of FIG. 46.

A keypad mortise lock entry device is shown in FIG. 44, with the wireless version being depicted in FIG. 44A. The keypad lock device 972 includes a keypad 974, backup key lock 976 and a door handle 976, each of which will generate a signal when activated. The signal is carried from the control box 980 to a universal interface 946 for connection to the LAN 970. A wireless version is shown in FIG. 44A. The keypad lock 974 is replaced by a card 986 and swipe reader 984 in FIG. 45 (wired) and FIG. 45A (wireless). A magnetic or optical card reader 990 and compatible card 992 is shown in FIG. 46 (wired) and FIG. 46A (wireless).

Figure 47:
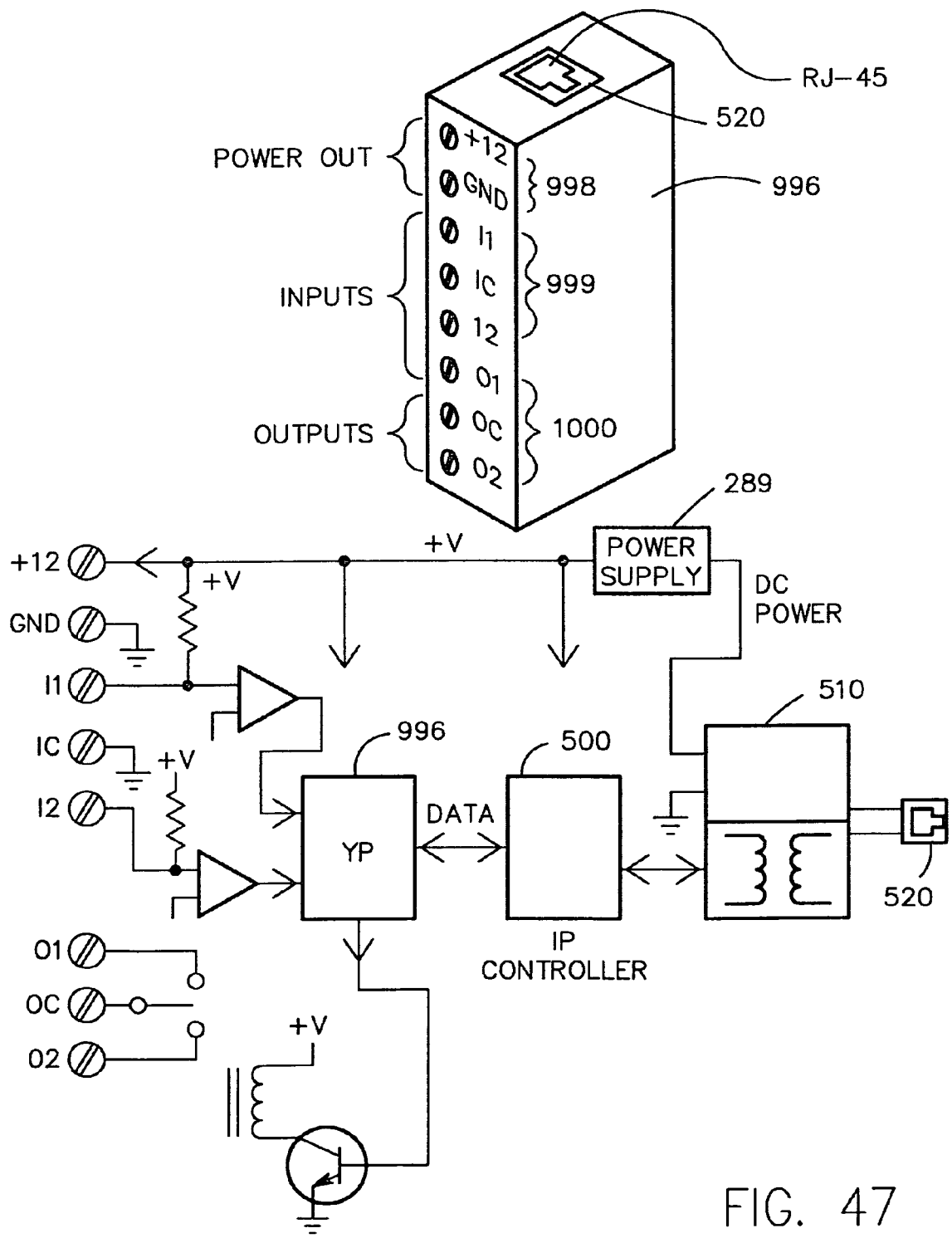
FIG. 47 is a control center system and diagram for connecting various sensors to the system.
Figure 47A:
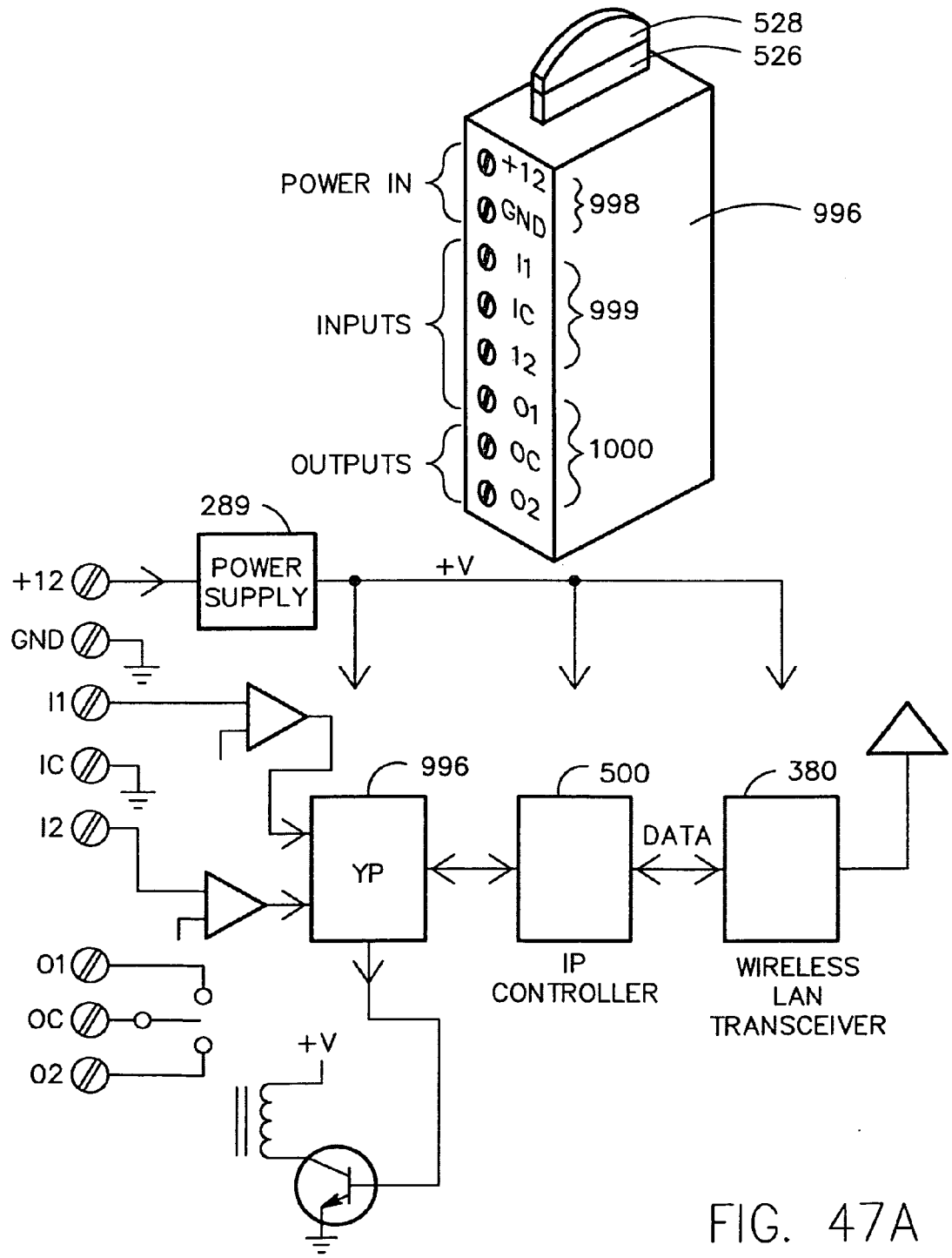
FIG. 47A is a wireless version of the system of FIG. 47.
Figure 48:
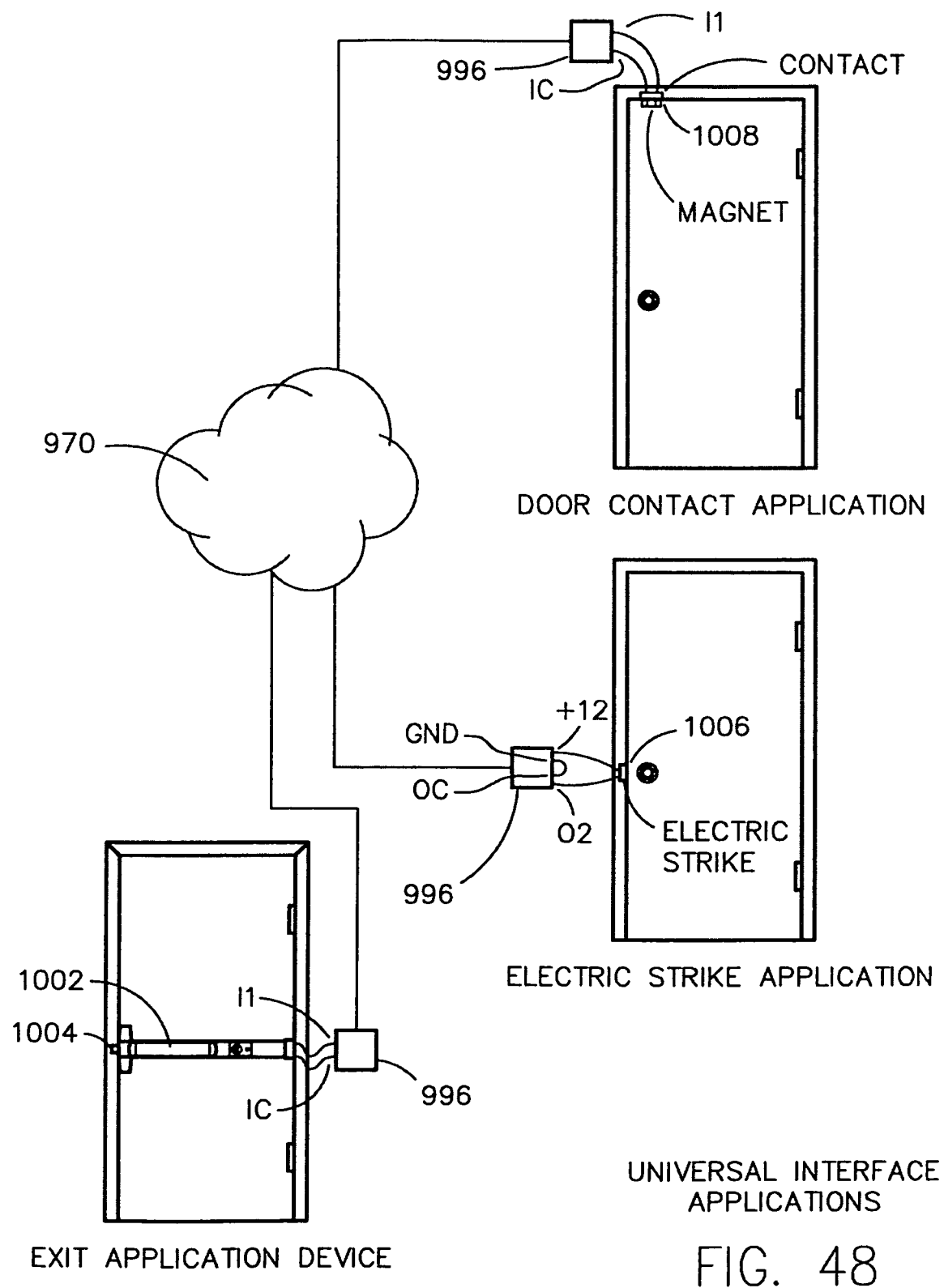
FIGS. 48 and 49 depict multiple universal interface applications.
Figure 49:
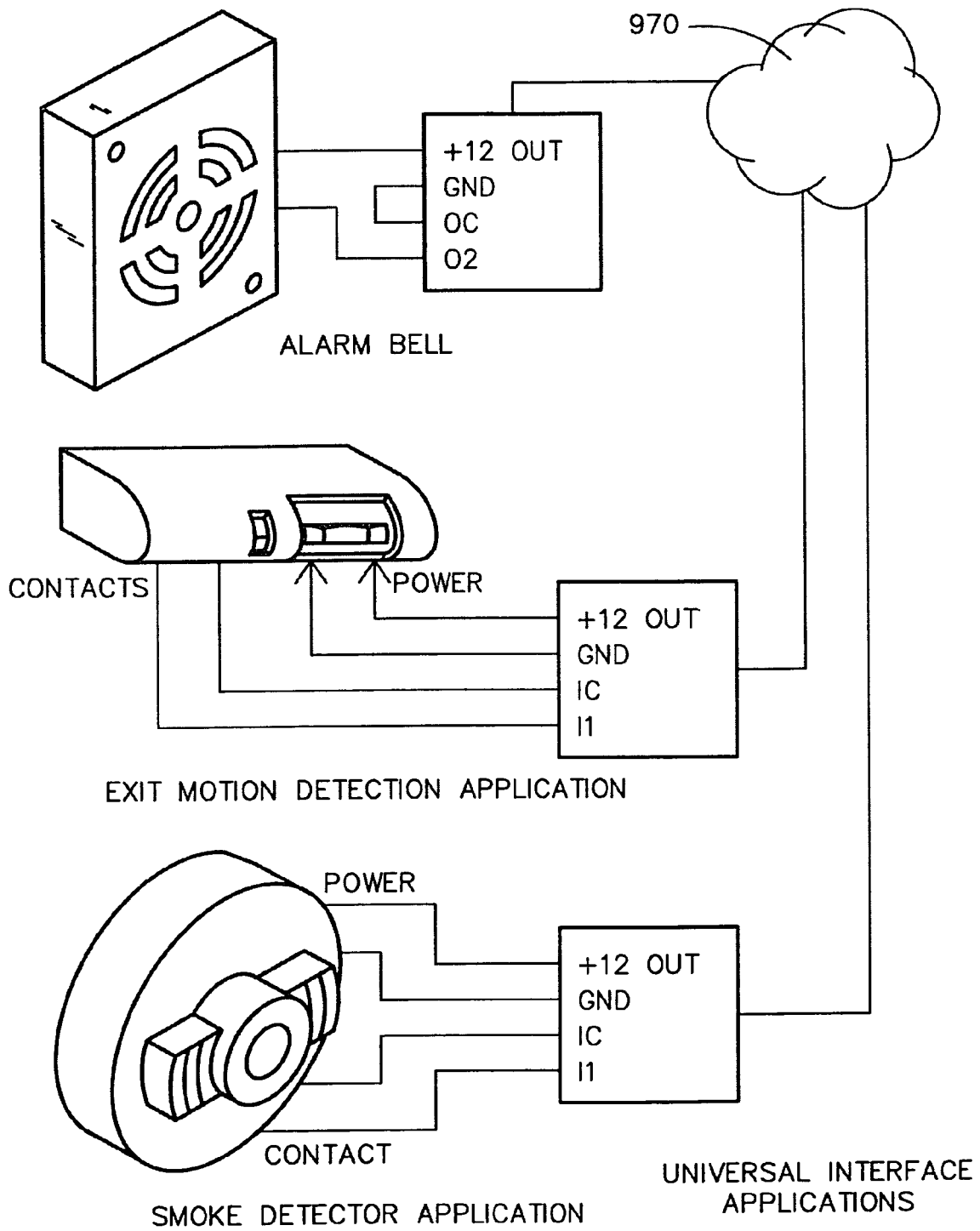

An alternative universal connector interface 996 is shown in FIGS. 47 (wired) and 47A (wireless). The universal connector interface includes a plurality of terminals for providing power out (998), input from legacy appliances (999) and various output signals other than network (1000). Applications of the universal interface are shown in FIG. 48 wherein an electric strike 1002 and latch 1004, an electric strike 1006 and a magnetic contact 1008. FIG. 49 shows additional universal interface applications using legacy appliances.

Figure 49B:
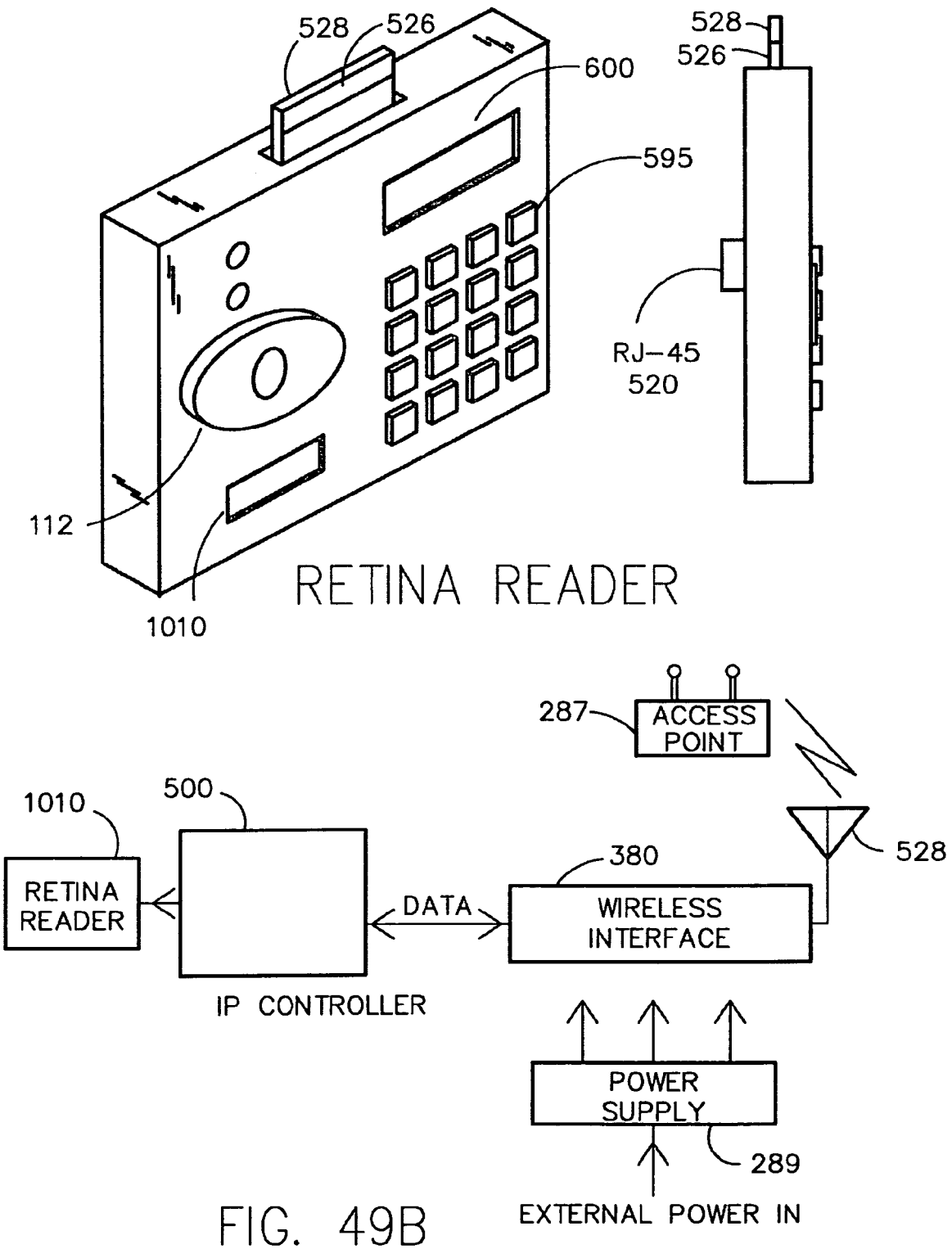
FIG. 49B is the wireless version of the retina reader of FIG. 49A.

FIG. 49A shows a retina reader 1010 adapted for use in the system of the present invention. The retina scanner 1012 is adapted for scanning the retina of a user. A readout display is provided at 600 to indicate acceptance or rejection. A keyboard input panel 595 may be provided for secondary identification, where desired. This version includes the circuitry previously described for connecting the retina reader to a network via the RJ-45 connection 520. The wireless version is shown in FIG. 49B and includes a wireless interface network 380 embodied in the interface card 526, and an antenna 528 whereby the retina reader wirelessly communicates with the network via an access point 287.

Figure 49D:
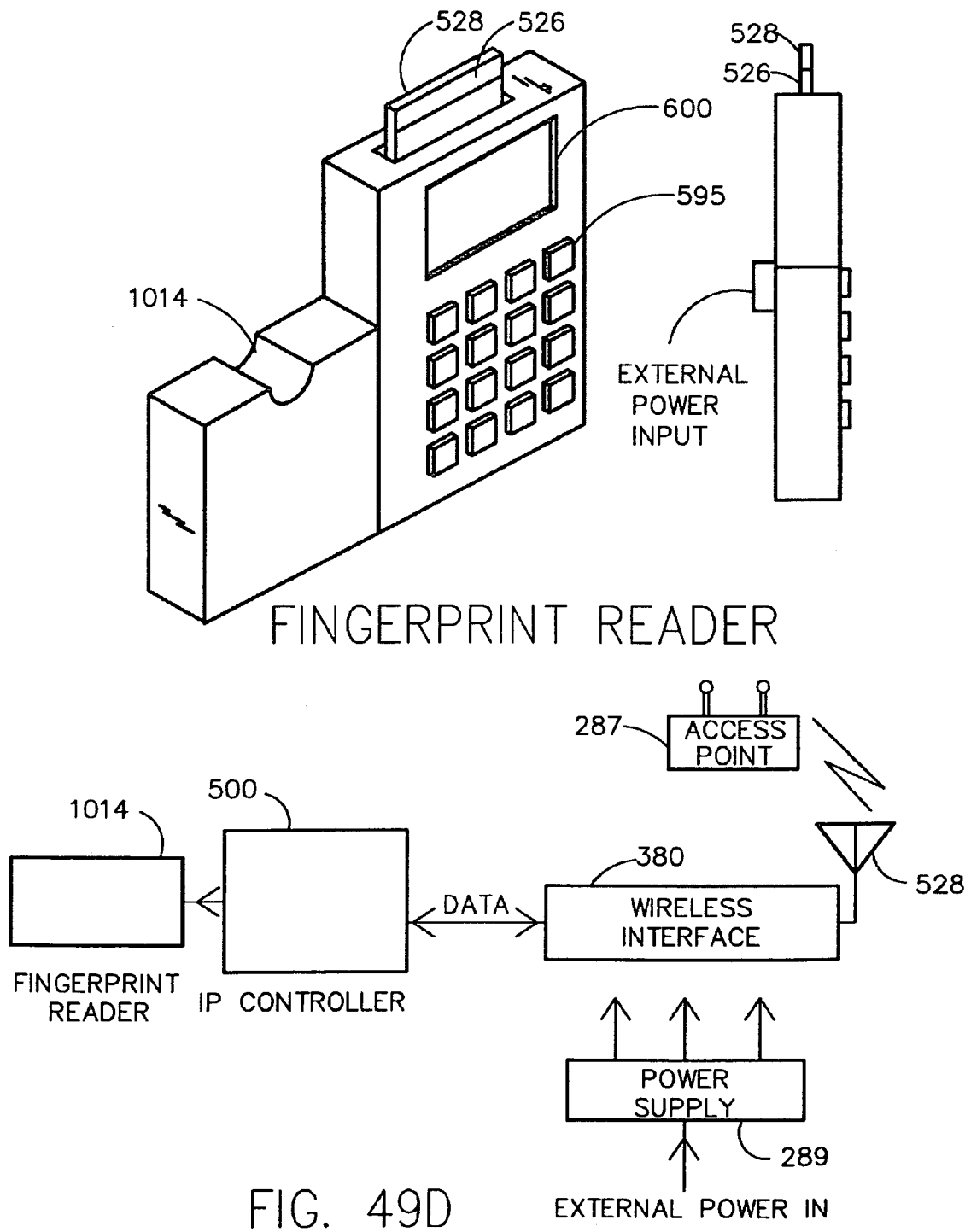
FIG. 49D is the wireless version of the fingerprint reader of FIG. 49C.

FIG. 49C shows a fingerprint reader 1014 adapted for use in the system of the present invention. A readout display is provided at 600 to indicate acceptance or rejection. A keyboard input panel 595 may be provided for secondary identification, where desired. This version includes the circuitry previously described for connecting the fingerprint reader to a network via the RJ-45 connector 520. The wireless version is shown in FIG. 49D and includes a wireless interface network 380 embodied in the interface card 526, and an antenna 528 whereby the retina reader wirelessly communicates with the network via an access point 287.

Figure 49E:
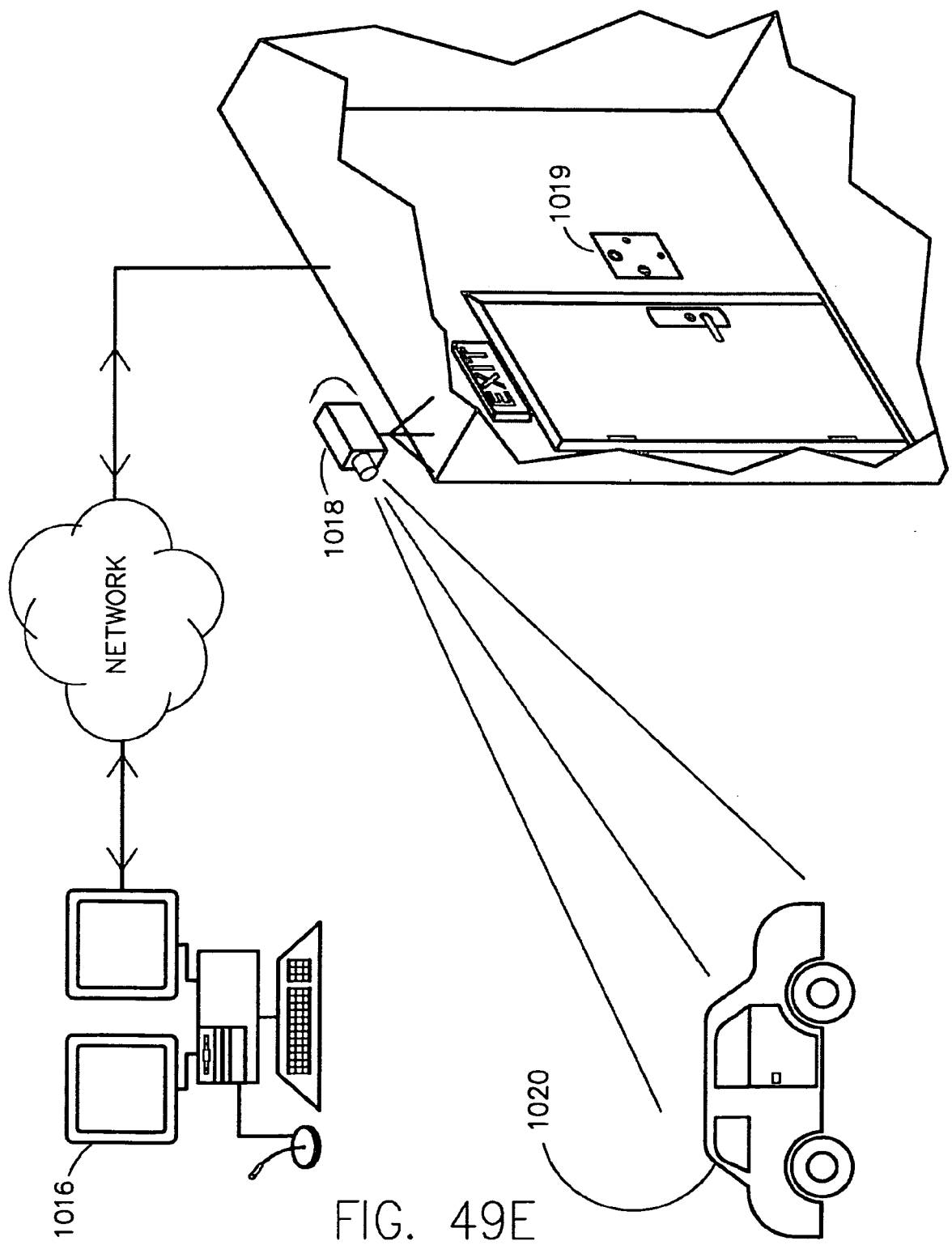
FIG. 49E depicts a tilt/pan/zoom camera for use in the networked system of the subject invention.
Figure 49F:
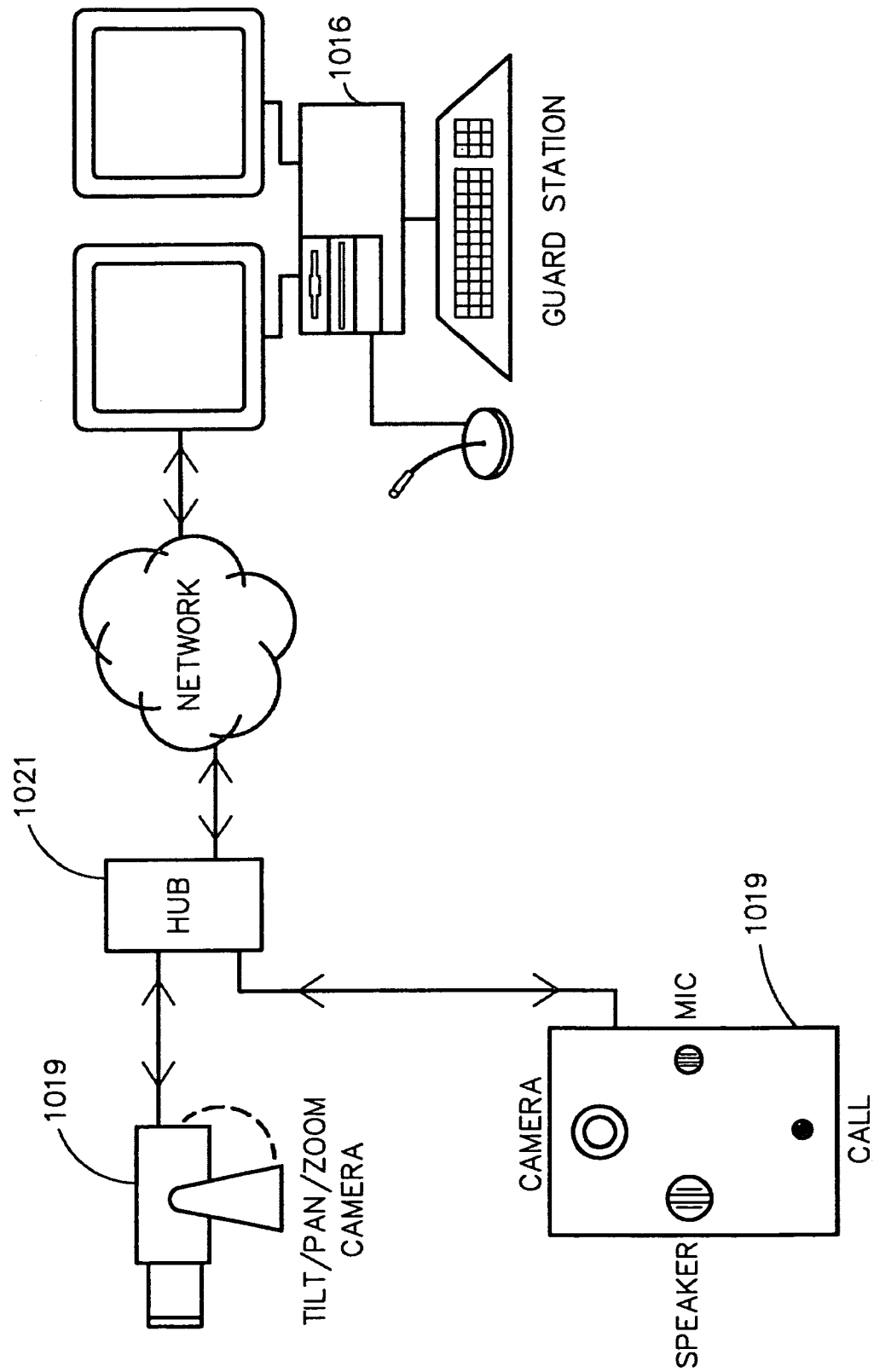
FIG. 49F is an enhancement of the camera and system as shown in FIG. 49E.

FIGS. 49E and 49F show a system including a tilt/pan/zoom camera. In this enhancement, the camera 1018 is mounted in a location such as near the exit and is positioned to monitor a specific zone. The camera controls are transmitted via the network from the control station 1016 and the camera-captured images are transmitted via the same network. As shown in FIG. 49F, the door access panel 1019 may also be connected to the same network interface by using the hub 1021.

Figure 50:
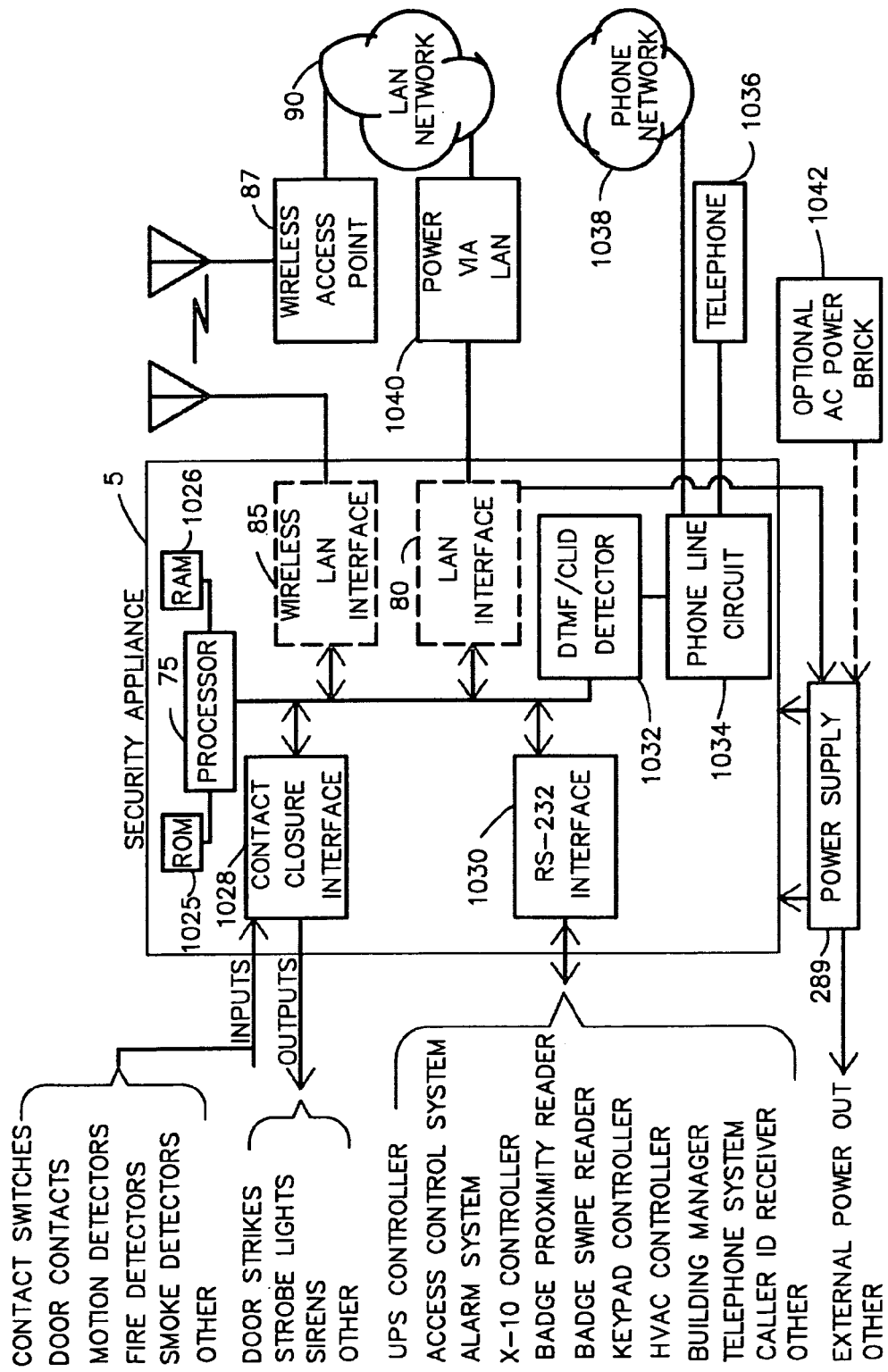
FIG. 50 is a block diagram of the multiple appliance security system in accordance with the invention.
Figure 51A:
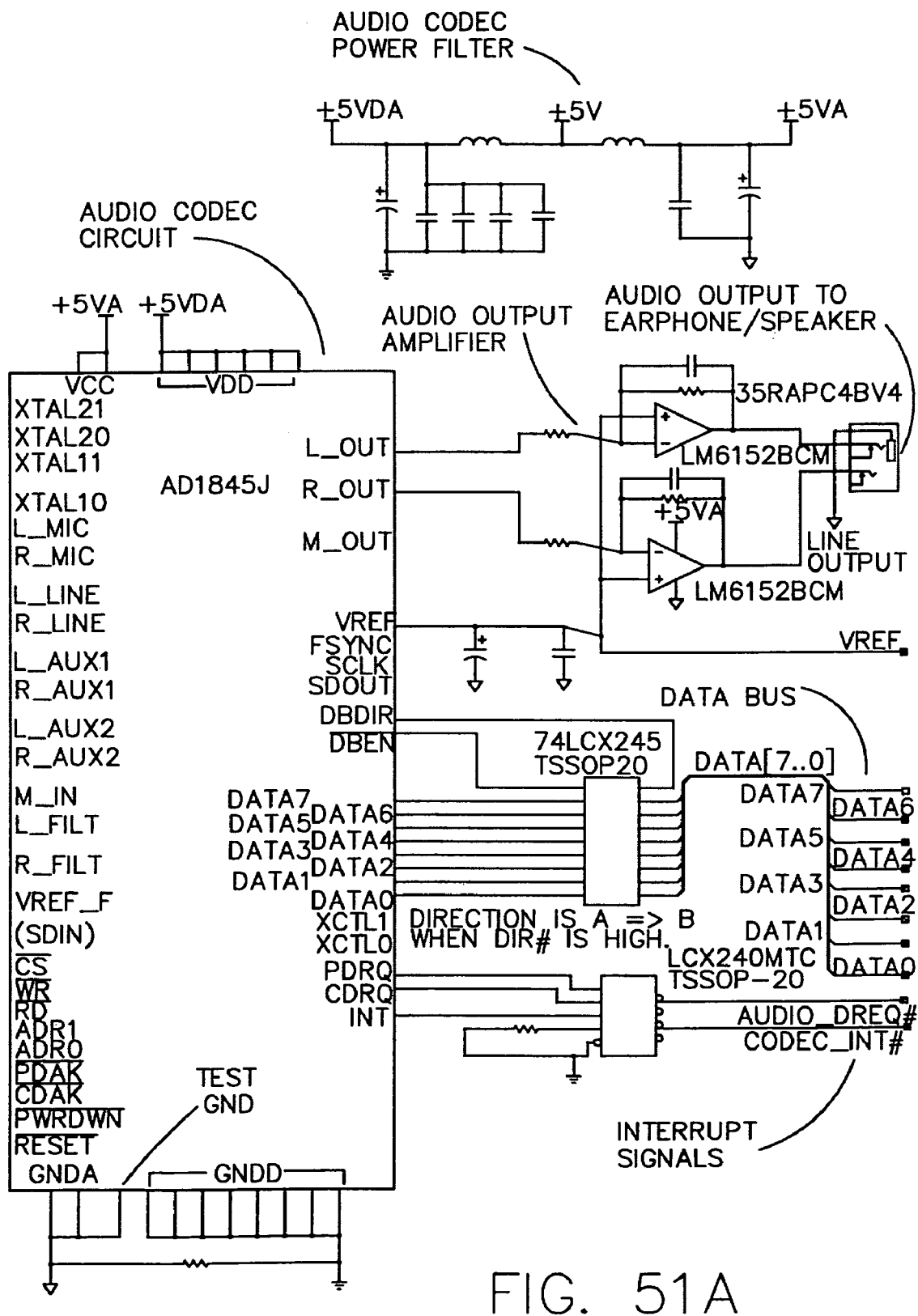
FIGS. 51A-51BB comprise a full schematic of the system in accordance with the block diagram of FIG. 50.
Figure 51B:
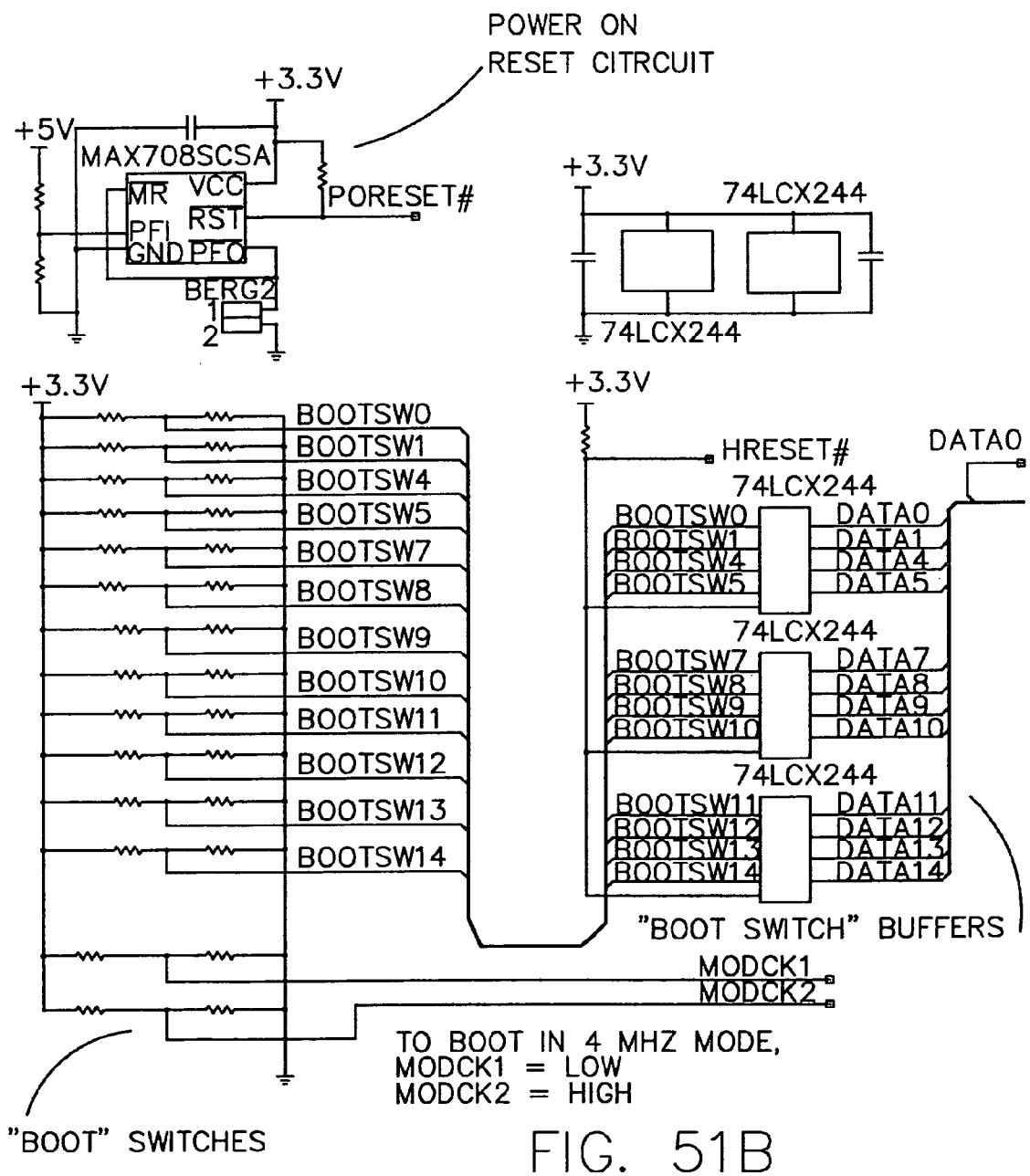
Figure 51C:
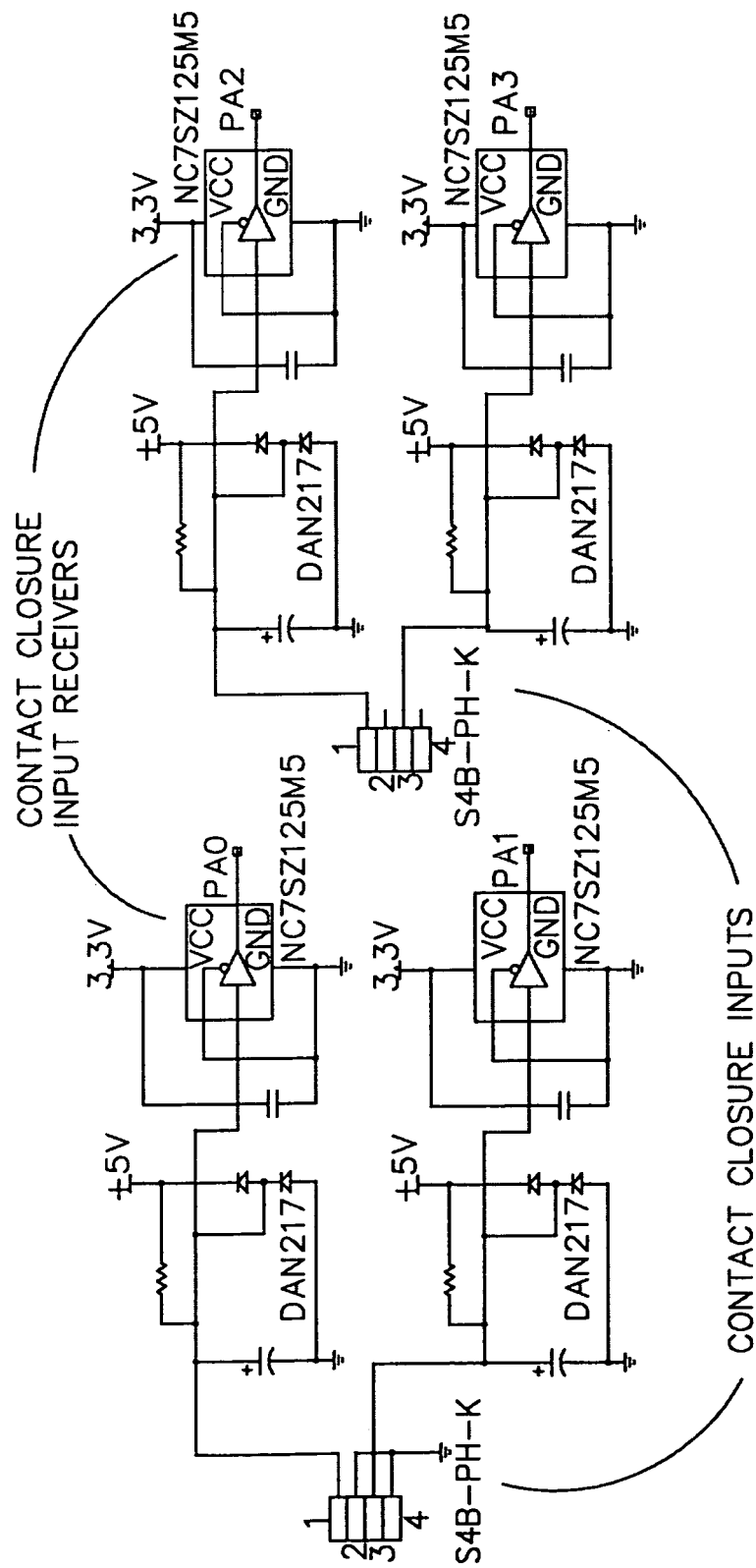
Figure 51D:
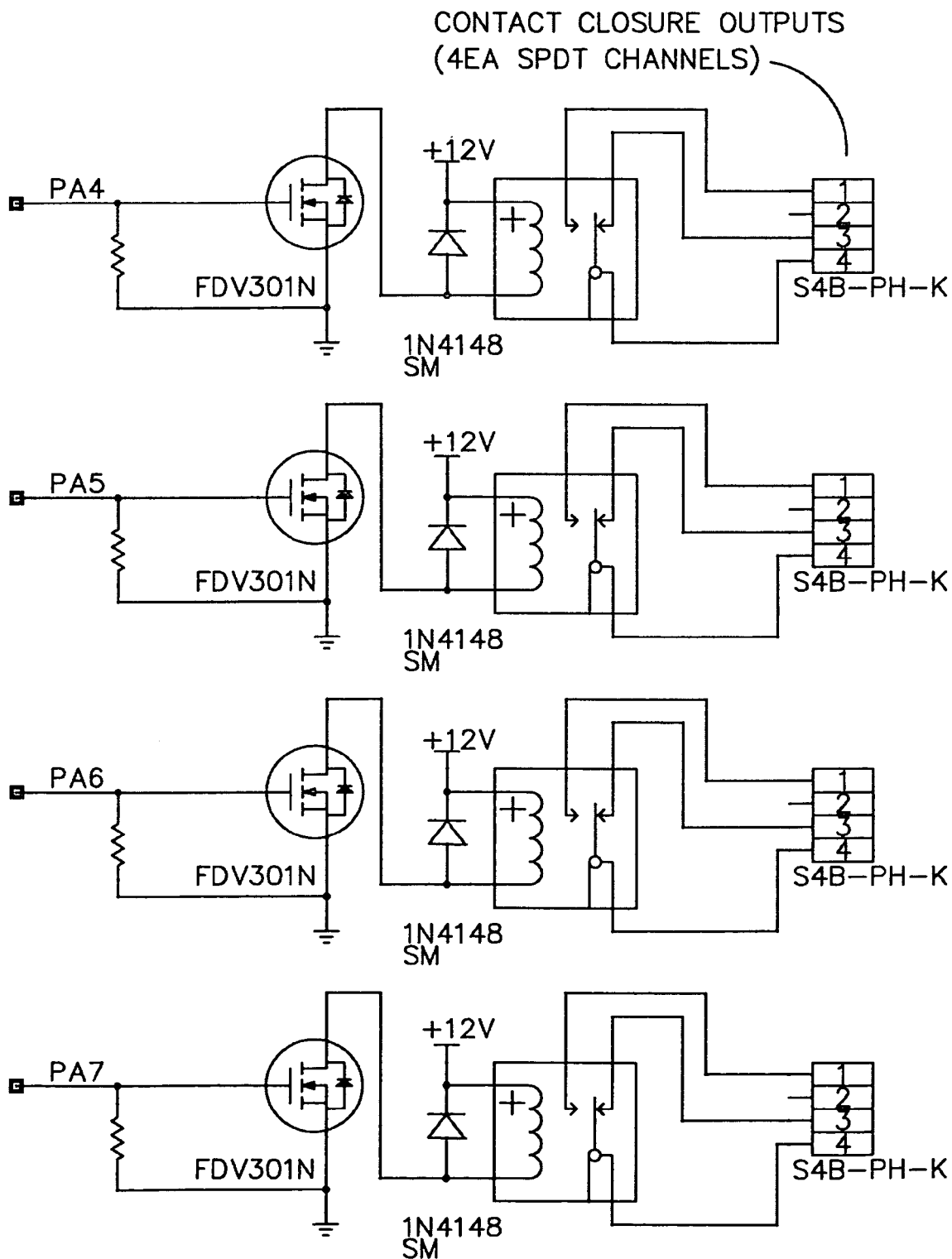
Figure 51E:
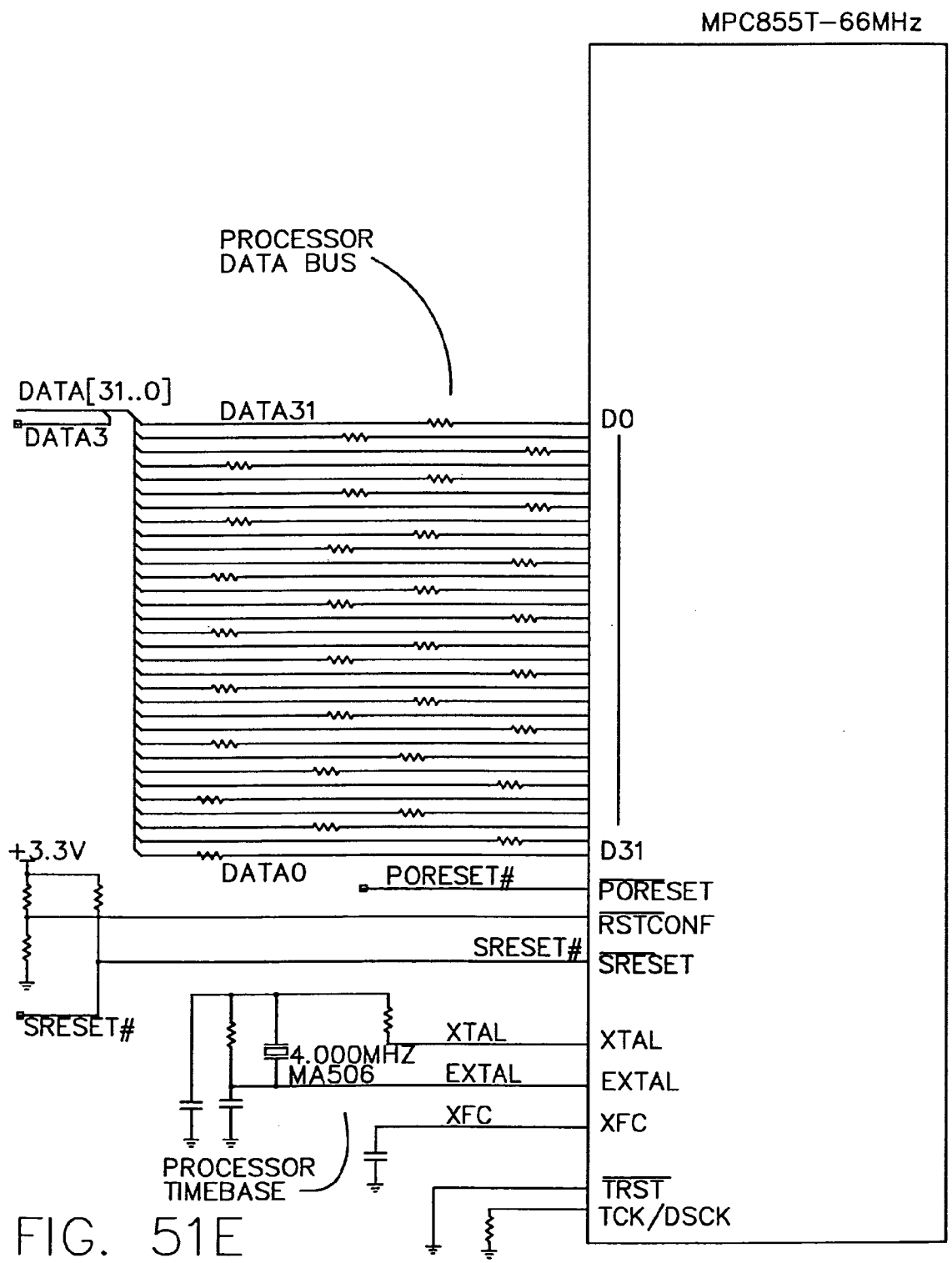
Figure 51F:
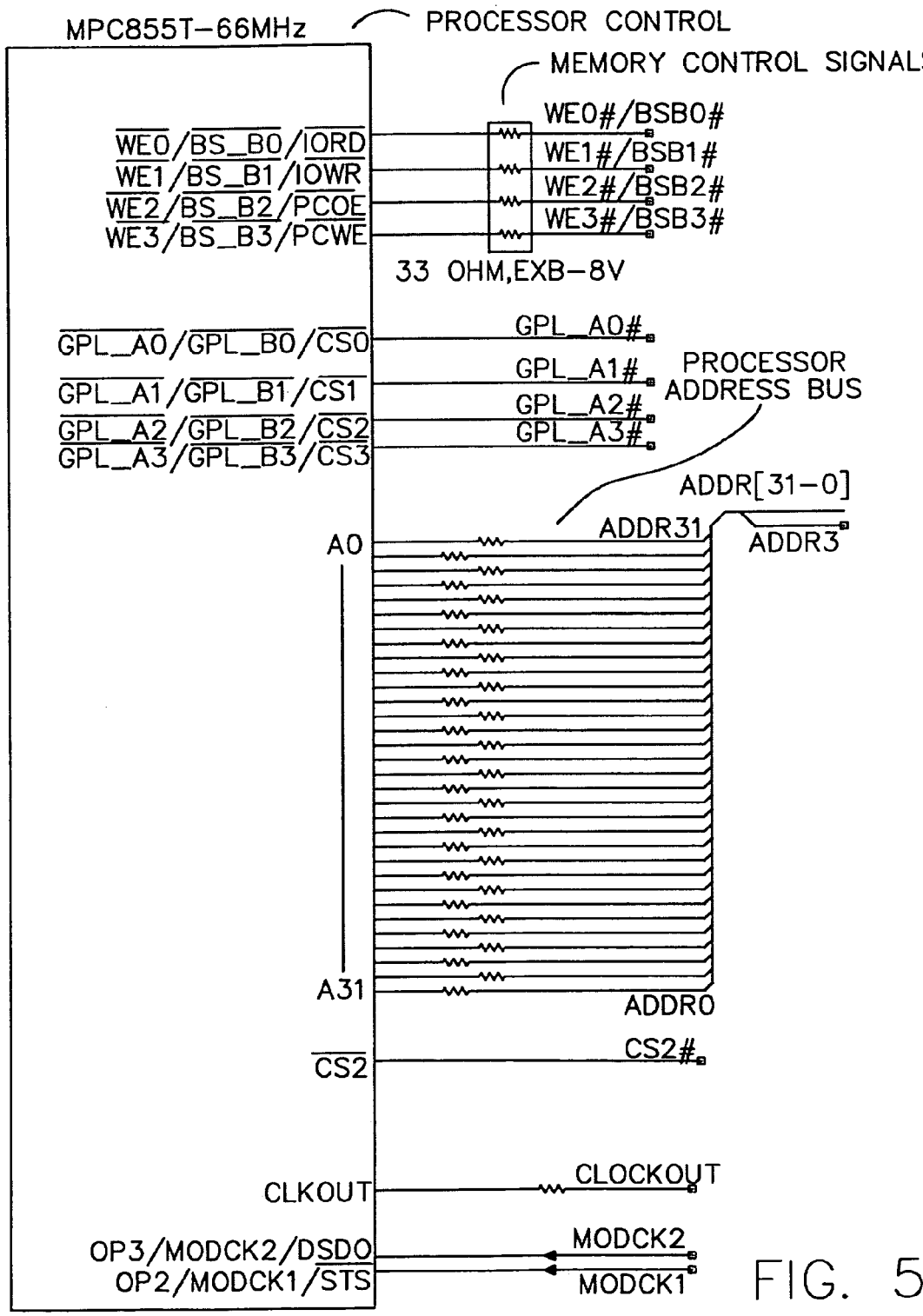
Figure 51G:
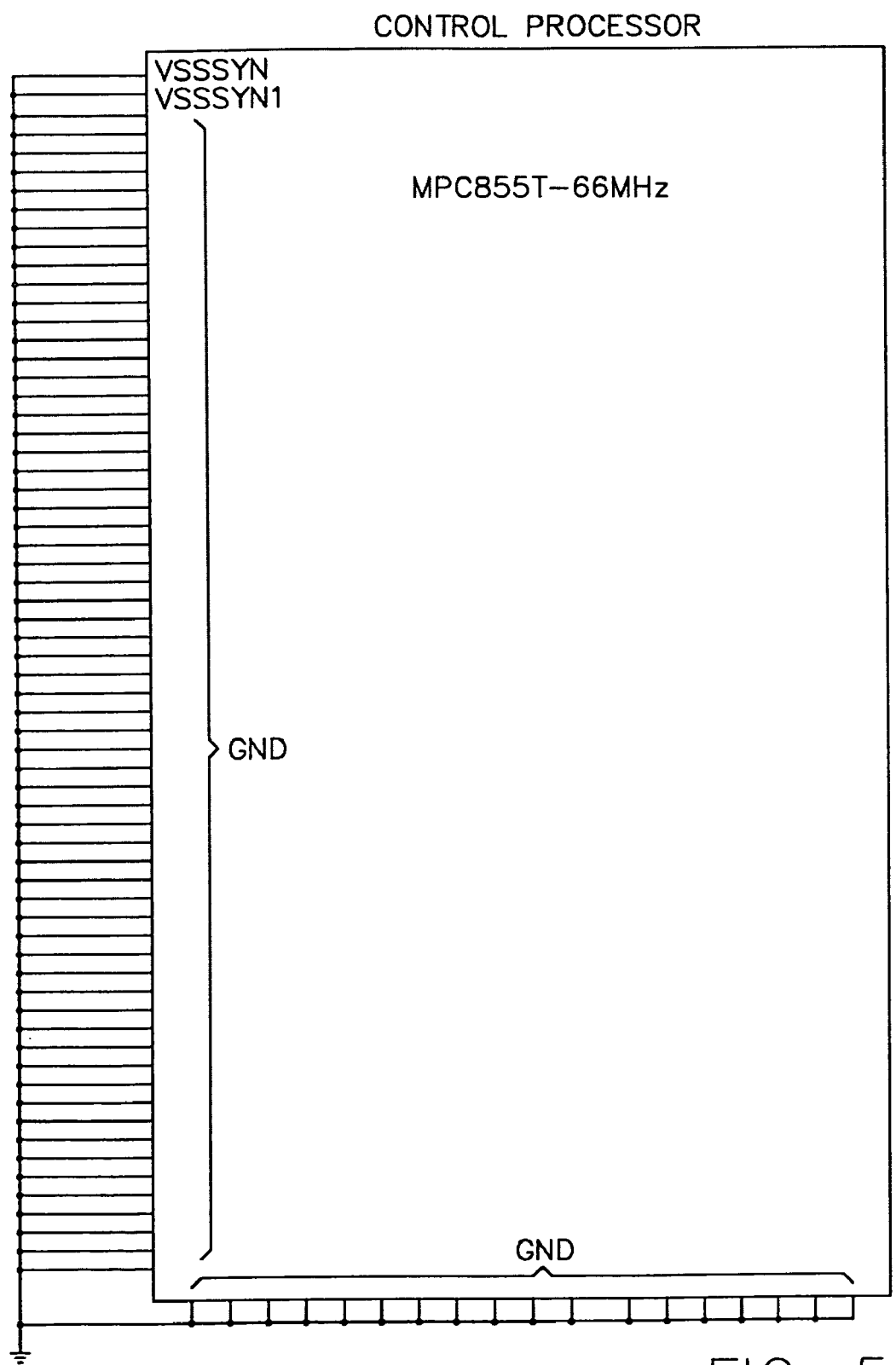
Figure 51H:
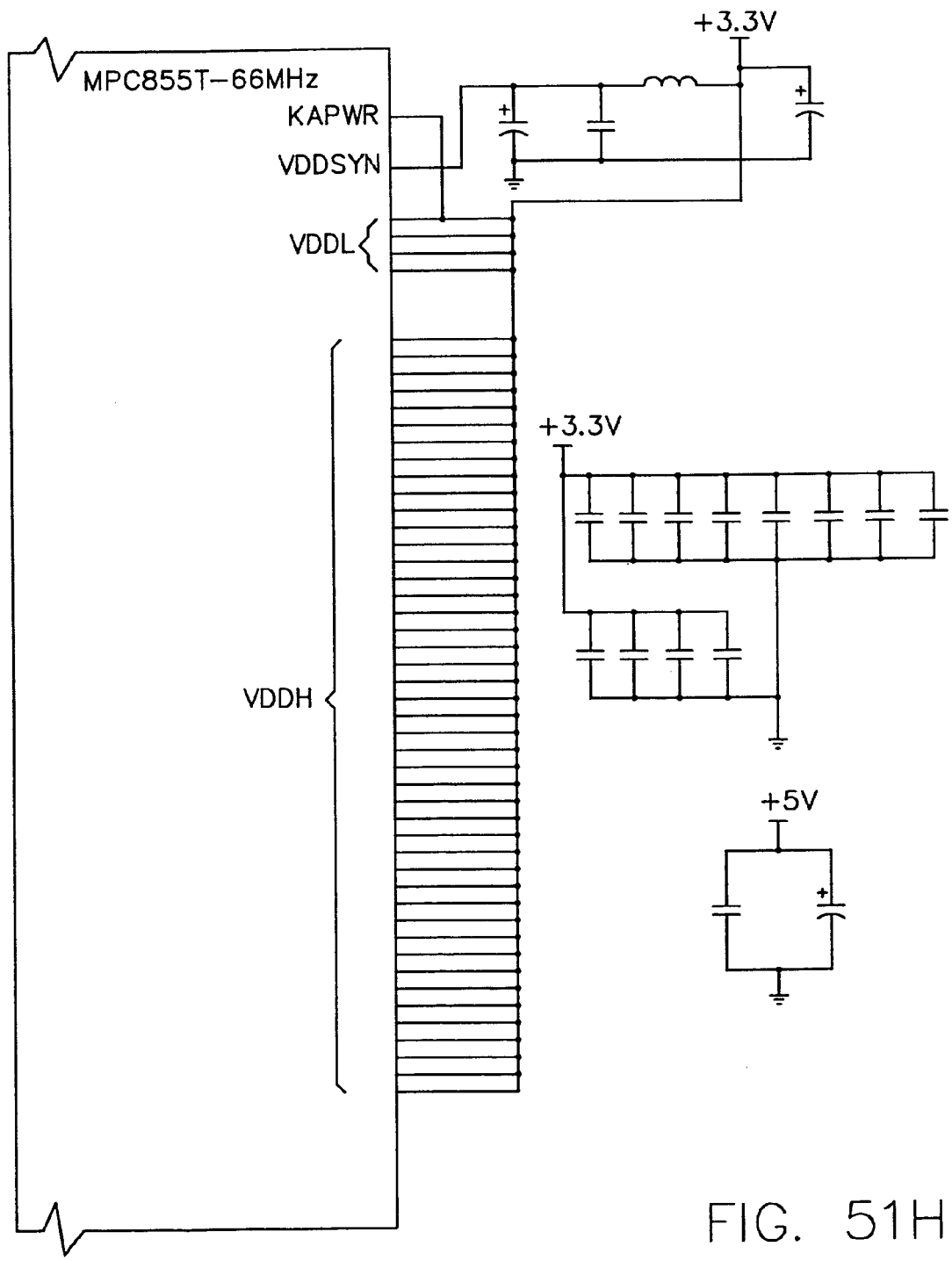
Figure 51I:
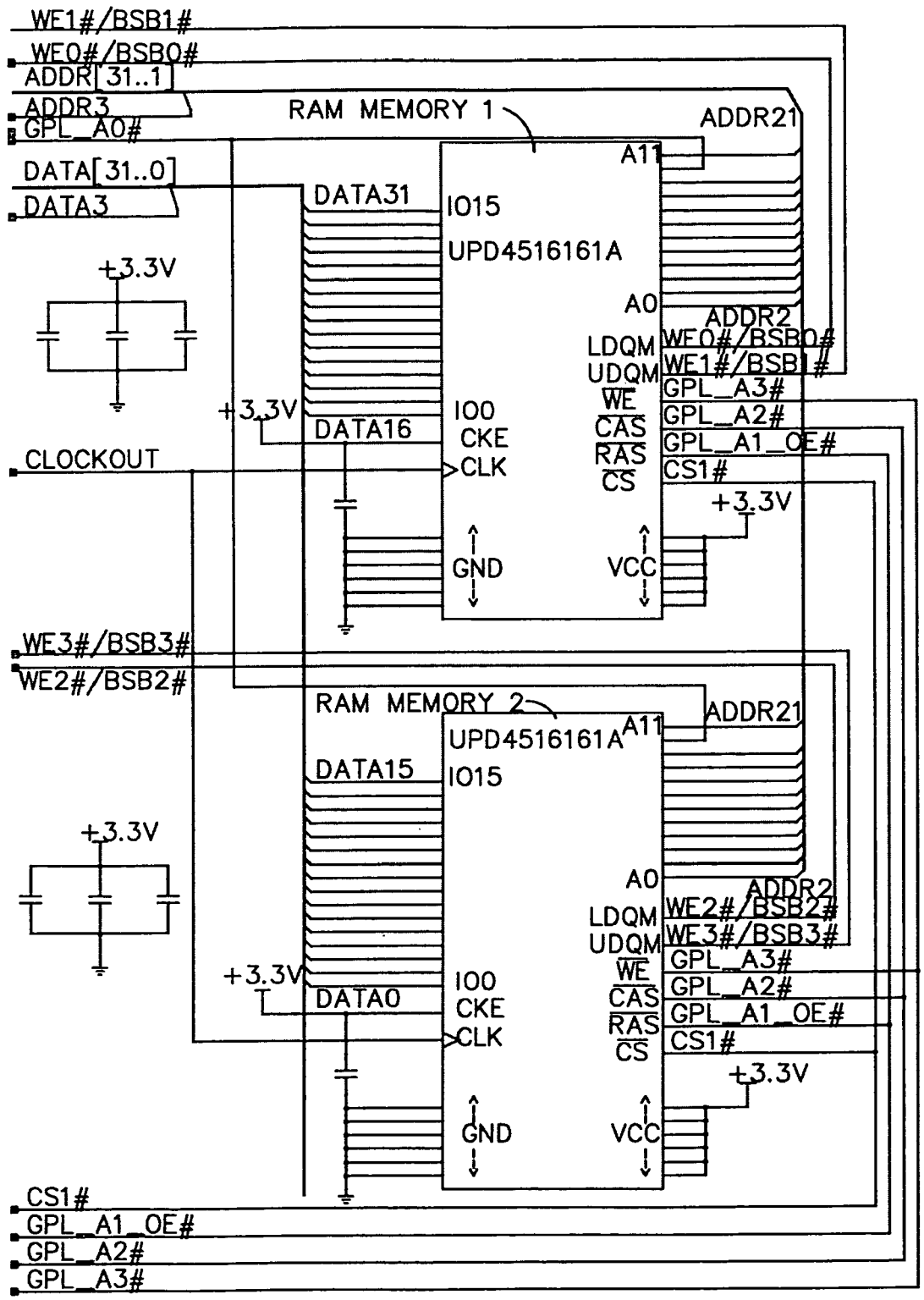
Figure 51J:
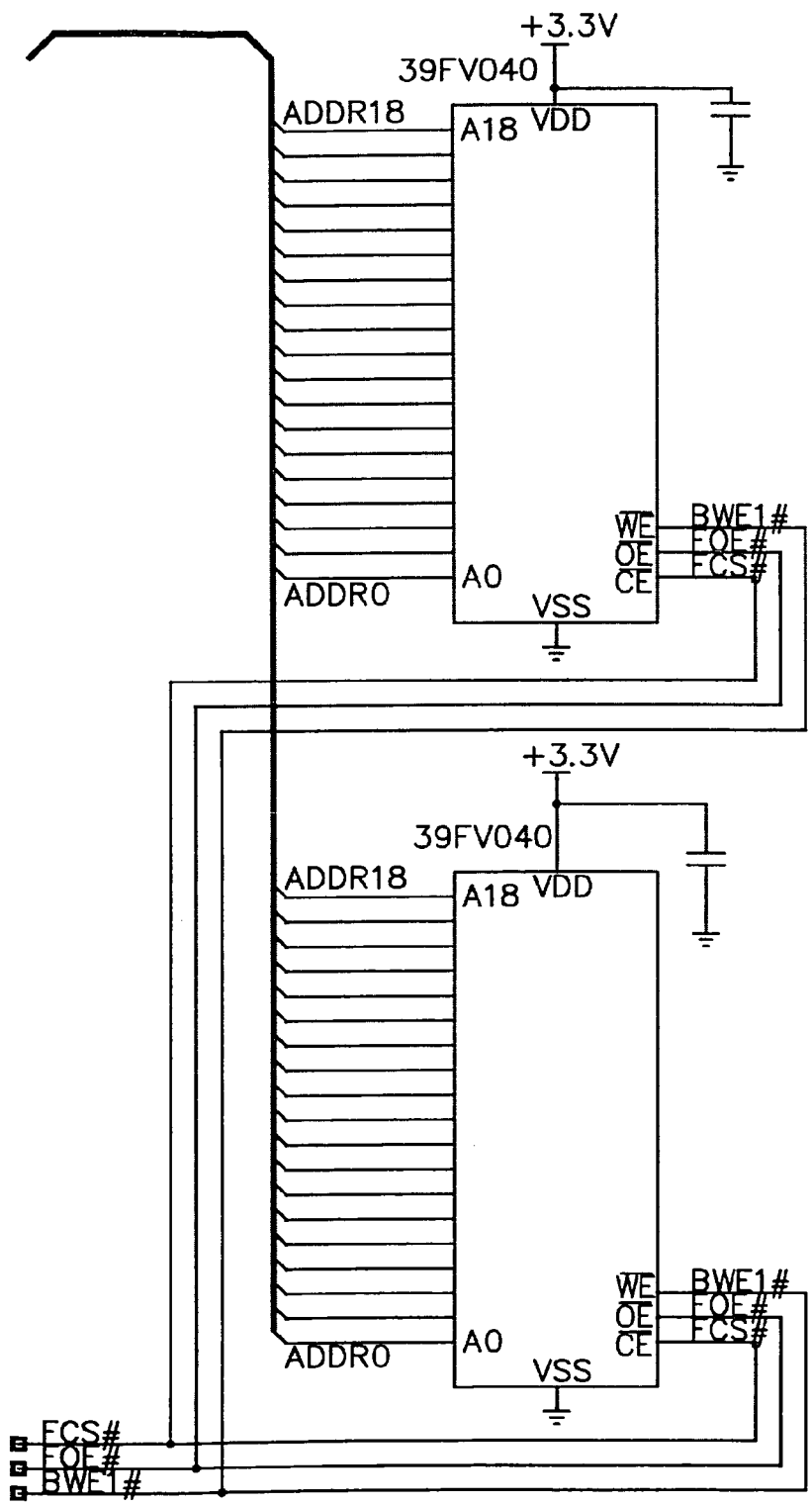
Figure 51K:
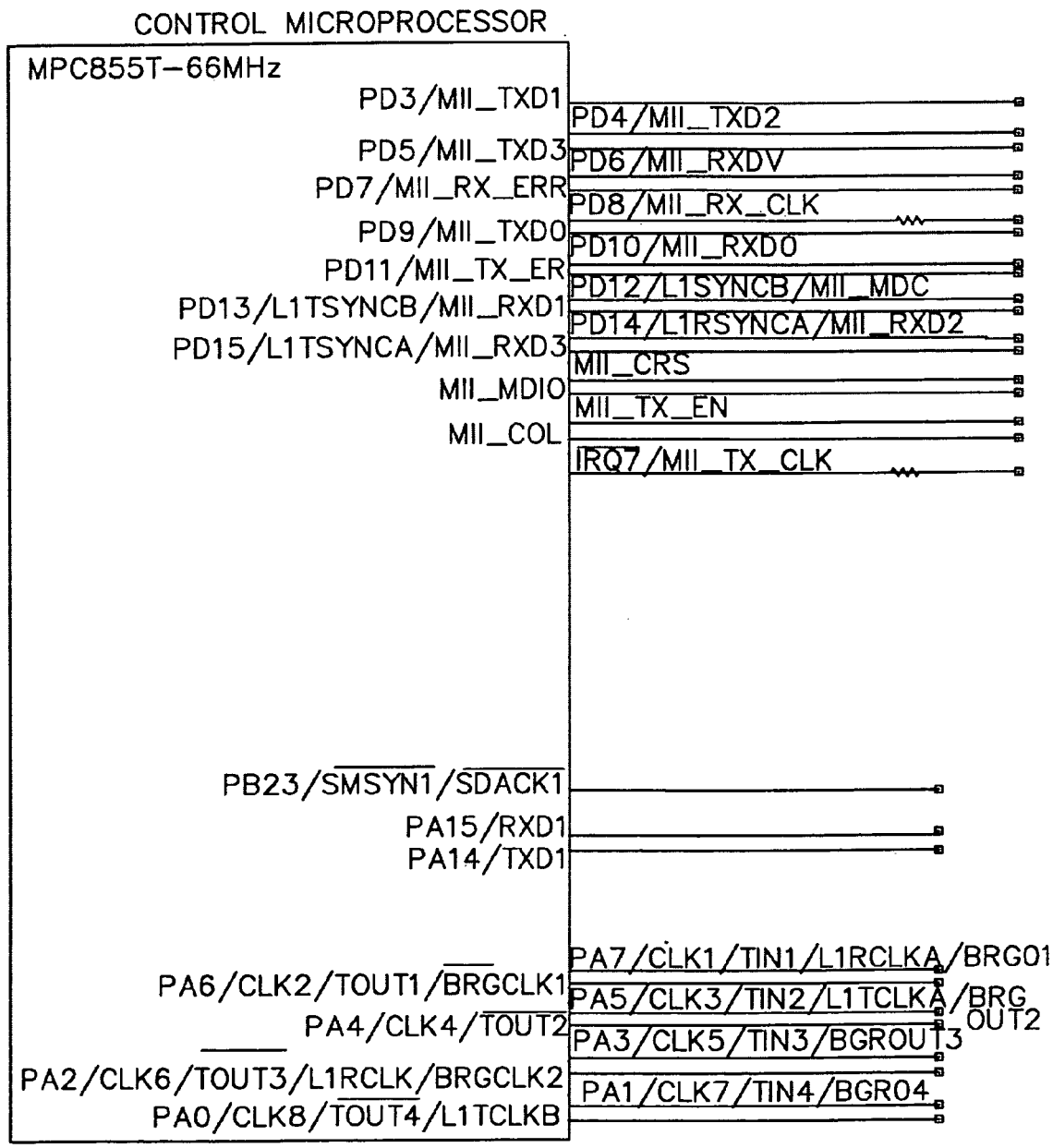
Figure 51L:
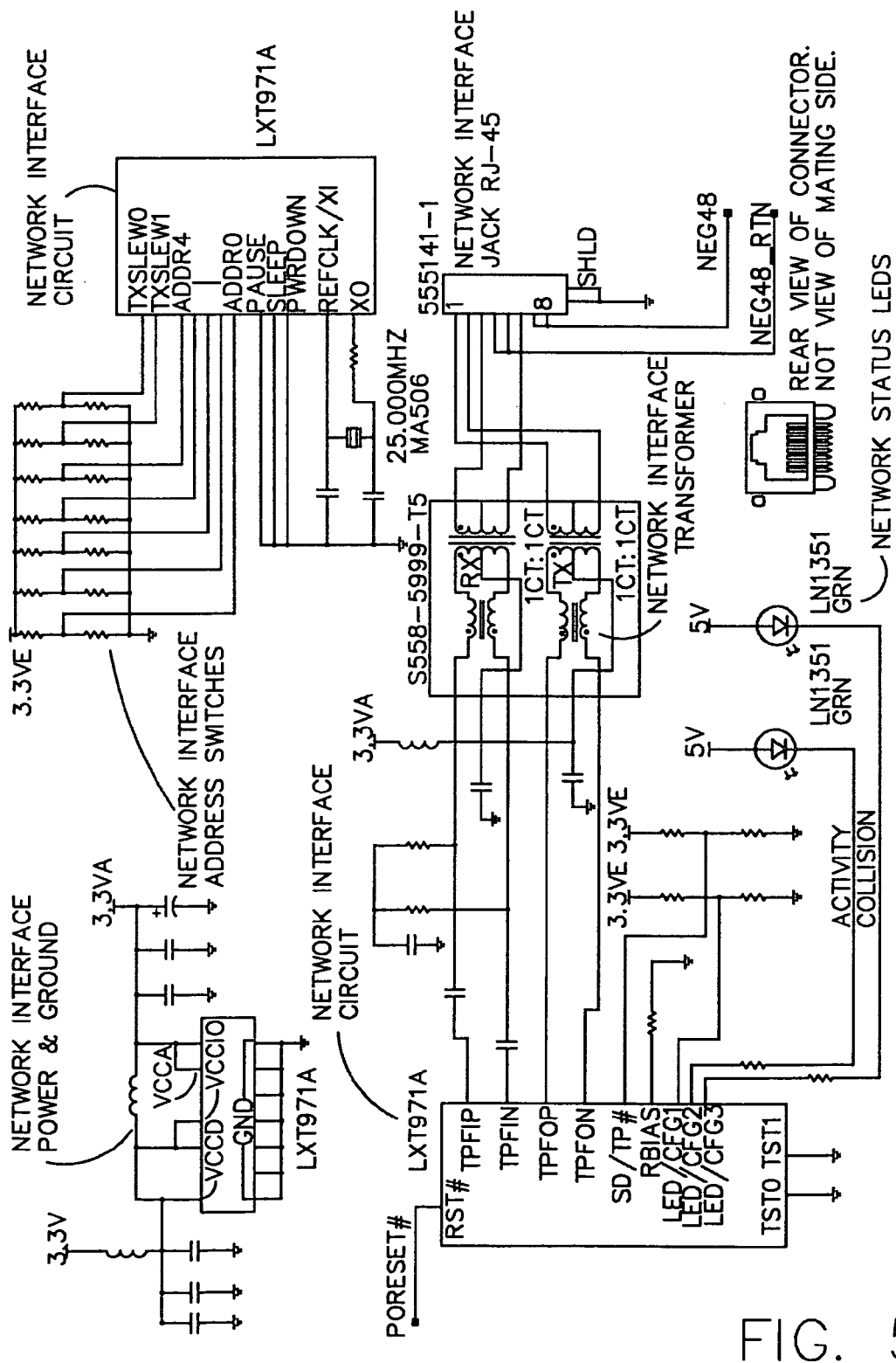
Figure 51M:
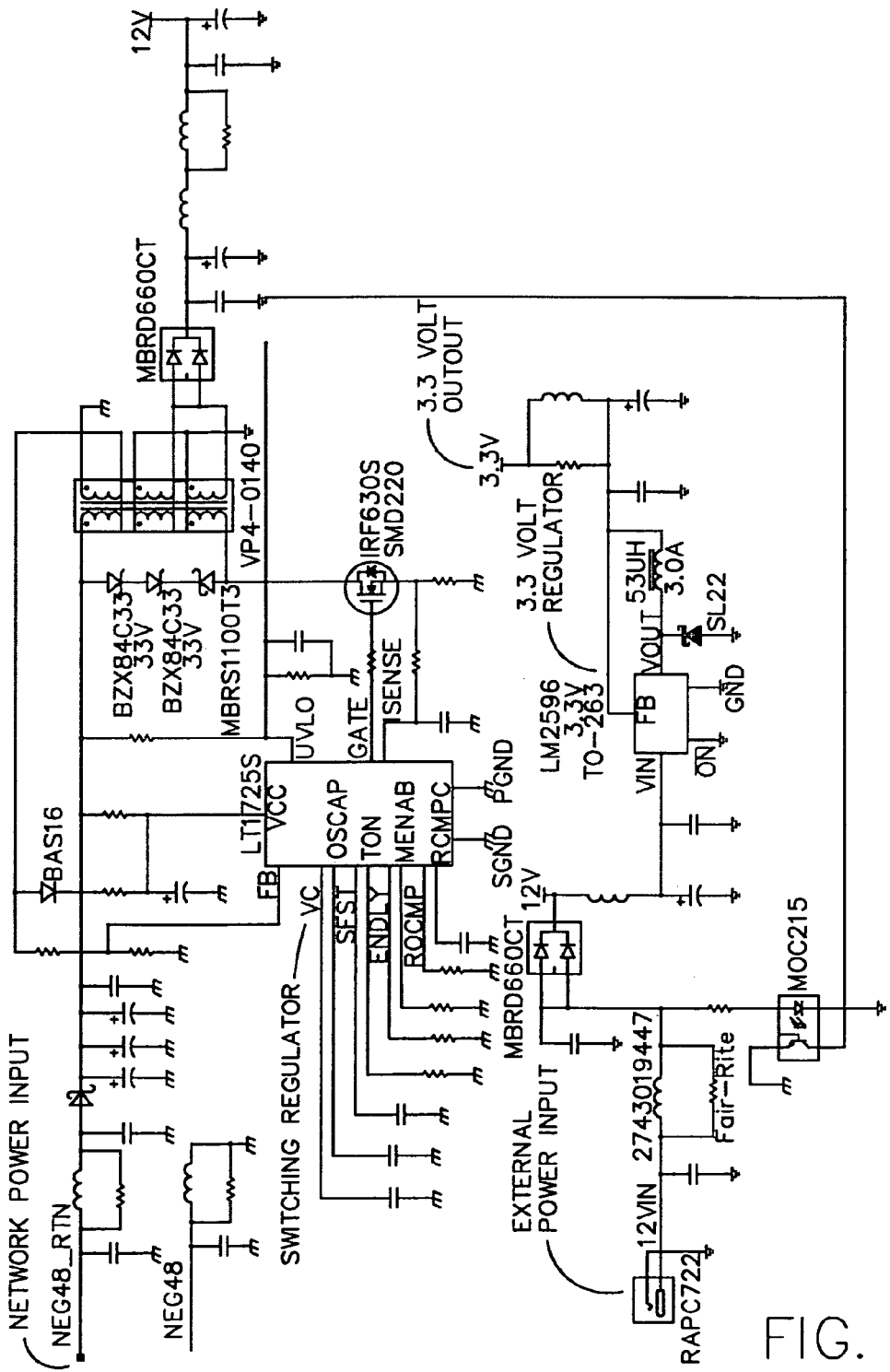
Figure 51N:
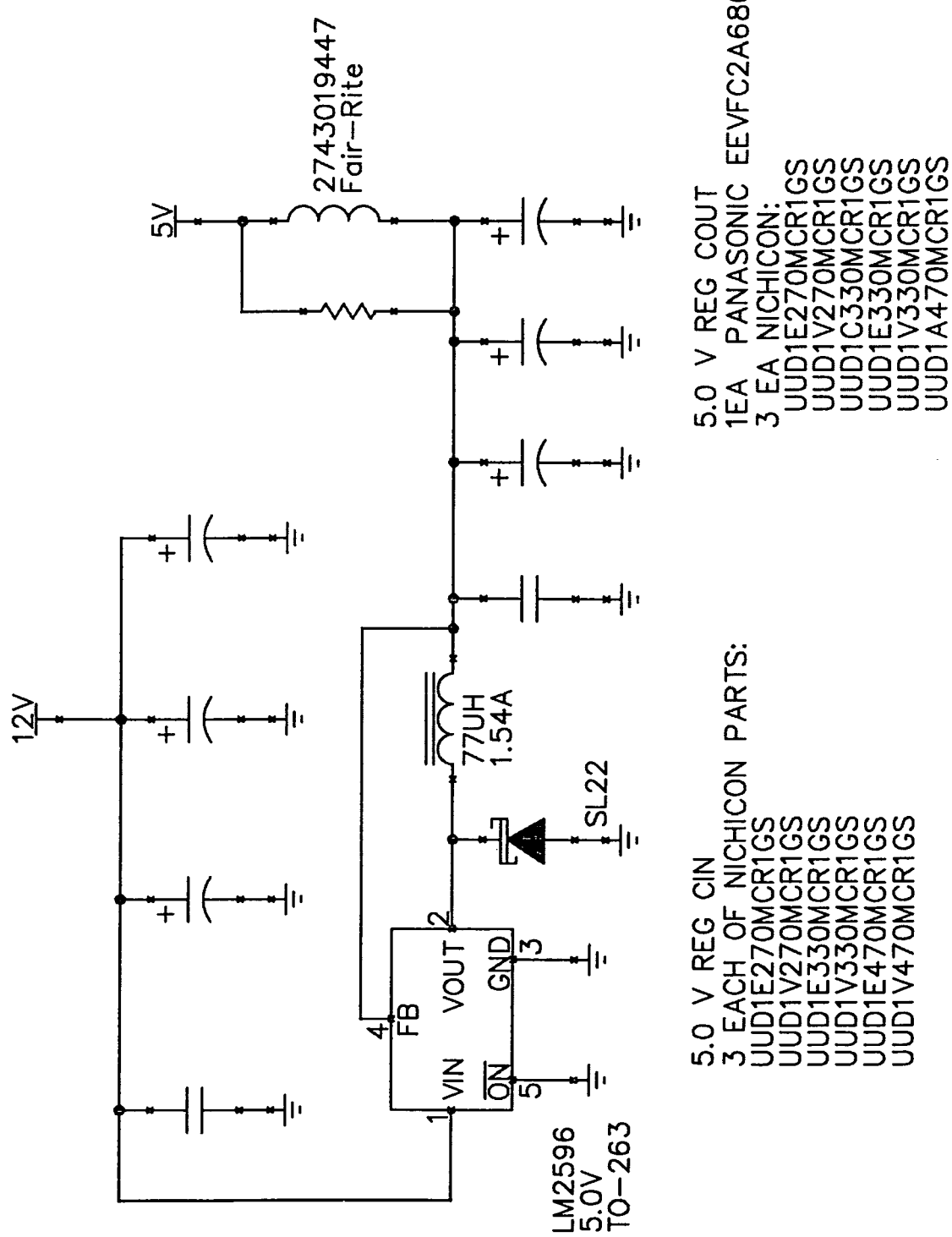
Figure 510:
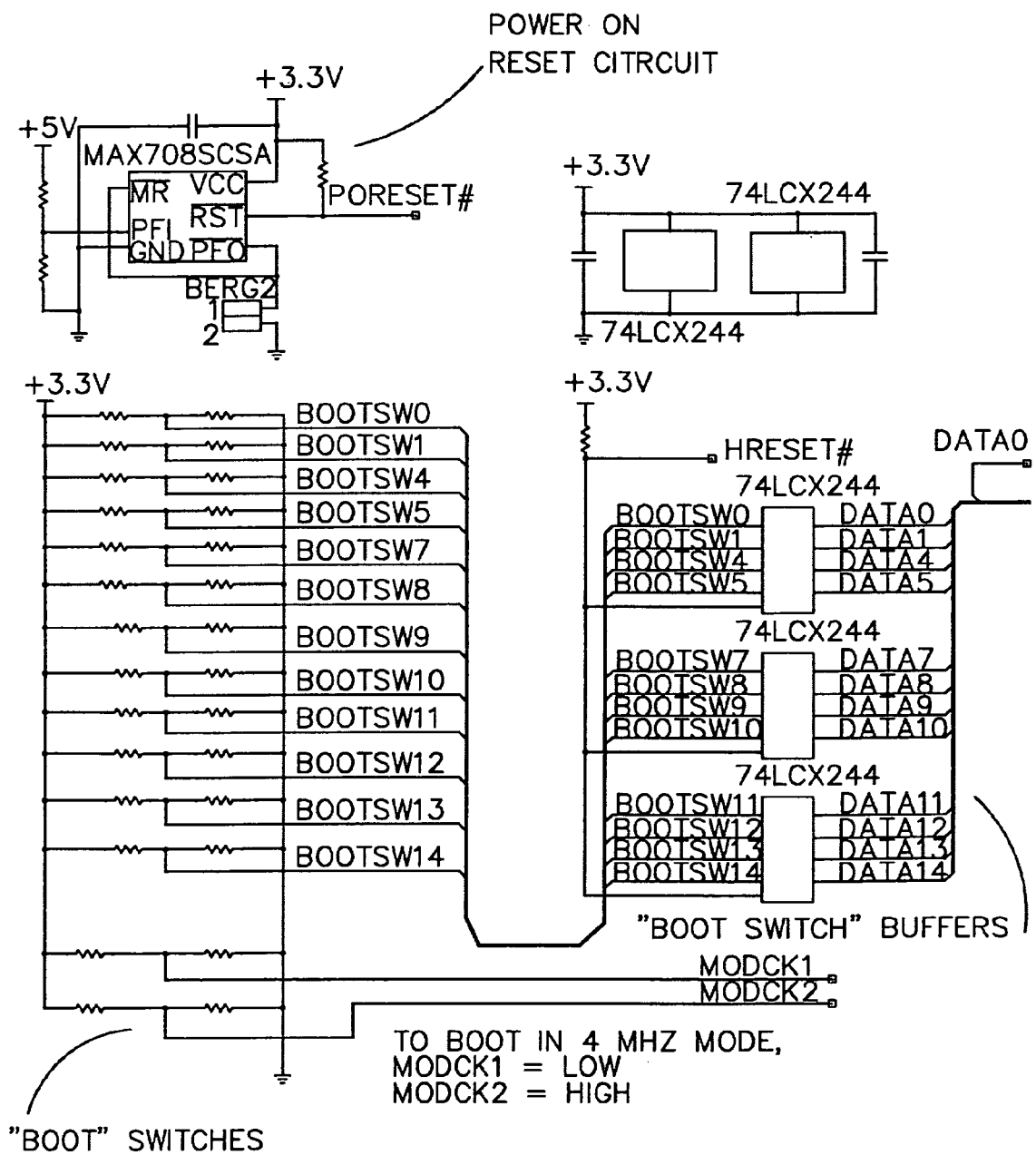
Figure 51P:
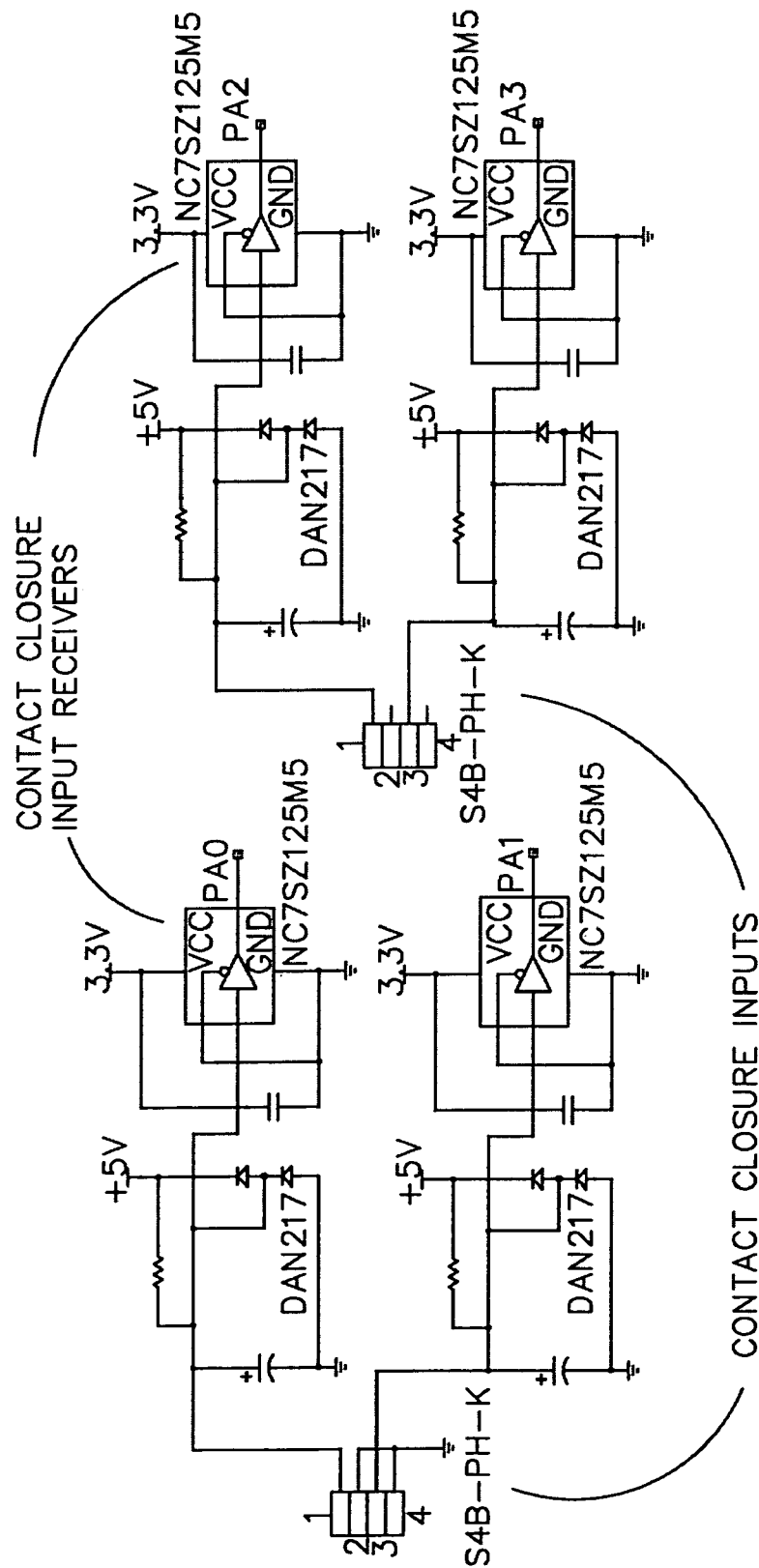
Figure 51Q:
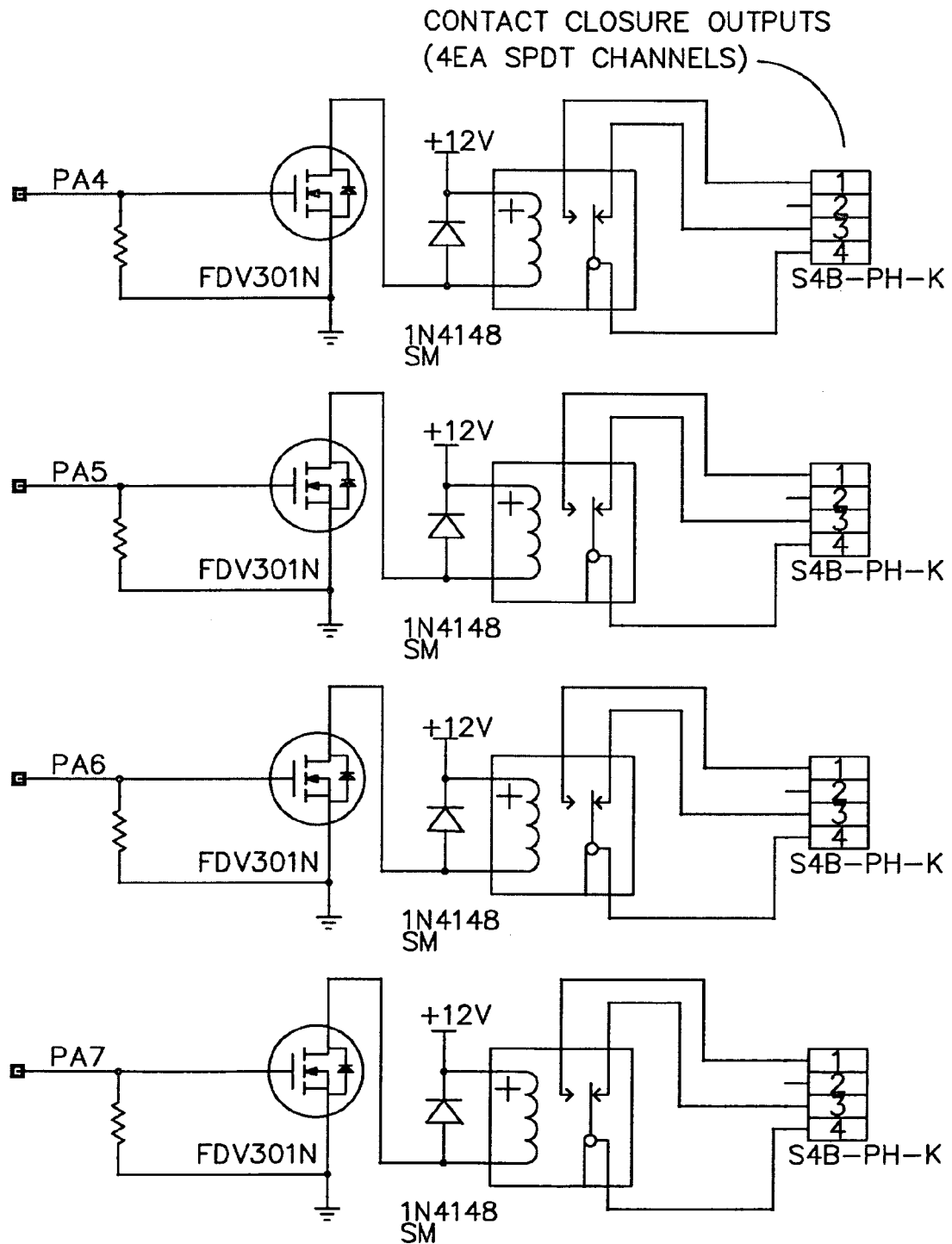
Figure 51R:
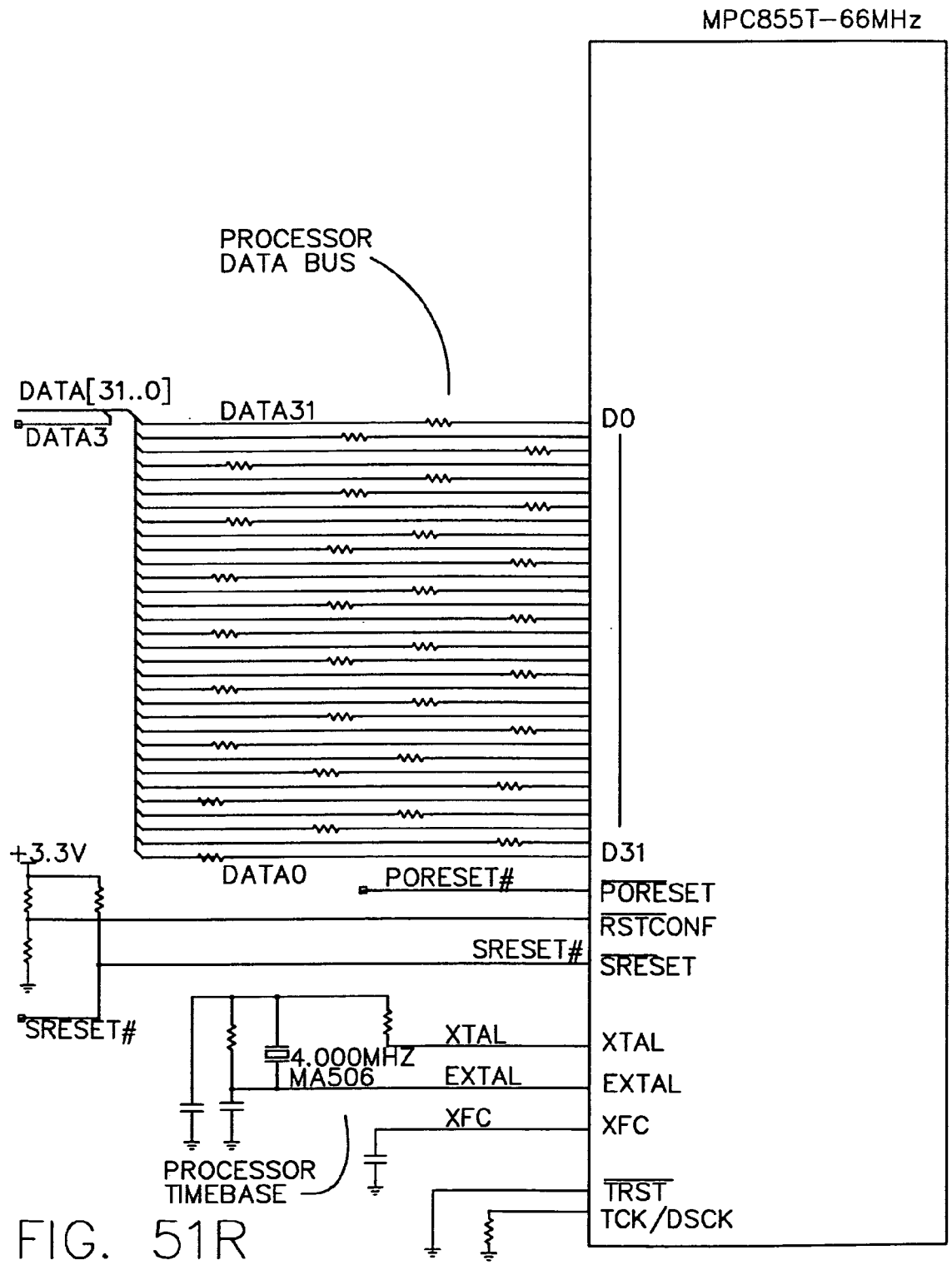
Figure 51S:
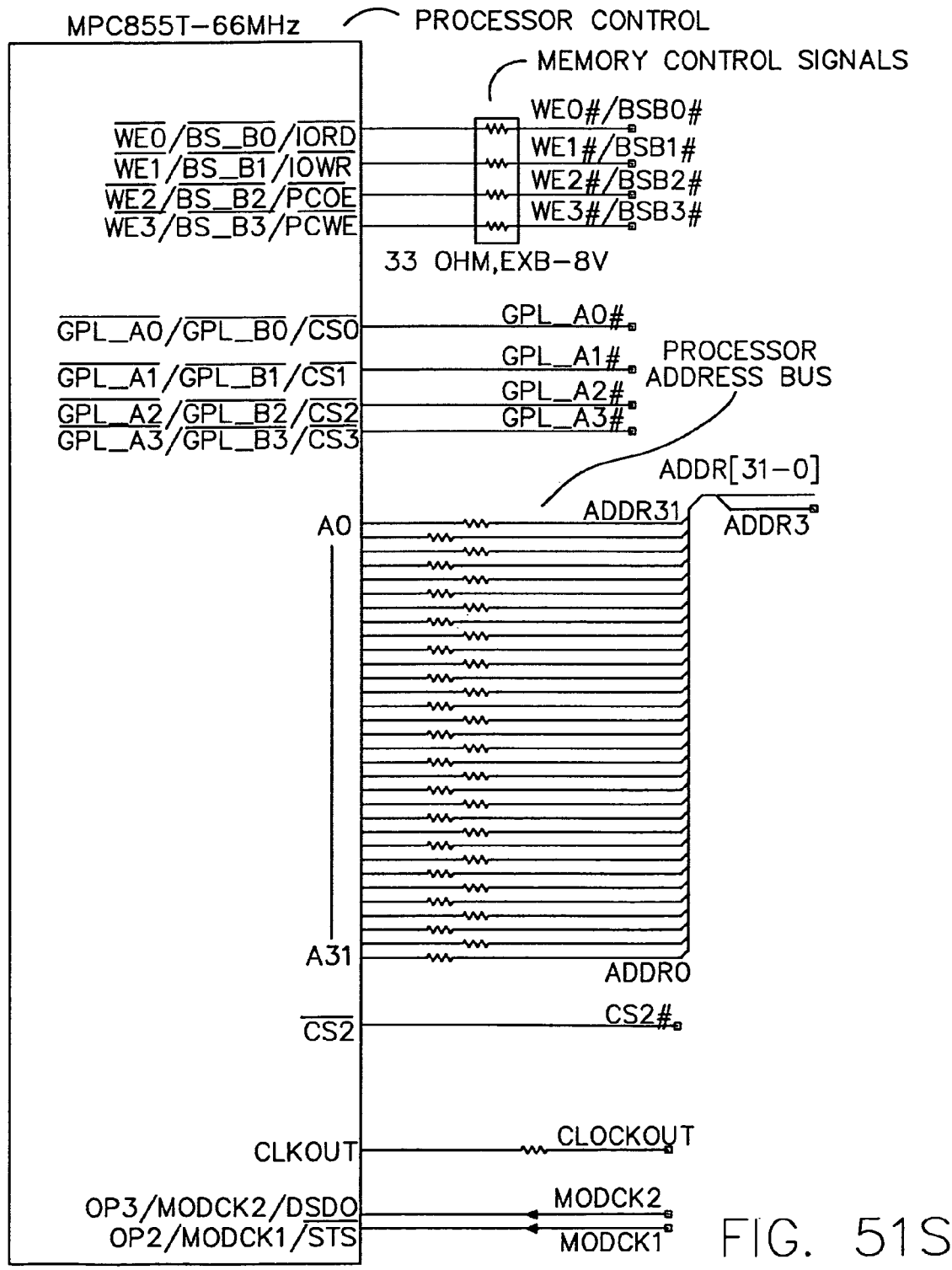
Figure 51T:
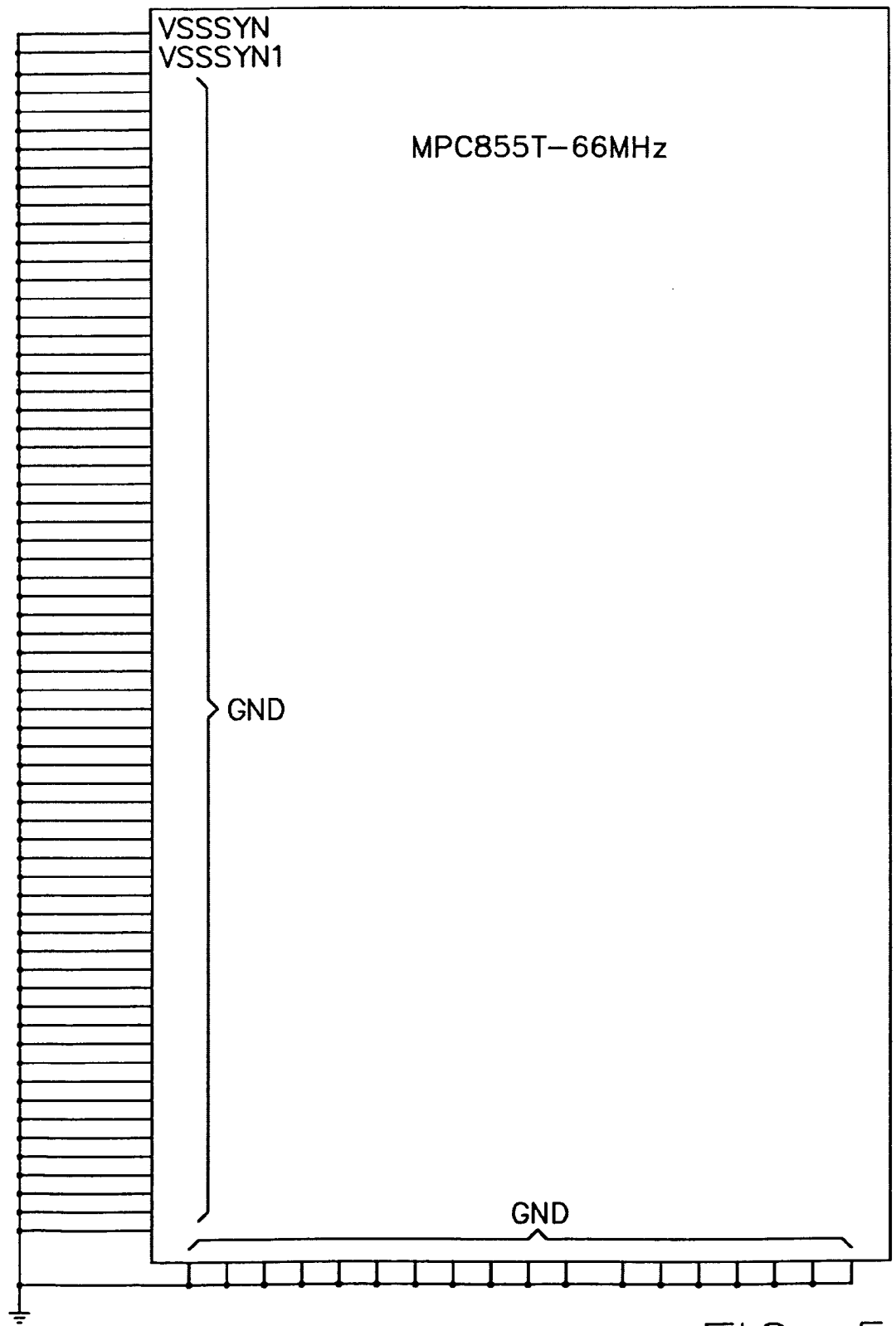
Figure 51U:
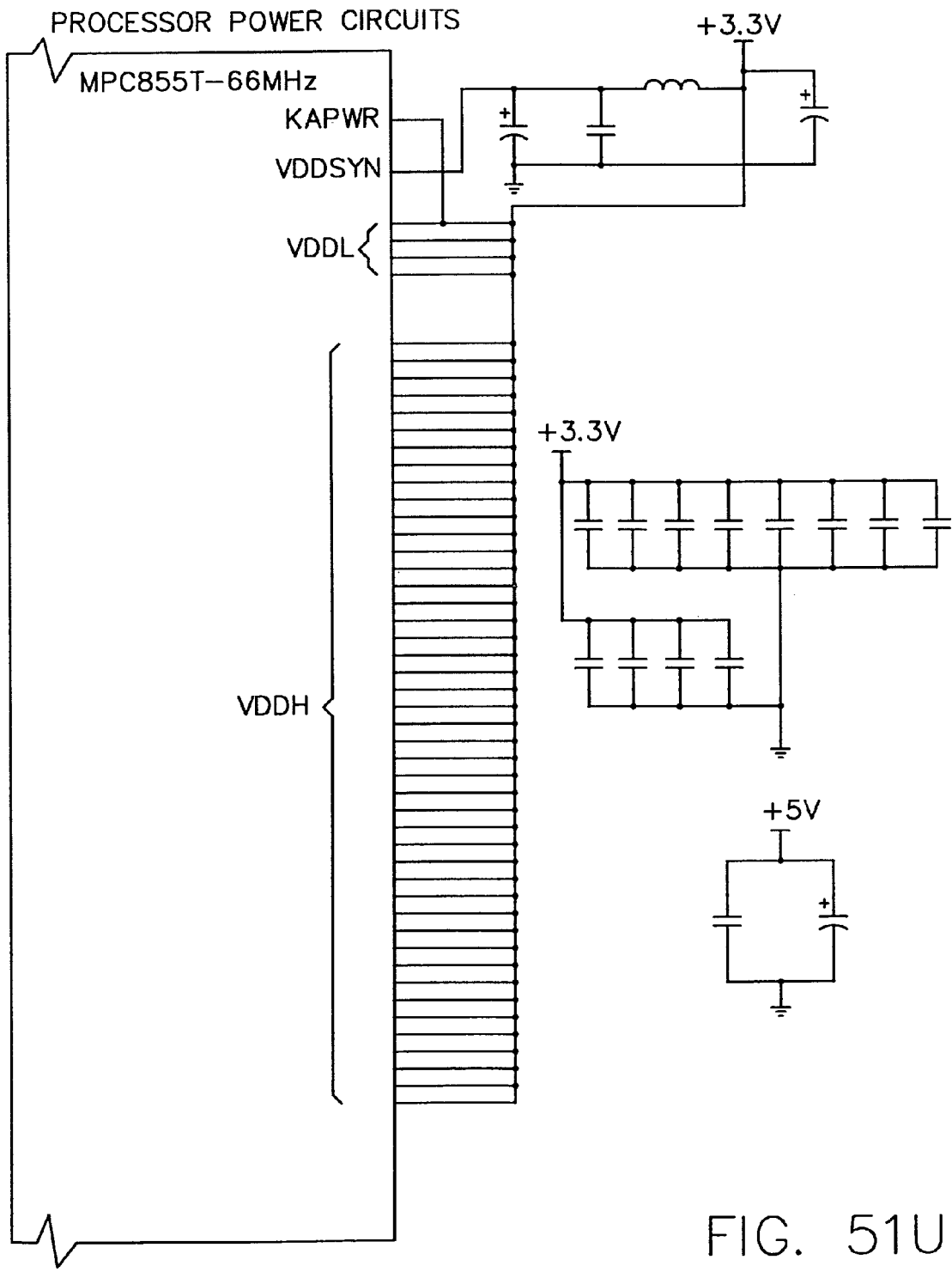
Figure 51V:
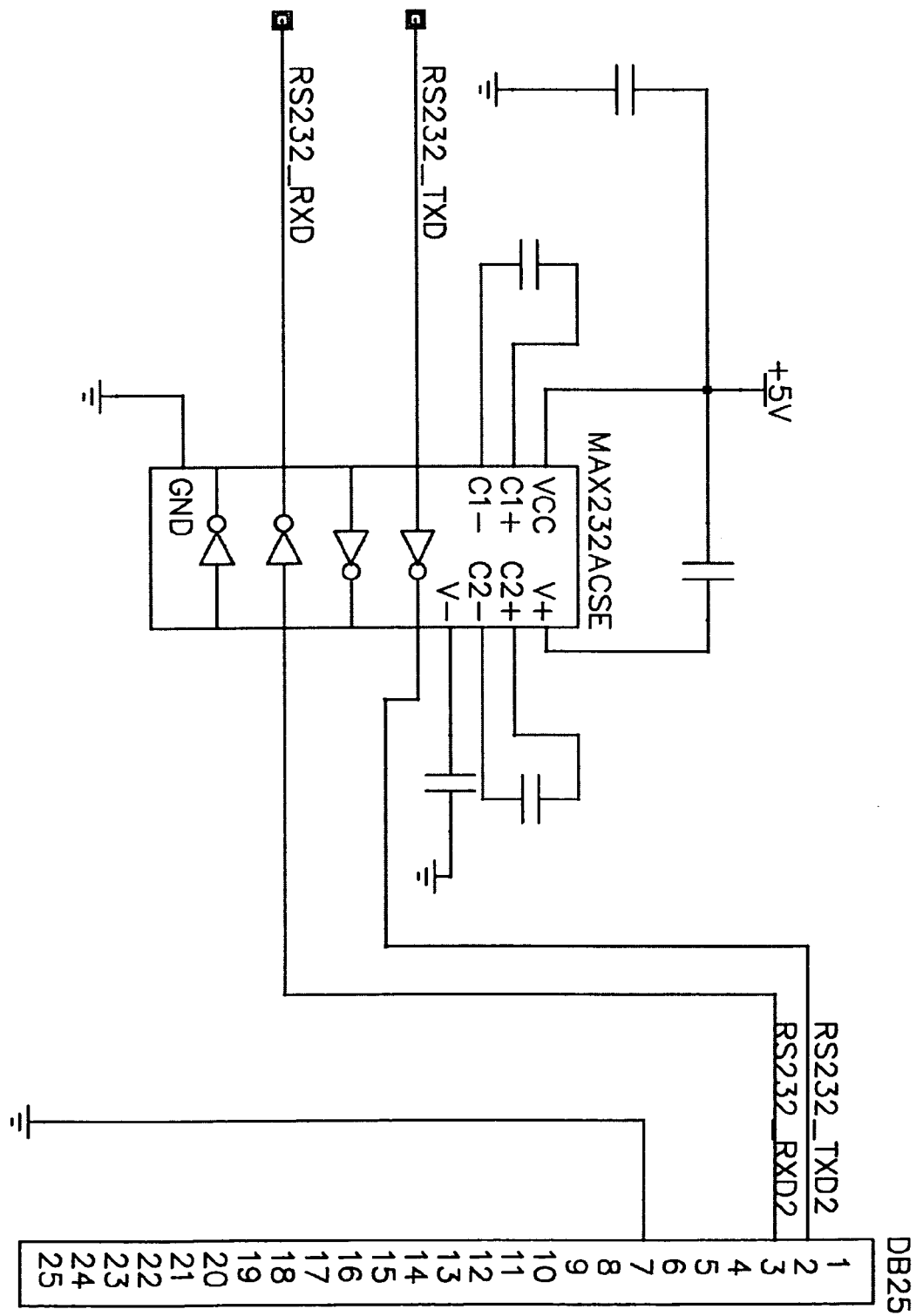
Figure 51W:
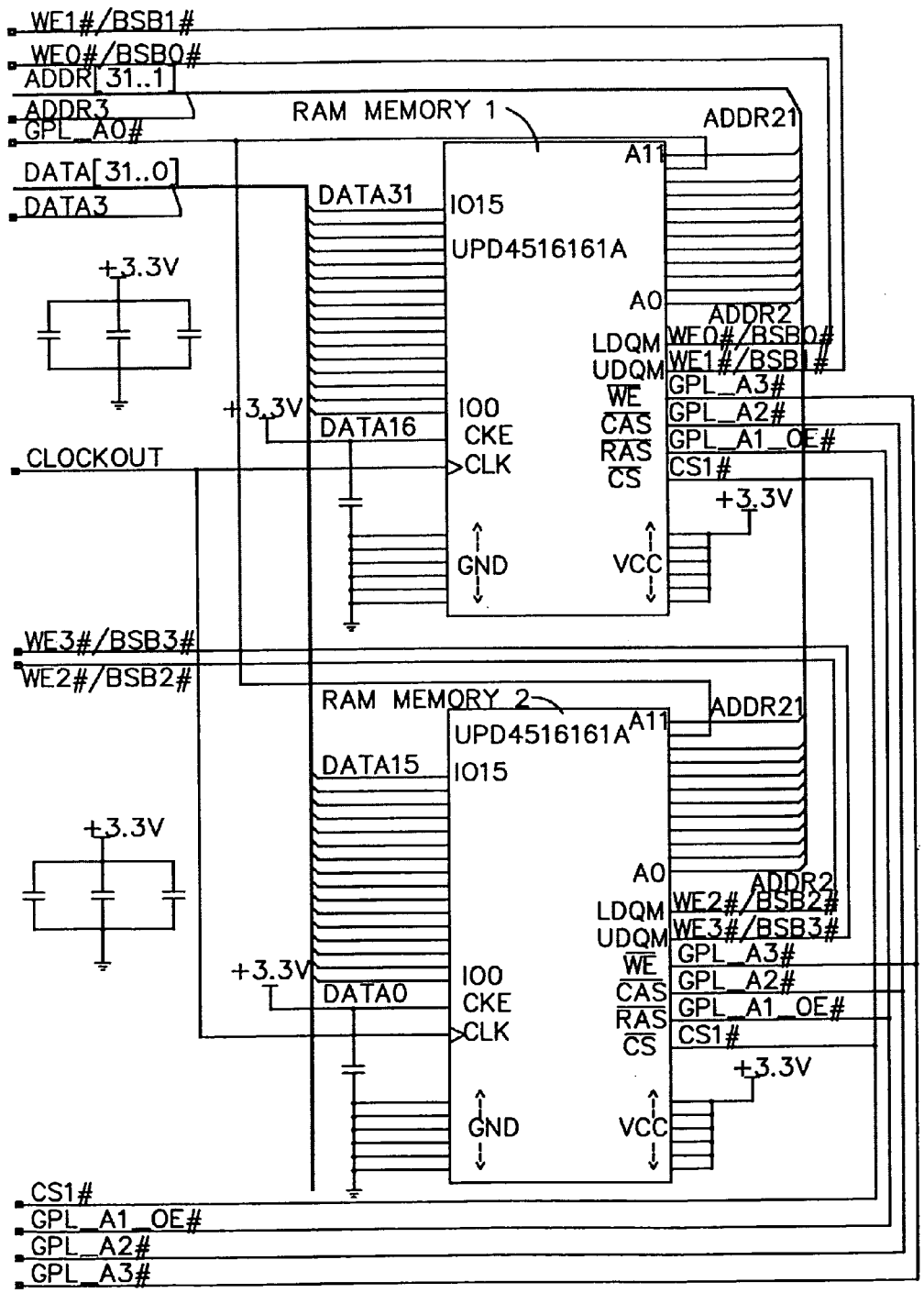
Figure 51X:
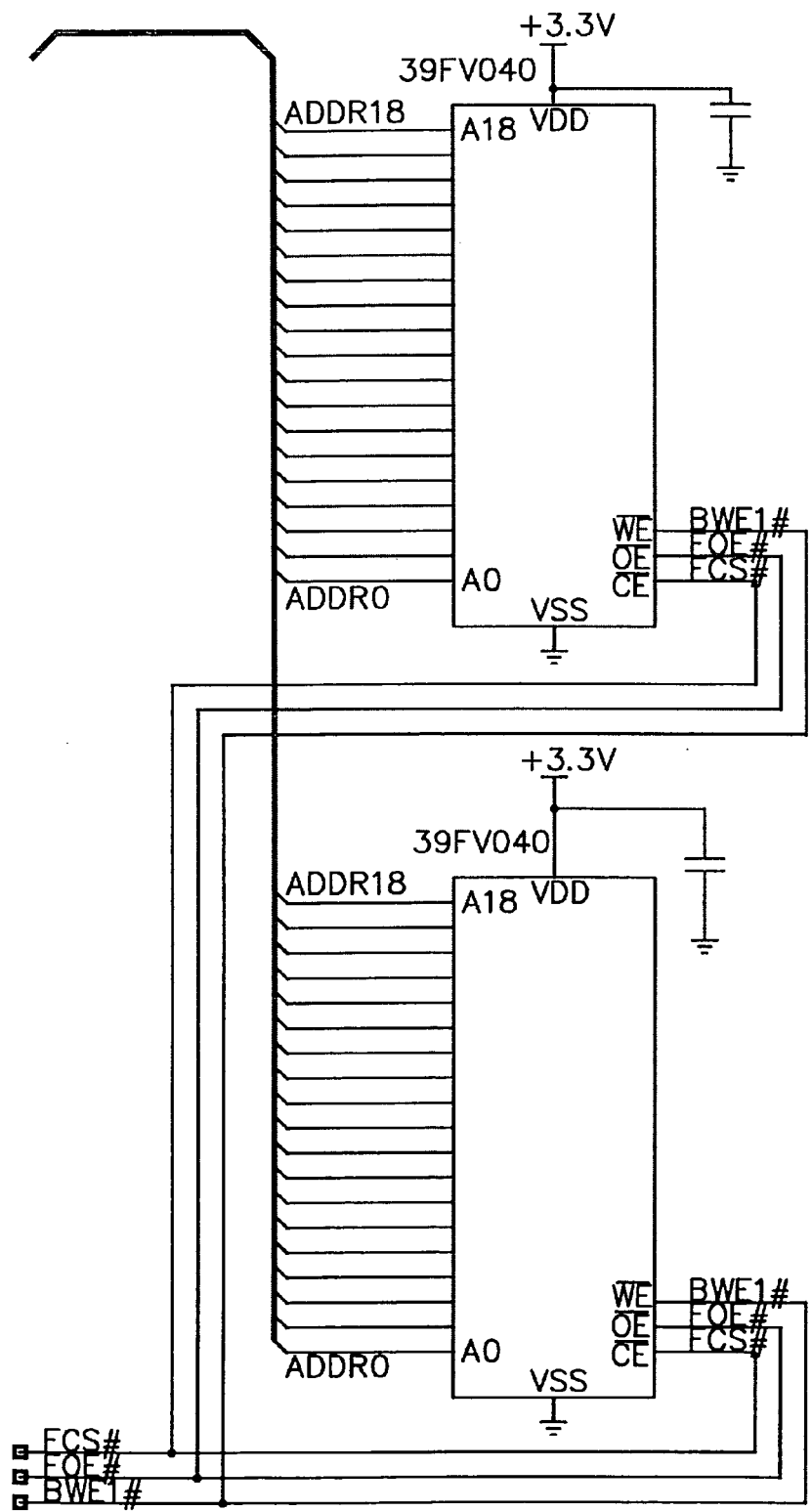
Figure 51Y:
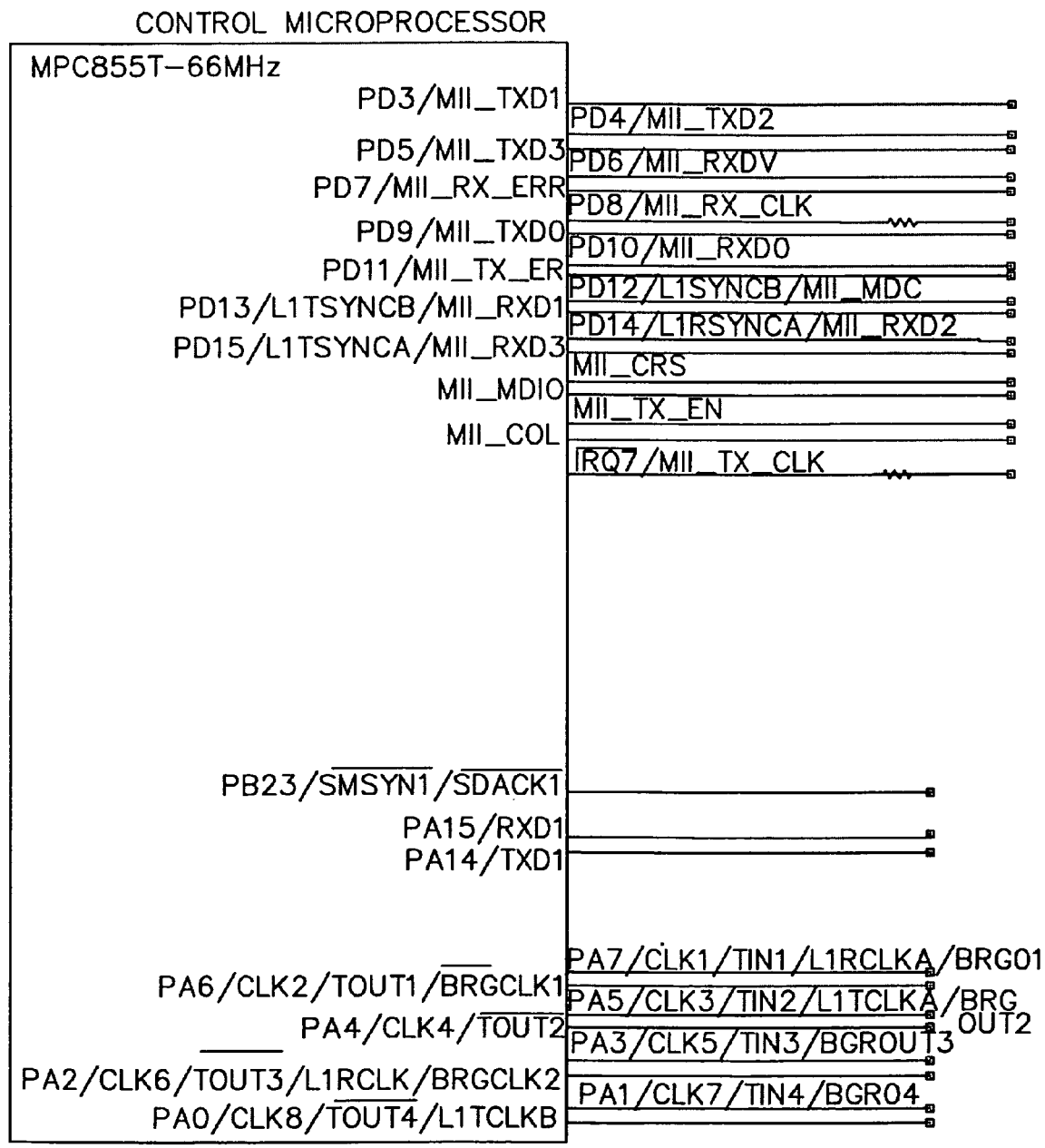
Figure 51Z:
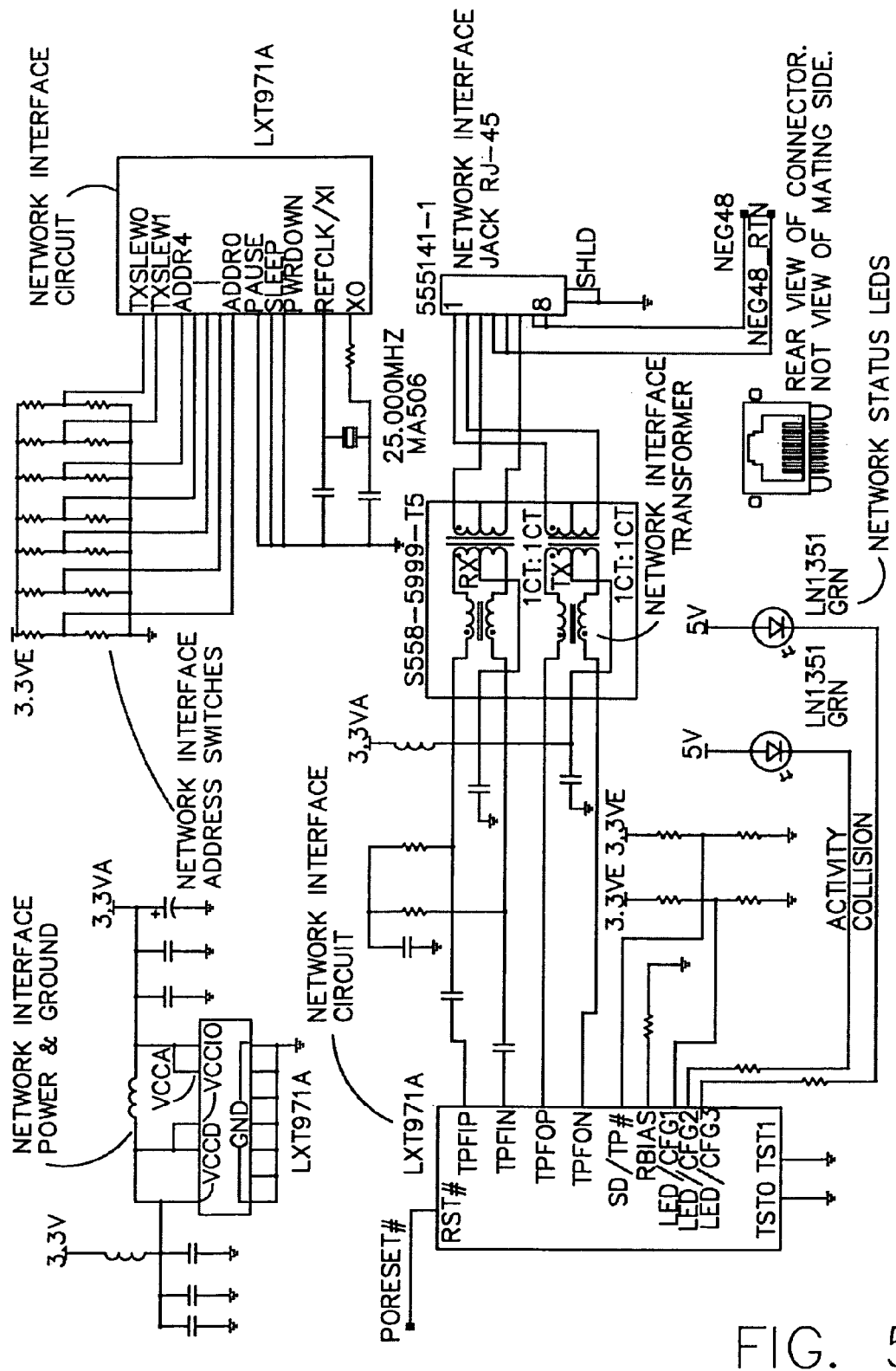
Figure 51A:
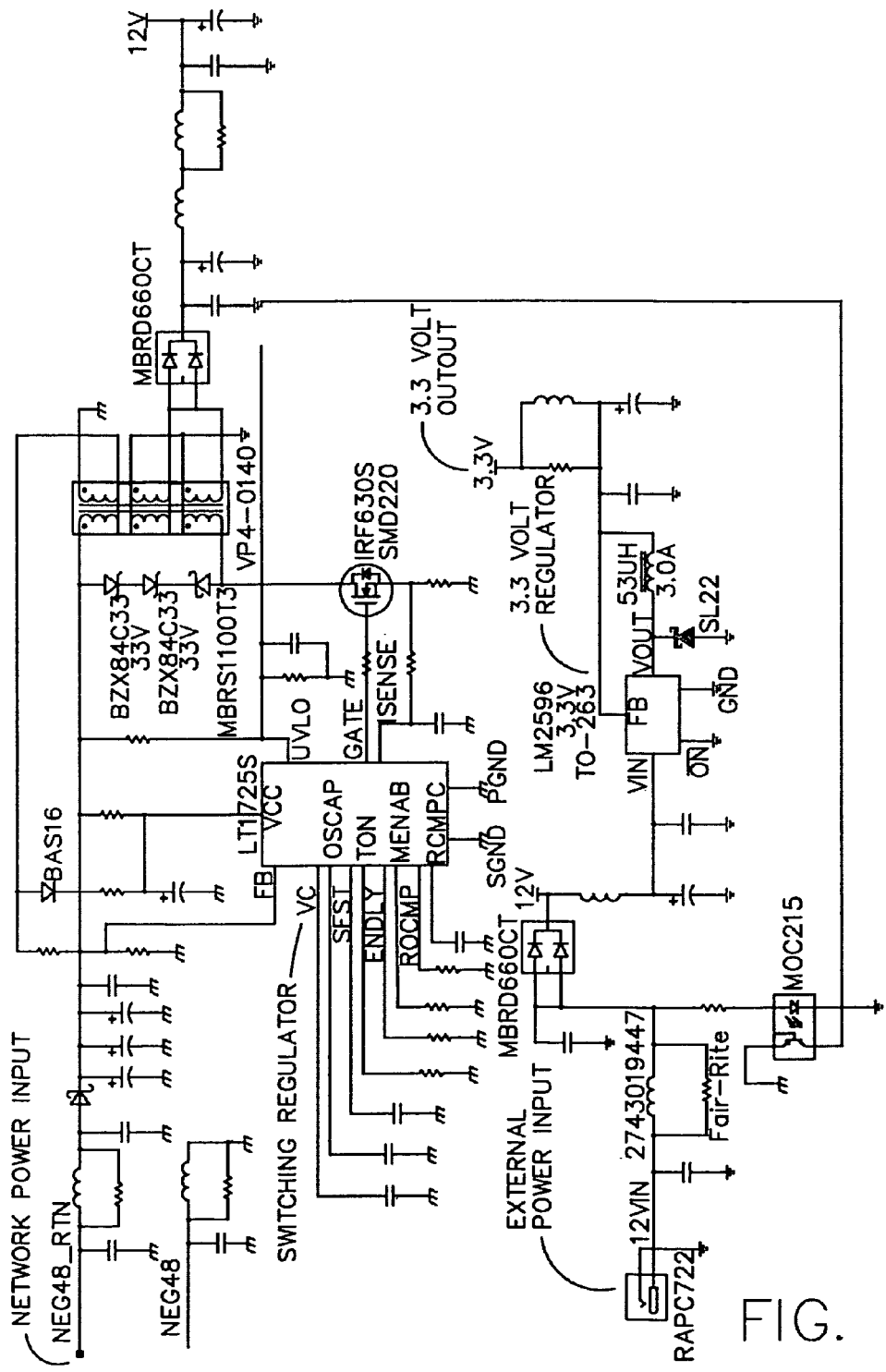
Figure 51B:
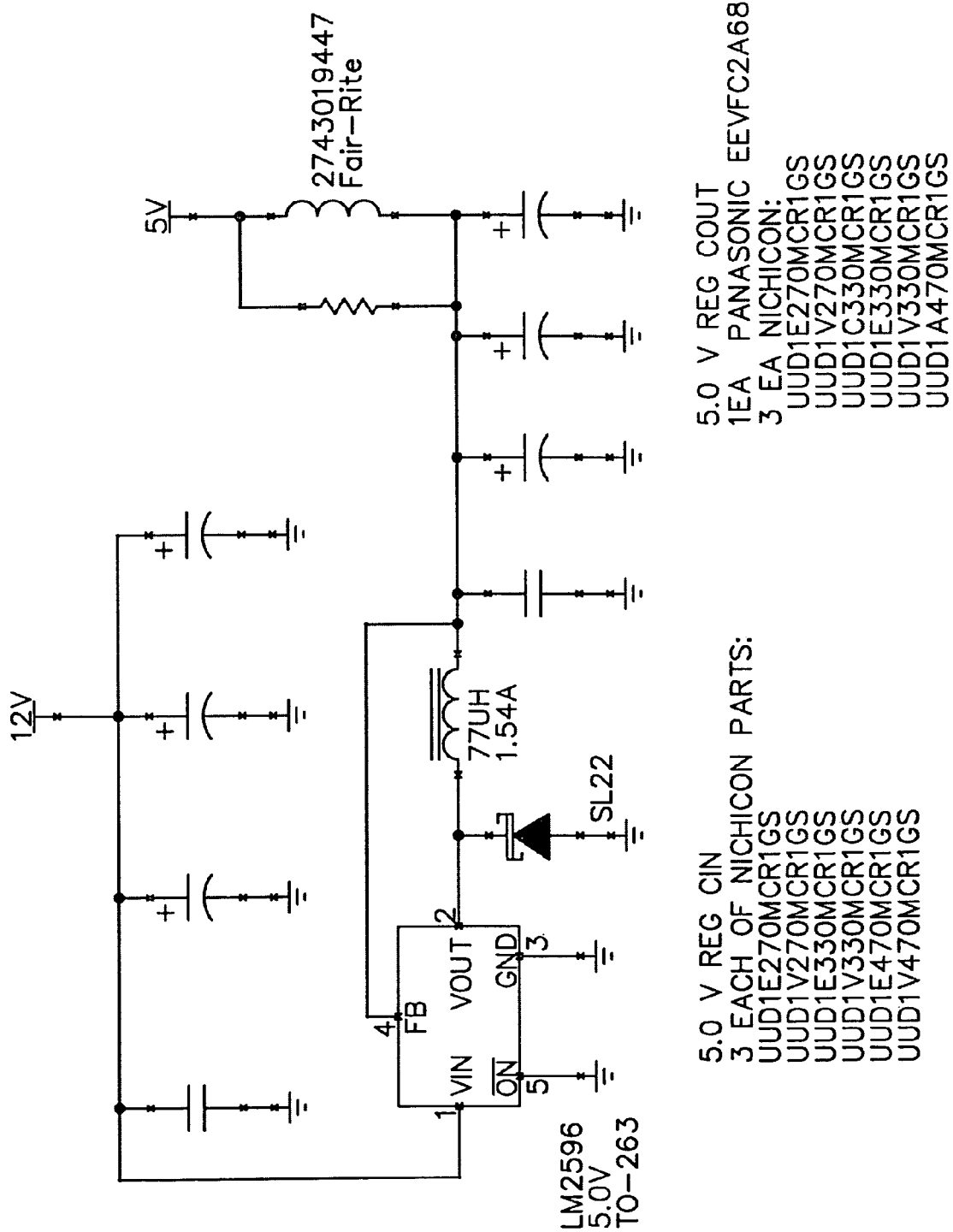

FIG. 50 is block diagram of the circuitry for supporting a multiple appliance security system in accordance with the subject invention. The full schematic is shown in FIGS. 51 and 51A-51*. With reference to FIG. 50, the security appliance 5 includes a system processor 75 having both Read Only Memory (ROM) and Random Access Memory (RAM) components 1025 and 1026, respectively. A contact closure interface 1028 is provided for connecting any combination of simple external appliances to the security appliance center. Specifically, these appliances are generally limited to ON/OFF conditions and responses The RS-232 interface 1030 is provided for connecting more sophisticated external appliances such as, by way of example, the listed appliances and the appliances described elsewhere herein. A DTMF/CLID detector 1032 and phone line circuit monitor 1034 provides connection to an external telephone 1036 and to the telephone network 1038. External power is provided to the system either through the wired LAN interface 80 and the network power module 1040. External power may also be provided by the power supply 289 or through the option AC power brick 1042. The system is capable of wireless connection to the network 90 via the wireless network interface 85 and the wireless access point 87, or alternatively by wired connection to the network via network interface 80.

While certain embodiments and features of the invention have been described in detail herein, it will be readily understood that the invention includes all modifications and enhancements within the scope and spirit of the following claims.

The invention claimed is:

1. An appliance for a network based security system, the network operating according to a packet switching protocol, comprising:
   a sensor component adapted for generating a signal in response to a condition present at the sensor component;
   a processor for generating a digital output signal corresponding to the sensor component signal;
   a network interface for transmitting the digital output signal via a digital network, wherein the sensor is a video sensor and the signal comprises a video signal, the appliance further comprising:
   an analog-to-digital converter for converting the analog video signal to a digital signal;
   a motion video buffer;
   an mpeg compressor associated with the motion video compressor;
   a still frame buffer;
   a jpeg compressor associated with the still frame buffer;
   a multiplexer for combining the output of the mpeg compressor and the jpeg compressor for generating a combined output signal to the processor for distribution via the network interface over the network, wherein there is further comprising:

an audio sensor component;

an analog-to-digital converter for converting the analog audio signal to a digital signal;

an audio compressor associated with the audio sensor component for introducing a signal to the multiplexer, whereby the multiplexer produces a combined digital signal comprising a video and an audio component for distribution via the network interface over the network.

2. A device adapted to be connected to an internet protocol network, the device comprising:

a housing;

at least one sensor supported by the housing, the at least one sensor providing digital sensor data, the digital sensor data relating to at least one condition of an environment external of the housing, the at least one sensor including a camera, the camera being configured to provide digital image data;

at least one digital processor supported by the housing, the at least one digital processor being in communication with the at least one sensor for receiving the digital sensor data;

at least two compressors supported by the housing, the at least two compressors being configured to congress digital image data according to respective of at least two compression protocols, the at least two compressors providing respective of at least two differentiated sets of compressed digital image data; and a network interface supported by the housing, the network interface being in communication with the at least two compressors for receiving the at least two differentiated sets of compressed digital image data, the network interface being adapted to be connected to the internet protocol network for communicating to the internet protocol network the at least two differentiated sets of compressed digital image data in internet protocol format.

3. A device according to claim 2 and further comprising:

a time server in communication with the internet protocol network, the time server outputting a time base signal to the internet protocol network, the internet protocol network communicating the time base signal to the network interface, the network interface providing the tint base signal to the at least one digital processor.

4. A device according to claim 2 and further comprising:

the at least one sensor including at least one circuit, operation of the at least one circuit providing the digital sensor data.

5. A device according to claim 2 and further comprising:

the at least one sensor including at least one of:

a transducer, a condition sensor, an image processing device, an image processing circuit, a camera, an image capture device, a video capture device, a video and still image camera, a clock, a timer, an access control device, an audio sensor, a notion detector, a fire sensor, a temperature detector, a snake detector, a fire detector, a switch, a panic switch, a door contact, a floor sensor, an alarm, a manual alarm, an automated alarm, a panic bar, an electric door strike, a magnetic door strike, a door opener, a light, a siren, an emergency light, and fire control equipment.

6. A device according to claim 2 and further comprising:

the at least one sensor including at least one camera, the at least one camera providing digital sensor data, the digital sensor data including at least one of a still image and video.

7. A device according to claim 6 and further comprising:

the digital sensor data including both a still image in digital format and video in digital format;

at least one still image encoder for compressing according to at least one still image compression protocol the still image in digital format, the at least one still image encoder providing compressed still image data, the at least one still image encoder being in communication with the at least one digital processor;

at least one video encoder for compressing according to at least one video compression protocol the video in digital format, the at least one video encoder providing compressed video data, the at least one video encoder being in communication with the at least one digital processor, the digital sensor data received by the digital processor including the compressed still image data and the compressed video data.

8. A device according to claim 7 and further comprising:

the compressed still image data including data in MPEG format, the compressed video data including data in at least one of JPEG format and MPEG format.

9. A device according to claim 8 and further comprising:

at least one buffer in communication with the at least one analog to digital converter to receive the digital sensor data, the at least one buffer being in communication with the at least one video encoder for providing to the at least one video encoder the digital sensor data.

10. A device according to claim 8 and further comprising:

the digital sensor data when communicated from the network interface to the internet protocol network being contained in at least one sequence of data packets, the at least one sequence of data packets including the compressed still image data and the compressed video data.

11. A device according to claim 10 and further comprising:

at least one multiplexer in communication with the network interface, the at least one multiplexer being adapted to provide to the network interface at least one sequence of data including the compressed still image data and the compressed video data, the at least one sequence of data packets communicated to the internet protocol network from the network interface including the at least one sequence of data.

12. A device according to claim 2 and further comprising:

the at least one sensor including a camera, the camera a megapixel camera.

13. A device adapted to be connected to an internet protocol network, the device comprising:

a housing;

at least one camera supported by the housing, the at least one camera providing sensor data, the sensor data relating to at least one field of view of an environment external of the housing;

at least one analog to digital converter supported by the housing, the at least one analog to digital converter being connected to the camera to receive the sensor data, the at least one analog to digital converter digitizing the sensor data, the at least one analog to digital converter providing digital sensor data;

at least one digital processor supported by the housing, the at least one digital processor being in communication with the at least one analog to digital converter for receiving the digital sensor data; and a network interface supported by the housing, the network interface being in communication with the at least one digital processor for receiving the digital sensor data, the network interface being adapted to be connected to the internet protocol network for communicating to the internet protocol network the digital sensor data in internet protocol format.

14. A device according to claim 13 and further comprising:
a time server in communication with the internet protocol network, the time server outputting a time base signal to the internet protocol network, the internet protocol network communicating the time base signal to the network interface, the network interface providing the time base signal to the at least one digital processor.

15. A device according to claim 13 and further comprising:
the at least one camera including the at least one analog to digital converter.

16. A device according to claim 13 and further comprising:
the at least one camera including at least one of:
an image processing device, an image processing circuit, an image capture device, a video capture device, a video camera, and a video and still image camera.

17. A device according to claim 13 and further comprising:
the sensor data including both a still image and video;
the digital sensor data including both a still image in digital format and video in digital format;
at least one still image encoder for compressing according to at least one still image compression protocol the still image in digital format, the at least one still image encoder providing compressed still image data, the at least one still image encoder being in communication with the at least one digital processor;
at least one video encoder for compressing according to at least one video compression protocol the video in digital format, the at least one video encoder providing compressed video data, the at least one video encoder being in communication with the at least one digital processor,
the digital sensor data received by the digital processor including the compressed still image data and the compressed video data.

18. A device according to claim 17 and further comprising:
at least one buffer in communication with the at least one analog to digital converter to receive the digital sensor data, the at least one buffer being in communication with the at least one video encoder for providing to the at least one video encoder the digital sensor data.

19. A device according to claim 17 and further comprising:
the compressed still image data including data in MPEG format,
the compressed video data including data in at least one of JPEG format and MPEG format.

20. A device according to claim 17 and further comprising:
the digital sensor data when communicated from the network interface to the internet protocol network being contained in at least one sequence of data packets, the at least one sequence of data packets including the compressed still image data and the compressed video data.

21. A device according to claim 20 and further comprising:
at least one multiplexer in communication with the network interface, the at least one multiplexer being adapted to provide to the network interface at least one sequence of data including the compressed still image data and the compressed video data, the at least one sequence of data packets communicated to the internet protocol network from the network interface including the at least one sequence of data.

22. A device adapted to be connected to an internet protocol network, the device comprising:
a housing;
at least one camera supported by the housing, the at least one camera providing digital sensor data, the digital sensor data relating to at least one field of view, the digital sensor data including a still image in digital format and video in digital format;
at least one still image encoder for compressing according to at least one still image compression protocol the still image in digital format, the at least one still image encoder providing compressed still image data;
at least one video encoder for compressing according to at least one video compression protocol the video in digital format, the at least one video encoder providing compressed video data;
at least one digital processor supported by the housing, the at least one digital processor being in communication with the at least one still image encoder for receiving the compressed still image data, the at least one digital processor being in communication with the at least one still image encoder for receiving the compressed video data;
a network interface supported by the housing, the network interface being in communication with the at least one digital processor for receiving the compressed still image data and the compressed video data, the network interface being adapted to be connected to the internet protocol network for communicating to the internet protocol network the compressed still image data and the compressed video data in internet protocol format, the compressed still image data and the compressed video data when communicated to the internet protocol network being contained in at least one sequence of data packets, the at least one sequence of data packets including the compressed still image data and the compressed video data; and
at least one multiplexer in communication with the network interface, the at least one multiplexer being adapted to provide to the network interface at least one sequence of data including the compressed still image data and the compressed video data, the at least one sequence of data packets communicated to the internet protocol network from the network interface including the at least one sequence of data.

23. A device according to claim 22 and further comprising:
a time server in communication with the internet protocol network, the time server outputting a time base signal to the internet protocol network, the internet protocol network communicating the time base signal to the network interface, the network interface providing the tint base signal to the at least one digital processor.

24. A device according to claim 22 and further comprising:
at least one buffer in communication with the at least one camera to receive the digital sensor data, the at least one buffer being in communication with the at least one video encoder for providing to the at least one video encoder the digital sensor data.

25. A device according to claim 22 and further comprising:
the compressed still image data including data in MPEG format,
the compressed video data including data in at least one of JPEG format and MPEG format.

26. A device according to claim 22 and further comprising:
at least one of an ethernet hub and a wireless access point supported by the housing, the at least one of an et her net hub and a wireless access point being adapted to be connected to the internet protocol network for communicating with the internet protocol network, the at least one of an ethernet hub and a wireless access point being adapted to communicate with a client external of the housing for providing to the internet protocol network data from the client, the at least one of an ethernet hub and a wireless access point being in communication with the at least one digital processor for receiving the digital sensor data, the at least one of an ethernet hub and a wireless access point communicating to the internet protocol network the digital sensor data in internet protocol format.

27. A device adapted to be connected to an internet protocol network, the device comprising:
   a housing;
   at least one camera supported by the housing, the at least one camera providing digital sensor data, the digital sensor data relating to at least one field of view,
   at least one digital processor supported by the housing, the at least one digital processor being in communication with the at least one camera for receiving the digital sensor data;
   a location signal source in communication with the at least one digital processor for providing to the digital processor a location signal, the location signal corresponding to a location;
   a panic switch in communication with the at least one digital processor, operation of the panic switch by an operator providing to the digital processor a panic signal, the panic signal corresponding to a request for assistance by personnel; and
   a network interface supported by the housing, the network interface being in communication with the at least one digital processor for receiving the digital sensor data, the network interface being in communication with the at least one digital processor for receiving the signal, the network interface being adapted to be connected to the internet protocol network for communicating to the internet protocol network the digital sensor data, the location signal, and the panic signal.

28. A device as set forth in claim 27 and further comprising:
   a wireless communication channel in communication with at least one of the digital processor and the network interface, the wireless communication channel being in communication with the panic switch for providing the panic signal to the at least one of the digital processor and the network interface.

29. An appliance adapted for connection to a security system the security system including an internet protocol network, the appliance comprising:
   a sensor component, the sensor component including a video sensor component adapted for generating a video signal in response to a condition present at the video sensor component;
   an analog-to-digital converter for converting the video signal from analog format to digital format, the analog-to-digital converter thus producing a digital video signal;
   a motion video buffer;
   an mpeg compressor associated with the motion video buffer, the mpeg compressor producing compressed mpeg output;
   a still frame buffer;
   a jpeg compressor associated with the still frame buffer, the jpeg compressor producing compressed jpeg output;
   a multiplexer for combining the compressed mpeg output and the compressed jpeg output for generating a combined output signal, the combined output signal being communicated to the processor;
   a processor for generating a digital output signal corresponding to the combined output signal; and
   a network interface for transmitting the digital output signal to the internet protocol network.

30. An appliance according to claim 29 and further comprising:
   an audio sensor component, the audio sensor component being adapted for producing an audio signal in response to a condition present at the audio sensor component;
   an analog-to-digital converter for converting the audio signal from analog for ma to digital format, the analog-to-digital converter thus producing a digital audio signal;
   an audio compressor associated with the audio sensor component for producing a compressed audio signal;
   the multiplexer being in communication with the audio compress or for receiving the compressed audio, the multiplexer being in communication with the jpeg compressor for receiving the compressed jpeg, the multiplexer being in communication with the mpeg compress or for receiving the compressed mpeg, the multiplexer being adapted for producing the combined output signal, the combined output signal including the compressed audio, the compressed jpeg and the compressed mpeg.

31. The appliance according to claim 29 and further comprising:
   wherein the internet protocol network is a hardwired network, the network interface including a connector.

32. The appliance according to claim 29 and further comprising:
   wherein the internet protocol network includes a wireless network, the network interface including a wireless transmitter.

33. The appliance according to claim 32 and further comprising:
   the network interface including a wireless receiver.

34. The appliance according to claim 29 and further comprising:
   the digital output signal including a location signal, the location signal identifying a location of the appliance.

35. The appliance according to claim 34 and further comprising:
   the location signal including a gps signal.

36. The appliance according to claim 29 and further comprising:
   the digital output signal including a device identification signal, the device identification signal identifying a device type.

37. The appliance according to claim 29 and further comprising:
   the network interface including an embedded base-T hub.

38. The appliance according to claim 29 and further comprising:
   the network interface including a wireless receiver and a hard-wired connector.

39. The appliance according to claim 29 and further comprising:
   the sensor component including a plurality of distinct sensor sub-components, the plurality of distinct sensor sub-components each producing a respective sub-component sensor signal, the processor combining the plurality of sub-component sensor signals into a digital sensor signal having a plurality of digital sub-signals.

40. The appliance according to claim 29 and further comprising:
a self-contained power supply.

41. The appliance according to claim 29 and further comprising:
the network interface including a LAN data link, the LAN data link having a hub physical-layer interface, the LAN data link having two twisted-pair wires, the LAN data link having a first transformer connecting the two twisted-pair wires to the hub physical-layer interface, the LAN data link having a network device physical-layer interface connected to the two twisted-pair wires, the LAN data link having a second transformer connected to a peripheral device.

42. The appliance according to claim 29 and further comprising:
the sensor component including a motion detector.

43. The appliance according to claim 29 and further comprising:
the sensor component including a smoke detector.

44. The appliance according to claim 29 and further comprising:
the sensor component including a temperature detector.

45. The appliance according to claim 29 and further comprising:
the sensor component including a manual switch for generating a signal when actuated.

46. The appliance according to claim 29 and further comprising:
the sensor component including a contact switch.

47. The appliance according to claim 29 and further comprising:
the sensor component including a thermal sensor adapted for detecting body heat.

48. The appliance according to claim 29 and further comprising:
the sensor component including a glass breakage sensor.

49. The appliance according to claim 29 and further comprising:
the sensor component including a signal-generating unit for generating a local warning signal, the local warning signal being local to the environment of the appliance.

50. The appliance according to claim 29 and further comprising:
a signal generating unit including a clock, the clock including a visual display.

51. The appliance according to claim 29 and further comprising:
the digital output signal including an emergency event annunciation signal.

52. The appliance according to claim 29 and further comprising:
a pager, the digital output signal including a paging signal.

53. The appliance according to claim 29 and further comprising:
an intercom the digital output signal including an intercom signal.

54. The appliance according to claim 29 and further comprising:
a gunshot detector, the digital output signal including a gunshot detection signal.

55. The appliance according to claim 29 and further comprising:
a room access control, the digital output signal including an access control signal.

56. The appliance according to claim 29 and further comprising:
a mute control, the digital output signal including a mute control signal, the mute control signal being communicated to mute at least one of a camera and a microphone.

57. The appliance according to claim 29 and further comprising:
a panic switch, the digital output signal including a panic switch signal, the panic switch signal when the panic switch is actuated causing operation of at least one of a camera and a microphone.

58. The appliance according to claim 57 and further comprising:
an intercom operation of the intercom being initiated by actuation of the panic switch.

59. The appliance according to claim 57 and further comprising:
the panic switch signal when the panic switch is actuated causing an emergency notification.

60. The appliance according to claim 57 and further comprising:
the panic switch signal when the panic switch is actuated causing activation of a location icon on a map display.

61. The appliance according to claim 57 and further comprising:
the panic switch signal when the panic switch is actuated causing emergency communications to be recorded.

62. The appliance according to claim 55 and further comprising:
when access is attempted the access control signal causing display of at least one of the compressed mpeg output and the compressed jpeg output in the digital output signal.

63. The appliance according to claim 29 and further comprising:
an encryption algorithm stored in media and operable to encrypt at least one of the combined signal and the digital output signal.

64. The appliance according to claim 29 and further comprising:
the sensor component including a biometric identification device.

65. The appliance according to claim 29 and further comprising:
the video sensor component including a tilt/pan/zoom camera.

66. The appliance according to claim 29 and further comprising:
the sensor component including a manual fire alarm.

67. The appliance according to claim 29 and further comprising:
the sensor component including a contact closure interface.

68. The appliance according to claim 29 and further comprising:
the sensor component including at least one of a telephone interface and a telephone dialer.

69. The appliance according to claim 29 and further comprising:
the sensor component including an electric door strike.

* * * * *